US007949577B1

(12) United States Patent
Cooper et al.

(10) Patent No.: US 7,949,577 B1
(45) Date of Patent: May 24, 2011

(54) COMMISSION MANAGEMENT SYSTEM

(75) Inventors: Patricia H. Cooper, Dunwoody, GA (US); Thomas C. Smith, Roswell, GA (US); Derek L. Calhoun, Marietta, GA (US); Kevin S. Cunningham, Atlanta, GA (US); Vickey Ford Pharr, Dunwoody, GA (US); Diane F. Tucker, Alpharetta, GA (US); Amy Zwarico, Mountain Brook, AL (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 1732 days.

(21) Appl. No.: 10/305,404

(22) Filed: Nov. 25, 2002

Related U.S. Application Data

(60) Provisional application No. 60/343,756, filed on Dec. 27, 2001.

(51) Int. Cl.
G07B 17/00 (2006.01)
G07F 19/00 (2006.01)
(52) U.S. Cl. .......................... 705/30; 705/10; 705/14.16
(58) Field of Classification Search .................. 705/14
See application file for complete search history.

(56) References Cited

U.S. PATENT DOCUMENTS

| 6,105,001 A * | 8/2000 | Masi et al. ...................... 705/14 |
| 6,134,533 A * | 10/2000 | Shell ................................ 705/26 |
| 6,321,202 B1 * | 11/2001 | Raveis, Jr. ......................... 705/1 |
| 6,662,164 B1 * | 12/2003 | Koppelman et al. ............. 705/14 |
| 6,782,369 B1 * | 8/2004 | Carrott ............................... 705/1 |
| 2003/0004840 A1 * | 1/2003 | Gharavy ......................... 705/30 |

* cited by examiner

Primary Examiner — F. Zeender
Assistant Examiner — Luna Champagne
(74) Attorney, Agent, or Firm — Fay Kaplun & Marcin, LLP

(57) ABSTRACT

A computer system and method for managing commissions, including: a storage device containing a database having commission data and a periodic extract of sales transactions stored therein; a user interface for inputting the commission data into the database and viewing the commission data stored in the database; and a processor for calculating commissions for sales representatives and agents associated with a business enterprise based on the commission data, and forwarding the calculated commissions to a payroll department within the business enterprise; wherein the processor executes: a first software module for retrieving billing, inventory, corporate, and affiliated sales information for the sales representatives, and for calculating the commissions based on a predetermined rules set; and a second software module for retrieving billing and affiliated sales information for the agents, and for calculating the commissions based on the terms of a contract between the agent and the business enterprise.

13 Claims, 59 Drawing Sheets

COMMISSION MANAGEMENT SYSTEM

CROSS REFERENCE TO RELATED APPLICATION

This application claims the benefit of U.S. application Ser. No. 10/099,658, filed Mar. 15, 2002, which claims the benefit of U.S. Provisional Application Ser. No. 60/343,756, filed Dec. 27, 2001.

COPYRIGHT NOTIFICATION

Portions of this patent application include materials that are subject to copyright protection. The copyright owner has no objection to the facsimile reproduction by anyone of the patent document itself, or of the patent application, as it appears in the files of the United States Patent and Trademark Office, but otherwise reserves all copyright rights whatsoever in such included copyrighted materials.

BACKGROUND

The present invention relates to a system and method of calculating commissions, bonuses, and residuals for sales representatives and agents. The system and method forwards the calculated values to payroll or accounting for processing.

SUMMARY

In one embodiment, the present invention relates to a computer system for managing commissions, including: a storage device containing a database having commission data and a periodic extract of sales transactions stored therein; a user interface for inputting the commission data into the database and viewing the commission data stored in the database; and a processor for calculating commissions for sales representatives and agents associated with a business enterprise based on the commission data, and forwarding the calculated commissions to a payroll department within the business enterprise; wherein the processor executes: a first software module for retrieving billing, inventory, corporate, and affiliated sales information for the sales representatives, and for calculating the commissions based on a predetermined rules set; and a second software module for retrieving billing and affiliated sales information for the agents, and for calculating the commissions based on the terms of a contract between the agent and the business enterprise.

In another embodiment, the present invention relates to a method of managing commissions, including: communicating with a plurality of commissions object servers located in a central location via a client component implemented as a plurality of GUI applications; determining commission compensation amounts via a plurality of interface processes components; and reporting the commission compensation amounts.

In a further embodiment, the present invention relates to a commission management system, including: a first computer including one or more clients and browsers in communication with a plurality of remotely located computers; wherein the first computer collects commission data from the plurality of remotely located computers and executes: a first software module for retrieving billing, inventory, corporate, and affiliated sales information for sales representatives associated with a business enterprise via the remotely located computers, and for calculating commissions based on a predetermined rules set; and a second software module for retrieving billing and affiliated sales information for agents associated with the business enterprise, via the remotely located computers and for calculating the commissions based on the terms of a contract between the agent and the business enterprise.

These and various other features of the embodiments of the preset invention will become apparent to those skilled in the art from the following description and corresponding drawings. As will be realized, the present invention is capable of modification without departing from the scope of the invention. Accordingly, the description and the drawings are to be regarded as being illustrative in nature, and not as being restrictive.

BRIEF DESCRIPTION OF THE DRAWINGS

The present invention will be described in conjunction with the following figures, wherein like parts are referenced by like numerals throughout the several views and wherein:

FIGS. 6 through 26 illustrate various example screens associated with a portion of a software module feature according to one embodiment of the present invention;

FIGS. 31 through 36 illustrate various example screens associated with a portion of a software module feature according to one embodiment of the present invention;

FIGS. 37 through 38 illustrate various example screens associated with a portion of a software module feature according to one embodiment of the present invention;

FIGS. 39 through 41 illustrate various example screens associated with a portion of a software module feature according to one embodiment of the present invention;

FIGS. 42 through 44 illustrate various example screens associated with a portion of a software module feature according to one embodiment of the present invention;

FIG. 45 illustrates one example of a screen associated with a portion of a software module feature according to one embodiment of the present invention;

FIGS. 46 through 52 illustrate various example screens associated with a portion of a software module feature according to one embodiment of the present invention;

FIGS. 64 to 76 illustrate various example screens associated with a portion of a software module feature according to one embodiment of the present invention;

FIGS. 95 to 100 illustrate various example screens associated with a portion of a software module feature according to one embodiment of the present invention;

FIG. 101 illustrates one example of a screen associated with a portion of a software module feature according to one embodiment of the present invention;

FIG. 104 illustrates one example of a screen associated with a portion of a software module feature according to one embodiment of the present invention;

FIGS. 105 to 109 illustrate various example screens associated with a portion of a software module feature according to one embodiment of the present invention;

DESCRIPTION

It is to be understood that the figures and descriptions of the present invention have been simplified to illustrate elements that are relevant for a clear understanding of the present invention while eliminating, for purposes of clarity, other elements found in a conventional communications system. It can be recognized that other elements may be desirable and/or required to implement a system incorporating the present invention. For example, the details of the system architecture are not disclosed because such elements are well known in the art. Furthermore, because the description of such elements does not facilitate a better understanding of the present invention, a discussion of such elements is not provided herein.

The present invention is directed to a table-driven, rules-based software system that defines, manages, and reports on the compensation earned by a sales force through commissions. The system includes a database having commission data and a periodic extract of sales transactions, interfaces for users, and server-side business logic. The interfaces include an Internet application that can be used by sales personnel to view current commissions, Windows NT-based clients that can be used by those personnel that design and manage the commission program, and an Internet client that can be used by personnel for generating ad hoc reports.

Figure 1:
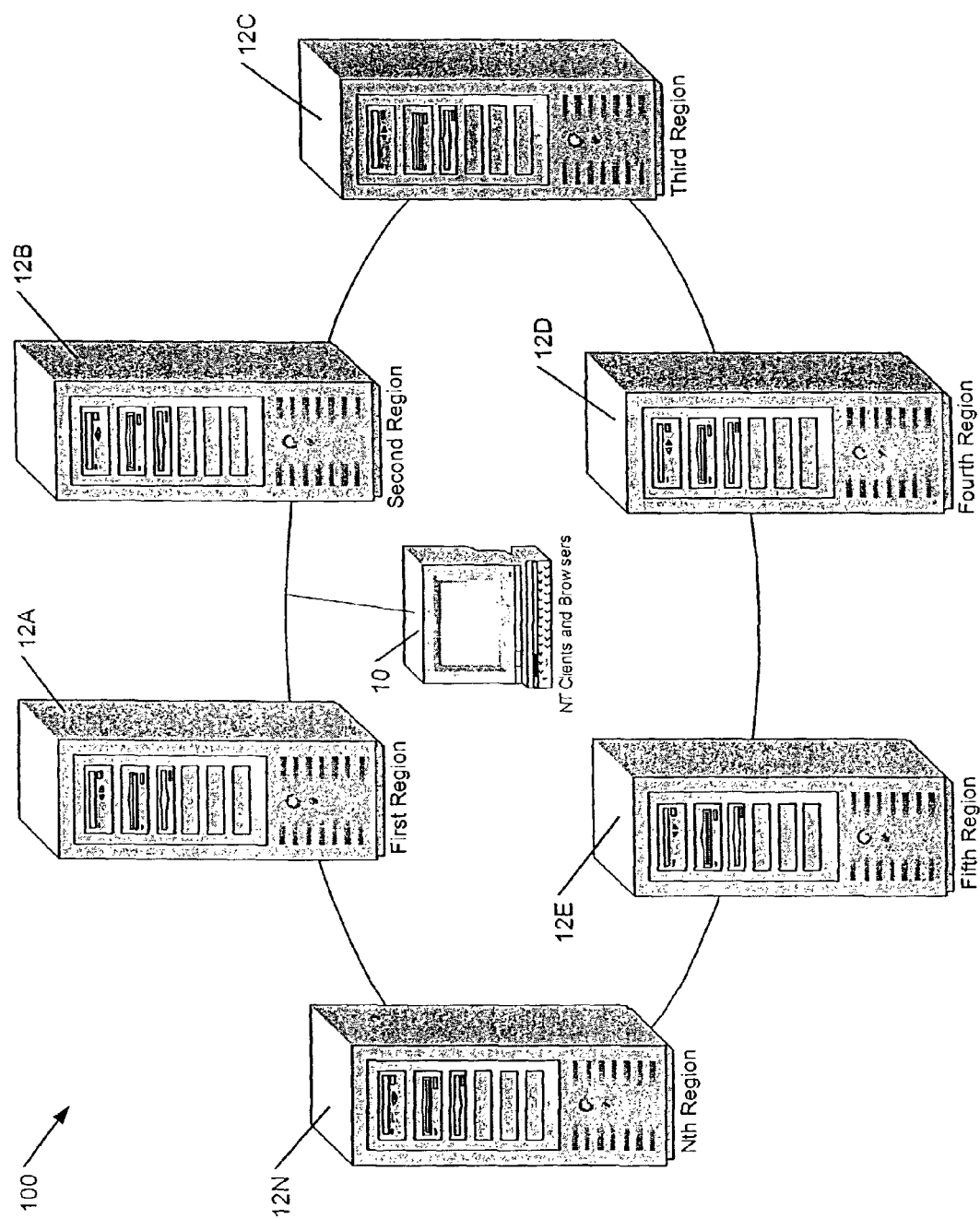
FIG. 1 illustrates one embodiment of a distributed environment in which one embodiment of the present invention may be employed.
Figure 2:
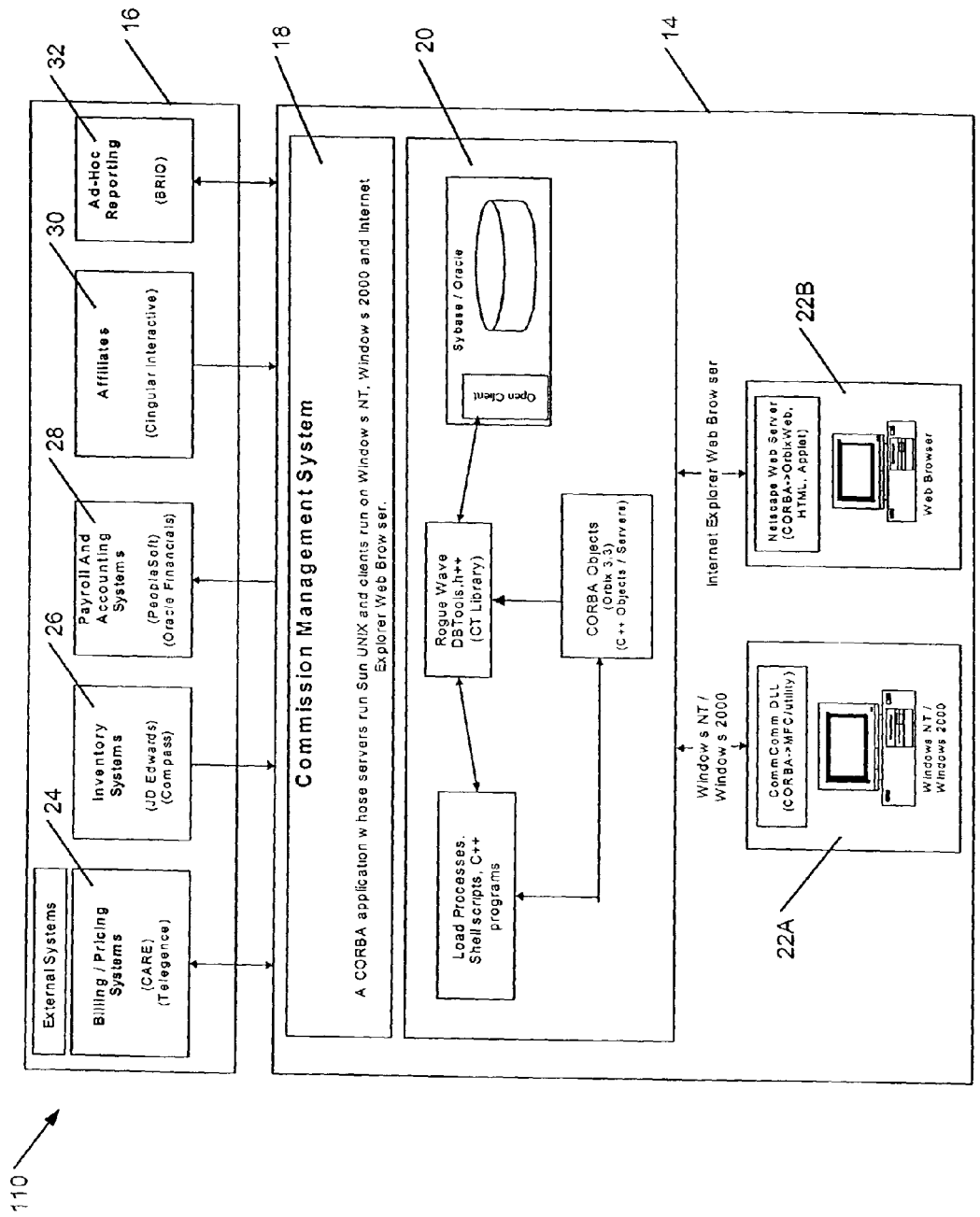
FIG. 2 illustrates one embodiment of a system architecture in which one embodiment of a commission management system according to the present invention may be employed.

The present invention may receive commission data from, for example, a billing backend computer system that interacts with various point of sale terminals. FIGS. 1 and 2 below provide an example of an implementation of the commission management system according to the present invention known under the trade designation "HORIZON."

The present invention provides a system that rapidly responds to external sales and marketing changes and allows sales incentive programs to be designed without being constrained by time or technology. The present invention also reduces errors associated with conventional commission methods and reduces compensation administrative costs.

In one embodiment the present invention provides functionality for calculating commissions, bonuses, and residuals for sales representatives and agents, and for forwarding the calculated information to a payroll or accounting department within a business enterprise. Generally, this sort of information is date-sensitive, having both an effective date and an expiration date associated with each record. This enables one embodiment of the present invention to provide a "snapshot" of historical data, by way of effective period. A first software module (Direct Module) is also provided for retrieving billing, inventory, corporate, and affiliated sales information for direct and indirect sales forces associated with a business enterprise, and for calculating commissions and bonuses based on the rules set forth in one embodiment of the present invention. A second software module (Agent Module) is also provided for retrieving billing and affiliated sales information for agents associated with the business enterprise, and for calculating commissions and residual payments based on the terms of each agent's contract(s). Those skilled in the art will appreciate that other modules may provide administrative functions that bridge both the Direct Module and the Agent Module.

A further description of the present invention will now be deferred pending a brief description of a basic software and hardware system architecture in which the present invention may be employed. Various components may be required to define and deliver compensation to the sales force. Accordingly, one embodiment of the present invention provides various components such as: a commissions client, interface processes, ad-hoc reporting, and commissions web system.

A commission system client component according to one embodiment of the present invention is implemented as a plurality of Windows GUI applications that communicates with various commissions object servers located in a central location. The commission system client provides for day-to-day operation and maintenance of commission information, while the object servers define specific functionality, based on individual business requirements. Multiple objects can be accessed, providing different types of information. The commission system client provides the interface, which allows commissions specialists to approve or reject specific sales transactions, calculate commission and/or bonus amounts, and maintain sales force information. Additional functionality allows specified compensation designers within a business enterprise to define and implement approved compensation programs without the need for major development efforts.

Interface processes components are provided in order for the commission system client to accurately determine compensation amounts. Accordingly, data must be provided to the system from several different sources: billing/pricing systems, inventory systems, payroll and accounting systems, affiliated systems, and ad-hoc reporting systems. Following commission processing, the commission system data is transmitted to a financial administrative system so that compensation checks can be written to both sales representatives and agents. Interface processes, therefore, exist between the commission system and each source of data, as well as between the commission system and the downstream systems that its feeds.

An ad-hoc reporting component provides reporting tools that can be purchased to provide custom reports for both the sales force and management. Standardized reports can be stored within a corporate repository for communal use. Data is accessed directly from the commission system's database for speed, flexibility, and accuracy.

A commission web system component provides a means for sales representatives to validate their sales and commission information on a weekly basis, prior to its capture by the commission system, in order to eliminate "after the fact" reconciliation. Information is secured and access is allowed only to pertinent data. Errors or discrepancies in sales activity discovered during a current month can therefore be corrected through the sales/billing systems before being converted to commissions transactions.

One embodiment of the present invention may be implemented utilizing conventional software and database management tools such as, for example, C++, Visual C++, Java, RPG-ILE, SQL, Korn Shell, and Sybase/Oracle. Various middle-ware foundation software tools such as, for example, Orbix (CORBA), Orbix (Web), Rogue Wave, Spread, Input Pro, Netscape Web Server, and Visual Café can be used to implement one embodiment of the present invention. Operating system, network protocols, and hardware systems that can be used to implement one embodiment of the present invention include, for example, Windows NT, Windows 2000, Sun Solaris 2.6/2.8, TCP/IP, IIOP, HTTP, and 1 Sun E10000/3 Sun Fire 6800's.

One embodiment of the present invention utilizes the CORBA architecture. CORBA is the acronym for Common Object Request Broker Architecture, Object Management Group's (OMG) open, vendor-independent architecture and infrastructure that computer applications use to work together over networks. Using the IIOP standard protocol, a CORBA-based program from any vendor, on almost any computer, operating system, programming language, and network, can interoperate with a CORBA-based program from the same or another vendor, on almost any other computer, operating system, programming language, and network, for example.

The CORBA architecture allows programmers and administrators to share business functionality across applications written in any programming language. The IONA Orbix 3.3, for example, is capable of supporting billions of objects and hundred of thousands of clients and offers great scalability.

CORBA applications are composed of objects, which are individual units of running software that combine functionality and data. Generally, there are many instances of an object of a single type. For example, an e-commerce website may have many shopping cart object instances, all identical in functionality but differing in that each is assigned to a different customer, and contains data representing the merchandise that its particular customer has selected. For other types, there may be only one instance. When a legacy application, such as an accounting system, is wrapped in code with CORBA interfaces and opened up to clients on a network, there is usually only one instance.

For each object type, such as the shopping cart mentioned above, an interface can be defined in OMG IDL. The interface is the syntax portion of the contract that the server object offers to the clients that invoke it. Any client that wants to invoke an operation on the object must use this IDL interface to specify the operation it wants to perform. The IDL interface definition is independent of programming language, but maps to all of the popular programming languages via OMG standards.

In CORBA, every object instance has its own unique object reference, an identifying electronic token. Clients use the object references to direct their invocations, identifying to the ORB (Object Request Broker) the exact instance they want to invoke. The client acts as if it is invoking an operation on the object instance, but it is actually invoking on the IDL stub which acts as a proxy. Passing through the stub on the client side, the invocation continues through the ORB, and the skeleton on the implementation side, to get to the object where it is executed.

FIG. 1 illustrates one embodiment of a distributed environment 100 in which the present invention may be employed. In one embodiment, a first computer 10 comprising one or more NT clients and browsers, for example, is in communication with a plurality of computers 12A, 12B, 12C, 12D, 12E, and 12N thus forming a distributed computing environment for collecting commissions data and for running the commission management system according to the present invention.

FIG. 2 illustrates one embodiment of a system architecture 110 in which one embodiment of a commission management system according to the present invention may be employed. The system architecture 110 comprises a first computer system 14 in communication with one or more external systems 16. Those skilled in the art will appreciate that the external systems 16 may form a portion of a distributed computing environment residing in various geographic locations. One embodiment of a commission management system 18 may reside in the first computing system 14 in the form of a CORBA application executing on one or more servers. In one embodiment the CORBA application implementing one embodiment of the present invention runs on a server 20 that runs a SUN UNIX operating system and clients 22A, 22B that run WINDOWS NT, WINDOWS 2000, and Internet EXPLORER Web Browser, respectively, for example. The external systems 16 include one or more Billing/Pricing Systems 24, Inventory Systems 26, Payroll and Accounting Systems 28, Affiliate Systems 30, and Ad-Hoc Reporting Systems 32.

One embodiment of the present invention will now be described with reference to various software modules and screen views designed for capturing and processing unique information associated with the commission management system according to one embodiment of the present invention. Those skilled in the art will appreciate that there may exist many implementations of software modules and screen views that can be used accomplish the various features of the present invention and, therefore, the following description is for illustrative purposes and is not to be construed as limiting the scope of the invention thereto. Accordingly, following is a description of one embodiment of: (1) a Direct Module with associated screen descriptions and procedures; (2) an Agent Module with associated screen descriptions and procedures; (3) Other Modules with associated screen descriptions and procedures; and (4) various Toolbar Functions.

Although the screen format associated with the each example screen within the commission management system is designed to capture and process unique information, certain aspects of each screen remain consistent throughout as follows: the commission management system displays the user-name, environment, region and location across the top of each screen. From the toolbar, the View menu can be used to change to a different location. Below this line is the toolbar, containing the following menus, wherein certain items in these menus may be disabled based on the particular security set-up:

1. "File," which includes Print Setup and Exit;
2. "View," which includes Location, Refresh, Messages and Status Bar;
3. "Direct," which includes Reports, Tools and Payroll;
4. "Agent," which includes Reports, Tools and Accounting;
5. "Support," which includes Processes and Log;
6. "Help," which includes Help Topics and About the commission management system.

A status bar is displayed across the bottom of each screen. This bar identifies the next payroll date, the next accounting date for local agents, and the next accounting date for national retail agents. It can be turned "on" and "off" through the View menu by clicking the Status Bar.

As appropriate, screens will display function buttons that allow Commission Specialists to add and maintain data. Although individual screens may include additional function buttons, these will be addressed in that specific screen's description. The most common of these buttons are:

1. "Add," which schedules a blank dialog box for the addition of new data;
2. "Edit," which allows modification to existing data;
3. "Remove," which schedules a "confirmation" window before deleting existing data;
4. "Expire," which schedules an expiration window to define the date the data is no longer in effect.

The data displayed on each screen is automatically sorted based on pre-defined criteria. A highlighted arrow in a column heading designates that column as a sort, and indicates either an ascending or a descending sequence. To reverse the sort sequence, click on the arrow. To sort based on different criteria, click on a different column heading. To re-establish the default sorts, the user can use the View menu in the toolbar and click Refresh, or simply press F5.

Figure 3:
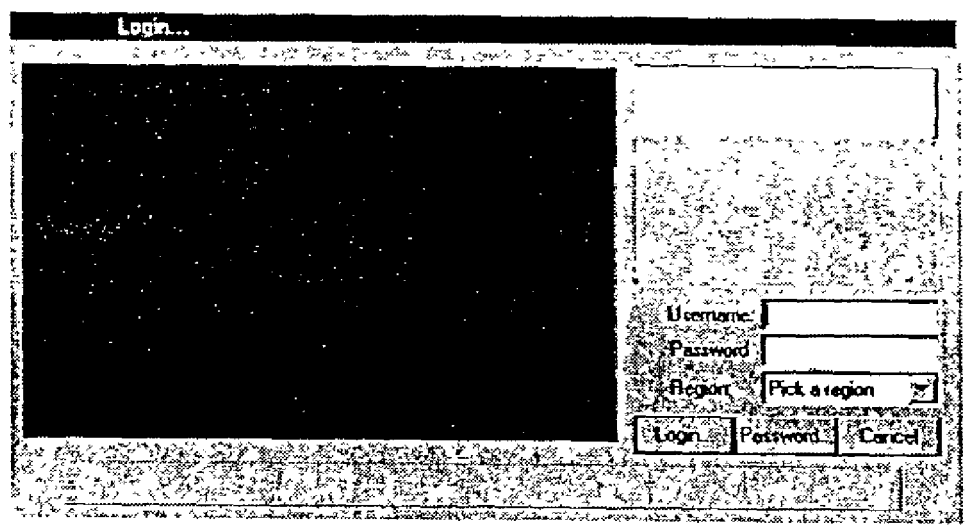
FIG. 3 illustrates one example of a commission management system login screen of a commission management system according to one embodiment of the present invention.

Turning now to FIG. 3, one embodiment of one example of a commission management system login screen 130 is illustrated. The current commission management system executable program can be set up as a "shortcut" on a user's desktop. Clicking the icon for this shortcut can provide access to the executable program. The commission management system Login screen provides the user with a means for entering a Username and Password. The user then uses the drop-down list to select a particular geographic region, and clicks the Login button.

Figure 4:
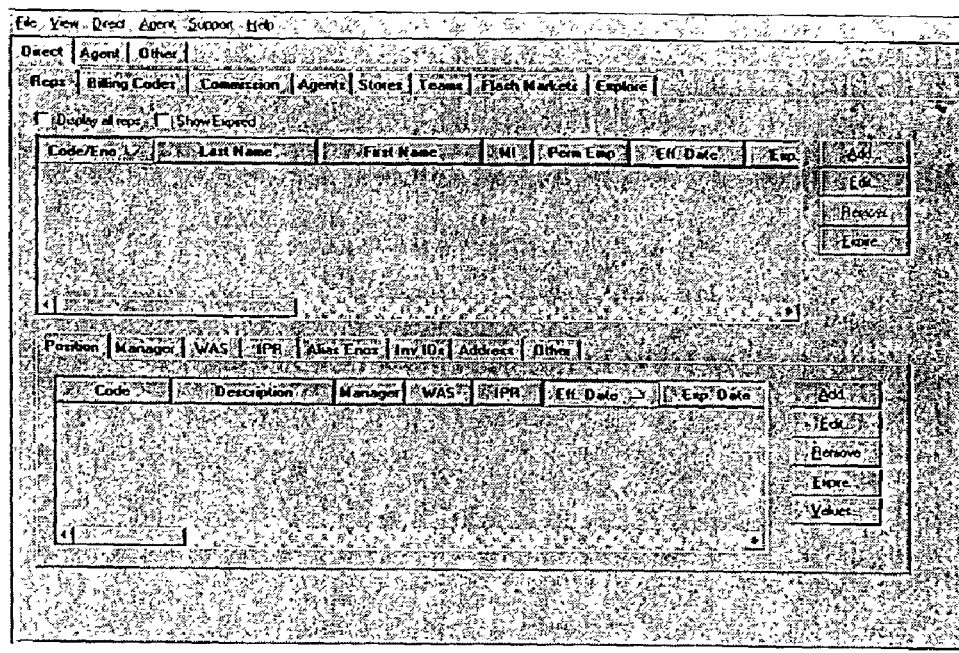
FIG. 4 illustrates one example of a permission screen assigned to a particular user of a commission management system according to one embodiment of the present invention.

FIG. 4, illustrates one embodiment of one example of a permission screen 140 assigned to the particular user. The permissions assigned to the specific security ID define exactly what segments of the commission management system a user can access, so the first screen that a user sees after logging on may not include all available tabs. A user such as a Commissions Specialist with full permission to both the Direct and Agent modules would see the permission screen 140 as illustrated.

Figure 5:
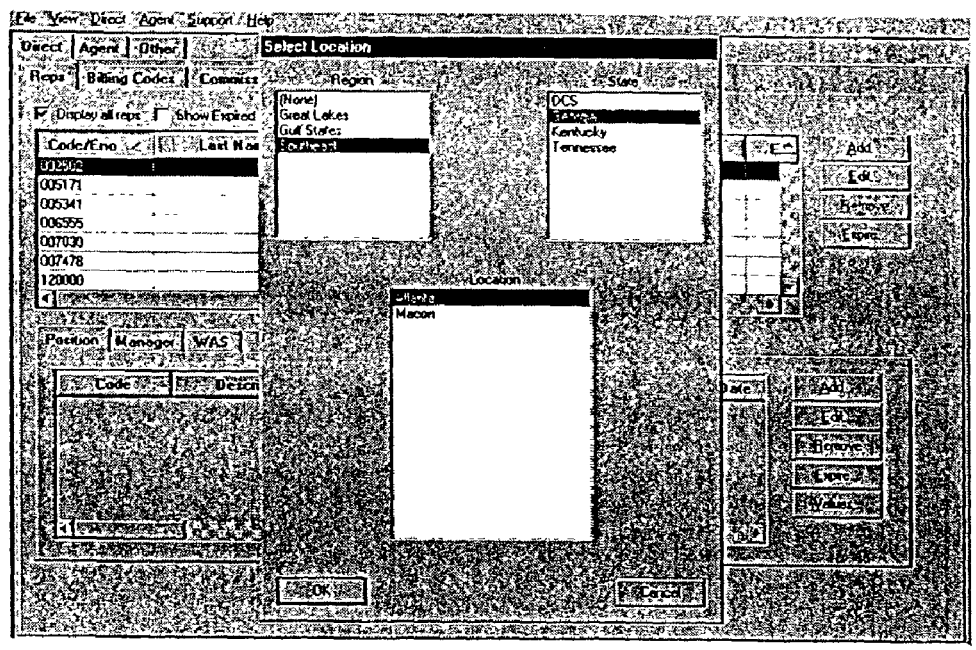
FIG. 5 illustrates one example of a select location screen selected by a user of a commission management system according to one embodiment of the present invention.

FIG. 5, illustrates one embodiment of one example of a select location screen 150 selected by the user. In use, the user selects the location needed to work in via the View menu on the toolbar and clicks on Location to display the Select Location window, listing those regions, states, and locations that the particular security set-up gives the user access to. From the select location window 150, the user highlights the region, state, and location of interest on clicks on OK to switch to that location, or Cancel to close the window. To end the commission system session, the user accesses the File menu on the toolbar and clicks Exit.

Direct Module

One embodiment of the present invention will now be discussed with respect to the Direct Module screen descriptions and procedures. There are eight different tab options provided within the commission management system Direct Module, separate tabs are provided to process different types of data. The separate tabs are as follows:

1. "Reps"—Defines detailed information for each sales representative.
2. "Billing Codes"—Lists all billing transaction codes, identifies those considered commissionable, and defines the value(s) associated with each.
3. "Commission"—Displays detailed sales transactions for the month, as well as commissions and bonus values. Also allows users to make manual adjustments and re-calculate on demand.
4. "Agents"—Defines detailed information for each direct agent, and provides the parameter list of agents for whom data is extracted from the billing systems.
5. "Stores"—Defines detailed information for each retail store or kiosk.
6. "Teams"—Defines detailed information for each team of sales representatives.
7. "Flash Markets"—Displays data for indirect sales flash markets. Agents within these markets are then assigned to indirect sales representatives as part of their set-up.
8. "Explore"—Provides a search tool that displays detailed information about all transactions associated with a particular mobile number.

FIGS. 6 through 26 illustrate various example screens associated with the "Reps" tab portion of the commission management system's Direct Module feature. It is to be understood that such example screens are provided for illustrative purposes only and, therefore, the present invention should not be limited thereby. Turning now to FIG. 6, one embodiment of one example of a "Reps" (Representatives) tab screen 160 is illustrated. The Reps tab and its sub-tabs define detailed information for each sales representative of the business enterprise. Note that each sub-tab displays a historical view of all associated records for the highlighted representative, along with the dates each was in effect. Initially, the "Reps" tab lists those active representatives in the specified location which are identified as the Commission Specialist. The user can click on "Display all representatives" to list all representatives in this location, regardless of Commission Specialist. Otherwise, the user can click on "Show expired" to list only expired representatives in this location.

As provided in the example screen illustrated in FIG. 7, within the "Reps" tab screen 160, the user can select the "Rep" dialog screen 170. The "Rep" dialog screen 170 defines high-level information about each sales representative in the commission management system, including his/her employee number, SSN, and full name. The "Reps" tab screen 160 field definitions associated with the "Rep" dialog screen 170 are:

1. "Code/Eno"—Enter the representative code/employee number. If applicable, the commission management system inserts the market prefix at the beginning of this entry.
2. "SSN"—Enter the representative's social security number.
3. "Last Name"—Enter the representative's last name.
4. "First Name"—Enter the representative's first name.
5. "MI"—Enter the representative's middle initial.
6. "Effective"—Use the calendar to select the date the representative is effective in the commission management system.

7. "Expiration"—Use the calendar to select the date the representative expires from the commission management system.

8. "Address"—Enter the representative's address.
Line 1
Line 2
Line 3
City
State
Zip
Type 9. "Phone"—Enter the representative's phone number(s), and a type for each.
Phone 1
Type
Phone 2
Type
Phone 3
Type 10. "Other"—Not currently used.

11. "Is Active"—Click to indicate whether or not the representative is currently active. Setting this flag allows a representative who is expired from the commission management system but is still an active employee in another area to receive a pro-rated portion of their bonus.

12. "Is Permanent"—Click to indicate whether or not the representative is a permanent employee. Setting this flag indicates that the commission and/or bonus calculated for the representative should be included in the feed to payroll.

Figure 8:
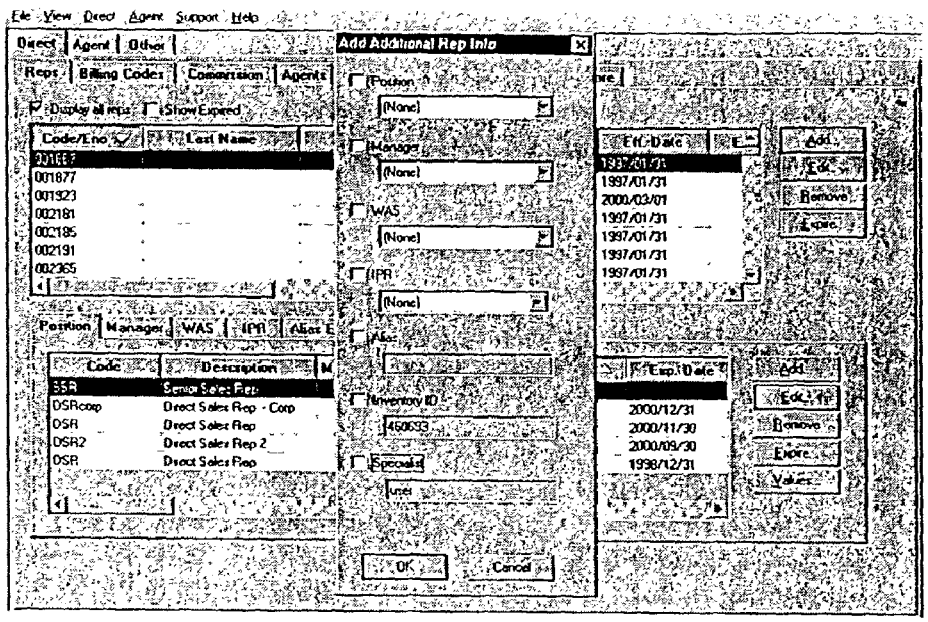

As provided in the example screen illustrated in FIG. 8, within the "Reps" tab screen 160, the user can select the "Add Additional Rep Info" dialog screen 180. The "Add Additional Rep Info" dialog screen 180 is scheduled whenever a new representative is added to facilitate the creation of the sub-records for that representative. By clicking each box, the associated detailed dialog or set of dialogs is scheduled as described in the following pages. The drop-down lists provided for Position, Manager, WAS, and IPR can be used to by-pass the corresponding "selection" dialogs as described in the following pages.

Figure 9:
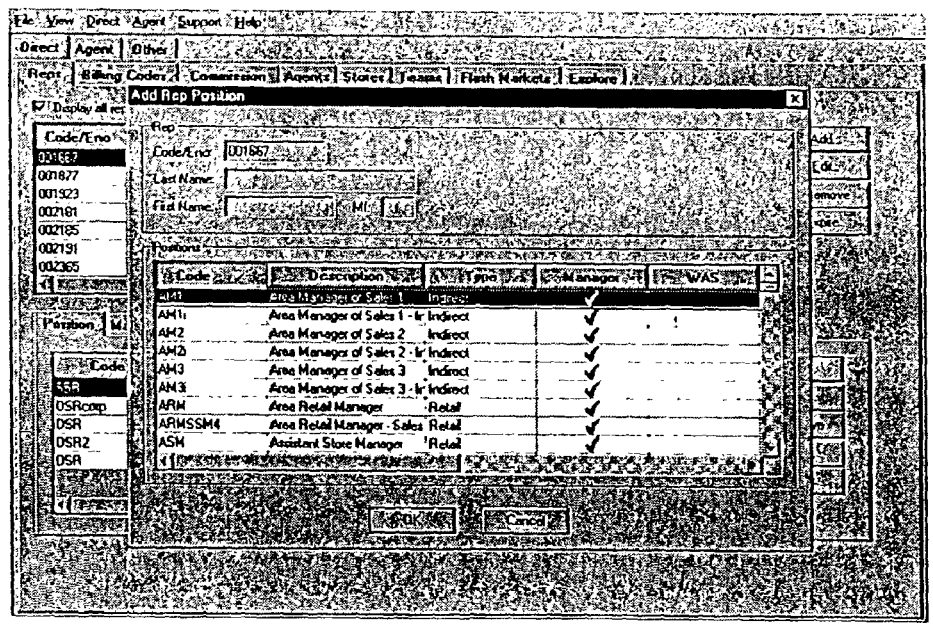

As provided in the example screen illustrated in FIG. 9, within the "Reps" tab screen 160, the user can select the "Add Rep Position" dialog screen 190. The "Add Rep Position" dialog screen 190 allows a user to select the position code assigned to the representative. Only one position record can be active at any given time for a representative.

The "Add Rep Position" field definitions are:

1. "Rep"—The selected representative's ID and name.
Code/Eno
Last Name
First Name
MI 2. "Positions"—The commission management system lists all positions defined in the system. Highlight a line to select the correct position for the representative.
"Code"—The position code.
"Description"—The position name.
"Type"—The type of position.
"Manager"—Flag indicating if this is a manager position.
"WAS"—Flag indicating if this is a wireless application specialist position.
"IPR"—Flag indicating if this is an interactive paging service representative position.

Figure 10:
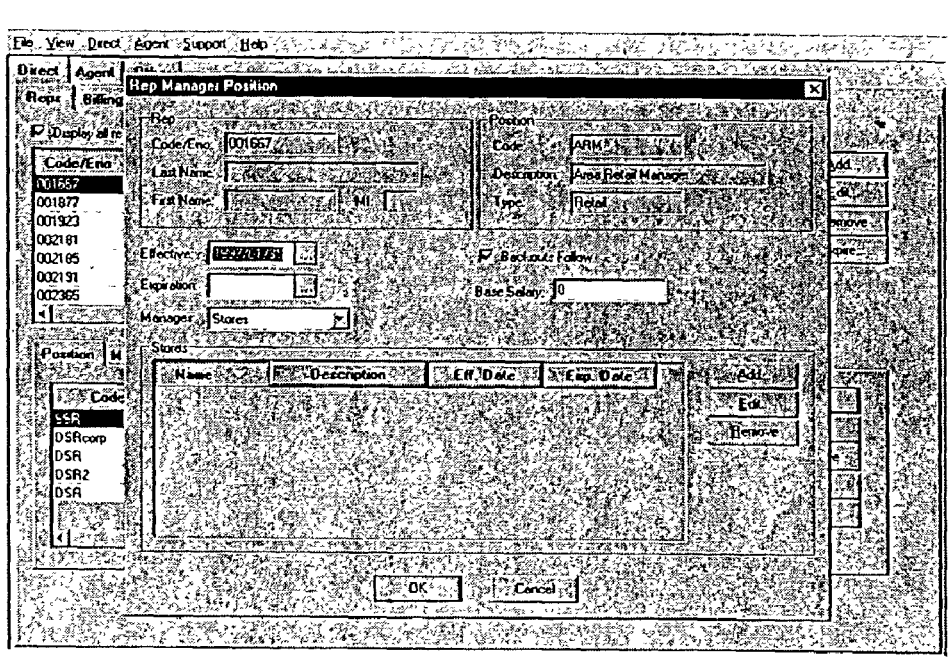
Figure 11:
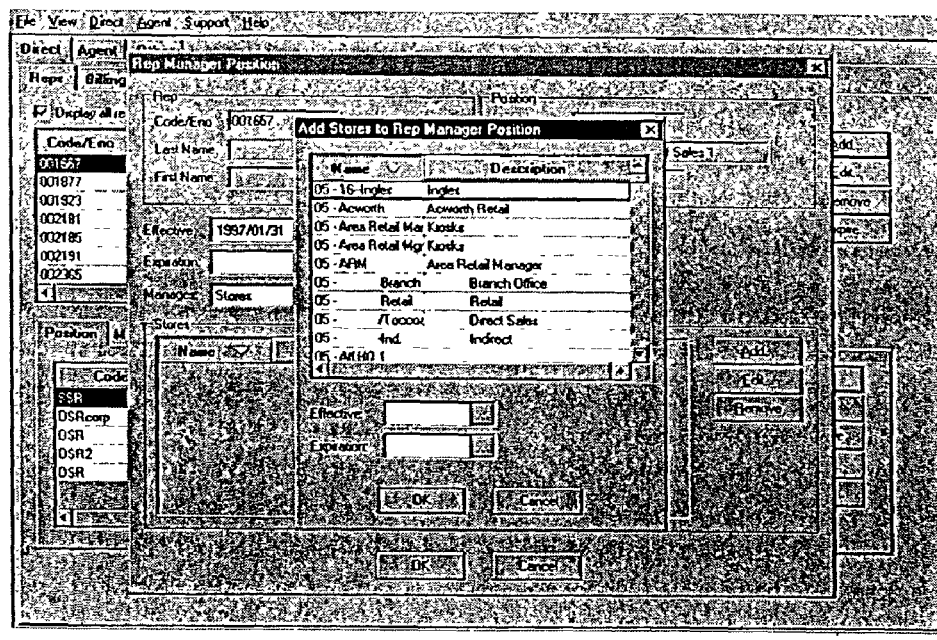

As provided in the example screen illustrated in FIG. 10, within the "Reps" tab screen 160, the user can select the "Rep Manager Position" dialog screen 200. The "Rep Manager Position" dialog screen 200 defines additional information for management positions. The "Rep Manager Position" field definitions are:

1. "Rep"—The selected representative's ID and name.
Code/Eno
Last Name
First Name
MI 2. "Position"—The selected position's code, description and type.
Code
Description
Type 3. "Effective"—Use the calendar to select the date the representative is effective in this position. This defaults to the representative's effective date.

4. "Expiration"—Use the calendar to select the date the representative is expired from this position.

5. "Manages"—Use the drop-down list to select the manager roll-up basis for the representative.

6. "Backouts Follow"—Click to indicate if backouts from this position should follow to the representative's next position.

7. "Base Salary"—Enter the representative's base salary in this position.

8. "Stores"—If the representative manages stores, the name, description, effective date and expiration date for each.
Name
Description
Eff. Date
Exp. Date As provided in the example screen illustrated in FIG. 11, within the "Rep Manager Position" dialog screen 200, the user can select the "Add Stores to Rep Manager Position" dialog screen 210. The "Add Stores to Rep Manager Position" dialog screen 210 identifies the store(s) managed by this representative, and is accessed by clicking the Add function button by Stores on the "Rep Manager Position" dialog screen 200. The "Add Stores to Rep Manager Position" field definitions are:

1. "Name"—The commission management system lists all stores defined in the system for this location and its "friendly" markets. Highlight a line to select the appropriate store(s) from this list. Use the Ctrl key to select multiple stores; use the Shift key to select a block of stores.

2. "Description"—The store description.

3. "Effective"—Use the calendar to select the date the representative begins managing the store(s).

4. "Expiration"—Use the calendar to select the date the representative no longer manages the store(s).

Figure 12:
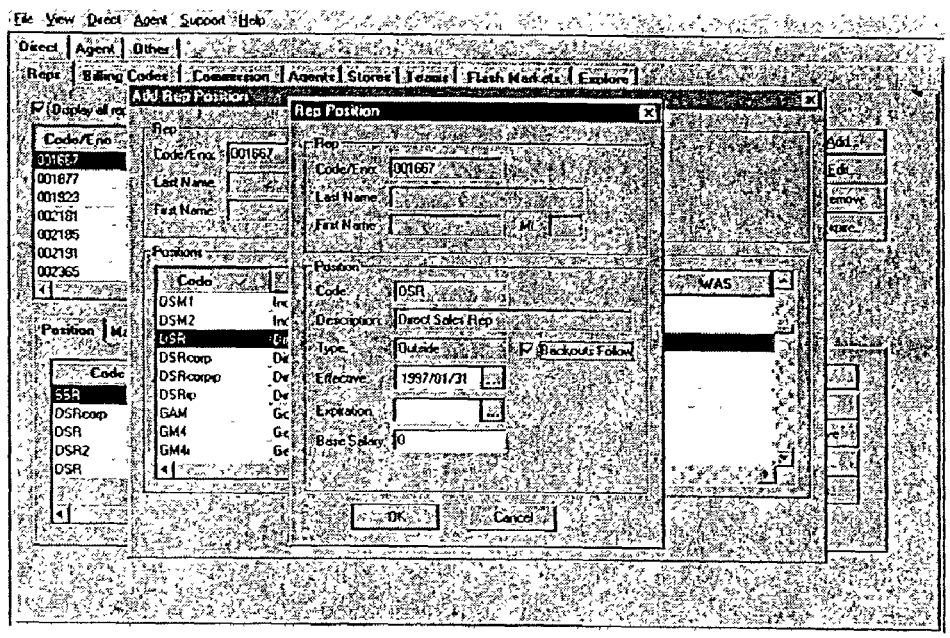

As provided in the example screen illustrated in FIG. 12, within the "Add Rep Position" dialog screen 190 the user can open a "Rep Position" dialog screen 220 to define additional information for non-management positions. The "Rep Position" dialog screen 220 field definitions are:

1. "Rep"—The selected representative's ID and name.
Code/Eno
Last Name
First Name
MI 2. "Position"—The selected position's code, description and type.
Code
Description
Type 3. "Effective"—Use the calendar to select the date the representative is effective in this position. This defaults to the representative's effective date.

4. "Expiration"—Use the calendar to select the date the representative is expired from this position.

5. "Base Salary"—Enter the representative's base salary in this position.

6. "Backouts Follow"—Click to indicate if backouts from this position should follow to the representative's next position.

Figure 13:
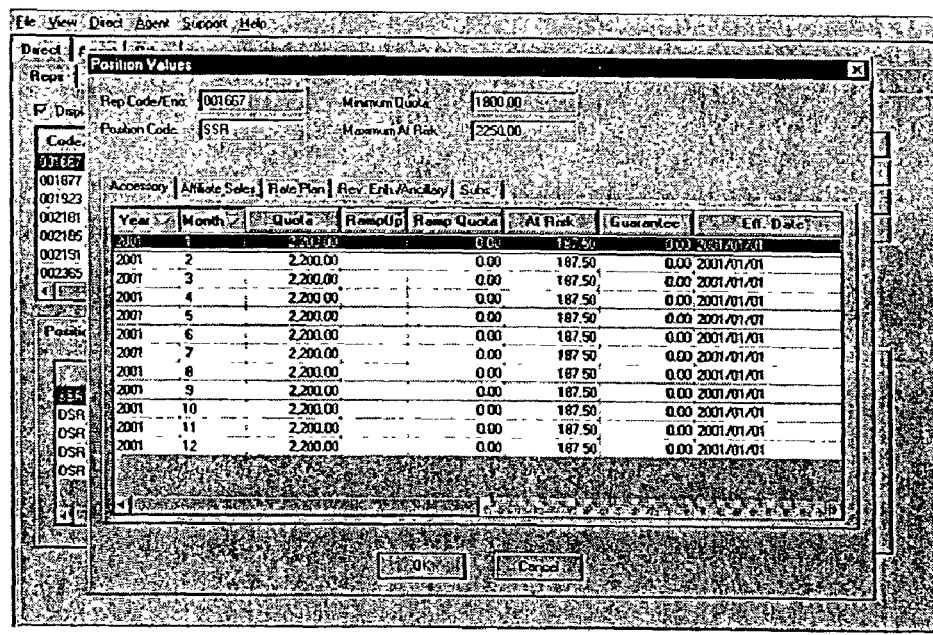

As provided in the example screen illustrated in FIG. 13, by clicking the Values function button in the "Rep Position" sub-tab, the user can access the "Position Values" dialog screen 230 to define the quotas, at risk amounts, and guarantees applicable to the representative in each position held. Individual sub-tabs are displayed for each component defined for the representative's position. The "Position Values" dialog screen 230 field definitions are:

1. "Rep Code/Eno"—Is the selected representative's ID.

2. "Minimum Quota"—Is the minimum monthly quota defined for the position.

3. "Position Code"—Is the representative's position code.

4. "Maximum At Risk"—Is the maximum yearly at risk defined for the position.

5. "Year"—Is the year.

6. "Month"—Is the month.

7. "Quota"—Enter the monthly quota applicable to the representative. This defaults to the minimum quota defined for the position.

8. "Ramp Up"—Click to indicate whether or not a ramp up quota applies in this month/year. Note that this column does not appear for all components.

9. "Ramp Quota"—Enter the ramp up quota applicable to the representative for this month/year. Note that this column does not appear for all components.

10. "At Risk"—Enter the monthly at risk amount applicable to the representative. This defaults to the maximum at risk defined for the position divided by 12.

11. "Guarantee"—Enter the monthly guaranteed payment amount applicable to the representative.

12. "Eff. Date"—The representative's position effective date.

Figure 14:
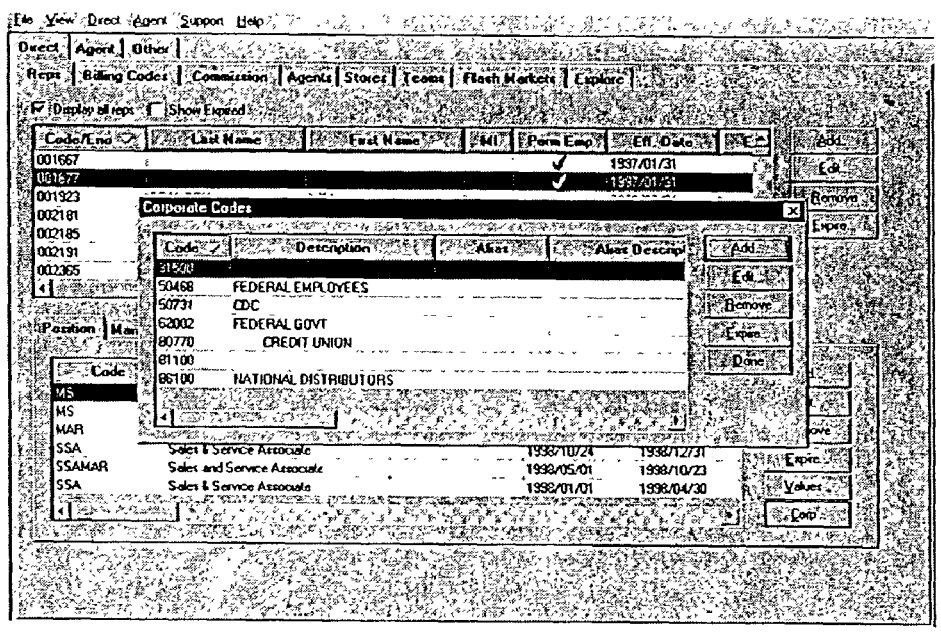

As provided in the example screen illustrated in FIG. 14, the "Corporate Codes" dialog screen 240 identifies the corporate codes that roll to the representative. Clicking the Corp function button on the Rep Position sub-tab accesses the "Corporate Codes" dialog screen 240. This button is only displayed if the selected rep/position receives compensation from corporate sales. The "Corporate Codes: dialog screen 240 field definitions are:

1. "Code"—Enter the corporate code.

2. "Description"—Enter the corporate name.

3. "Alias"—Enter an alias code can be associated with each corporate code, if desired.

4. "Alias Description"—Enter a description of the alias code.

5. "Eff. Date"—Use the calendar to select the date the corporate code is effective for this rep/position.

6. "Exp. Date"—Use the calendar to select the date the corporate code expires for this rep/position.

Figure 15:
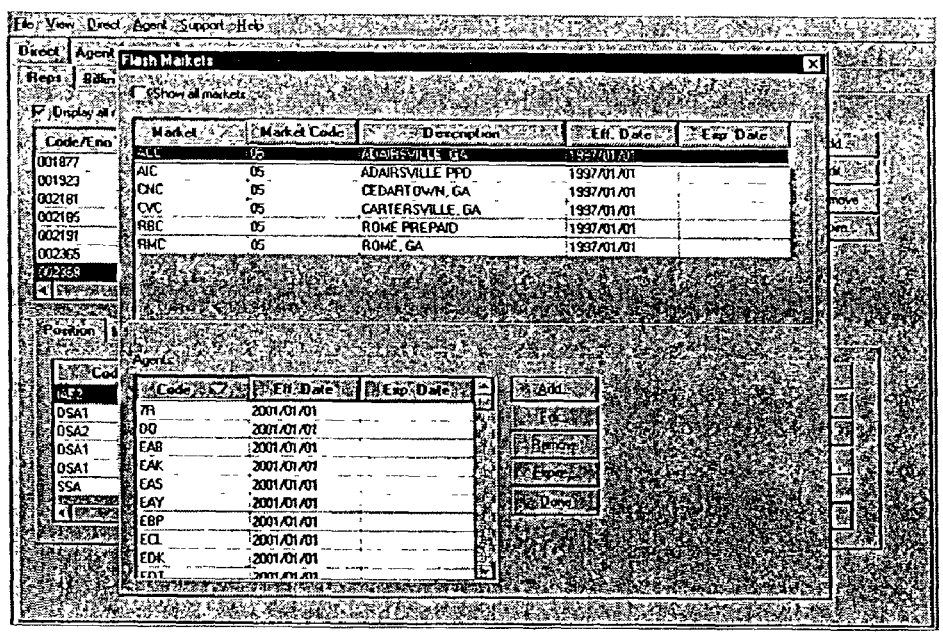

As provided in the example screen illustrated in FIG. 15, the "Flash Markets" dialog screen 250 identifies the agent(s) within each flash market that roll to the representative. Clicking the Flash function button on the Rep Position sub-tab accesses it. This button is only displayed if the selected rep/position is paid from the Sales Flash. Initially, this tab lists those markets already assigned to the selected rep/position.

To access, the screen the user clicks Show all markets to list all markets in the specified location. The "Flash Markets" dialog screen 250 field definitions are:

1. "Market"—The commission management system lists all flash markets assigned to the representative. Select the appropriate market from this list.

2. "Market Code"—The commissions market code (e.g., location).

3. "Description"—The flash market name.

4. "Eff. Date"—The date the flash market is effective in the Sales Flash.

5. "Exp. Date"—The date the flash market expires in the Sales Flash.

6. "Agents"—The agent code(s) within each flash market for which this rep/position receives credit, and the effective period for each. Highlight a line to select the appropriate agent. Use the Ctrl key to select multiple agents; use the Shift key to select a block of agents.

Figure 16:
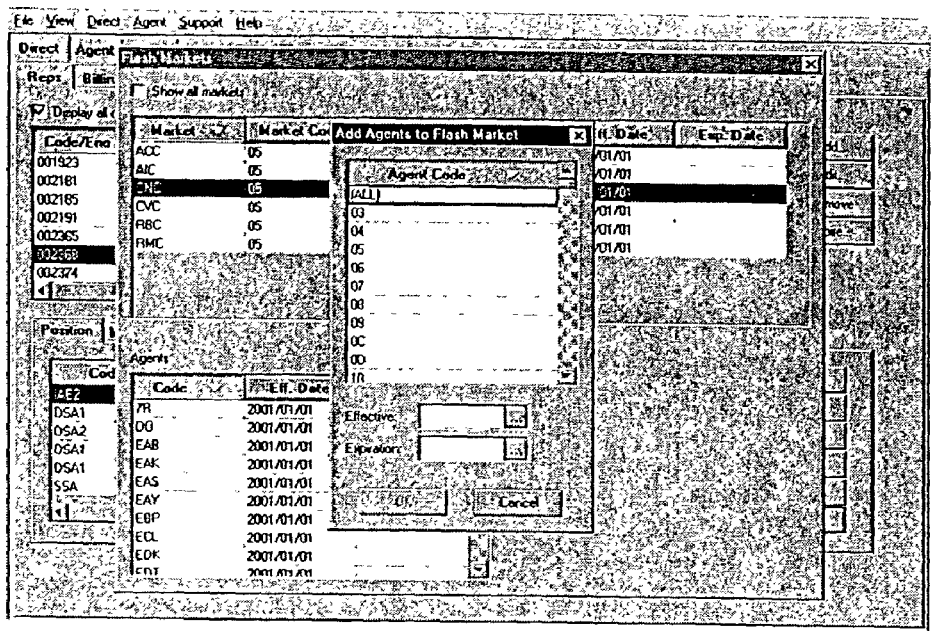

As provided in the example screen illustrated in FIG. 16, the "Add Agents to Flash Market" dialog screen 260 identifies the agent(s) within the selected flash market for which the representative receives credit, and is accessed by clicking the Add function button by Agents in the "Flash Markets" dialog screen 250. The "Add Agents to Flash Market" dialog screen 260 field definitions are:

1. "Agent Code"—The commission management system lists all agent codes defined in the system for the selected flash market. Highlight a line to select the appropriate agent(s) from this list. Use the Ctrl key to select multiple agents; use the Shift key to select a block of agents.

2. "Effective"—Use the calendar to select the date the representative begins getting credit for the agent(s).

3. "Expiration"—Use the calendar to select the date the representative no longer gets credit for the agent(s).

Figure 17:
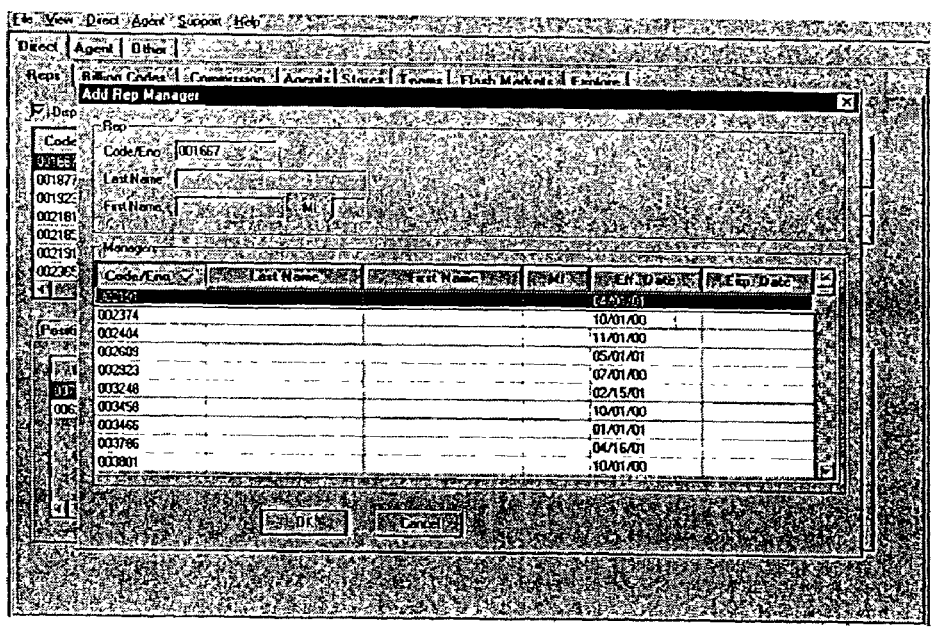

As provided in the example screen illustrated in FIG. 17, the "Add Rep Manager" dialog screen 270 allows the user to select the manager to whom the representative reports. Only one manager record can be active at any given time for a representative. The "Add Rep Manager" dialog screen 270 field definitions are:

1. "Rep"—The selected representative's ID and name.
Code/En
Last Name
First Name
MI 2. "Managers"—The commission management system lists all active managers defined in the system for this location and its "friendly" markets. Highlight a line to select the appropriate manager from this list.
Code/Eno—The manager's ID.
Last Name—The manager's last name.
First Name—The manager's first name.
MI—The manager's middle initial.
Eff. Date—The manager's position effective date.
Exp. Date—The manager's position expiration date.

Figure 18:
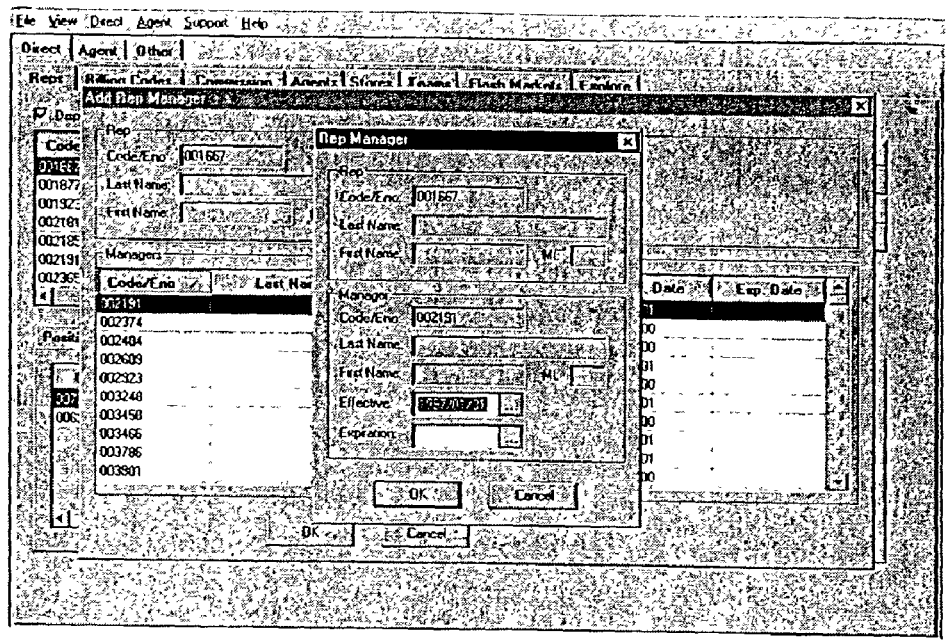

As provided in the example screen illustrated in FIG. 18, the "Rep Manager" dialog screen 280 establishes the effective period for the representative's manager. The "Rep Manager" dialog screen 280 field definitions are:

1. "Rep"—The selected representative's ID and name.
Code/Eno
Last Name
First Name
MI 2. "Manager"—The selected manager's ID and name.
Code/Eno
Last Name First Name

MI

3. "Effective"—Use the calendar to select the date the representative begins reporting to this manager. This defaults to the representative's effective date.

4. "Expiration"—Use the calendar to select the date the representative no longer reports to this manager.

Figure 19:
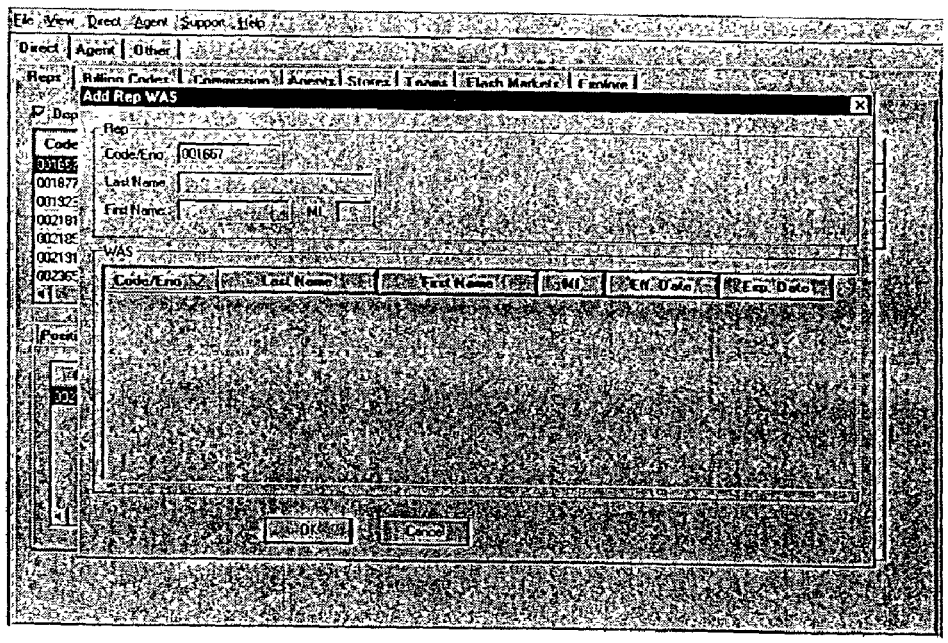

As provided in the example screen illustrated in FIG. 19, the "Add Rep WAS" dialog, screen 290 allows the user to select a wireless application specialist who provides support to this representative and receives compensation based on his/her sales. Only one WAS record can be active at any given time for a representative. The "Add Rep WAS" dialog screen field definitions are:

1. "Rep"—The selected representative's ID and name.
Code/Eno
Last Name
First Name
MI 2. "WAS"—The commission management system lists all active wireless application specialists defined in the system for this location and its "friendly" markets. Highlight a line to select the appropriate WAS from this list.
Code/Eno—The WAS's ID.
Last Name—The WAS's last name.
First Name—The WAS's first name.
MI—The WAS's middle initial.
Eff. Date—The WAS's position effective date.
Exp. Date—The WAS's position expiration date.

Figure 20:
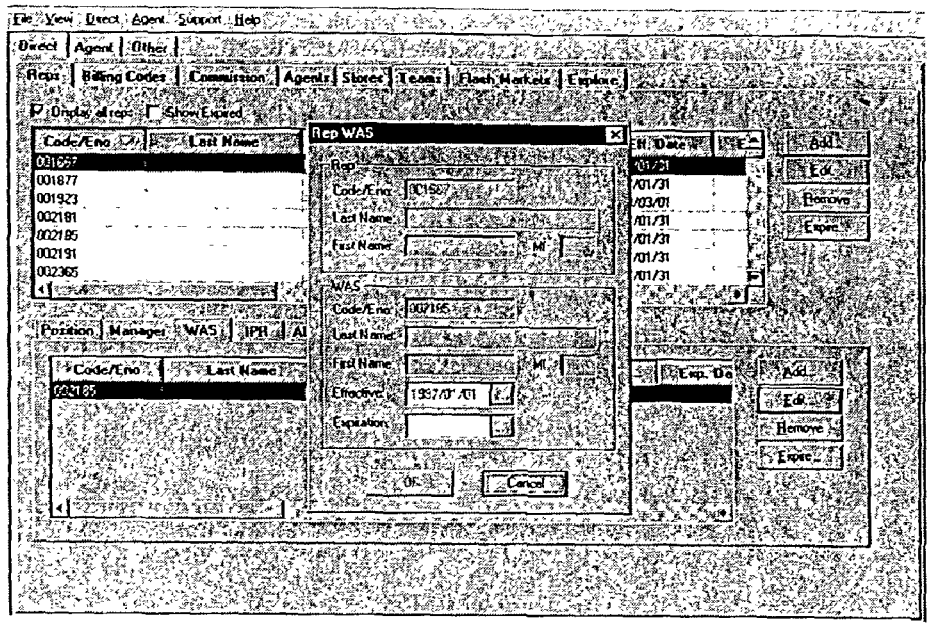

As provided in the example screen illustrated in FIG. 20, the "Rep WAS" dialog screen 300 establishes the effective period for the representative's wireless application specialist. The "Rep WAS" dialog screen 300 field definitions are:

1. "Rep"—The selected representative's ID and name.
Code/Eno
Last Name
First Name
MI 2. "WAS"—The selected wireless application specialist's ID and name.
Code/Eno
Last Name
First Name
MI 3. "Effective"—Use the calendar to select the date this WAS begins supporting the representative. This defaults to the representative's effective date.

4. "Expiration"—Use the calendar to select the date this WAS no longer supports the representative.

Figure 21:
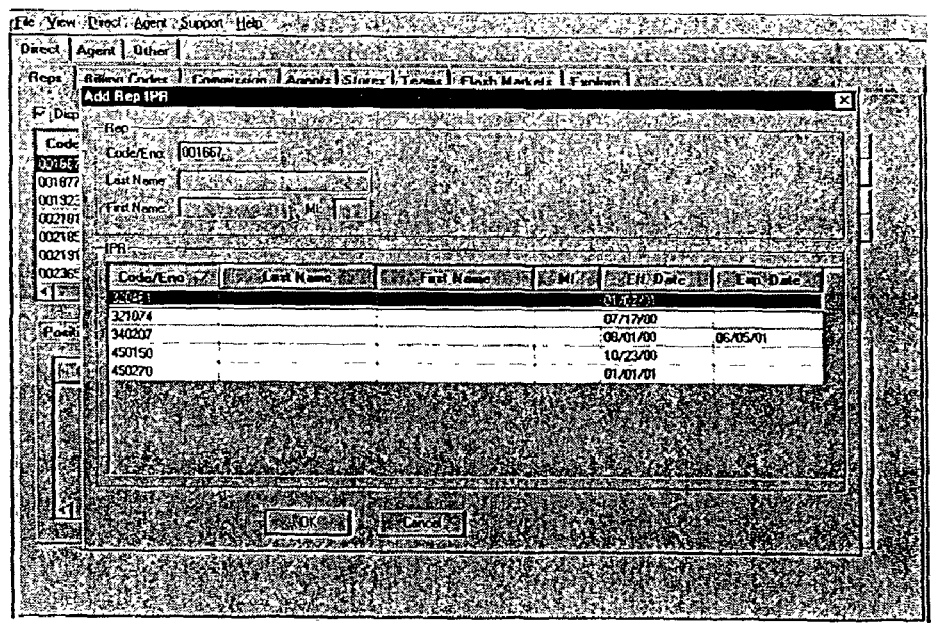

As provided in the example screen illustrated in FIG. 21, the "Add Rep IPR" dialog screen 310 allows the user to select the interactive paging service representative who provides support to this representative and receives compensation based on his/her sales. Only one IPR record can be active at any given time for a representative. The "Add Rep IPR" dialog screen 310 field definitions are:

1. "Rep"—The selected representative's ID and name.
Code/Eno
Last Name
First Name
MI 2. "IPR"—The commission management system lists all active interactive paging service representatives defined in the system for this location and its "friendly" markets. The user may highlight a line to select the appropriate IPR from this list.
Code/Eno—The IPR's ID.
Last Name—The IPR's last name.
First Name—The IPR's first name.
MI—The IPR's middle initial.
Eff. Date—The IPR's position effective date.
Exp. Date—The IPR's position expiration date.

Figure 22:
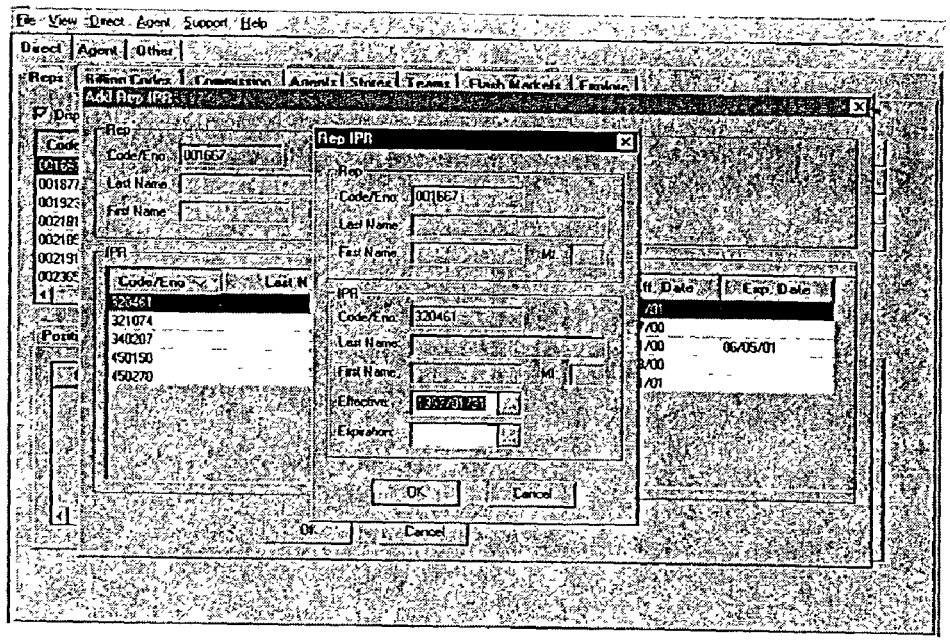

As provided in the example screen illustrated in FIG. 22, the "Rep IPR" dialog screen 320 establishes the effective period for the representative's interactive paging service representative. The "Rep IPR" dialog screen 320 field definitions are:

1. "Rep"—The selected representative's ID and name.
Code/Eno
Last Name
First Name
MI 2. "IPR"—The selected interactive paging service representative's ID and name.
Code/Eno
Last Name
First Name
MI 3. "Effective"—Use the calendar to select the date this IPR begins supporting the representative. This defaults to the representative's effective date.

4. "Expiration"—Use the calendar to select the date this IPR no longer supports the representative.

Figure 23:
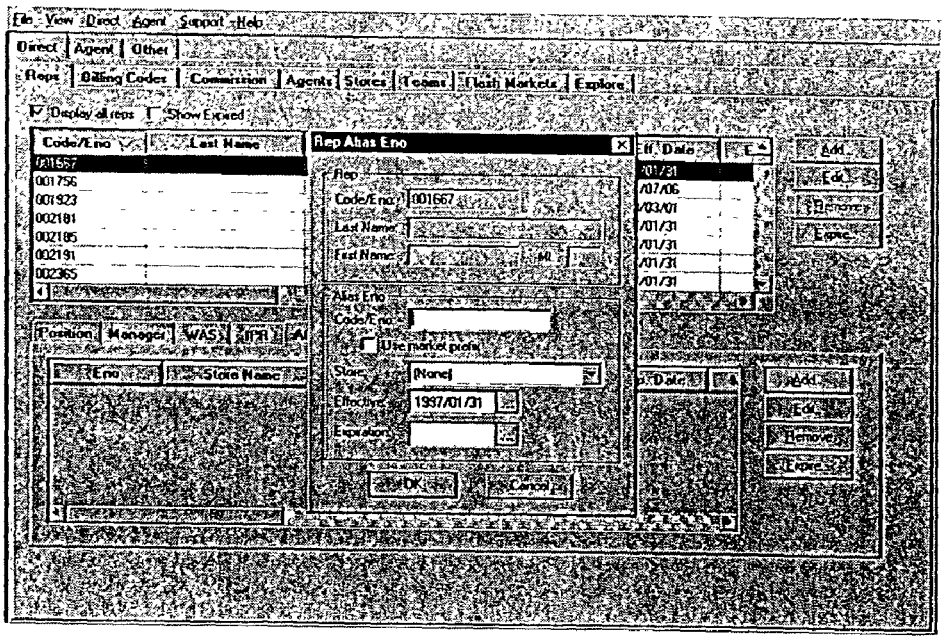

As provided in the example screen illustrated in FIG. 23, the "Rep Alias Eno" dialog screen 330 allows the user to identify multiple ID's under which the representative may activate billing transactions. This is helpful if a representative works as a "floater" out of more than one store or kiosk and his/her sales need to be tracked individually by store. The "Rep Alias Eno" dialog screen 330 field definitions are:

1. "Rep"—The selected representative's ID and name.
Code/Eno
Last Name
First Name
MI 2. "Alias Eno"
Code/Eno—Enter the alias ID used by the rep
Use market prefix—Click to indicate whether or not the commission management system should insert the market prefix at the beginning of the alias ID entered.
Store—Use the drop-down list to select the store in which the representative uses this ID, if applicable.
Effective—Use the calendar to select the date the representative begins using this ID in this store. This defaults to the representative's effective date.
Expiration—Use the calendar to select the date the representative no longer uses this ID in this store.

Figure 24:
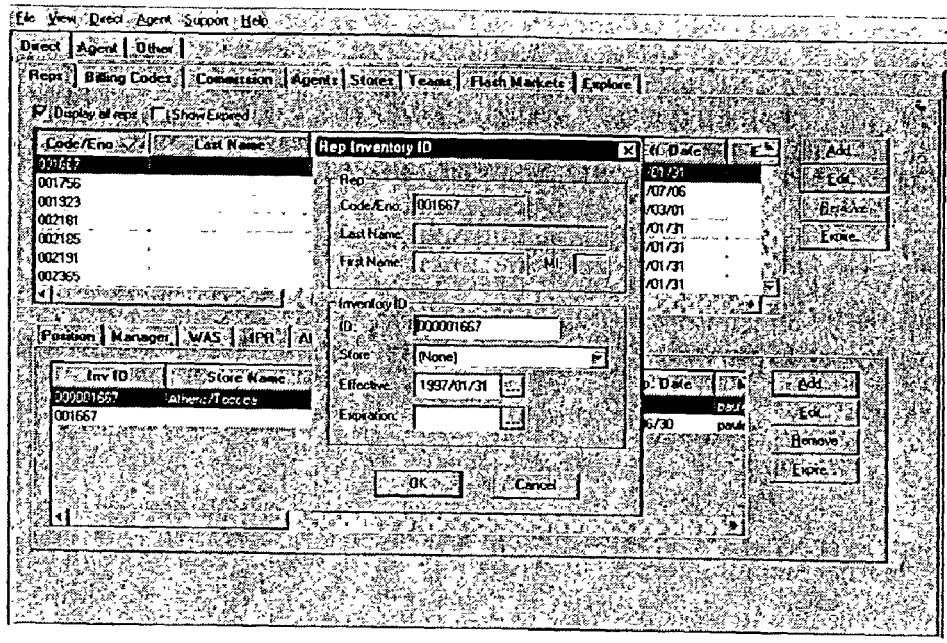

As provided in the example screen illustrated in FIG. 24, the "Rep Inventory ID" dialog screen 340 allows the user to identify multiple ID's under which the representative may activate inventory transactions. This is helpful if a representative works as a "floater" out of more than one store or kiosk and his/her sales need to be tracked individually by store. The "Rep Inventory ID" dialog screen 340 field definitions are:

1. "Rep"—The selected representative's ID and name.
Code/Eno
Last Name
First Name
MI 2. "Inventory ID"
ID—Enter the inventory ID used by the rep
Store—Use the drop-down list to select the store in which the representative uses this ID, if applicable.

Effective—Use the calendar to select the date the representative begins using this ID in this store. This defaults to the representative's effective date.

Expiration—Use the calendar to select the date the representative no longer uses this ID in this store.

Figure 25:
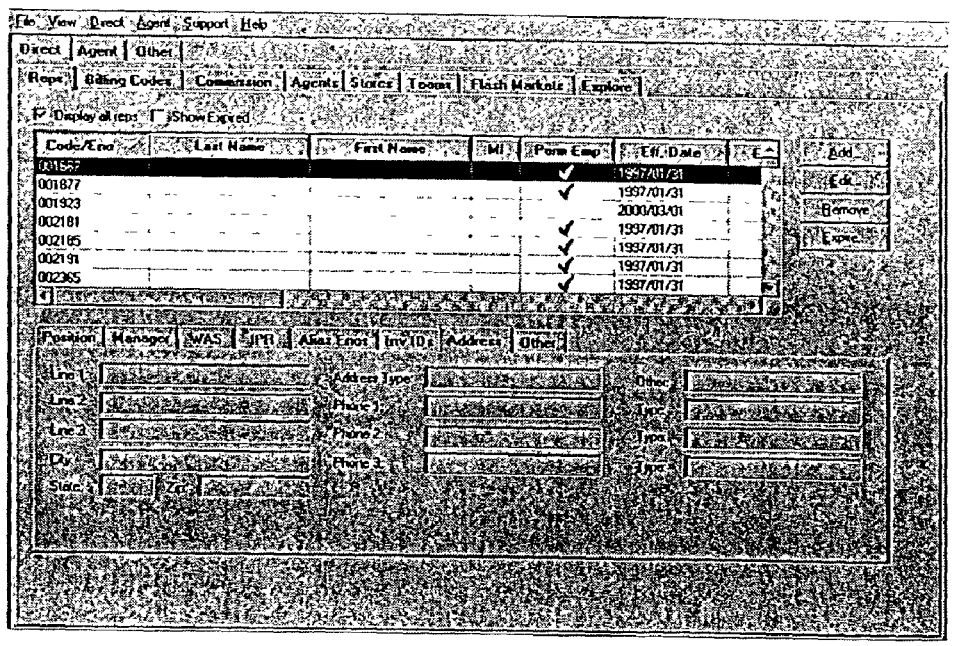

As provided in the example screen illustrated in FIG. 25, the "Address" dialog screen 350 displays any address information defined on the main Rep dialog. The "Address" dialog screen 350 field definitions are:

1. "Address"—The representative's address.
   Line 1
   Line 2
   Line 3
   City
   State
   Zip
   Address Type
2. "Phone"—The representative's phone number(s), and a type for each.
   Phone 1
   Type
   Phone 2
   Type
   Phone 3
   Type
3. "Other"—Not currently used.

Figure 26:
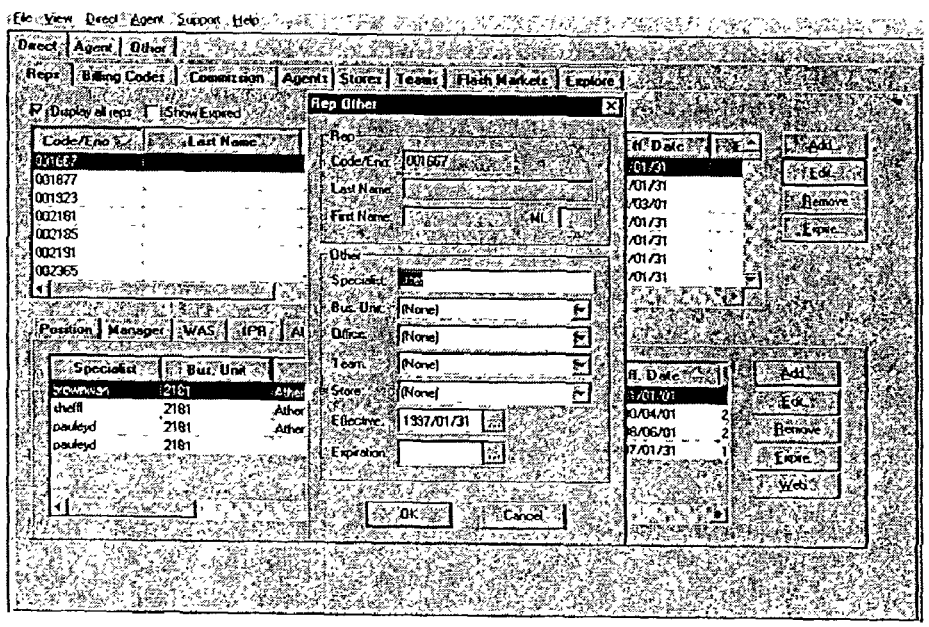

As provided in the example screen illustrated in FIG. 26, the "Rep Other" dialog screen 360 defines "other" miscellaneous information about the representative, which is used in mapping billing transactions and in the reporting processes. Only one "Rep Other" record can be active at any given time for a particular representative. The "Rep Other" dialog screen 360 field definitions are:

1. "Rep"—The selected representative's ID and name.
   Code/Eno
   Last Name
   First Name
   MI
2. "Other"
   Specialist—Enter the username of the representative's Commission Specialist. This defaults to the current user's username. All representatives showing the user as their active specialist will appear in the particular representative list.
   Bus. Unit—Use the drop-down list to select the representative's business unit.
   Office—Use the drop-down list to select the representative's office.
   Team—Use the drop-down list to select the representative's team.
   Store—Use the drop-down list to select the representative's "main" store.
   Effective—Use the calendar to select the date this data takes effect for the representative. This defaults to the representative's effective date.
   Expiration—Use the calendar to select the date this data no longer applies to the representative.

Figure 27:
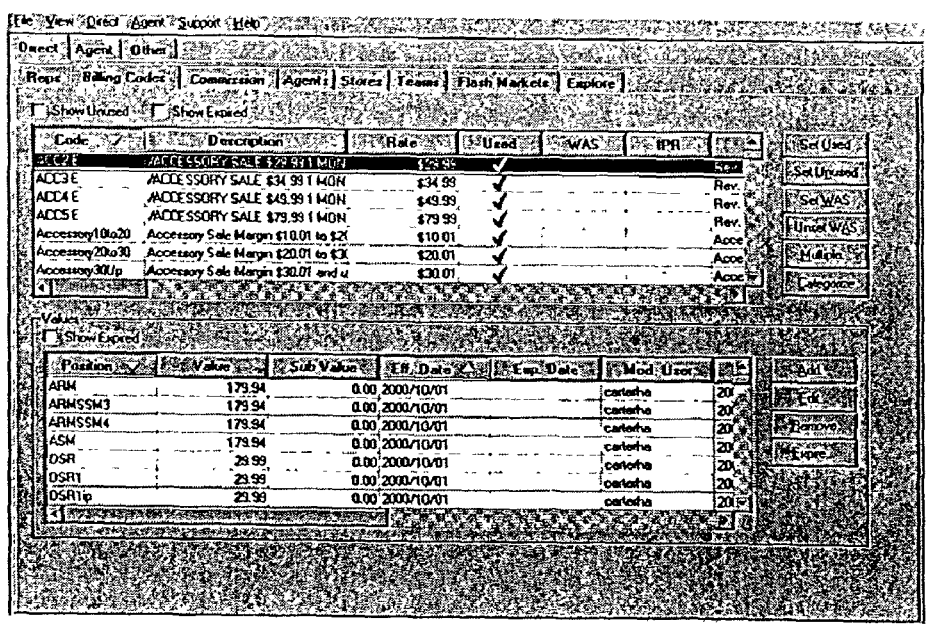
FIGS. 27 through 30 illustrate various example screens associated with a portion of a software module feature according to one embodiment of the present invention.

FIGS. 27 through 30 illustrate various example screens associated with the "Billing Codes" tab portion of the commission management system's Direct Module feature. It is to be understood that such example screens are provided for illustrative purposes only and, therefore, the present invention should not be limited thereby. Turning now to FIG. 27, one example of one embodiment of a "Billing Codes" tab 370 lists all billing transaction codes and identifies those considered commissionable. Its Values sub-tab defines the commission value(s) associated with each billing code by position. Codes flagged as "used" are considered commissionable and are included in the extract from the billing system(s). Initially, this tab lists those active billing codes in the specified location marked as "used." Clicking "Show Unused" lists all unused billing codes in this location and clicking "Show Expired" to list only expired billing codes in this location. The "Billing Codes" tab 370 field definitions are:

1. "Code"—The billing code defined in the billing system(s).
2. "Description"—The billing code description.
3. "Rate"—The rate charged for the billing code as defined in the billing system(s).
4. "Used"—Flag to indicate that the billing code is commissionable (e.g., it is "used" in the representative's compensation calculation).
5. "WAS"—Flag to indicate that the billing code contributes to the WAS position's compensation.
6. "IPR"—Flag to indicate that the billing code contributes to the IPR position's compensation.
7. "Type"—The component type into which the commission management system groups the billing code for compensation calculation.
8. "Internal Code"—The internal billing code defined in the billing system(s).
9. "Category"—The P&L reporting category into which the billing code is grouped.
10. "Eff. Date"—The date the billing code was effective in the billing system(s).
11. "Exp. Date".—The date the billing code is no longer effective in the billing system(s).
12. "Function Buttons"
    Set Used—Click to set the "used" flag on a billing code.
    Set Unused—Click to clear the "used" flag on a billing code.
    Set WAS—Click to set the "WAS" flag on a billing code.
    Unset WAS—Click to clear the "WAS" flag on a billing code.
    Multiple—Click to schedule the Billing Codes (multiple) dialog.
    Categorize—Click to schedule the Billing Code Categorization dialog.

Figure 28:
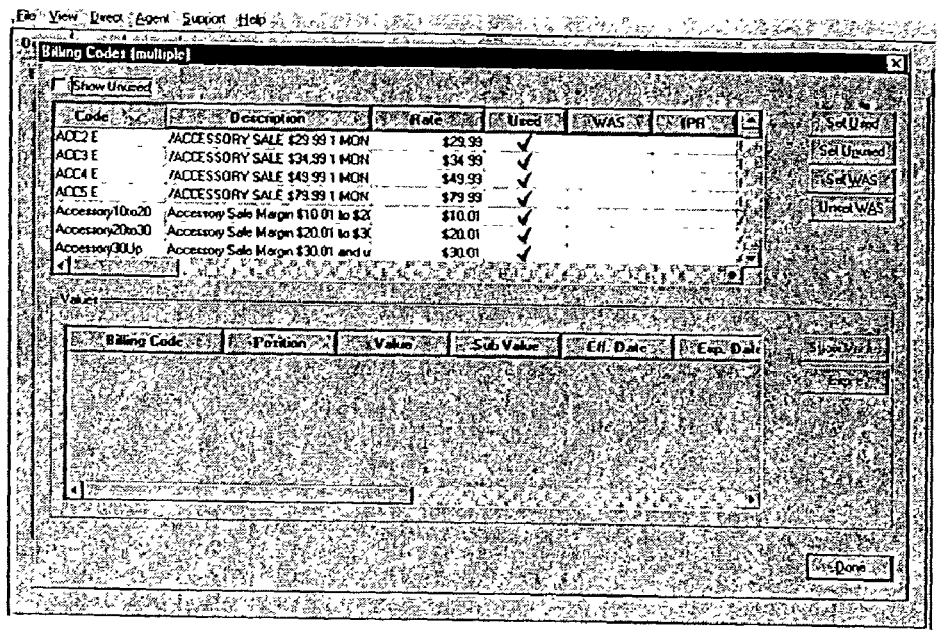

As provided in the example screen illustrated in FIG. 28, the "Billing Codes" (Multiple) dialog screen 380 can be accessed by clicking the Multiple function button on the Billing Codes tab. It allows maintenance to be performed on more than one billing code at a time. Initially, this tab lists those active billing codes in the specified location marked as used (e.g., commissionable). Clicking "Show Unused" to list all unused billing codes in this location and using the "Ctrl" key highlight multiple billing codes; and using the "Shift" key highlight a block of billing codes. The "Billing Codes" (multiple) dialog screen 380 field definitions are:

1. "Function Buttons"
   Set Used—Click to set the "used" flag on billing codes.
   Set Unused—Click to clear the "used" flag on billing codes.
   Set WAS—Click to set the "WAS" flag on billing codes.
   Unset WAS—Click to clear the "WAS" flag on billing codes.
   Show Values—Click to display the values associated with the highlighted billing codes.
   Expire—Click to expire the highlighted value(s). Use the Ctrl key to highlight multiple values; use the Shift key to highlight a block of values.
   Done—Click to close the dialog.

Figure 29:
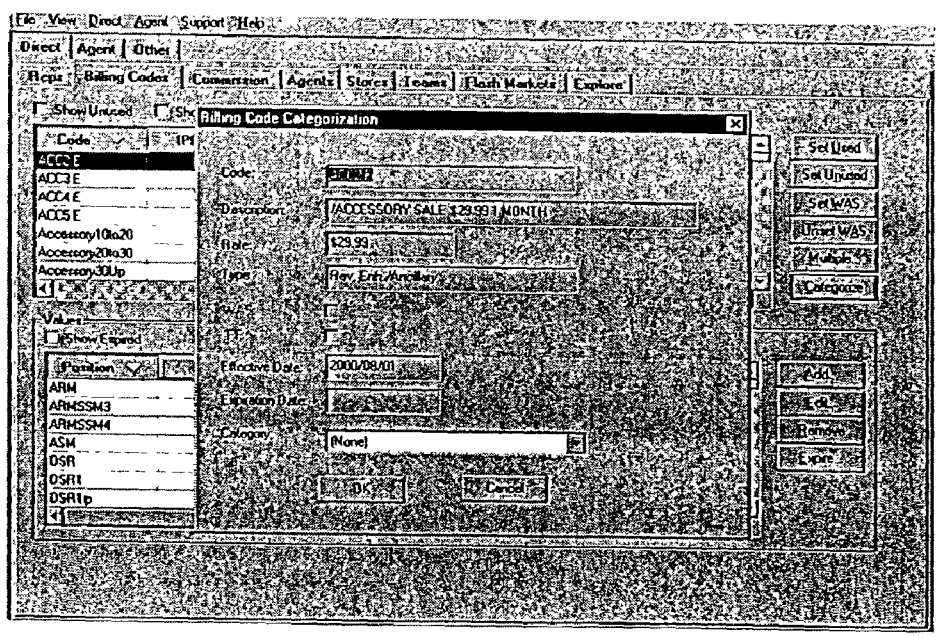

As provided in the example screen illustrated in FIG. 29, the "Billing Code Categorization" dialog screen 390 allows the user to group billing codes for P&L reporting, and is accessed by clicking the Categorize function button on the Billing Codes tab. It is also scheduled automatically after setting a billing code to "used." The "Billing Code Categorization" dialog screen 390 field definitions are:

1. "Code"—The selected billing code.
2. "Description"—The description of the billing code.
3. "Rate"—The rate charged for the billing code.
4. "Type"—The billing code's component type.
5. "WAS"—The WAS flag on the billing code.
6. "IPR"—The IPR flag on the billing code.
7. "Effective Date"—The billing code's effective date.
8. "Expiration Date"—The billing code's expiration date.
9. "Category"—Use the drop-down list to select the billing code's P&L reporting category.

Figure 30:
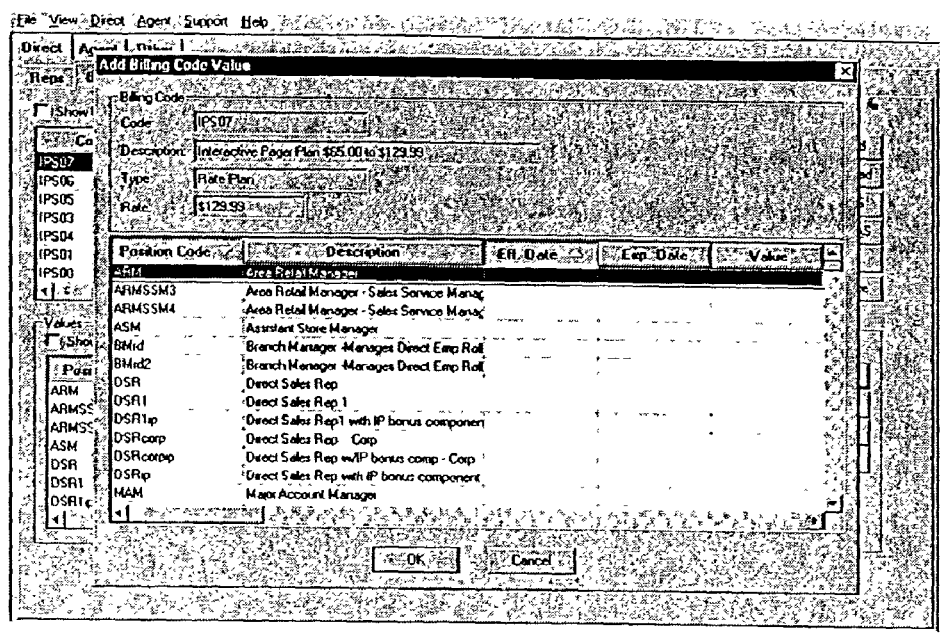

As provided in the example screen illustrated in FIG. 30, the "Add Billing Code Value" dialog screen 400 defines the commission value(s) associated with each code, by position, and is accessed by clicking the Add function button by Values on the Billing Codes tab. Corporate edit tables define a minimum and maximum value for each code type, as defined by the current Sales Compensation Plan, to ensure that the values assigned by each market fall within the approved range. The "Add Billing Code Value" dialog screen 400 field definitions are:

1. "Billing Code"—The selected billing code, its description type and rate.
   Code
   Description
   Type
   Rate
2. "Position Code"—The commission management system lists all position codes defined in the system. Highlight the position for which the user is adding values.
3. "Description"—The position description.
4. "Eff. Date"—Double-click to display the calendar; select the date the value takes effect for this position.
5. "Exp. Date"—Double-click to display the calendar; select the date the value is no longer in effect for this position.
6. "Value"—Enter the value to be paid representatives in this position for this billing code.
7. "Min Value"—The minimum value that can be assigned.
8. "Max Value"—The maximum value that can be assigned.
9. "Sub Value"—Enter the sub value to be paid representatives in this position for this billing code.
10. "Sub Min Value"—The minimum sub value that can be assigned.
11. "Sub Max Value"—The maximum sub value that can be assigned.

Figure 31:
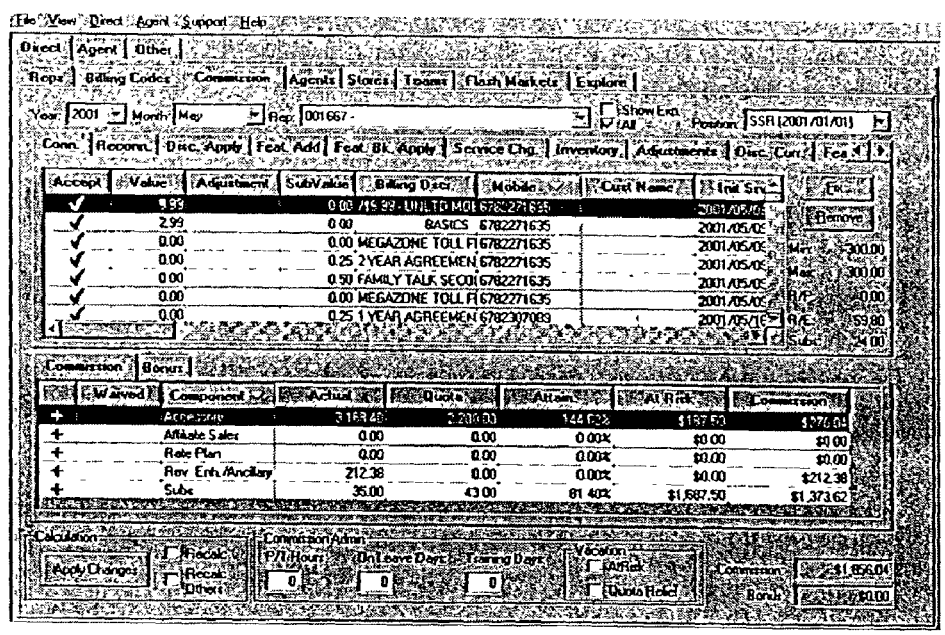

FIGS. 31 through 36 illustrate various example screens associated with the "Commission" tab portion of the commission management system's Direct Module feature. It is to be understood that such example screens are provided for illustrative purpose only and, therefore, the present invention should not be limited thereby. Turning now to FIG. 31, one embodiment of one example of a "Commission" tab screen 410 details a representative's compensation for a given month and year, allows the user to make manual adjustments, and to re-calculate commission and bonus on demand. The sub-tabs across the upper part of the screen display the representative's detailed sales transactions by type (e.g., connects vs. reconnects vs. feature adds, etc.). The commission and Bonus sub-tabs in the lower portion of the screen detail the actual compensation calculations for the representative by component. The commission Admin section at the bottom of the screen captures data the commission management system uses to adjust calculations, as appropriate, for part-time hours, on-leave days, training days, and vacation. The "Commission" tab screen 410 field definitions are:

1. "Year"—Use the drop-down list to select the year. This defaults to the current processing year.
2. "Month"—Use the drop-down list to select the month. This defaults to the current processing month.
3. "Rep"—Use the drop-down list to select the representative.
4. "Show Exp."—Click to list only expired representatives in the drop-down Rep list.
5. "All"—Click to list all representatives, regardless of Commission Specialist, in the drop-down Rep list.
6. "Position"—If a representative held more than one position in the specified month/year, use the drop-down list to select the position whose data the user may want to display.

The sub-tabs displayed may vary based on a representative's position. As provided in the example screen illustrated in FIG. 31, for the majority of representative positions, the "Commission" tab screen 410 will be formatted as shown therein, with the sub-tabs described as follows. For each of the sub-tab fields: Conn. (Connect), Reconn. (Reconnect), Disc. Apply (Disconnect Apply), Feat. Add (Feature Add), Feat. Bk. Apply (Feature Backout Apply), Service Chg. (Service Change), Disc. Curr. (Disconnect Current), Feat. Bk. Curr. (Feature Backout Current) and Corp (Corporate), the field definitions are:

1. "Accept"—Click to indicate whether or not a transaction should be "accepted" for inclusion in the representative's compensation calculation. This is initially set based on pre-defined business rules applied during the load process.
2. "Value"—The value loaded in the Billing Codes tab for this billing code/representative position combination.
3. "Adjustment"—Enter a different value to paid, if appropriate. The value entered here will override that displayed in the Value column.
4. "SubValue"—The sub value loaded in the Billing Codes tab for this billing code/representative position combination.
5. "Billing Dscr."—The billing code description.
6. "Mobile"—The mobile number.
7. "Cust Name"—The customer name.
8. "Init Srv"—The initial service date.
9. "Action"—The "action date". This is the date the commission management system uses to determine which processing month a transaction falls into.
10. "Comp Comp."—The compensation component associated with this billing code.
11. "Agent"—The agent code.
12. "BC Agent"—The billing code agent.
13. "Fix"—Click to schedule the Commission Fix dialog to re-map a transaction to this representative.
14. "Remove"—Click to remove the highlighted transaction from this representative's transaction list. This actually "un-maps" the transaction from this representative.
15. "Min."—The minimum value identified for the highlighted transaction.
16. "Max."—The maximum value identified for the highlighted transaction.
17. "RIP"—The total rate plan value of all accepted transactions on this sub-tab.
18. "R/E"—The total revenue enhancement value of all accepted transactions on this sub-tab.
19. "Subs"—The total subs value of all accepted transactions on this sub-tab.

Figures 32, 33:
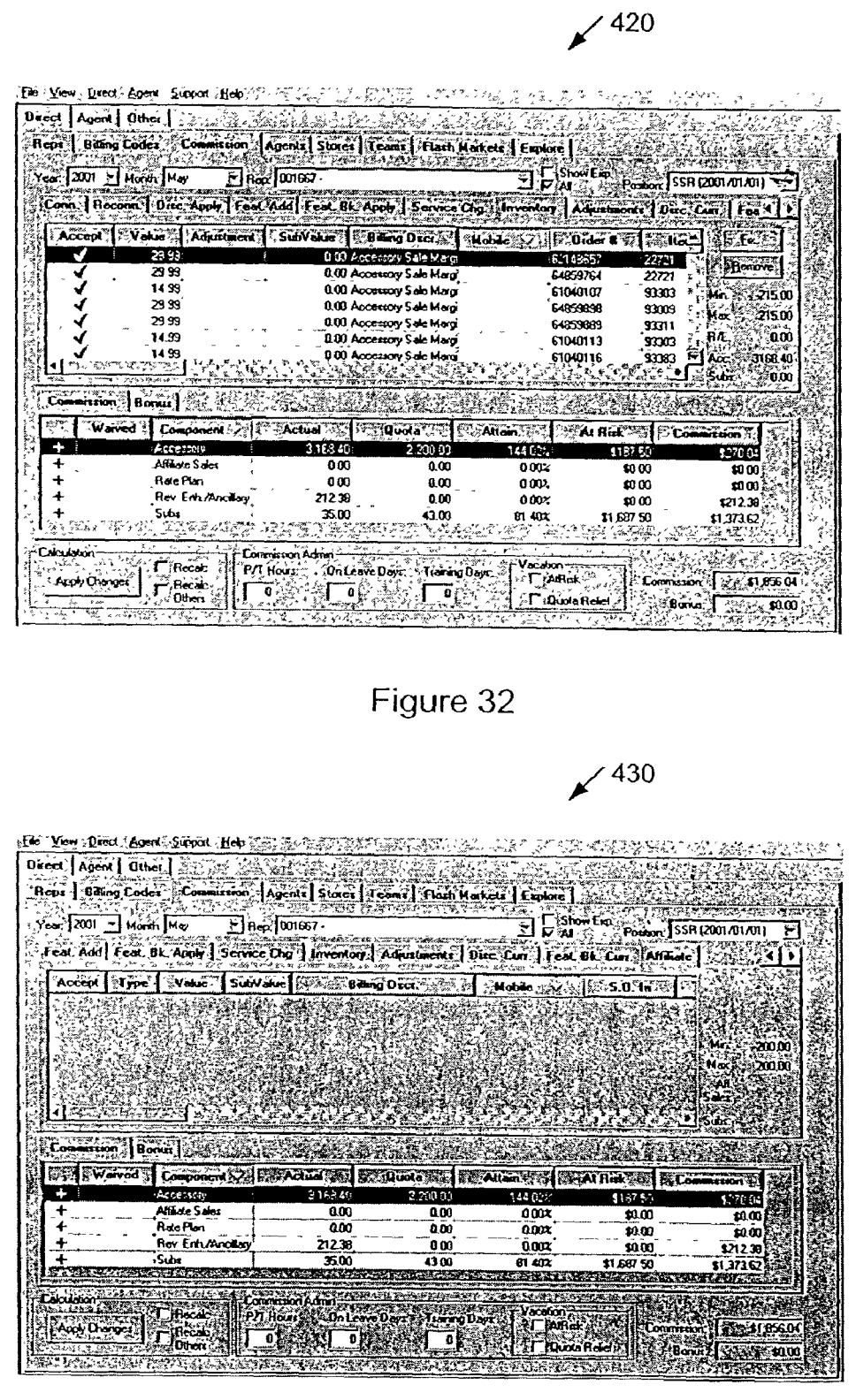

As provided in the example screen illustrated in FIG. 32, the field definitions of with reference to the "Inventory" sub-tab screen 420 are:

1. "Accept"—Click to indicate whether or not a transaction should be "accepted" for inclusion in the representative's compensation calculation. This is initially set based on pre-defined business rules applied during the load process.

2. "Value"—The value loaded in the Billing Codes tab for this billing code/representative position combination.

3. "Adjustment"—Enter a different value to paid, if appropriate. The value entered here will override that displayed in the Value column.

4. "SubValue"—The sub value loaded in the Billing Codes tab for this billing code/representative position combination.

5. "Billing Dscr."—The billing code description.

6. "Mobile"—The mobile number.

7. "Order #"—The inventory order number.

8. "Item #"—The inventory item number.

9. "Qty"—The quantity.

10. "Action"—The "action date". This is the date the commission management system uses to determine which processing month a transaction falls into.

11. "Comp Comp."—The compensation component associated with this billing code.

12. "Invoice #"—The inventory invoice number.

13. "Gross Price"—The gross price of the item.

14. "Discount Price"—The discount price of the item.

15. "Net Price"—The net price of the item.

16. "Reason Code"—The inventory reason code.

17. "Reason Dscr"—The reason description.

18. "Item SubCategory"—The item sub-category.

19. "Function Buttons"

Fix—Click to schedule the Commission Fix dialog to re-map a transaction to this representative.

Remove—Click to remove the highlighted transaction from this representative's transaction list. This actually "un-maps" the transaction from this representative.

20. "Min."—The minimum value identified for the highlighted transaction.

21. "Max."—The maximum value identified for the highlighted transaction.

22. "R/E"—The total revenue enhancement value of all accepted transactions on this sub-tab.

23. "Acc"—The total accessory value of all accepted transactions on this ub-tab.

24. "Subs"—The total subs value of all accepted transactions on this sub-tab.

As provided in the example screen illustrated in FIG. 33, the field definitions with reference to the "Affiliate" sub-tab screen 430 are:

1. "Accept"—Click to indicate whether or not a transaction should be "accepted" for inclusion in the representative's compensation calculation. This is initially set based on pre-defined business rules applied during the load process.

2. "Type"—The type of affiliate transaction (e.g., Connect vs. Disconnect).

3. "Value"—The value loaded in the Billing Codes tab for this billing code/representative position combination.

4. "SubValue"—The sub value loaded in the Billing Codes tab for this, billing code/representative position combination.

5. "Billing Dscr."—The description of the billing code on this transaction.

6. "Mobile"—Used to display the customer's name.

7. "S.O. In"—The incoming service order number.

8. "Date In"—The incoming service order date.

9. "S.O. Out"—The outgoing service order number.

10. "Date Out"—The outgoing service order date.

11. "Qty."—The quantity on this transaction.

12. "Min."—The minimum value identified for the highlighted transaction.

13. "Max."—The maximum value identified for the highlighted transaction.

14. "Aff Sales"—The total affiliate sales value of all accepted transactions on this sub-tab.

15. "Subs"—The total subs value of all accepted transactions on this sub-tab.

Figure 34:
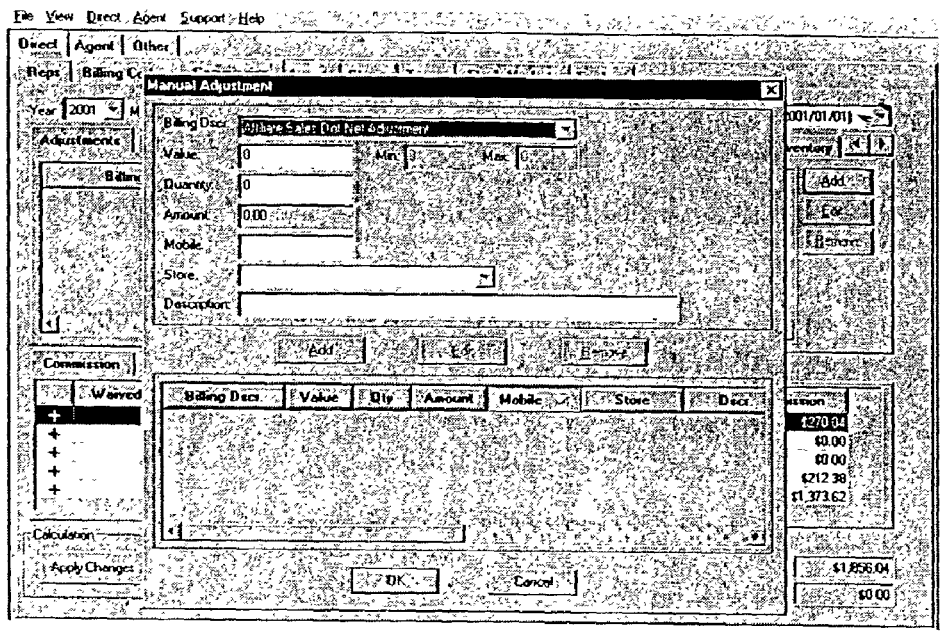

As provided in the example screen illustrated in FIG. 34, the field definitions with reference to the "Manual Adjustments" sub-tab screen 440, the columns displayed reflect the data entered on the Manual Adjustment dialog screen. The field definitions in the "Manual Adjustments" sub-tab screen 440 are:

1. "Billing Dscr."—Use the drop-down box to select the billing description.

2. "Value"—Enter the adjustment value.

3. "Min"—The minimum value that can be assigned.

4. "Max"—The maximum value that can be assigned.

5. "Quantity"—Enter the adjustment quantity. This allows the user to enter "bulk" adjustments.

6. "Amount"—The total amount calculated for this adjustment.

7. "Mobile"—Enter the mobile number.

8. "Store"—Use the drop-down box to select the store name to which this adjustment should be mapped.

9. "Description"—Enter a description of the adjustment.

10. "Function buttons"

Add—Click to add the adjustment data from the top of the screen to the window at the bottom of the screen.

Update—Highlight an existing adjustment and click to update that adjustment with the data at the top of the screen.

Remove—Highlight an existing adjustment and click to remove that adjustment.

Figure 35:
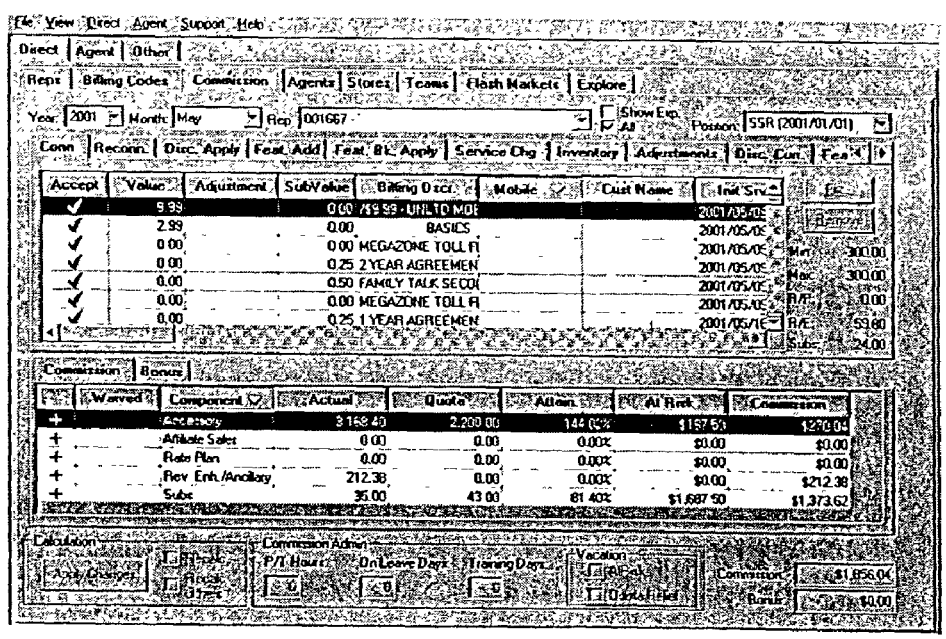

As provided in the example screen illustrated in FIG. 35, with reference to the "Commission" sub-tab screen 450, the sub-tabs are consistent with the "Bonus" sub-tab screen across all sub-tabs. The field definitions for the "Commission" sub-tab screen 450 are:

1. "+"—Click to drill down on the highlighted component to display any "subordinate" components that roll up, if applicable.

2. "Waived"—Click to apply the 60% waiver to the highlighted component.

3. "Component"—Each commission component defined for this position.

4. "Actual"—The total value applied in this representative's commission calculation for the highlighted component.

5. "Quota"—The quota applied in this representative's commission calculation for the highlighted component.

6. "Attain."—The commission attainment percentage calculated for the highlighted component.

7. "At Risk"—The at risk applied in this representative's commission calculation for the highlighted component.

8. "Commission"—The commission amount calculated for the highlighted component.

Figures 36, 37:
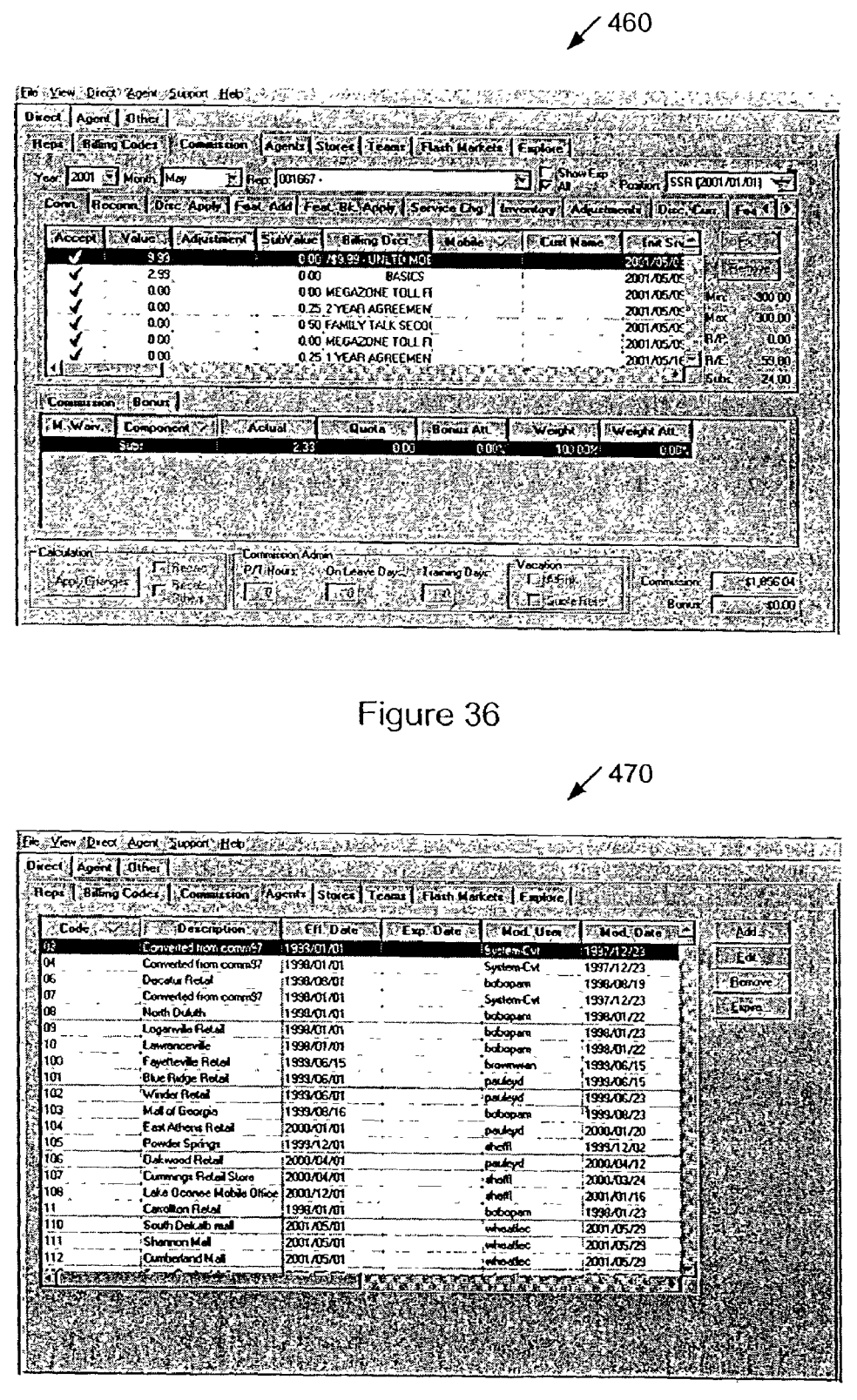

As provided in the example screen illustrated in FIG. 36, with reference to the "Bonus" sub-tab screen 460, the sub-tabs are consistent with the "Commission" sub-tab screen 450 across all sub-tabs. The field definitions for the "Bonus" sub-tab screen 460 are:

1. "M. Waiv."—Click to apply the bonus multiplier waiver to the highlighted component.

2. "Component"—Each bonus component defined for this position.

3. "Actual"—The quarter-to-date value for the highlighted component.

4. "Quota"—The quarter-to-date quota for the highlighted component.

5. "Bonus Att."—The quarter-to-date bonus attainment percentage calculated for the highlighted component.

6. "Weight"—The bonus weighting assigned to this position for the highlighted component.

7. "Weight Att."—The quarter-to-date weighted bonus attainment percentage calculated for the highlighted component.

8. "Calculation"

Apply Changes—Click to "save" any changes the user has made.

Recalc—Click to recalculate this representative only when the user applies changes.

Recalc Others—Click to recalculate this representative and all other representatives affected by this representative's calculation when the user selects Apply Changes.

9. "Commission Admin"

P/T Hours—For part-time positions, enter the average number of part-time hours worked per week during the month (e.g., total hours worked/4).

On Leave Days—Enter the number of days the representative was on leave during the month.

Training Days—Enter the number of days the representative was in training during the month.

Vacation At Risk—Click to generate a vacation at risk payment for this month.

Quota Relief—Click to calculate vacation quota relief for this month.

10. "Commission"—The total commission compensation amount calculated for this representative this month.

11. "Bonus"—The total bonus compensation amount calculated for this representative this month.

Figures 38, 39:
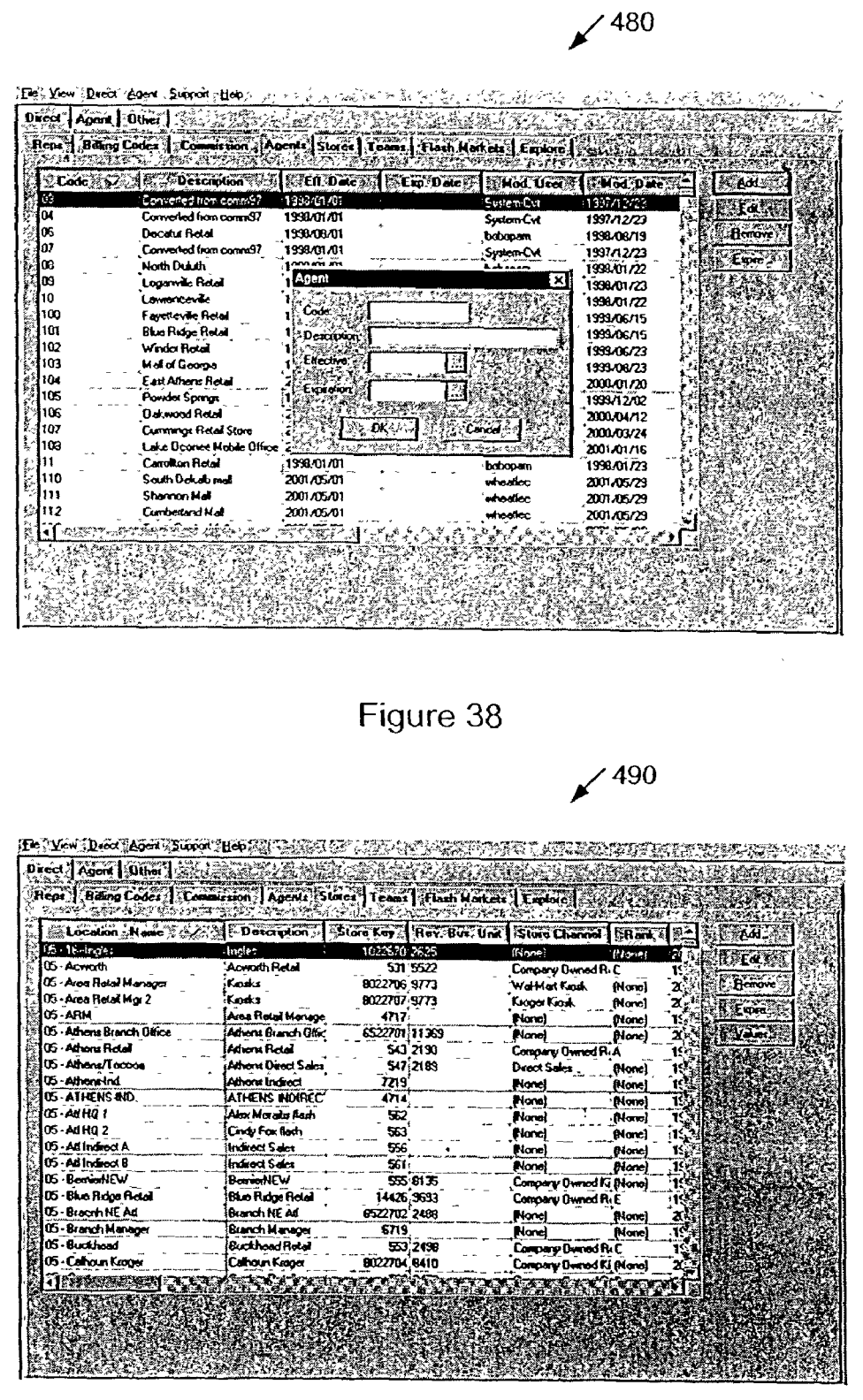

FIGS. 37 through 38 illustrate various example screens associated with the "Agents" tab portion of the commission management system's Direct Module feature. It is to be understood that such example screens are provided for illustrative purposes only and, therefore, the present invention should not be limited thereby. Turning now to FIG. 37, one embodiment of one example of an "Agents" tab screen 470 identifies all agent codes for the specified location to be included in the Direct commission extract from the billing system(s). As provided in the example screen illustrated in FIG. 38, the "Agents" dialog screen 480 captures each Direct agent's detailed data. The field definitions for the "Agents" dialog screen 480 are:

1. "Code"—Enter the agent code.

2. "Description"—Enter a description of the agent.

3. "Effective"—Use the calendar to select the date the agent is effective for direct processing in the commission management system.

4. "Expiration"—Use the calendar to select the date the agent is expired from the commission management system for direct processing.

Figure 40:
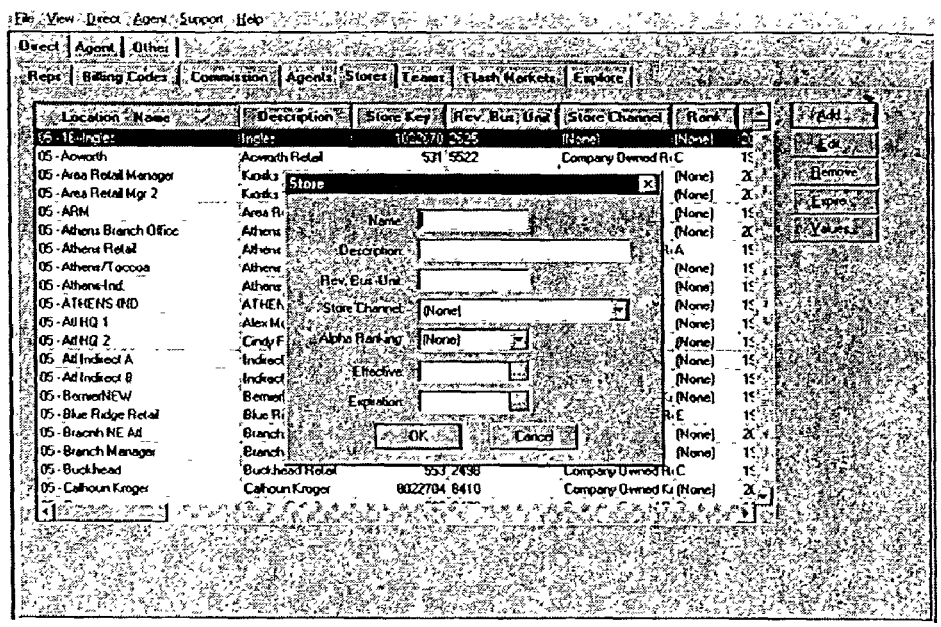
Figure 41:
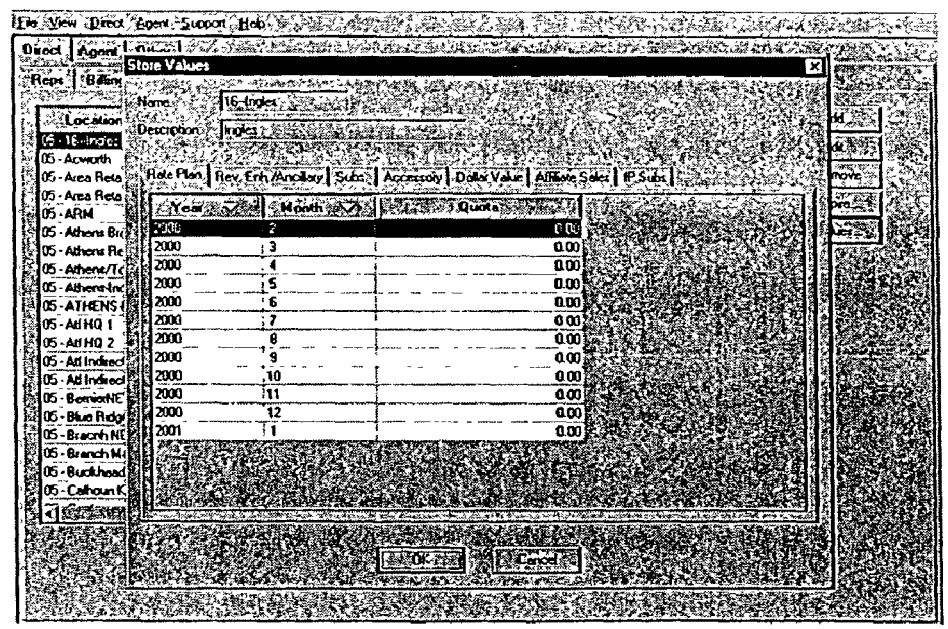

FIGS. 39 through 41 illustrate various example screens associated with the "Stores" tab portion of the commission management system's Direct Module feature. It is to be understood that such example screens are provided for illustrative purposes only and, therefore, the present invention should not be limited thereby. Turning now to FIG. 39, one embodiment of one example of a "Stores" tab screen 490 identifies all stores and kiosks in the specified location. This tab populates any "Stores" drop-down lists throughout the Direct Module. As provided in the example screen illustrated in FIG. 40, the "Store" dialog screen 500 captures detailed data about each store or kiosk. The field definitions for the "Store" 500 dialog screen are:

1. "Name"—Enter the name of the store.

2. "Description"—Enter a description of the store.

3. "Rev. Bus. Unit"—Enter the store's revenue business unit.

4. "Store Channel"—Use the drop-down list to select the store channel.

5. "Alpha Ranking"—Use the drop-down list to select the store's alpha ranking.

6. "Effective"—Use the calendar to select the date the store is effective in the commission management system.

7. "Expiration"—Use the calendar to select the date the store is expired from the commission management system.

As provided in the example screen illustrated in FIG. 41, the "Store Values" dialog screen 510 defines the quotas applicable to each store or kiosk, and is accessed by clicking the Values function button on the Stores tab. Note that individual sub-tabs can be displayed for each component. The field definitions for the "Store Values" dialog screen 510 are:

1. "Name"—The selected store's name.

2. "Description"—The selected store's description.

3. "Year"—The year.

4. "Month"—The month.

5. "Quota"—Enter the monthly quota applicable to the store.

Figures 42, 43:
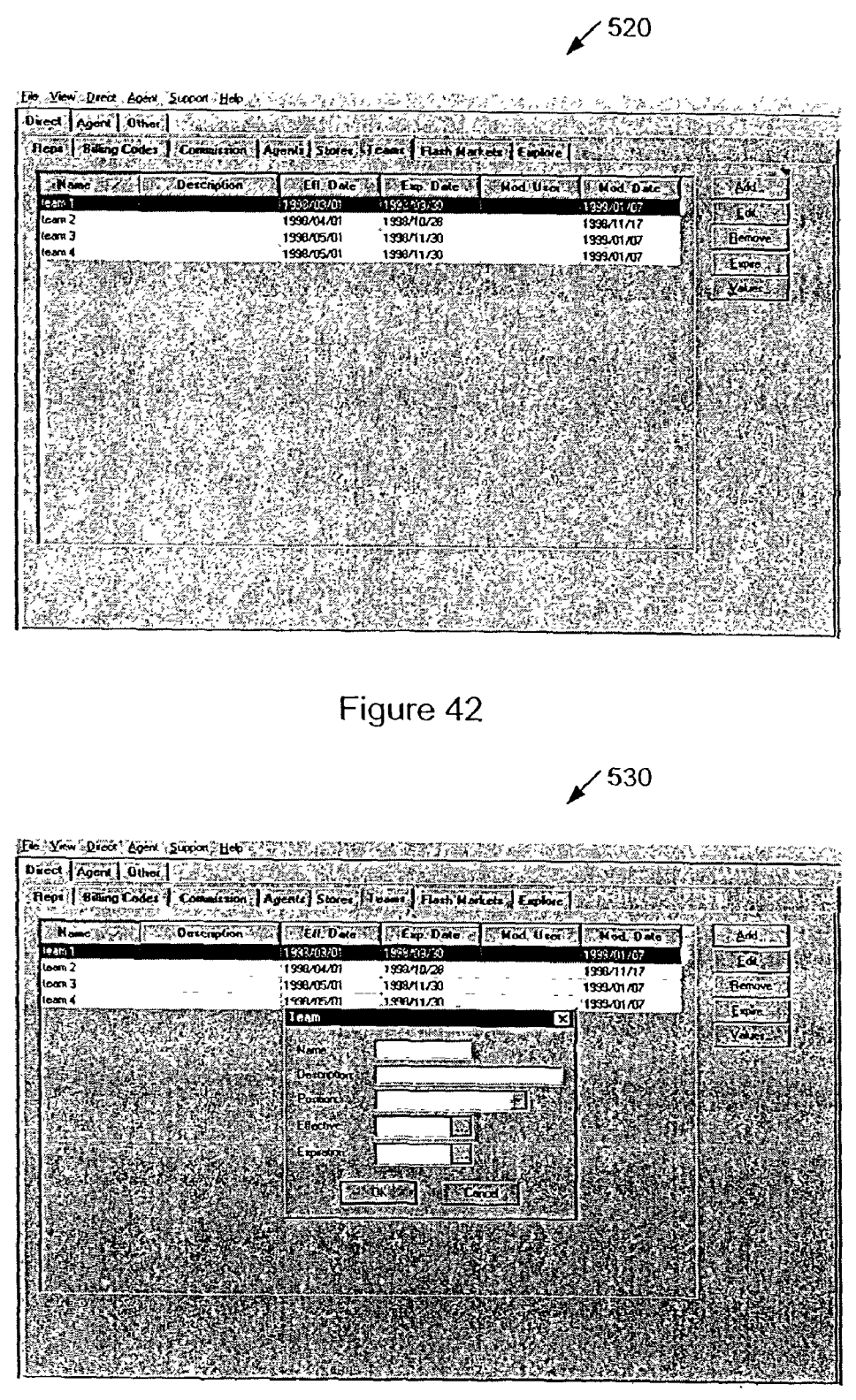
Figures 44, 45:
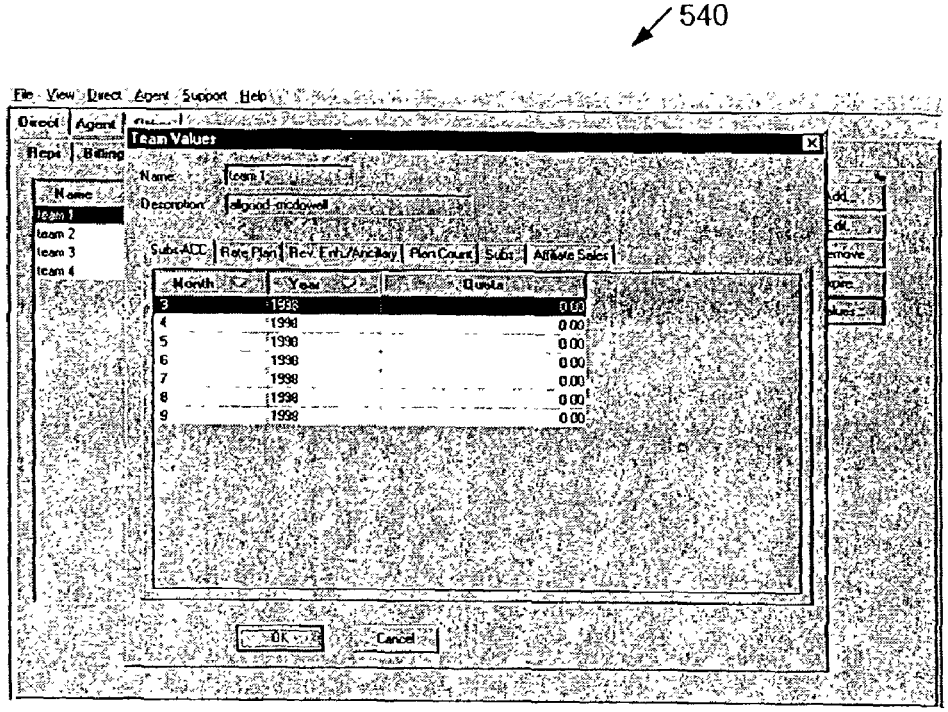

FIGS. 42 through 44 illustrate various example screens associated with the "Teams" tab portion of the commission management system's Direct Module feature. FIG. 42 illustrates one embodiment of one example of a "Teams" tab screen 520. It is to be understood that such example screens are provided for illustrative purposes only and, therefore, the present invention should not be limited thereby. The "Teams" tab screen 520 identifies all sales representative teams in the specified location. This tab populates any "teams" drop-down lists throughout the Direct Module. As provided in the example screen illustrated in FIG. 43, the "Team" dialog screen 530 captures detailed data about each team. The field definitions for the "Teams" dialog screen 530 are:

1. "Name"—Enter the name of the team.

2. "Description"—Enter a description of the team.

3. "Position"—Use the drop-down list to select a position code for the team, if applicable.

4. "Effective"—Use the calendar to select the date the team is effective in the commission management system.

5. "Expiration"—Use the calendar to select the date the team is expired from the commission management system.

As provided in the example screen illustrated in FIG. 44, the "Team Values" dialog screen 540 defines the quotas applicable to each sales representative team, and is accessed by clicking the Values function button on the Teams tab. Note that individual sub-tabs can be displayed for each component. The field definitions associated with the "Team Values" dialog screen 540 are:

1. "Name"—The selected team's name.

2. "Description"—The selected team's description.

3. "Year"—The year.

4. "Month"—The month.

5. "Quota"—Enter the monthly quota applicable to the team.

FIG. 45 illustrates one embodiment of one example of a screen associated with the "Flash Markets" tab portion of the commission management system's Direct Module feature. The "Flash Markets" tab screen 550 displays all flash markets for the specified location and its "friendly" markets, as defined in the Sales Flash. Agents within these markets are then assigned to indirect sales representatives as part of their set-up. The field definitions for the "Flash Markets" tab screen 550 are:

1. "Market"—The flash market code.
2. "Market Code"—The commissions market code (e.g., location).
3. "Description"—The flash market name.
4. "Eff. Date"—The date the flash market is effective in the Sales Flash.
5. "Exp. Date"—The date the flash market expires in the Sales Flash.

Figures 46, 47:
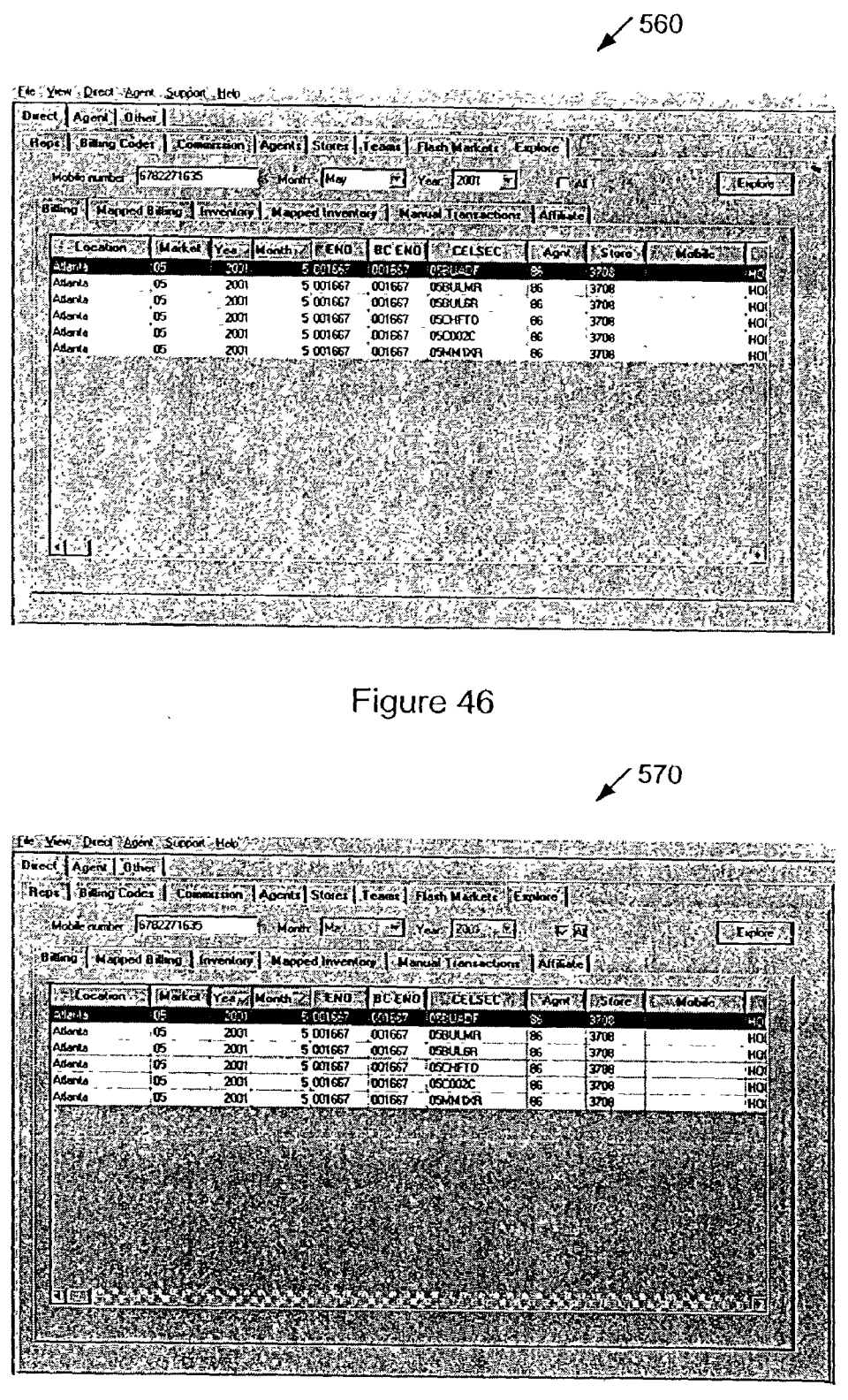

FIGS. 46 through 52 illustrate various example screens associated with the "Explore" tab portion of the commission management system's Direct Module feature. It is to be understood that such example screens are provided for illustrative purposes only and, therefore, the present invention should not be limited thereby. FIG. 46 illustrates one embodiment of one example of an "Explore" tab screen 560. The "Explore" tab screen 560 provides a search tool that displays detailed information about all transactions associated with a particular mobile number. The data, as received from its source system, displays on the Billing and Inventory sub-tabs. The data, as mapped by the commission management system, displays on the Mapped Billing, Mapped Inventory and Affiliate sub-tabs. Any transactions entered by the user display on the Manual Transactions sub-tab. Header information is consistent across all sub-tabs and the field definitions associated with the "Explore" tab screen 560 are:
1. "Mobile number"—The mobile number the user is searching for.
2. "Month"—Use the drop-down box to select the month the user wants to search in.
3. "Year"—Use the drop-down box to select the year to search in.
4. "All"—Click to search in all months and years for the mobile number.
5. "Function button"
Explore—Click to initiate the search.

FIG. 47 illustrates one embodiment of one example of a "Billing" data screen from the CARE and TELEGANCE systems displayed on the "Billing" sub-tab screen 570. The field definitions associated with the "Billing" sub-tab screen 570 are:
1. "Location"—The location name.
2. "Market"—The commission market code.
3. "Year"—The year.
4. "Month"—The month.
5. "ENO"—The mobile-level employee ID.
6. "BC ENO"—The billing code-level employee ID.
7. "CELSEC"—The billing code, prefaced by the market code.
8. "Agnt"—The mobile-level agent code.
9. "Store"—The store code.
10. "Mobile"—The mobile number.
11. "CustName"—The customer name.
12. "MNM"—The mnemonic.
13. "ESN"—The ESN.
14. "Status"—The status. If active, this will display blank.
15. "AirChrg"—The air charge.
16. "NewMobile"—The new mobile number.
17. "Corp."—The corporate code.
18. "ISD" The initial service date.
19. "RCD"—The reconnect date.
20. "DCD"—The disconnect date.
21. "EFD"—The effective final date.
22. "SCD"—The status change date. Not currently populated.
23. "SYSISD"—The system initial service date.
24. "SYSEFD"—The system effective final date.
25. "SYSDCD"—The system disconnect date.
26. "SYSRCD" The system reconnect date.
27. "BCAgt"—The billing code-level agent code.
28. "BCSYSCD"—The billing code-level system connect date.
29. "BCSYSDCD"—The billing code-level system disconnect date.
30. "BCISD"—The billing code-level initial service date.
31. "CSYSISD"—The billing code-level system initial service date.
32. "ContractSrvFlag"—The contract service flag.
33. "ActionType"—The action type.
34. "ActionDate"—The action date.

Figures 48, 49:
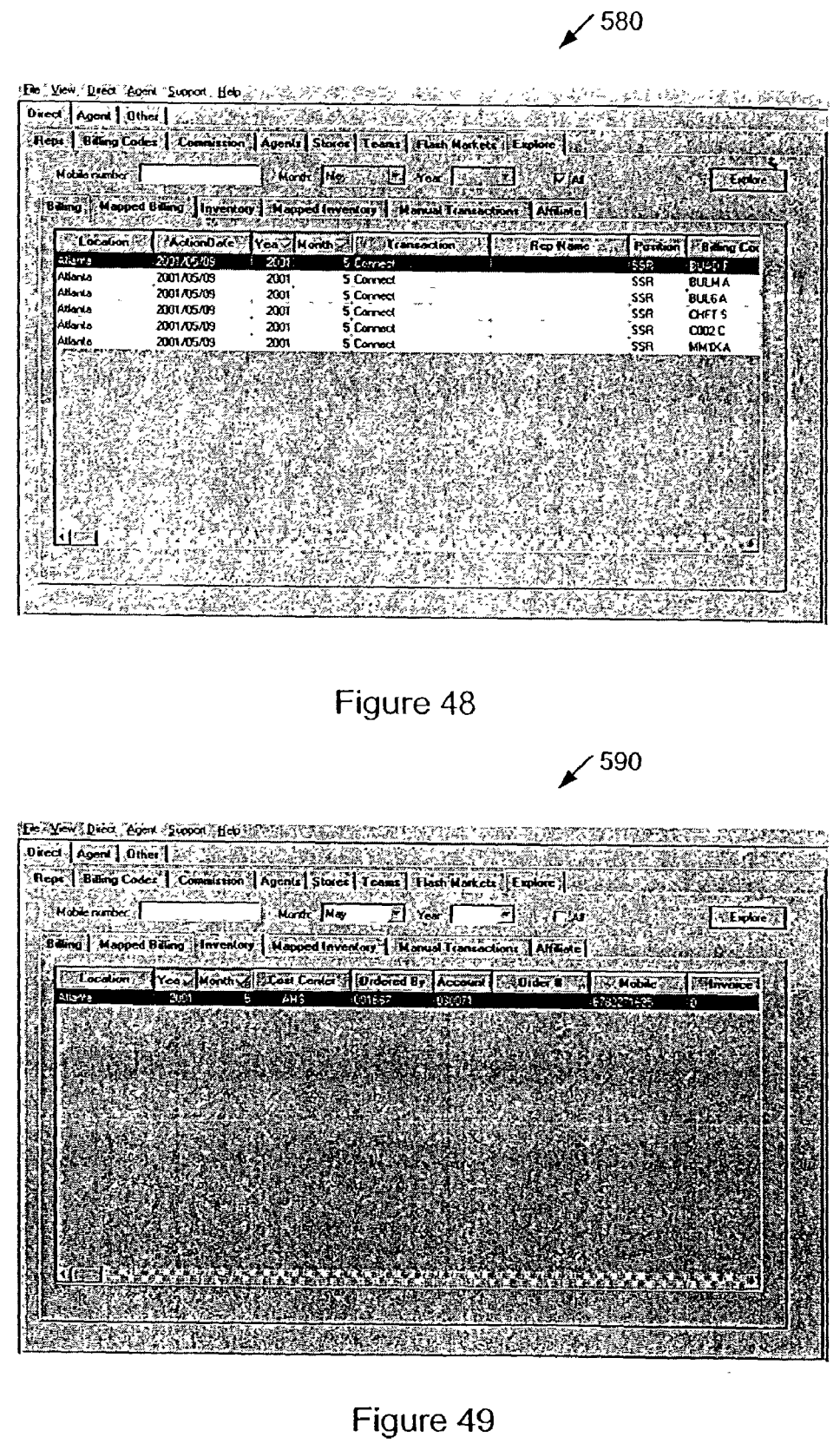

FIG. 48 illustrates one embodiment of one example of "Billing" data mapped by the commission management system displayed on a "Mapped Billing" sub-tab screen 580. The field definitions associated with the "Mapped Billing" sub-tab screen 580 are:
1. "Location"—The location name.
2. "ActionDate"—The action date.
3. "Year"—The year.
4. "Month"—The month.
5. "Transaction"—The transaction type.
6. "Rep Name"—The selling representative's name.
7. "Position"—The selling representative's position code.
8. "Billing Code"—The billing code.
9. "BC Key"—The billing code key.
10. "Store"—The store code.
11. "IsAcc"—"Is Accepted" indicator, Yes or No.
12. "Agnt"—The agent code.
13. "Mobile"—The mobile number.
14. "SYSISD"—The system initial service date.
15. "CustName"—The customer name.
16. "Billing Code Dscr"—The billing code description.
17. "Value"—The commission value.
18. "Adjustment"—The adjustment value.
19. "IsSub"—"Is Sub" indicator, Yes or No.
20. "Sub Value"—The sub value.
21. "Billing Code Type"—The billing code type.
22. "BC Rate"—The billing code rate.
23. "Value From"—Not currently used.
24. "CELSEC"—The billing code, prefaced by the market code.
25. "ESN"—The ESN.
26. "BCAgt"—The billing code-level agent code.
27. "ApplyCurrent"—"Apply Current" indicator, Yes or No.
28. "BCSYSISD"—The billing code-level system initial service date.
29. "Corp Rep"—The corporate representative ID.
30. "Corp Code"—The corporate code.
31. "IsCorpAcc"—"Is Corporate Accepted" indicator, Yes or No.
32. "Mod. User"—The username of the last person to modify the transaction.
33. "Mod. Date"—The date the transaction was last modified.

FIG. 49 illustrates one embodiment of one example of "Inventory" data from the COMPASS system displayed on the "Inventory" sub-tab data screen 590. The field definitions associated with the "Inventory" sub-tab screen 590 are:
1. "Location"—The location name.
2. "Year"—The year.
3. "Month"—The month.
4. "Cost Center"—The cost center.
5. "Ordered By"—The "Ordered By" inventory ID.
6. "Account"—The "Account" inventory ID.
7. "Order #"—The inventory order number.

8. "Mobile"—The mobile number.
9. "Invoice #"—The inventory invoice number.
10. "E-Store"—The store code.
11. "Item #"—The inventory item number.
12. "Short #"—The abbreviated inventory stock number.
13. "Quantity"—The quantity.
14. "Price"—The price.
15. "Cost"—The cost of the item.
16. "Gross Price"—The gross price of the item.
17. "Discount Price"—The discount price of the item.
18. "Net Price"—The net price of the item.
19. "ReasonCode"—The inventory reason code.
20. "ReasonDscr"—The reason description.
21. "ItemSubCat"—The item sub-category.
22. "Line Type"—The line type code.
23. "GLCD"—The general ledger code.
24. "Update Date"—The date the record was last updated.
25. "Trans. Date"—The transaction date.
26. "Rec Type"—The record type.
27. "CGSA"—The CGSA code.
28. "RADAR BU"—The RADAR business unit.
29. "OracleOrgCode"—The Oracle organization code.

Figure 50:
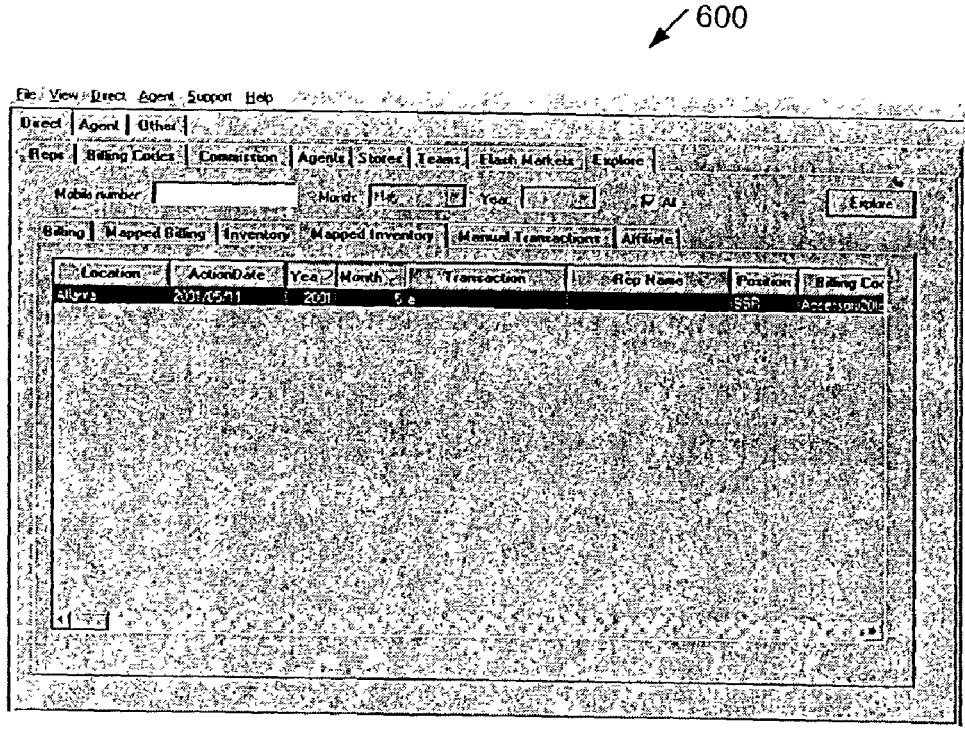

FIG. 50 illustrates one embodiment of one example of "Inventory" data mapped by the commission management system displayed on the "Mapped Inventory" sub-tab screen 600. The field definitions associated with the "Mapped Inventory" sub-tab screen 600 are:
1. "Location"—The location name.
2. "ActionDate"—The action date.
3. "Year"—The year.
4. "Month"—The month.
5. "Transaction"—The transaction type.
6. "Rep Name"—The selling representative's name.
7. "Position"—The selling representative's position code.
8. "Billing Code"—The billing code.
9. "BC Key"—The billing code key.
10. "Store"—The store code.
11. "IsAcc"—"Is Accepted" indicator, Yes or No.
12. "Order #"—The inventory order number.
13. "Mobile"—The mobile number.
14. "Invoice #"—The inventory invoice number.
15. "Item #"—The inventory item number.
16. "Value"—The commission value.
17. "Adjustment"—The adjustment value.
18. "Billing Code Type"—The billing code type.
19. "Billing Code Dscr"—The billing code description.
20. "Price"—The price.
21. "Cost"—The cost of the item.
22. "Gross Price"—The gross price of the item.
23. "Discount Price"—The discount price of the item.
24. "Net Price"—The net price of the item.
25. "Reason Code"—The inventory reason code.
26. "Reason Dscr"—The reason description.
27. "Item SubCategory"—The item sub-category.
28. "Cost Center"—The cost center.
29. "Line Type"—The line type code.
30. "GLCD"—The general ledger code.
31. "Quantity"—The quantity.
32. "BC Rate"—The billing code rate.
33. "Mod. User"—The username of the last person to modify the transaction.
34. "Mod. Date"—The date the transaction was last modified.

Figure 51:
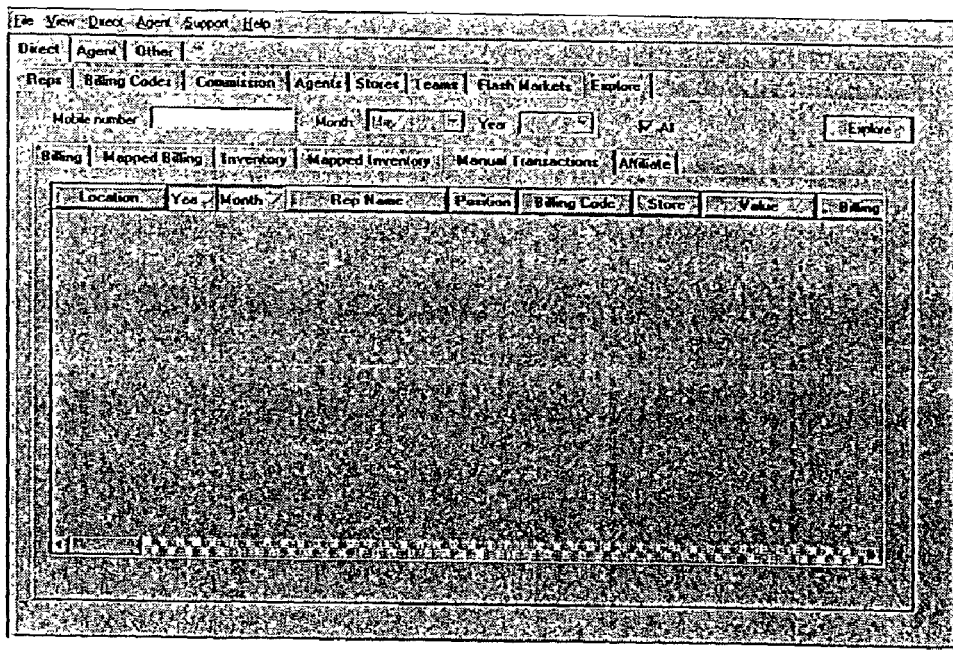

FIG. 51 illustrates one embodiment of one example of "Manual" adjustments entered by the Commission Specialist displayed on the "Manual Transactions" sub-tab screen 610. The field definitions associated with the "Manual Transactions" sub-tab screen 610 are:
1. "Location"—The location name.
2. "Year"—The year.
3. "Month"—The month.
4. "Rep Name"—The selling representative's name.
5. "Position"—The selling representative's position code.
6. "Billing Code"—The billing code.
7. "Store"—The store code.
8. "Value"—The adjustment value.
9. "Billing Code Type"—The billing code type.
10. "Billing Code Dscr"—The billing code description.
11. "Quantity"—The quantity.
12. "Amount"—The total adjustment amount.
13. "BC Rate"—The billing code rate.
14. "Mobile"—The mobile number.
15. "Description"—The adjustment description.
16. "Mod. User"—The username of the last person to modify the transaction.
17. "Mod. Date"—The date the transaction was last modified.

Figure 52:
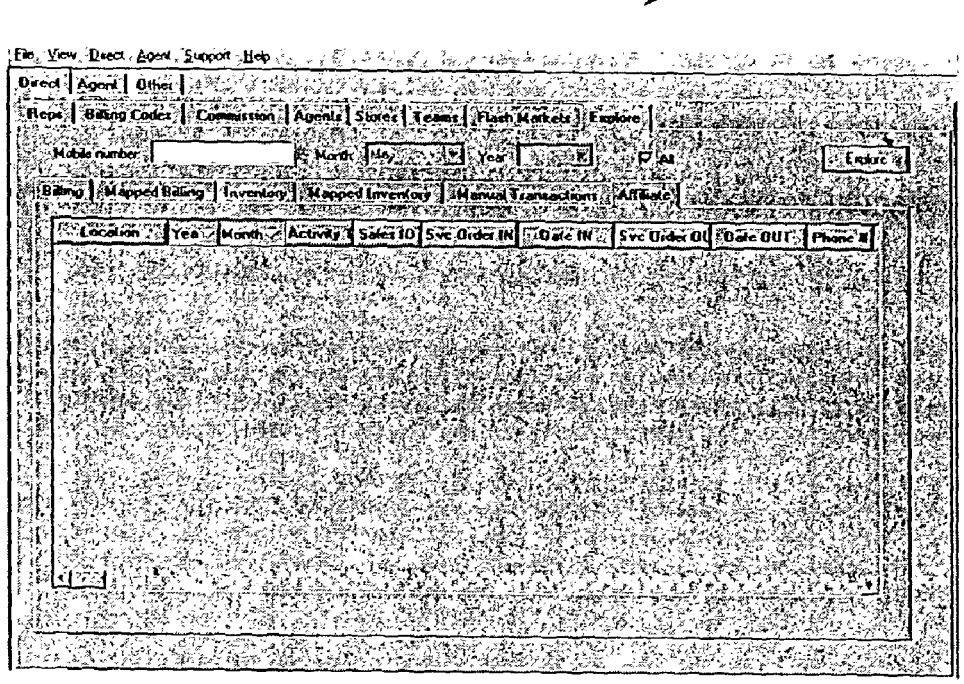

FIG. 52 illustrates one embodiment of one example of "Interactive" pager data mapped by the commission management system displayed on the "Affiliate" sub-tab screen 620. The field definitions associated with the "Affiliate" sub-tab screen 620 are:
1. "Location"—The location name.
2. "Year"—The year.
3. "Month"—The month.
4. "Activity Type"—The activity type.
5. "Sales ID"—The BSWD ID.
6. "Svc Order IN"—The incoming service order number.
7. "Date IN"—The incoming service order date.
8. "Svc Order OUT"—The outgoing service order number.
9. "Date OUT"—The outgoing service order date.
10. "Phone #"—Displays the customer's name.
11. "Service Type"—Displays the billing code.
12. "Quantity"—The quantity.
13. "Commission"—The commission rate.
14. "Action Type"—The action type.
15. "Action Date"—The action date.
16. "Rep Name"—The selling representative's name.
17. "Position"—The selling representative's position code.
18. "Billing Code"—The billing code.
19. "BC Key"—The billing code key.
20. "Store Name"—The store name.
21. "Store Key"—The store key.
22. "IsAcc"—"Is Accepted" indicator, Yes or No.
23. "Value"—The commission value.
24. "Billing Code Type"—The billing code type.
25. "Billing Code Dscr"—The billing code description.
26. "BC Rate"—The billing code rate.
27. "Sub Value"—The sub value.
28. "Mod. User"—The username of the last person to modify the transaction.
29. "Mod. Date"—The date the transaction was last modified.

Having discussed one embodiment of the present invention with respect to the Direct Module screen descriptions, one embodiment of the present invention with respect to various procedures will now be described. There are four separate functional procedures in the Direct Module that are available to a user of the commission management system Direct Module in accordance with one embodiment of the present invention. The four separate functional procedures are the "Commission Processing," "Explore," "Payroll," and "Table Maintenance" procedures. The "Commission Processing" procedure describe's how to reconcile the particular representatives' sales for each month. The "Explore" procedure describes how to use the commission management system Direct Module to investigate transactions. The "Payroll" procedure describes how to submit a representative's commission and bonus information to Payroll. The "Table Maintenance" procedure describes how to set up and maintain the tables that drive the commission management system Direct Module.

Accordingly, a user can use the following "Commission Processing" procedure each month as the representatives reconcile their sales:

1. Click on the Commission tab.
 2. Use the drop-down boxes to select the Year and Month being processed. The system defaults to the current processing year and month.
 3. Select the Rep being processed from the drop-down box. NOTE: The user can "fast-track" to a specific rep from the "Reps" tab by right-clicking the mouse and highlighting Go To Commission Tab. Reverse this by right-clicking the mouse on the Commission tab and highlighting Go to Rep Tab.
 4. If the rep held more than one Position during the month, use the drop-down box to select the appropriate one. The system defaults to the current position.
 5. To approve or reject transactions for payment, click in the Accept column to set or remove the check mark. Different transaction types are displayed on different sub-tabs (e.g., connects, disconnects, feature adds, etc.).
 6. To override the payment value loaded on the Billing Codes tab, key the value to be paid in the Adjustment column.
 7. If a transaction was mapped to the wrong representative, highlight that transaction and click Remove.
 8. To re-map a transaction to the correct representative, switch to the Commission tab for that representative and click Fix. On the Commission Fix dialog, enter the Mobile number and click Lookup. Select the un-mapped transaction(s) that belong to this rep, and use the drop-down box to indicate the associated Store. Click Update to re-map the transaction(s) to this representative, or click Cancel to return to the Commission tab.
 9. Make manual adjustments on the Adjustments sub-tab.
 10. Make any Commission Admin entries.
 11. Click the Recalc box and the Recalc Others box, if necessary.
 12. Click Apply Changes to recalculate the representative's commission and bonus, incorporating changes that have been made.

Further, a user can use the following "Explore" procedure as a troubleshooting tool for determining the data the commission management system received from its source systems, and how it mapped that data:

1. Click on the Explore tab. The user also can access Explore from the Direct menu on the toolbar by clicking Tools then Explore, or by simply pressing F7.
 2. Enter the Mobile number being searched.
NOTE: "Fast-track" can be used to Explore a specific mobile from the Commission tab by highlighting that mobile, then right-clicking the mouse and clicking Explore.
 3. Use the drop-down boxes to select the Month and Year being searched, or click All to search all months and years. The system defaults to the current processing year and month.
 4. Click Explore.

Moreover, a user can use the following "Payroll" procedure for submitting the representatives' commission and bonus information to Payroll:

1. Click Payroll from the Direct menu on the toolbar.
 2. Click Preview to review the payroll report online and/or to generate a hard copy of the report for signatures.
 3. If payment errors are detected, correct and recalculate the representative(s) in question. Repeat these procedures.
 4. Click Submit when all commission and bonus information is accurate. The commission management system generates a file and transmits it to the Payroll department for processing.

Finally, a user can use the following "Table Maintenance" procedures to add, edit, remove, and expire records from the tables that define and direct the commission management system processing for various agents, billing codes, representatives, stores, and teams.

Accordingly, for adding, editing, removing, and expiring records with respect to tables that define and direct the commission management system processing for various agents, a user can use the following procedures.

To add a new agent:
 1. On the Agents tab, click Add.
 2. Enter the agent's Code, Description, Effective Date and Expiration Date (if applicable).
 3. Click OK to add the agent, or Cancel to abort the process.

To edit an agent:
 1. On the Agents tab, highlight the agent being changed.
 2. Click Edit.
 3. Enter the updated information for the agent. The commission management system prevents the user from changing "key" data.
 4. Click OK to process the update, or Cancel to abort the process. The commission management system does not allow the user to make changes to a record effective in a "frozen" month (e.g., a month for which payroll has been submitted).

To remove an agent:
 1. On the Agents tab, highlight the agent being removed.
 2. Click Remove. In one embodiment, this function physically deletes the record.
 3. The commission management system displays a confirmation window. Click Yes to remove the agent, or No to abort the process. The commission management system does not allow the user to remove a record effective in a "frozen" month (e.g., a month for which payroll has been submitted).

To expire an agent:
 1. On the Agents tab, highlight the agent being expired.
 2. Click Expire.
 3. On the Expire dialog, enter the Expiration Date and click the Create new record box, if appropriate.
 4. Click OK to expire the agent, or Cancel to abort the process.

Further, for adding, editing, removing, and expiring records with respect to tables that define and direct the commission management system processing for various Billing Codes, a user can use the following procedures.

To add a new billing code to the extract:
 1. On the Billing Codes tab, click Show Unused.
 2. Highlight the billing code being added.
 3. Click Set Used.
 4. On the Billing Code Categorization dialog, use the drop-down box to select the Category.
 5. Click OK to add the billing code, or Cancel to abort the process.

To remove a billing code from the extract:
 1. On the Billing Codes tab, highlight the billing code being removed.
 2. Click Set Unused.

To add a category to a billing code:

1. On the Billing Codes tab, highlight the billing code being updated.
2. Click Categorize.
3. On the Billing Code Categorization dialog, use the drop-down box to select the Category.
4. Click OK to update the billing code, or Cancel to abort the process.

To add values to a billing code:

1. On the Billing Codes tab, highlight the billing code being updated.
2. Click Add by the Values window.
3. Highlight the Position Code that values are being added for.
4. Double-click the Eff. Date and select the appropriate date from the calendar.
5. Double-click the Exp. Date (if applicable) and select the appropriate date from the calendar.
6. Enter the Value and the Sub Value.
7. Click OK to add the values, or Cancel to abort the process.

To edit a billing code value:

1. On the Billing Codes tab, highlight the code being changed.
2. Highlight the value being changed.
3. Click Edit by the Values window.
4. Enter the updated information for the billing code values. The commission management system prevents the user from changing "key" data.
5. Click OK to process the update, or Cancel to abort the process. The commission management system does not allow the user to make changes to a record effective in a "frozen" month (e.g., a month for which payroll has been submitted).

To remove a billing code value:

1. On the Billing Codes tab, highlight the code being changed.
2. Highlight the value being removed.
3. Click Remove by the Values window. In one embodiment, this function physically deletes the record.
4. The commission management system displays a confirmation window. Click Yes to remove the value, or No to abort the process. The commission management system does not allow the user to remove a record effective in a "frozen" month (e.g., a month for which payroll has been submitted).

To expire a billing code value:

1. On the Billing Codes tab, highlight the code being changed.
2. Highlight the value being expired.
3. Click Expire by the Values window.
4. On the Expire dialog, enter the Expiration Date and click the Create new record box, if appropriate.
5. Click OK to expire the value, or Cancel to abort the process.

Moreover, for adding, editing, removing, and expiring records with respect to tables that define and direct the commission management system processing for various representatives, a user can use the following procedures.

To add a new representative:

1. On the "Reps" tab, click Add.
2. Enter the representative's Code/Eno, SSN, Last Name, First Name, MI, Effective date and Expiration date (if applicable). Enter Address and Phone information, if desired.
3. Click OK to add the representative, or Cancel to abort the process.
4. On the Add Additional Rep Info dialog:
   a. Click Position and select the representative's position code. Click OK to confirm the selection, or Cancel to return to the Add Additional Rep Info dialog. Use the drop-down box on the Add Additional Rep Info dialog to by-pass the Add Rep Position window. Confirm the Effective date or enter a different date. Enter the Expiration date (if applicable), and the Base Salary. For manager positions, define the manager roll-up basis. Click OK to add the record, or Cancel to return to the Add Additional Rep Info dialog.
   b. Click Manager and select the representative's manager. Click OK to confirm the selection, or Cancel to return to the Add Additional Rep Info dialog. Use the drop-down box on the Add Additional Rep Info dialog to by-pass the Add Rep Manager window. Confirm the Effective date or enter a different date. Enter the Expiration date (if applicable). Click OK to add the record, or Cancel to return to the Add Additional Rep Info dialog.
   c. Click WAS and select the representative's wireless application specialist. Click OK to confirm the selection, or Cancel to return to the Add Additional Rep Info dialog. Use the drop-down box on the Add Additional Rep Info dialog to by-pass the Add Rep WAS window. Confirm the Effective date or enter a different date. Enter the Expiration date (if applicable). Click OK to add the record, or Cancel to return to the Add Additional Rep Info dialog.
   d. Click IPR and select the representative's interactive paging service representative. Click OK to confirm the selection, or Cancel to return to the Add Additional Rep Info dialog. Use the drop-down box on the Add Additional Rep Info dialog to by-pass the Add Rep IPR window. Confirm the Effective date or enter a different date. Enter the Expiration date (if applicable). Click OK to add the record, or Cancel to return to the Add Additional Rep Info dialog.
   e. Click Alias and enter the representative's alias Code/Eno. Use the drop-down box to select the Store the alias is tied to. Confirm the Effective date or enter a different date. Enter the Expiration date (if applicable). Click OK to add the record, or Cancel to return to the Add Additional Rep Info dialog.
   f. Click Inventory ID. Confirm the representative's ID or enter a different ID. Use the drop-down box to select the Store the ID is tied to. Confirm the Effective date or enter a different date. Enter the Expiration date (if applicable). Click OK to add the record, or Cancel to return to the Add Additional Rep Info dialog.
   g. Click Specialist. Confirm the Specialist username or enter a different username. Use the drop-down boxes to select the representative's Bus. Unit, Office, Team and Store. Confirm the Effective date or enter a different date. Enter the Expiration date (if applicable). Click OK to add the record, or Cancel to return to the Add Additional Rep Info dialog. When all additional rep information has been defined, click OK to add the rep, or Cancel to abort the process.
5. If the representative's position is subject to ramp-up quota, the commission management system displays a window asking if the user wants to define that now. Click Yes to add Position Values now, or No to add them later.
6. If the user answered Yes above, identify the Ramp Up period, enter the Ramp Quota, and confirm or modify the regular Quota, At Risk and Guarantee for the rep. Click OK to establish the position values, or Cancel to return to the "Reps" tab and add position values later.

To edit a representative:

1. On the "Reps" tab, highlight the representative being changed.
2. Click Edit.
3. Enter the updated information for the rep. The commission management system prevents the user from changing "key" data.

4. Click OK to process the update, or Cancel to abort the process. The commission management system does not allow the user to make changes to a record effective in a "frozen" month (e.g., a month for which payroll has been submitted).

To expire a representative:

1. On the "Reps" tab, highlight the representative being expired.

2. Click Expire.

3. The commission management system displays a warning window. Click Yes to continue, or No to abort the process.

4. On the Expire dialog, enter the Expiration Date. Click the Create new record box, if appropriate, and the is Active box if the rep is still an employee of the business enterprise.

5. Click OK to expire the representative and all representative sub-tabs, or Cancel to abort the process.

Once a representative has been established in the commission management system, the sub-tabs can be used to add or change data.

For example, To add a new position to a representative:

1. On the "Reps" tab, highlight the representative being changed.

2. On the Position sub-tab, highlight the representative's old position and click Expire.

3. On the Expire dialog, enter the Expiration Date. Click the Create new record box, if appropriate, and the Backouts Follow box if chargebacks should flow to the representative's new position.

4. Click OK to expire the representative's old position, or Cancel to abort the process.

5. On the Position sub-tab, click Add.

6. On the Add Rep Position dialog, select the representative's new position code. Click OK to confirm the selection, or Cancel to return to the Position sub-tab.

7. Enter the Effective date for this position, the Expiration date (if applicable), and the Base Salary. For manager positions, define the manager roll-up basis. Click OK to add the record, or Cancel to abort the process.

To edit a representative's position:

1. On the "Reps" tab, highlight the representative being changed.

2. On the Position sub-tab, highlight the position being changed and click Edit.

3. Enter the updated information for the representative's position. The commission management system prevents the user from changing "key" data.

4. Click OK to process the update, or Cancel to abort the process. The commission management system does not allow the user to make changes to a record effective in a "frozen" month (e.g., a month for which payroll has been submitted).

To remove a representative's position:

1. On the "Reps" tab, highlight the representative being changed.

2. On the Position sub-tab, highlight the position being removed and click Remove. In one embodiment, this function physically deletes the record.

3. The commission management system displays a confirmation window. Click Yes to remove the position, or No to abort the process. The commission management system does not allow the user to remove a record effective in a "frozen" month (e.g., a month for which payroll has been submitted).

To expire a representative's position:

1. On the "Reps" tab, highlight the representative being changed.

2. On the Position sub-tab, highlight the position being expired and click Expire.

3. On the Expire dialog, enter the Expiration Date. Click the Create new record box, if appropriate, and the Backouts Follow box if chargebacks should flow to the representative's next position.

4. Click OK to expire the representative's position, or Cancel to abort the process.

To add or change a representative's quota, at risk or guarantee:

1. On the "Reps" tab, highlight the representative being changed.

2. On the Position sub-tab, highlight the position being changed and click Values.

3. On the Position Values dialog, click on the appropriate component sub-tab, and highlight the month being changed. Enter the updated values for the representative.

4. Click OK to process the update, or Cancel to abort the process. The commission management system does not allow the user to make changes to a "frozen" month (e.g., a month for which payroll has been submitted).

To add a corporate code to a representative:

1. On the "Reps" tab, highlight the representative being changed.

2. On the Position sub-tab, highlight the position being changed and click Corp. This button only displays for positions paid based on corporate codes.

3. On the Corporate Codes dialog, click Add.

4. Enter the Code and Description for the new corporate code, and the Alias Code and Alias Description (if applicable). Enter the Effective date and the Expiration date (if applicable). Click OK to add the code, or Cancel to return to the Corporate Codes dialog.

5. Click Done to return to the Position sub-tab.

To edit a corporate code on a representative:

1. On the "Reps" tab, highlight the representative being changed.

2. On the Position sub-tab, highlight the position being changed and click Corp. This button only displays for positions paid based on corporate codes.

3. On the Corporate Codes dialog, click Edit.

4. Enter the updated information for the code. The commission management system prevents the user from changing "key" data.

5. Click OK to process the update, or Cancel to return to the Corporate Codes dialog. The commission management system does not allow the user to make changes to a record effective in a "frozen" month (e.g., a month for which payroll has been submitted).

6. Click Done to return to the Position sub-tab.

To remove a corporate code from a representative:

1. On the "Reps" tab, highlight the representative being changed.

2. On the Position sub-tab, highlight the position being changed and click Corp. This button only displays for positions paid based on corporate codes.

3. On the Corporate Codes dialog, highlight the code being removed and click Remove. In one embodiment, this function physically deletes the record.

4. The commission management system displays a confirmation window. Click Yes to remove the code, or No to return to the Corporate Codes dialog. The commission management system does not allow the user to remove a record effective in a "frozen" month (e.g., a month for which payroll has been submitted).

5. Click Done to return to the Position sub-tab.

To expire a corporate code from a representative:

1. On the "Reps" tab, highlight the representative being changed.

2. On the Position sub-tab, highlight the position being changed and click Corp. This button only displays for position paid based on corporate codes.

3. On the Corporate Codes dialog, highlight the code being expired and click Expire.

4. On the Expire dialog, enter the Expiration Date and click the Create new record box, if appropriate.

5. Click OK to expire the code, or Cancel to return to the Corporate Codes dialog.

6. Click Done to return to the Position sub-tab.

To add a flash market to a representative:

1. On the "Reps" tab, highlight the representative being changed.

2. On the Position sub-tab, highlight the position being changed and click Flash. This button only displays for positions paid from the Sales Flash.

3. On the Flash Markets dialog, click Show all markets.

4. Highlight the new flash market(s). Use the Ctrl key to pick multiple markets; use the Shift key to pick a block of markets.

5. Click Add by the Agents window.

6. Highlight the agent(s) in the new flash market(s). Use the Ctrl key to pick multiple agents; use the Shift key to pick a block of agents. Enter the Effective date and the Expiration date (if applicable).

7. Click OK to add the market(s), or Cancel to return to the Flash Markets dialog.

8. Click Done to return to the Position sub-tab.

To add an Agent to an existing Flash Market for a representative:

1. On the "Reps" tab, highlight the representative being changed.

2. On the Position sub-tab, highlight the position being changed and click Flash. This button only displays for positions paid from the Sales Flash.

3. On the Flash Markets dialog, highlight the market being changed and click Add by the Agents window.

4. Highlight the new agent(s) in the flash market. Use the Ctrl key to pick multiple agents; use the Shift key to pick a block of agents. Enter the Effective date and the Expiration date (if applicable).

5. Click OK to add the agent(s), or Cancel to return to the Flash Markets dialog.

6. Click Done to return to the Position sub-tab.

To edit a flash agent on a representative:

1. On the "Reps" tab, highlight the representative being changed.

2. On the Position sub-tab, highlight the position being changed and click Flash. This button only displays for positions paid from the Sales Flash.

3. On the Flash Markets dialog, highlight the market being changed. The commission management system displays the existing agent(s) for that market.

4. Highlight the agent being changed, and click Edit by the Agents window.

5. Enter the updated information for the agent. The commission management system prevents the user from changing "key" data.

6. Click OK to process the update, or Cancel to return to the Flash Markets dialog. The commission management system does not allow the user to make changes to a record effective in a "frozen" month (e.g., a month for which payroll has been submitted).

7. Click Done to return to the Position sub-tab.

To remove a flash agent from a representative:

1. On the "Reps" tab, highlight the representative being changed.

2. On the Position sub-tab, highlight the position being changed and click Flash. This button only displays for positions paid from the Sales Flash.

3. On the Flash Markets dialog, highlight the market being changed. The commission management system displays the existing agent(s) for that market.

4. Highlight the agent being removed, and click Remove by the Agents window. In one embodiment, this function physically deletes the record.

5. The commission management system displays a confirmation window. Click Yes to remove the agent, or No to return to the Flash Markets dialog. The commission management system does not allow the user to remove a record effective in a "frozen" month (e.g., a month for which payroll has been submitted).

6. Click Done to return to the Position sub-tab.

To expire a flash agent from a representative:

1. On the "Reps" tab, highlight the representative being changed.

2. On the Position sub-tab, highlight the position being changed and click Flash. This button only displays for positions paid from the Sales Flash.

3. On the Flash Markets dialog, highlight the market being changed. The commission management system displays the existing agent(s) for that market.

4. Highlight the agent being expired, and click Expire by the Agents window.

5. On the Expire dialog, enter the Expiration Date.

6. Click OK to expire the agent, or Cancel to return to the Flash Markets dialog.

7. Click Done to return to the Position sub-tab.

To add a store to a manager's roll-up:

1. On the "Reps" tab, highlight the representative being changed.

2. On the Position sub-tab, highlight the position being changed and click Edit.

3. On the Rep Manager Position dialog, click Add by the Stores window.

4. Select the store being added to the manager's roll-up, and enter the Effective date and the Expiration date (if applicable).

5. Click OK to add the store, or Cancel to abort the process.

To edit a store on a manager's roll-up:

1. On the "Reps" tab, highlight the representative being changed.

2. On the Position sub-tab, highlight the position being changed and click Edit.

3. On the Rep Manager Position dialog, highlight the store being changed and click Edit by the Stores window.

4. Enter the updated information for the store. The commission management system prevents the user from changing "key" data.

5. Click OK to process the update, or Cancel to abort the process. The commission management system does not allow the user to make changes to a record effective in a "frozen" month (e.g., a month for which payroll has been submitted).

To remove a store from a manager's roll-up:

1. On the "Reps" tab, highlight the representative being changed.

2. On the Position sub-tab, highlight the position being changed and click Edit.

3. On the Rep Manager Position dialog, highlight the store being removed and click Remove by the Stores window. In one embodiment, this function physically deletes the record.

4. The commission management system displays a confirmation window. Click Yes to remove the store, or No to abort the process. The commission management system does not allow the user to remove a record effective in a "frozen" month (e.g., a month for which payroll has been submitted).

To expire a store from a manager's roll-up:
1. On the "Reps" tab, highlight the representative being changed.
2. On the Position sub-tab, highlight the position being changed and click Edit.
3. On the Rep Manager Position dialog, highlight the store being expired and click Edit by the Stores window.
4. Enter the Expiration date.
5. Click OK to process the update, or Cancel to abort the process. The commission management system does not allow the user to make changes to a record effective in a "frozen" month (e.g., a month for which payroll has been submitted).

To add a new manager to a representative:
1. On the "Reps" tab, highlight the representative being changed.
2. On the Manager sub-tab, highlight the representative's old manager and click Expire.
3. On the Expire dialog, enter the Expiration Date. Click the Create new record box, if appropriate.
4. Click OK to expire the representative's old manager, or Cancel to abort the process.
5. On the Manager sub-tab, click Add.
6. On the Add Rep Manager dialog, select the representative's new manager. Click OK to confirm the selection, or Cancel to return to the Manager sub-tab.
7. Enter the Effective date for this manager, and the Expiration date (if applicable). Click OK to add the record, or Cancel to abort the process.

To edit a representative's manager data:
1. On the "Reps" tab, highlight the representative being changed.
2. On the Manager sub-tab, highlight the manager being changed and click Edit.
3. Enter the updated information for the representative's manager. The commission management system prevents the user from changing "key" data.
4. Click OK to process the update, or Cancel to abort the process. The commission management system does not allow the user to make changes to a record effective in a "frozen" month (e.g., a month for which payroll has been submitted).

To remove a representative's manager:
1. On the "Reps" tab, highlight the representative being changed.
2. On the Manager sub-tab, highlight the manager being removed and click Remove. In one embodiment, this function physically deletes the record.
3. The commission management system displays a confirmation window. Click Yes to remove the manager, or No to abort the process. The commission management system does not allow the user to remove a record effective in a "frozen" month (e.g., a month for which payroll has been submitted).

To expire a representative's manager:
1. On the "Reps" tab, highlight the representative being changed.
2. On the Manager sub-tab, highlight the manager being expired and click Expire.
3. On the Expire dialog, enter the Expiration Date. Click the Create new record box, if appropriate.
4. Click OK to expire the representative's old manager, or Cancel to abort the process.

To add a new wireless application specialist to a representative:
1. On the "Reps" tab, highlight the representative being changed.
2. On the WAS sub-tab, highlight the representative's old wireless application specialist and click Expire.
3. On the Expire dialog, enter the Expiration Date. Click the Create new record box, if appropriate.
4. Click OK to expire the representative's old WAS, or Cancel to abort the process.
5. On the WAS sub-tab, click Add.
6. On the Add Rep WAS dialog, select the representative's new wireless application specialist. Click OK to confirm the selection, or Cancel to return to the WAS sub-tab.
7. Enter the Effective date for this WAS, and the Expiration date (if applicable). Click OK to add the record, or Cancel to abort the process.

To edit a representative's wireless application specialist data:
1. On the "Reps" tab, highlight the representative being changed.
2. On the WAS sub-tab, highlight the WAS being changed and click Edit.
3. Enter the updated information for the representative's WAS. The commission management system prevents the user from changing "key" data.
4. Click OK to process the update, or Cancel to abort the process. The commission management system does not allow the user to make changes to a record effective in a "frozen" month (e.g., a month for which payroll has been submitted).

To remove a representative's wireless application specialist:
1. On the "Reps" tab, highlight the representative being changed.
2. On the WAS sub-tab, highlight the WAS being removed and click Remove. In one embodiment, this function physically deletes the record.
3. The commission management system displays a confirmation window. Click Yes to remove the WAS, or No to abort the process. The commission management system does not allow the user to remove a record effective in a "frozen" month (e.g., a month for which payroll has been submitted).

To expire a representative's wireless application specialist:
1. On the "Reps" tab, highlight the representative being changed.
2. On the WAS sub-tab, highlight the WAS being expired and click Expire.
3. On the Expire dialog, enter the Expiration Date. Click the Create new record box, if appropriate.
4. Click OK to expire the WAS, or Cancel to abort the process.

To add a new interactive paging service rep to a representative:
1. On the "Reps" tab, highlight the representative being changed.
2. On the IPR sub-tab, highlight the representative's old, interactive paging service rep and click Expire.
3. On the Expire dialog, enter the Expiration Date. Click the Create new record box, if appropriate.
4. Click OK to expire the representative's old IPR, or Cancel to abort the process.
5. On the IPR sub-tab, click Add.
6. On the Add Rep IPR dialog, select the representative's new interactive paging service rep. Click OK to confirm the selection, or Cancel to return to the IPR sub-tab.
7. Enter the Effective date for this IPR, and the Expiration date (if applicable). Click OK to add the record, or Cancel to abort the process.

To edit a representative's interactive paging service rep data:
1. On the "Reps" tab, highlight the representative being changed.
2. On the IPR sub-tab, highlight the IPR being changed and click Edit.
3. Enter the updated information for the representative's IPR. The commission management system prevents the user from changing "key" data.
4. Click OK to process the update, or Cancel to abort the process. The commission management system does not allow the user to make changes to a record effective in a "frozen" month (e.g., a month for which payroll has been submitted).

To remove a representative's interactive paging service representative:
1. On the "Reps" tab, highlight the representative being changed.
2. On the IPR sub-tab, highlight the IPR being removed and click Remove. In one embodiment, this function physically deletes the record.
3. The commission management system displays a confirmation window. Click Yes to remove the IPR, or No to abort the process. The commission management system does not allow the user to remove a record effective in a "frozen" month (e.g., a month for which payroll has been submitted).

To expire a representative's interactive paging service representative:
1. On the "Reps" tab, highlight the representative being changed.
2. On the IPR sub-tab, highlight the IPR being expired and click Expire.
3. On the Expire dialog, enter the Expiration Date. Click the Create new record box, if appropriate.
4. Click OK to expire the IPR, or Cancel to abort the process.

To add a new alias ID to a representative:
1. On the "Reps" tab, highlight the representative being changed.
2. On the Alias Enos sub-tab, highlight the representative's old alias and click Expire.
3. On the Expire dialog, enter the Expiration Date. Click the Create new record box, if appropriate.
4. Click OK to expire the representative's old alias, or Cancel to abort the process.
5. On the Alias Enos sub-tab, click Add.
6. Enter the representative's new Code/Eno, and select the Store this alias is tied to. Enter the Effective date for this alias, and the Expiration date (if applicable). Click OK to add the record, or Cancel to abort the process.

To edit a representative's alias ID data:
1. On the "Reps" tab, highlight the representative being changed.
2. On the Alias Enos sub-tab, highlight the alias being changed and click Edit.
3. Enter the updated information for the representative's alias. The commission management system prevents the user from changing "key" data.
4. Click OK to process the update, or Cancel to abort the process. The commission management system does not allow the user to make changes to a record effective in a "frozen" month (e.g., a month for which payroll has been submitted).

To remove a representative's alias ID:
1. On the "Reps" tab, highlight the representative being changed.
2. On the Alias Enos sub-tab, highlight the alias being removed and click Remove. In one embodiment, this function physically deletes the record.
3. The commission management system displays a confirmation window. Click Yes to remove the alias, or No to abort the process. The commission management system does not allow the user to remove a record effective in a "frozen" month (e.g., a month for which payroll has been submitted).

To expire a representative's alias ID:
1. On the "Reps" tab, highlight the representative being changed.
2. On the Alias Enos sub-tab, highlight the alias being expired and click Expire.
3. On the Expire dialog, enter the Expiration Date. Click the Create new record box, if appropriate.
4. Click OK to expire the alias, or Cancel to abort the process.

To add a new inventory ID to a representative:
1. On the "Reps" tab, highlight the representative being changed.
2. On the Inv IDs sub-tab, highlight the representative's old inventory ID and click Expire.
3. On the Expire dialog, enter the Expiration Date. Click the Create new record box, if appropriate.
4. Click OK to expire the representative's old inventory ID, or Cancel to abort the process.
5. On the Inv IDs sub-tab, click Add.
6. Enter the representative's new inventory ID, and select the Store this ID is tied to. Enter the Effective date for this ID, and the Expiration date (if applicable). Click OK to add the record, or Cancel to abort the process.

To edit a representative's inventory ID data:
1. On the "Reps" tab, highlight the representative being changed.
2. On the Inv IDs sub-tab, highlight the inventory ID being changed and click Edit.
3. Enter the updated information for the representative's inventory ID. The commission management system prevents the user from changing "key" data.
4. Click OK to process the update, or Cancel to abort the process. The commission management system does not allow the user to make changes to a record effective in a "frozen" month (e.g., a month for which payroll has been submitted).

To remove a representative's inventory ID:
1. On the "Reps" tab, highlight the representative being changed.
2. On the Inv IDs sub-tab, highlight the inventory ID being removed and click Remove. In one embodiment, this function physically deletes the record. The commission management system displays a confirmation window. Click Yes to remove the inventory ID, or No to abort the process. The commission management system does not allow the user to remove a record effective in a "frozen" month (e.g., a month for which payroll has been submitted).

To expire a representative's inventory ID:
1. On the "Reps" tab, highlight the representative being changed.
2. On the Inv IDs sub-tab, highlight the inventory ID being expired and click Expire.
3. On the Expire dialog, enter the Expiration Date. Click the Create new record box, if appropriate.
4. Click OK to expire the inventory ID, or Cancel to abort the process.

To add a new "other" record to a representative:
1. On the "Reps" tab, highlight the representative being changed.
2. On the Other sub-tab, highlight the representative's old record and click Expire.
3. On the Expire dialog, enter the Expiration Date. Click the Create new record box, if appropriate.

4. Click OK to expire the representative's old "other" record, or Cancel to abort the process.

5. On the Other sub-tab, click Add.

6. Enter the representative's new Specialist, and select the Bus. Unit, Office, Team and/or Store this record is tied to. Enter the Effective date for this record, and the Expiration date (if applicable). Click OK to add the record, or Cancel to abort the process.

To edit a representative's "other" data:

1. On the "Reps" tab, highlight the representative being changed.

2. On the Other sub-tab, highlight the record being changed and click Edit.

3. Enter the updated information for the representative's "other" record. The commission management system prevents the user from changing "key" data.

4. Click OK to process the update, or Cancel to abort the process.

5. The commission management system does not allow the user to make changes to a record effective in a "frozen" month (e.g., a month for which payroll has been submitted).

To remove a representative's "other" record:

1. On the "Reps" tab, highlight the representative being changed.

2. On the Other sub-tab, highlight the record being removed and click Remove. In one embodiment, this function physically deletes the record.

3. The commission management system displays a confirmation window. Click Yes to remove the record, or No to abort the process. The commission management system does not allow the user to remove a record effective in a "frozen" month (e.g., a month for which payroll has been submitted).

To expire a representative's "other" record:

1. On the "Reps" tab, highlight the representative being changed.

2. On the Other sub-tab, highlight the record being expired and click Expire.

3. On the Expire dialog, enter the Expiration Date. Click the Create new record box, if appropriate.

4. Click OK to expire the record, or Cancel to abort the process.

Further, for adding, editing, removing, and expiring records with respect to tables that define and direct the commission management system processing for various Stores, a user can use the following procedures.

To add a new store:

1. On the Stores tab, click Add.

2. Enter the store's Name, Description and Rev. Bus. Unit, and select the Store Channel and Alpha Ranking from the drop-down boxes. Enter the Effective date and the Expiration date (if applicable).

3. Click OK to add the store, or Cancel to abort the process.

To edit a store:

1. On the Stores tab, highlight the store being changed.

2. Click Edit.

3. Enter the updated information for the store. The commission management system prevents the user from changing "key" data.

4. Click OK to process the update, or Cancel to abort the process. The commission management system does not allow the user to make changes to a record effective in a "frozen" month (e.g., a month for which payroll has been submitted).

To remove a store:

1. On the Stores tab, highlight the store being removed.

2. Click Remove. In one embodiment, this function physically deletes the record.

3. The commission management system displays a confirmation window. Click Yes to remove the store, or No to abort the process. The commission management system does not allow the user to remove a record effective in a "frozen" month (e.g., a month for which payroll has been submitted).

To expire a store:

1. On the Stores tab, highlight the store being expired.

2. Click Expire.

3. On the Expire dialog, enter the Expiration Date and click the Create new record box, if appropriate.

4. Click OK to expire the store, or Cancel to abort the process.

To add or change a store's quota:

1. On the Stores tab, highlight the store being changed.

2. Click Values.

3. On the Store Values dialog, click on the appropriate component sub-tab, and highlight the month being changed. Enter the updated quota for the store.

4. Click OK to process the update, or Cancel to abort the process. The commission management system does not allow the user to make changes to a "frozen" month (e.g., a month for which payroll has been submitted).

Finally, for adding, editing, removing, and expiring records with respect to tables that define and direct the commission management system processing for various Teams, a user can use the following procedures.

To add a new team:

1. On the Teams tab, click Add.

2. Enter the team's Name and Description. (The Position is no longer used . . . . Leave it blank.) Enter the Effective date and the Expiration date (if applicable).

3. Click OK to add the team, or Cancel to abort the process.

To edit a team:

1. On the Teams tab, highlight the team being changed.

2. Click Edit.

3. Enter the updated information for the team. The commission management system prevents the user from changing "key" data.

4. Click OK to process the update, or Cancel to abort the process. The commission management system does not allow the user to make changes to a record effective in a "frozen" month (e.g., a month for which payroll has been submitted).

To remove a team:

1. On the Teams tab, highlight the team being removed.

2. Click Remove. In one embodiment, this function physically deletes the record.

3. The commission management system displays a confirmation window. Click Yes to remove the team, or No to abort the process. The commission management system does not allow the user to remove a record effective in a "frozen" month (e.g., a month for which payroll has been submitted).

To expire a team:

1. On the Teams tab, highlight the team being expired.

2. Click Expire.

3. On the Expire dialog, enter the Expiration Date and click the Create new record box, if appropriate.

4. Click OK to expire the team, or Cancel to abort the process.

To add or change a team's quota:

1. On the Teams tab, highlight the team being changed.

2. Click Values.

3. On the Team Values dialog, click on the appropriate component sub-tab, and highlight the month being changed. Enter the updated quota for the team.

4. Click OK to process the update, or Cancel to abort the process. The commission management system does not allow the user to make changes to a "frozen" month (e.g., a month for which payroll has been submitted).

Agent Module

One embodiment of the present invention will now be discussed with respect to the Agent Module screen descriptions and procedures. There twelve different tab options provided within the commission management system Agent Module, separate tabs are provided to process different types of data. The separate tabs are as follows:

1. "Agents"—Defines detailed information for each agent.
2. "Contracts"—Defines detailed information for each commissions contract (or agreement) between an agent and the company.
3. "Residuals"—Defines detailed information for each residual contract (or agreement) between an agent and the company.
4. "SPIFs"—Defines detailed information for all Special Promotional Incentive Features for an agent.
5. "Commission"—Displays detailed sales transactions for the month, and allows users to make manual adjustments and re-calculate on demand.
6. "Invoice"—Displays commission and residual invoice information online.
7. "Accounts"—Defines all account codes and their associated accounting data for an agent.
8. "Sub Markets"—Defines all submarkets for the market and identifies the service area/line range combinations for each, and the business unit for an agent.
9. "Service Area/Line Range"—Displays all service area/line range combinations for the market.
10. "Billing Codes"—Lists all billing transaction codes, and identifies those considered commissionable.
11. "Cycles"—Displays the commission, residual and average revenue processing cycles for the market.
12. "Explore"—Provides a search tool that displays detailed information about all transactions associated with a particular mobile number.

Figure 53:
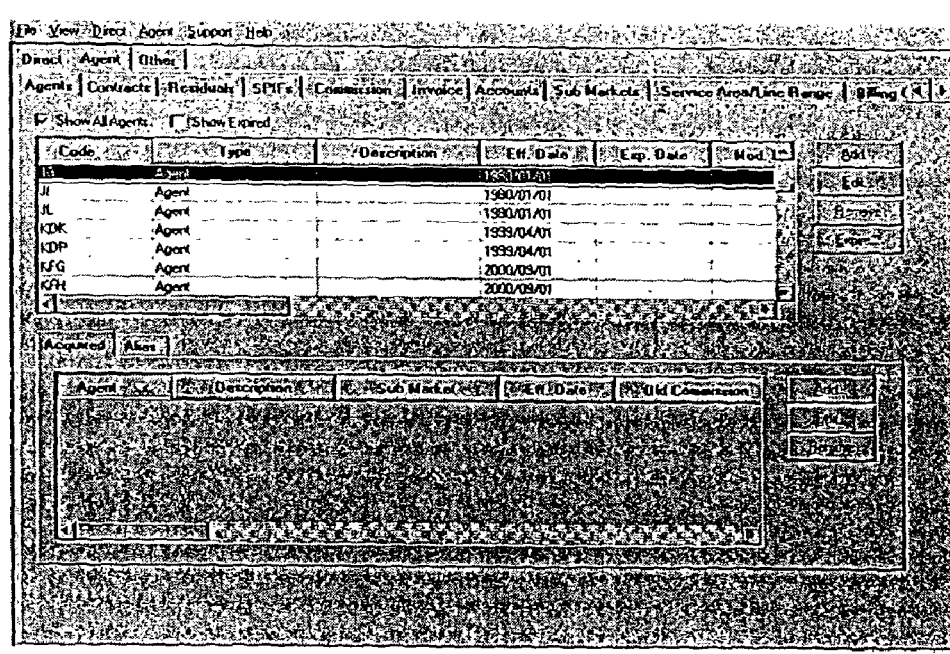
FIGS. 53 through 56 illustrate various example screens associated with a portion of a software module feature according to one embodiment of the present invention.

FIGS. 53 through 56 illustrate various example screens associated with the "Agents" tab portion of the commission management system's Agent Module feature. It is to be understood that such example screens are provided for illustrative purposes only and, therefore, the present invention should not be limited thereby. Turning now to FIG. 53, one embodiment of one example of an "Agents" tab screen 630 is illustrated. The "Agents" tab and its sub-tabs define detailed information for each agent. Note that each sub-tab displays a historical view of all associated records for the highlighted agent along with the dates each was in effect. Initially, this tab lists those active agents in the specified location for which the user is identified as the Commission Specialist. In use, the user Clicks Show All Agents to list all agents in the specified location, regardless of Commission Specialist and Clicks Show Expired to list only expired agents in the specified location.

Figure 54:
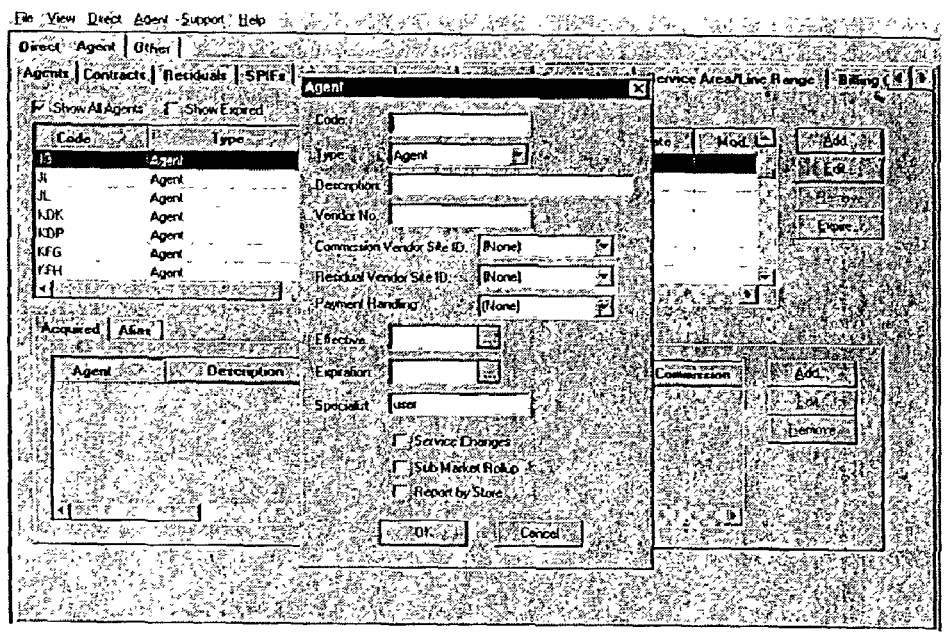

FIG. 54 illustrates one embodiment of one example of an "Agent" dialog screen 640 that defines general information about each agent in the commission management system. The field definitions for the "Agent" dialog screen 640 are:

1. "Code"—Enter the agent code.
2. "Type"—Use the drop-down list to select the agent type (Agent vs. National Retailer).
3. "Description"—Enter a description of the agent.
4. "Vendor No"—Enter the agent's main vendor number from Oracle.
5. "Commission Vendor Site ID"—Use the drop-down list to select the agent's vendor site ID for commissions. This identifies the address to which commissions checks will be sent.
6. "Residual Vendor Site ID"—Use the drop-down list to select the agent's vendor site ID for residuals. This identifies the address to which residuals checks will be sent.
7. "Payment Handling"—Use the drop-down list to select the method for handling the agent's payments through Oracle.
8. "Effective"—Use the calendar to select the date the agent is effective in the commission management system.
9. "Expiration"—Use the calendar to select the date the agent is expired from the commission management system.
10. "Specialist"—Enter the username of the agent's Commission Specialist. This defaults to the current user's username. All agents with the user as their active specialist will appear in the agent list.
11. "Service Changes"—Click to indicate whether or not the agent should be paid on service changes. This option is not currently supported.
12. "Sub Market Rollup"—Click to indicate whether or not activity from all submarkets should roll together for the agent.
13. "Report by Store"—Click to indicate whether or not the agent's activity should be reported separately by store.

Figure 55:
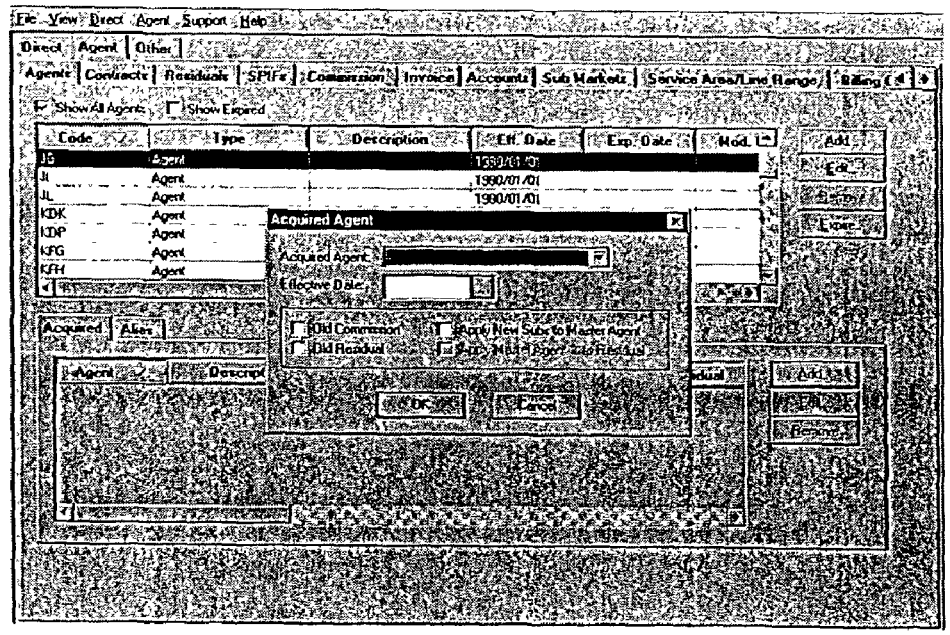

FIG. 55 illustrates one embodiment of one example of an "Acquired Agent" dialog screen 650 that defines general information about each agent in the commission management system. The "Acquired Agent" dialog screen 650 identifies any agents that have been acquired by the selected agent. Note that the acquired agent must already be set up in the "main" agent list. The field definitions for the "Acquired Agent" dialog screen 650 are:

1. "Acquired Agent"—Use the drop-down list to select each agent acquired by the agent.
2. "Effective Date"—Use the calendar to select the date the acquisition is effective.
3. "Old Commission"—Click to indicate whether or not the acquired agent's new activations should be combined with the "master" agent's to determine the commission tier to be paid.
4. "Apply New Subs to Master Agent"—Click to indicate whether or not the acquired agent's new activations should be applied in calculating the "master" agent's residual quota attainment.
5. "Old Residual"—Click to indicate that the acquired agent's residuals should be calculated based on its own residual contracts, quota, etc.
6. "Apply Master Agent to % to Residual"—Click to indicate whether or not the "master" agent's residual quota percent should be applied to the acquired agent's residual calculation. This option is only valid if Old Residual is checked.

Figure 56:
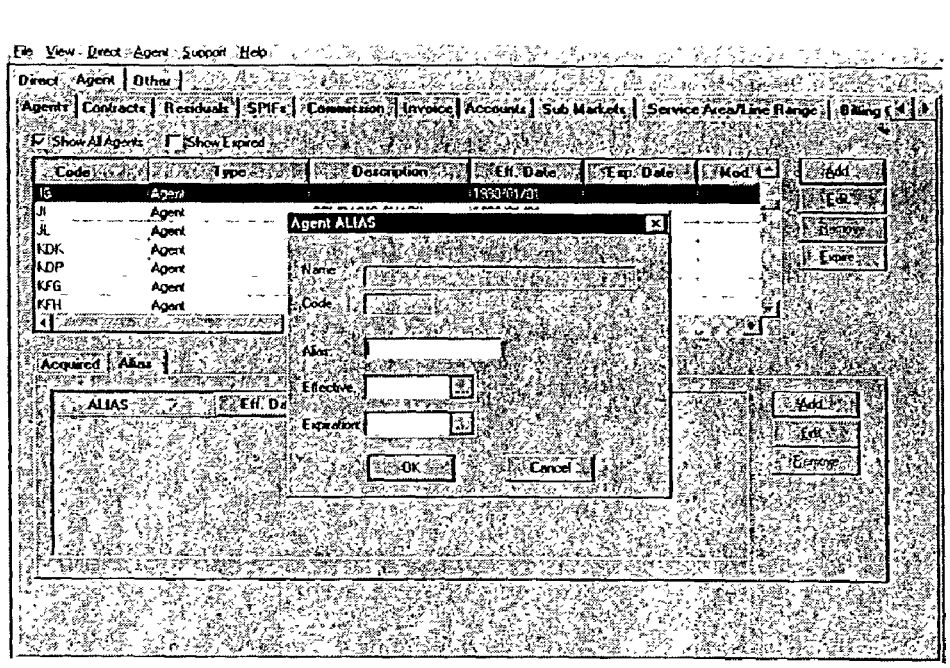

FIG. 56 illustrates one embodiment of one example of an "Agent ALIAS" dialog screen 660 that defines general information about each agent in the commission management system. The "Agent ALIAS" dialog screen 660 that defines the alias ID used by an agent for affiliate sales. The field definitions for the "Agent ALIAS" dialog screen 660 are:

1. "Name"—The selected agent's description.
2. "Code"—The selected agent's code.
3. "Alias"—Enter the alias ID used by the agent for affiliate sales.
4. "Effective"—Use the calendar to select the date the agents begins using this ID.
5. "Expiration"—Use the calendar to select the date the agent no longer uses this ID.

Figure 57:
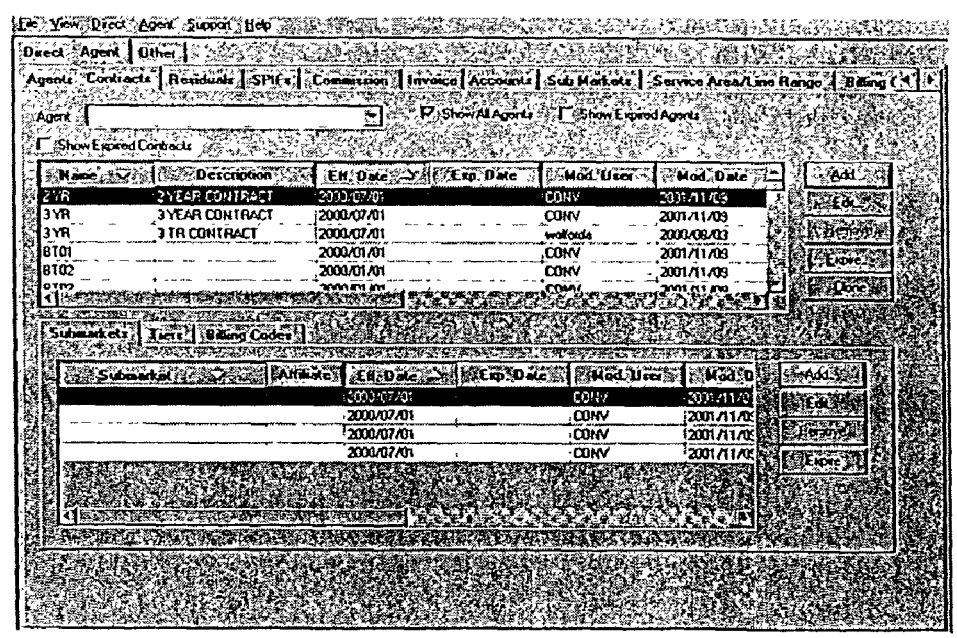
FIGS. 57 through 63 illustrate various example screens associated with a portion of a software module feature according to one embodiment of the present invention.

FIGS. 57 through 63 illustrate various example screens associated with the "Contracts" tab portion of the commission management system's Agent Module feature. It is to be understood that such example screens are provided for illustrative purposes only and, therefore, the present invention should not be limited thereby. Turning now to FIG. 57, one embodiment of one example of a "Contracts" tab screen 670 is illustrated. The "Contracts" tab and its sub-tabs define the commission contracts in effect for each agent, including the billing codes that are part of each and the payment tiers for each. Note that all information is date-sensitive. In use the user uses the Agent drop-down list to select the agent code. Initially, this tab lists active contracts for the specified agent. The use can click Show Expired Contracts to list only expired contracts for this agent.

Figure 58:
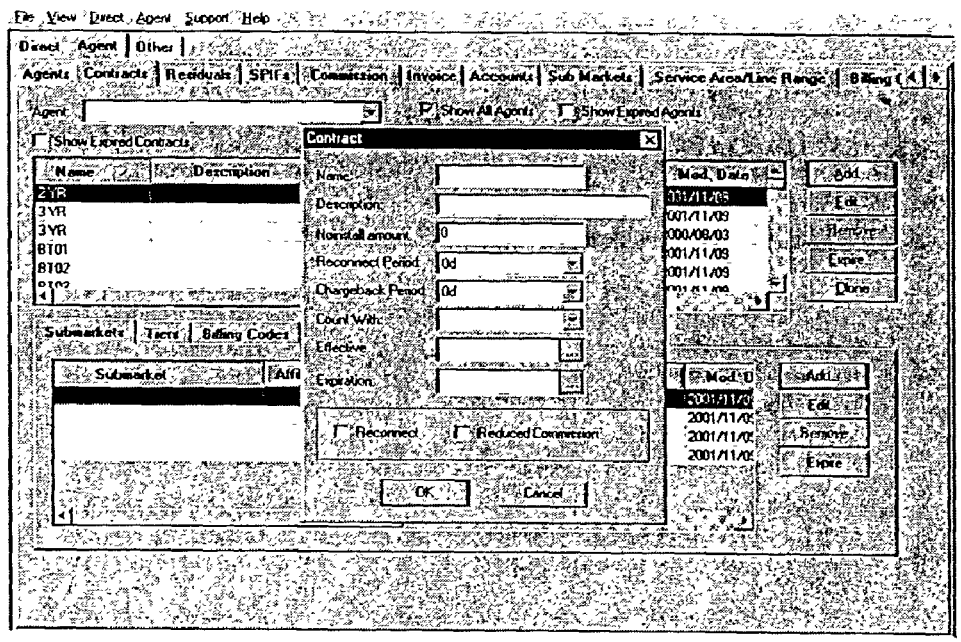

FIG. 58 illustrates one embodiment of one example of a "Contract" dialog screen 680 that defines each commission contract for the selected agent. The field definitions for the "Contract" dialog screen 680 are:

1. "Name"—Enter the name of the contract.
2. "Description"—Enter a description of the contract.
3. "Noinstall Amount"—Enter the amount to be charged back on no-installs.
4. "Reconnect Period"—Use the drop-down list to select the reconnect period. This is the amount of time after a vested number disconnects before the agent is eligible for payment for a reconnect under this contract.
5. "Chargeback Period"—Use the drop-down list to select the chargeback period. This is the amount of time before a number vests under this contract.
6. "Count With"—Use the drop-down list to select the contract that this one should "count with" in determining the agent's commission tier.
7. "Effective"—Use the calendar to select the date the contract is effective in the commission management system.
8. "Expiration"—Use the calendar to select the date the contract is expired from the commission management system.
9. "Reconnect"—Click to indicate whether or not the agent is paid for reconnects under this contract.
10. "Reduced Commission"—Click to indicate whether or not this is a "reduced commission" contract. This option is not currently supported.

Figure 59:
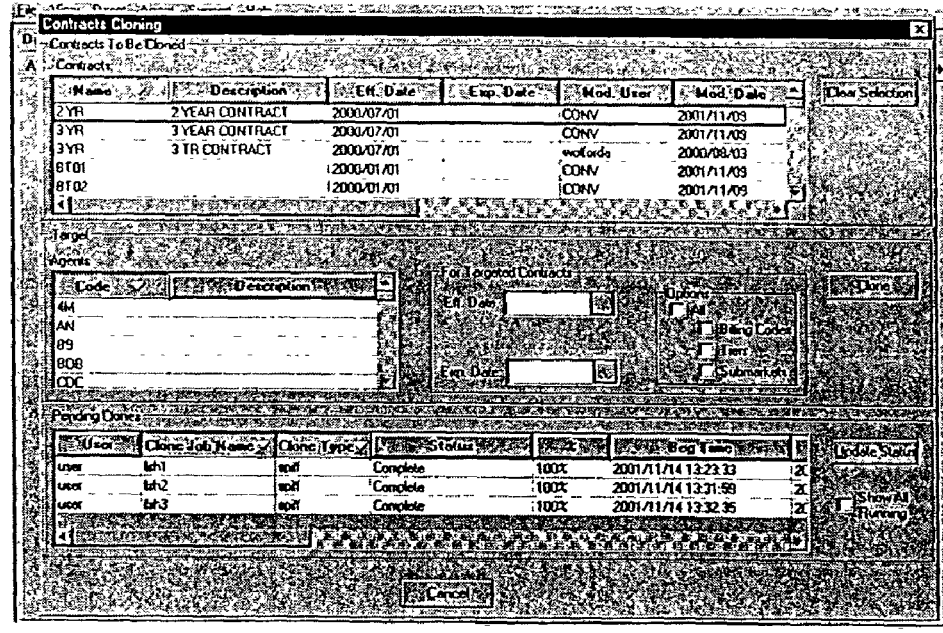

FIG. 59 illustrates one embodiment of one example of a "Contracts Cloning" dialog screen 690 that is accessed by clicking the Clone function button on the Contracts tab. This function copies contract data from the "source" to a "target." The specified contract cannot already exist for the target agent. The field definitions for the "Contracts Cloning" dialog screen 690 are:

1. "Contracts To Be Cloned"—The commission management system lists all contracts defined in the system for the selected agent. Highlight a line to select the contract(s) to be cloned from this list. Use the Ctrl
key to select multiple contracts; use the Shift key to select a block of contracts. Click on the Clear Selection button to clear the selections and start over.

| Name | The contract name. |
| --- | --- |
| Description | The contract description. |
| Eff. Date | The contract effective date. |
| Exp. Date | The contract expiration date. |
| Mod. User | The last user to modify the contract. |
| Mod. Date | The last date the contract was modified. |

2. "Target Agents"—Highlight the target agent(s) to which the "source" contract(s) should be copied. Use the Ctrl key to select multiple agents; use the Shift key to select a block of agents.
3. "For Targeted Contracts"

| Eff. Date | Use the calendar to select the date the contract is effective for the target agent. |
| --- | --- |
| Exp. Date | Use the calendar to select the date the contract expires for the target agent. |
| Options | Click the appropriate box to indicate what to copy: All copies all aspects of the "source" contract. Billing Codes copies only contract billing codes. Tiers copies only contract tiers. Submarkets copies only contract submarkets. |

4. "Clone"—Click this function key to begin the cloning process. The user will be asked to assign a name to this clone job for tracking purposes.
5. "Pending Clones"—Allows the user to track the progress of clone jobs. Click the Update Status function button to refresh the display.

| User | The username of the specialist initiating the clone job. |
| --- | --- |
| Clone Job Name | The name assigned to the clone job. |
| Clone Type | The type of clone job. |
| Status | The status of the clone job. |
| % | The percent complete. |
| Beg Time | The beginning time. |
| End Time | The ending time. |
| Show All Running | Click to show all clone jobs for all usernames. |

Figure 60:
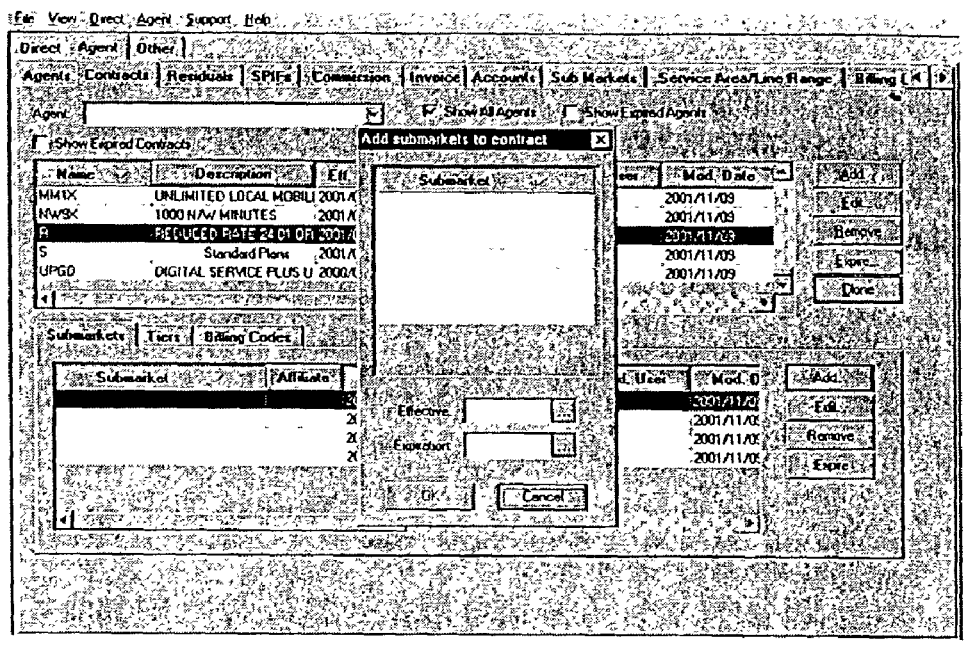

FIG. 60 illustrates one embodiment of one example of an "Add submarket to contract" dialog screen 700 that defines the submarket(s) in which each commission contract applies. Note that, in order to edit against duplicate billing codes, it is very important to define a new contract's submarkets before assigning any billing codes to that contract. The field definitions for the "Add submarket to contract" dialog screen 700 are:

1. "Submarket"—the commission management system lists all submarkets in the specified location. Highlight a line to select the submarket(s) to which this contract applies. Use the Ctrl key to select multiple submarkets; use the Shift key to select a block of submarkets.
2. "Effective"—Use the calendar to select the date the submarkets are effective for this contract.
3. "Expiration"—Use the calendar to select the date the submarkets expire from this contract.

Figure 61:
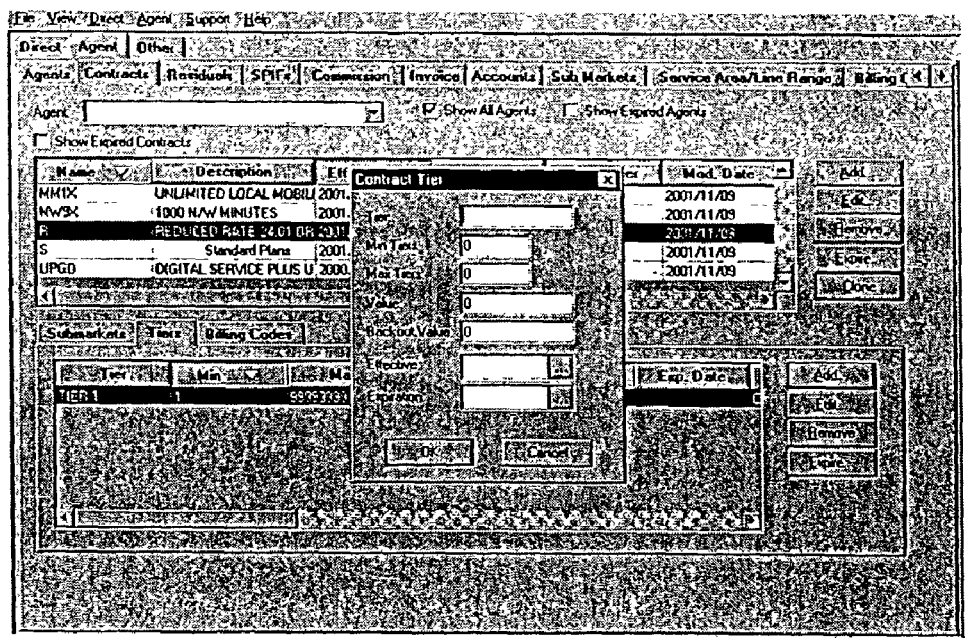

FIG. 61 illustrates one embodiment of one example of a "Contract Tier" dialog screen 710 that defines the commission payment tiers for each contract. The field definitions for the "Contract Tier" dialog screen 710 are:

1. "Tier"—Enter the tier name.
2. "Min Tier"—Enter the minimum customer count for this tier.
3. "Max Tiers"—Enter the maximum customer count for this tier.
4. "Value"—Enter the value to be paid on this tier.
5. "Backout Value"—Enter the value to be charged back on this tier.
6. "Effective"—Use the calendar to select the date this tier is effective.
7. "Expiration"—Use the calendar to select the date this tier expires.

Figure 62:
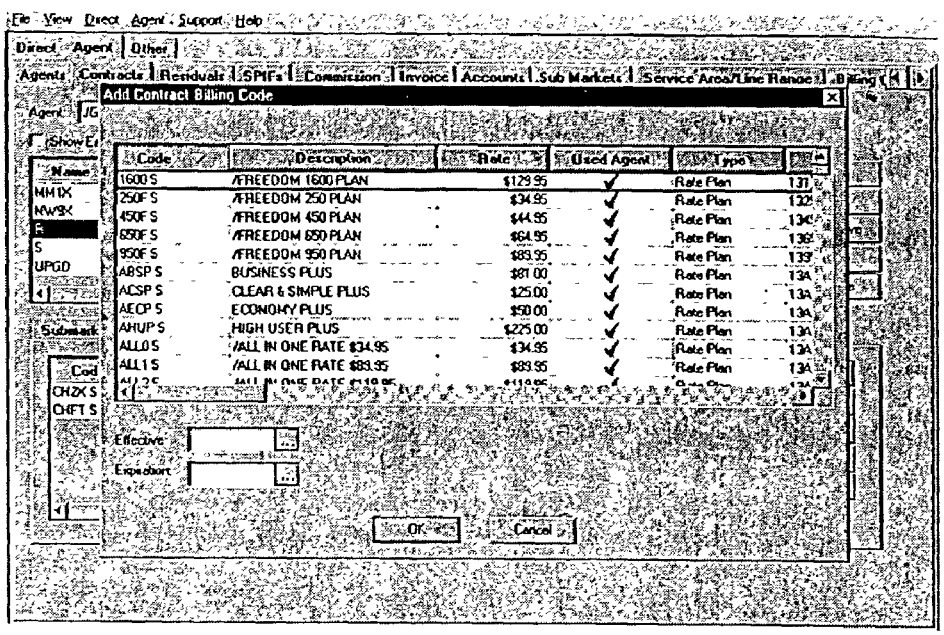

FIG. 62 illustrates one embodiment of one example of an "Add Contract Billing Code" dialog screen 720 that defines all billing codes that contribute to the selected contract. The field definitions for the "Add Contract Billing Code" dialog screen 720 are:

1. "Billing Codes"—The commission management system lists all commissionable billing codes in the specified location. Highlight a line to select the appropriate billing code(s) from this list. Use the Ctrl key to select multiple billing codes; use the Shift key to select a block of billing codes.

| | |
|---|---|
| Code | The billing code. |
| Description | The billing code description. |
| Rate | The rate charged for the billing code. |
| Used | The "used" flag set for either Agent or National Retailer, depending on the type of agent. |
| Type | The billing code type. |
| Internal Code | The internal billing code. |
| Eff. Date | The billing code effective date. |
| Exp. Date | The billing code expiration date. |

2. "Effective"—Use the calendar to select the date the billing code becomes part of this contract.

3. "Expiration"—Use the calendar to select the date the billing code is no longer part of this contract.

Figure 63:
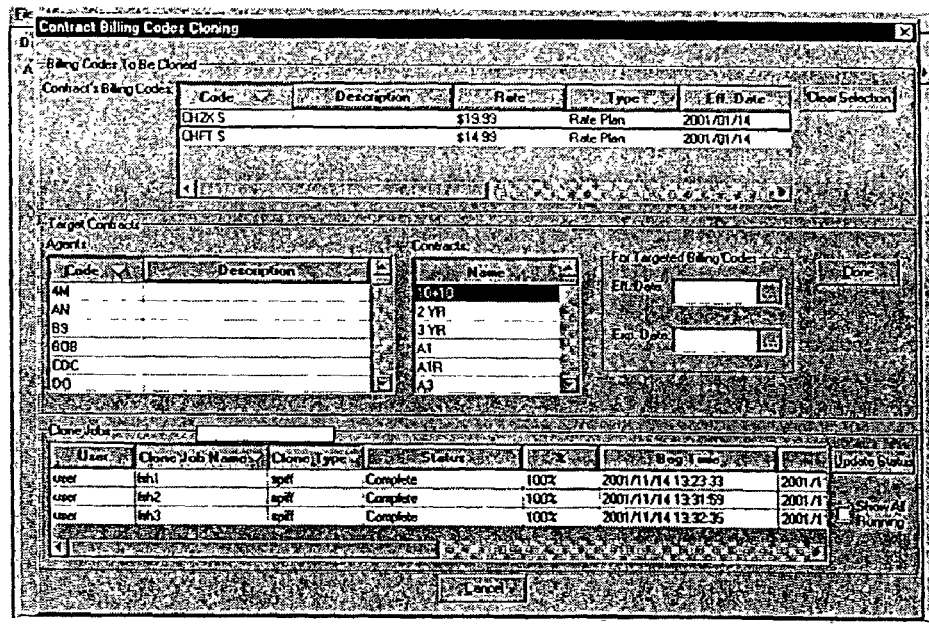

FIG. 63 illustrates one embodiment of one example of a "Contract Billing Codes Cloning" dialog screen 730 that is accessed by clicking the Clone function button on the Billing Codes sub-tab. This function copies contract billing code data from the "source" to a "target." The target agent/contract must already exist. The field definitions for the "Contract Billing Codes Cloning" dialog screen 730 are:

1. "Billing Codes To Be Cloned"—The commission management system lists all billing codes defined in the system for the selected contract. Highlight a line to select the billing code(s) to be cloned from this list. Use the Ctrl key to select multiple codes; use the Shift key to select a block of codes. Click on the Clear Selection button to clear the selections and start over.

Contract's Billing Codes:

| | |
|---|---|
| Code | The billing code. |
| Description | The billing code description. |
| Rate | The billing code rate. |
| Type | The billing code type. |
| Eff. Date | The billing code effective date. |
| Exp. Date | The billing code expiration date. |

2. "Target Contracts"—Select the agent(s)/contract(s) to which the "source" billing code(s) should be copied.

| | |
|---|---|
| Agents | Highlight the target agent(s). Use the Ctrl key to select multiple agents; use the Shift key to select a block of agents. |
| Contracts | Highlight the target contract(s). Use the Ctrl key to select multiple contracts; use the Shift key to select a block of contracts. |

3. "For Targeted Billing Codes"

| | |
|---|---|
| Eff. Date | Use the calendar to select the date the billing code is effective for the target agent/submarket/contract. |
| Exp. Date | Use the calendar to select the date the billing code expires for the target agent/submarket/contract. |

4. "Clone"—Click this function key to begin the cloning process. The user may be asked to assign a name to this clone job for tracking purposes.

5. "Clone Jobs"—Allows the user to track the progress of clone jobs. Click the Update Status function button to refresh the display.

| | |
|---|---|
| User | The username of the specialist initiating the clone job. |
| Clone Job Name | The name assigned to the clone job. |
| Clone Type | The type of clone job. |
| Status | The status of the clone job. |
| % | The percent complete. |
| Beg Time | The beginning time. |
| End Time | The ending time. |
| Show All Running | Click to show all clone jobs for all usernames. |

FIGS. 64 to 76 illustrate various example screens associated with the "Residuals" tab portion of the commission management system's Agent Module feature. It is to be understood that such example screens are provided for illustrative purposes only and, therefore the present invention should not be limited thereby. Turning now to FIG. 64, one embodiment of one example of a "Residuals" tab screen 740 is illustrated. The Residuals tab and its sub-tabs define the residual contracts in effect for each agent, as well as the residual vesting period. For agents with quotas contained in their contracts, all quota information is also defined here. The user can use the Agent drop-down list to select the agent code. Initially, this tab lists those active agents in the specified location for which the user is identified as the Commission Specialist. The user can click Show All Agents to list all agents in the specified location, regardless of Commission Specialist and click Show Expired Agents to list only expired agents in the specified location.

Figures 64, 65:
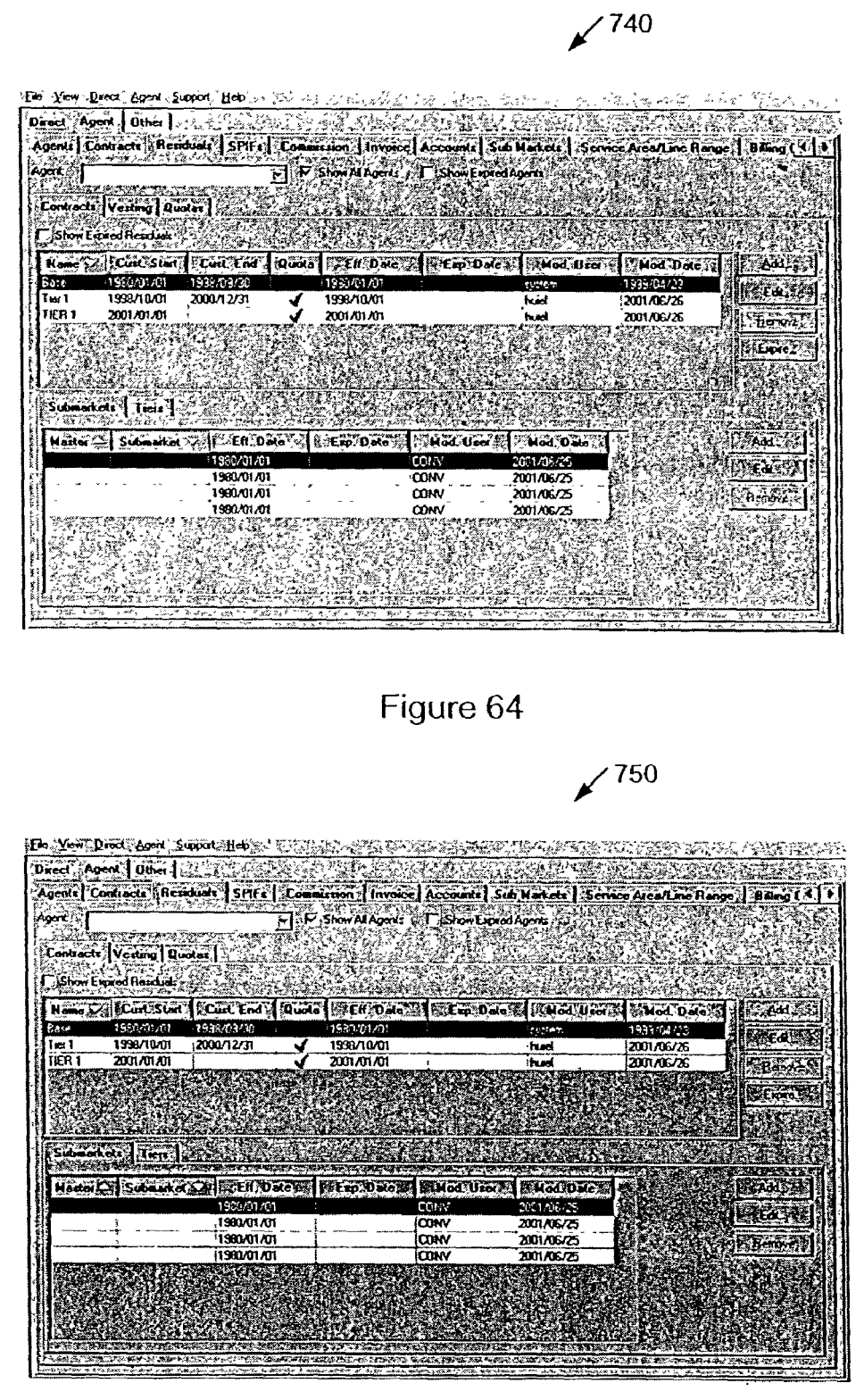

FIG. 65 illustrates one embodiment of one example of a "Residuals Contracts" sub-tab screen 750 that has its own set of sub-tabs for each contract defined: Submarkets and Tiers. Note that all information is date-sensitive. Initially, this sub-tab lists active contracts for the specified agent. The user can click Show Expired Residuals to list only expired contracts for this agent.

Figure 66:
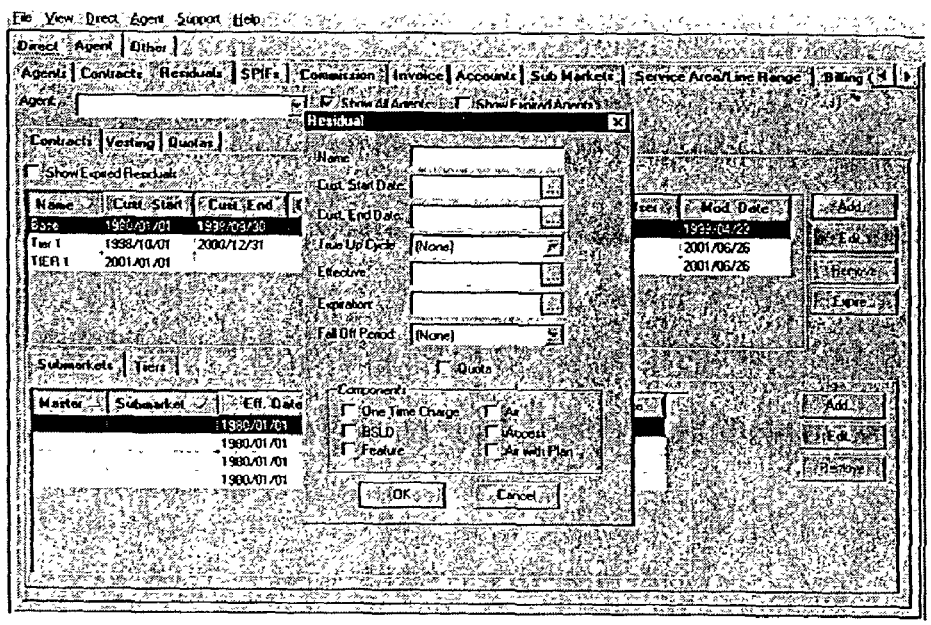

FIG. 66 illustrates one embodiment of one example of a "Residual" dialog screen 760 that defines each residual contract for the selected agent. The field definitions for the "Residual" dialog screen 760 are:

1. "Name"—Enter the name of the contract.

2. "Cust. Start Date"—Enter the customer start date (e.g., the first customer initial service date eligible for residuals).

3. "Cust. End Date"—Enter the customer end date (e.g., the last customer initial service date eligible for residuals), if appropriate.

4. "True Up Cycle"—Use the drop-down list to select the cycle for true up.

5. "Effective"—Use the calendar to select the date the contract is effective in the commission management system.

6. "Expiration"—Use the calendar to select the date the contract is expired from the commission management system.

7. "Fall Off Period"—Use the drop-down list to select the period after which customers "fall off" the residual calculation.

8. "Quota"—Click to indicate whether or not quota applies to the contract.

9. "Components"—Click the revenue component(s) for residual payment.

One Time Charge
BSLD
Feature
Air
Access
Air with Plan

Figure 67:
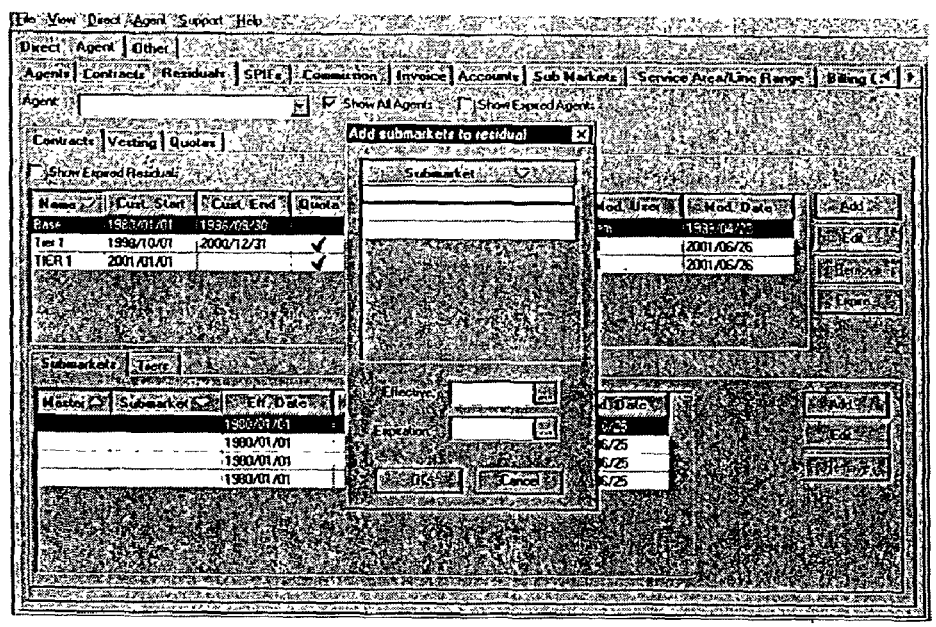

FIG. 67. illustrates one embodiment of one example of an "Add Submarkets to Residual" dialog screen 770 that defines the submarket(s) in which each residual contract applies. For contracts containing quotas, the user can first define the "master" submarket(s) on the Quotas Rollup sub-tab. The field definitions for the "Add Submarkets to Residual" dialog screen 770 are:

1. "Submarket"—For non-contracts containing quotas, the commission management system lists all submarkets in the specified location. Highlight a line to select the submarket(s) to which this contract applies. Use the Ctrl key to select multiple submarkets and use the Shift key to select a block of submarkets. All submarkets defined for the contract will "roll together" for that contract. For contracts containing quotas, the commission management system lists all "master" submarket(s) defined on the Quotas Rollup sub-tab. Highlight a line to select the submarket to which this contract applies. All submarkets in that submarket's rollup list will automatically follow. Only a single "master" can be defined for each contract containing quotas.

2. "Effective"—Use the calendar to select the date the submarkets are effective for this contract.

3. "Expiration"—Use the calendar to select the date the submarkets expire from this contract.

Figure 68:
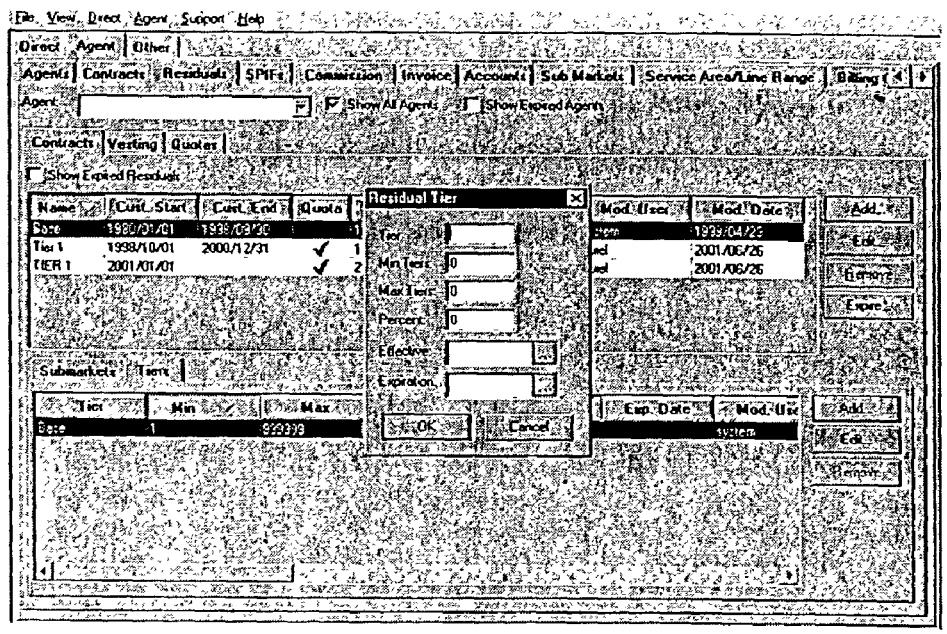

FIG. 68 illustrates one embodiment of one example of a "Residual Tier" dialog screen 780 that defines the residual payment tiers for each contract. The field definitions for the "Residual Tier" dialog screen 780 are:

1. "Tier"—Enter the tier name.
2. "Min Tiers"—Enter the minimum customer count for this tier.
3. "Max Tiers"—Enter the maximum customer count for this tier.
4. "Percent"—Enter the payment percent for this tier, in decimal format (e.g., 2% should be entered as 0.02).
5. "Effective"—Use the calendar to select the date this tier is effective.
6. "Expiration"—Use the calendar to select the date this tier expires.

Figure 69:
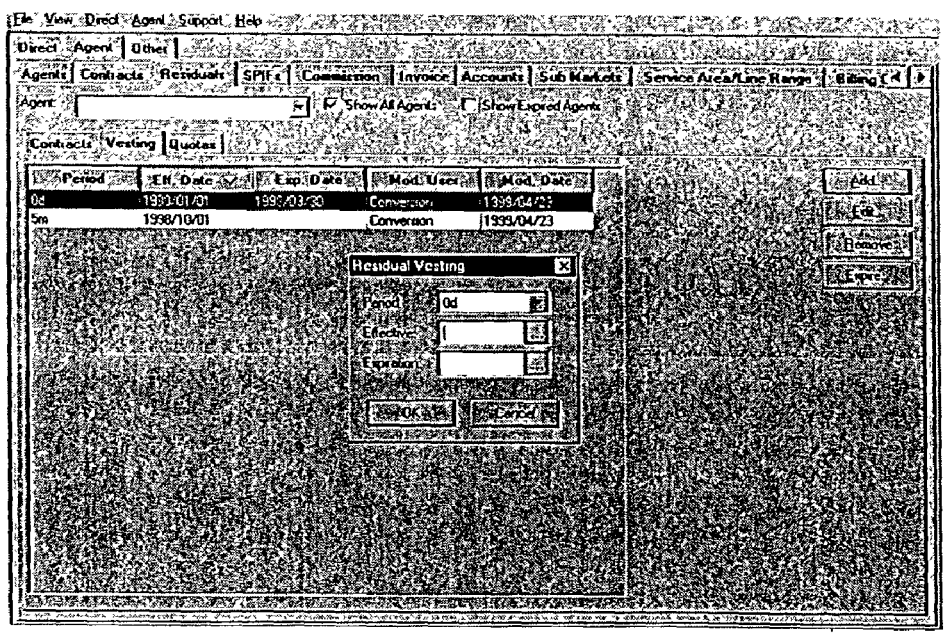

FIG. 69 illustrates one embodiment of one example of a "Residual Vesting" sub-tab and window screen 790 that define the agent's residual vesting period. The field definitions for the "Residuals Vesting" sub-tab and window screen 790 are:

1. "Period"—Use the drop-down list to select the vesting period.
2. "Effective"—Use the calendar to select the date this vesting period is effective.
3. "Expiration"—Use the calendar to select the date this vesting period expires.

Figure 70:
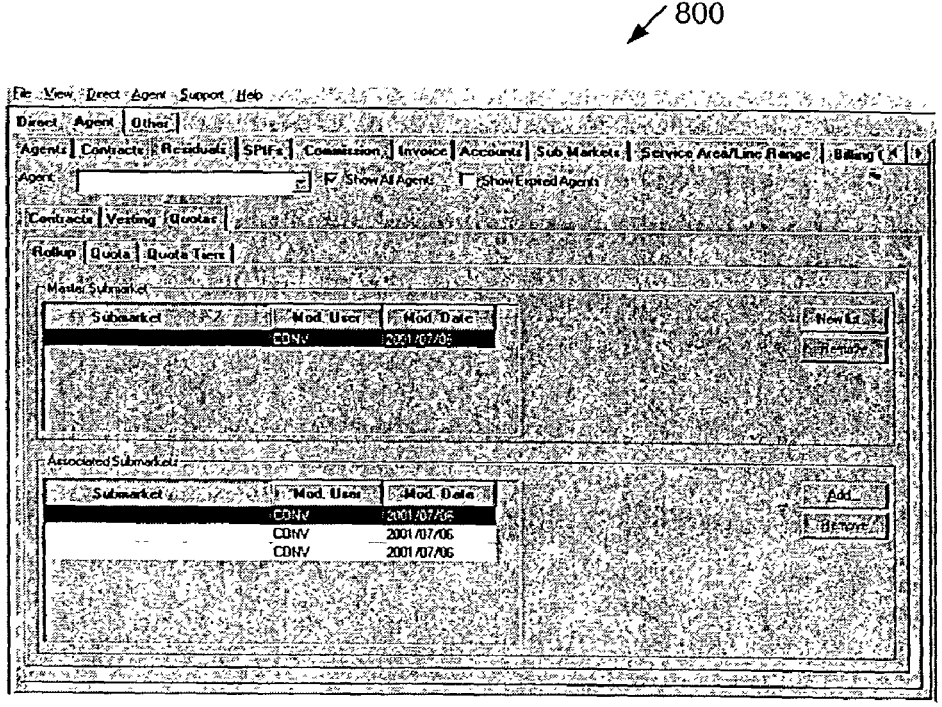

FIG. 70 illustrates one embodiment of one example of a "Residuals Quotas" sub-tab screen 800 that has its own set of sub-tabs to define quota information: Rollup, Quota, and Quota Tiers. The Rollup sub-tab defines each residual "master" submarket and its associated submarkets.

Figure 71:
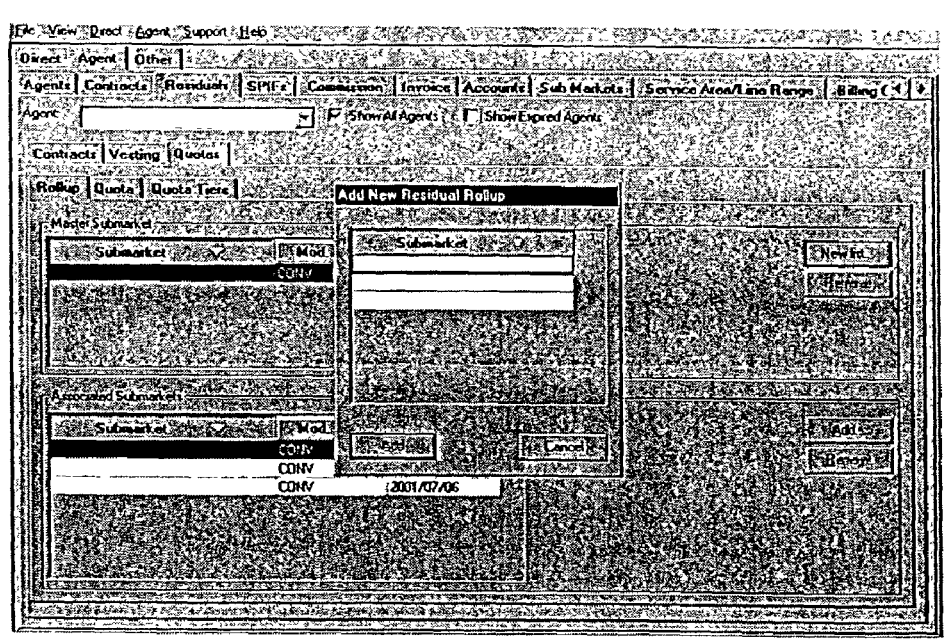

FIG. 71 illustrates one embodiment of one example of an "Add New Residual Rollup" window 810 that is accessed by clicking the New list function button beside the Master Submarket display on the Quotas Rollup sub-tab. Different rollup lists can be defined for different residual contracts, if applicable. The field definitions for the "Add New Residual Rollup" window 810 are:

1. "Submarket"—The commission management system lists all submarkets not already defined as master residual submarkets. Highlight a line to select the master submarket(s) for residual processing. Use the Ctrl key to select multiple submarkets and use the Shift key to select a block of submarkets. Note that a unique rollup list will be established for each master selected.

Figure 72:
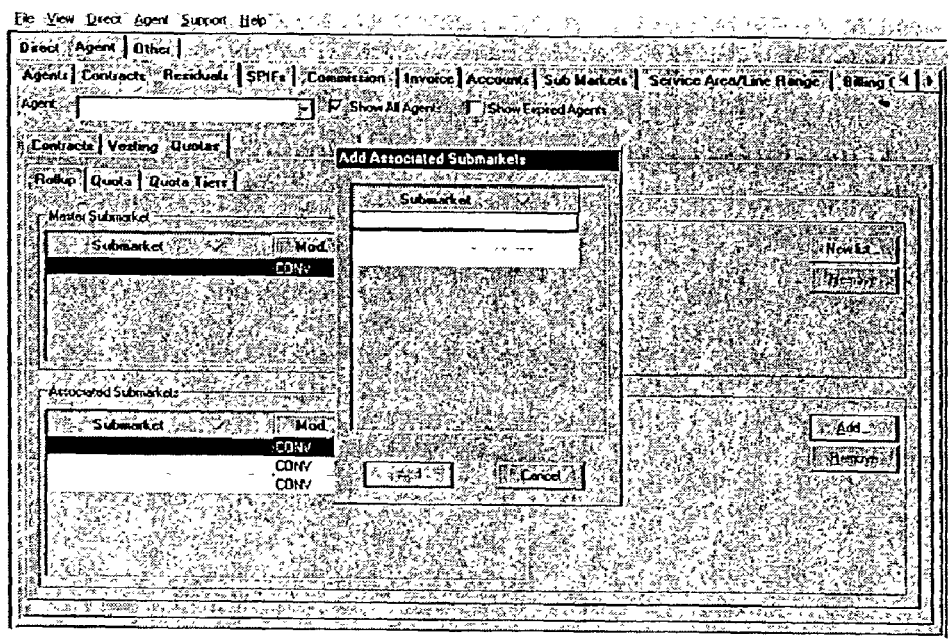

FIG. 72 illustrates one embodiment of one example of an "Add Associated Submarkets" dialog screen 820 that is accessed by clicking the Add function button beside the Associated Submarkets display on the Quotas Rollup sub-tab. It defines any other submarkets in each "master" submarket's rollup list. The field definitions for the "Add Associated Submarkets" dialog screen 820 are:

1. "Submarket"—The commission management system lists all submarkets not already associated with another rollup list. Highlight a line to select the submarket(s) to follow this master submarket for residual processing. Use the Ctrl key to select multiple submarkets and use the Shift key to select a block of submarkets.

Figure 73:
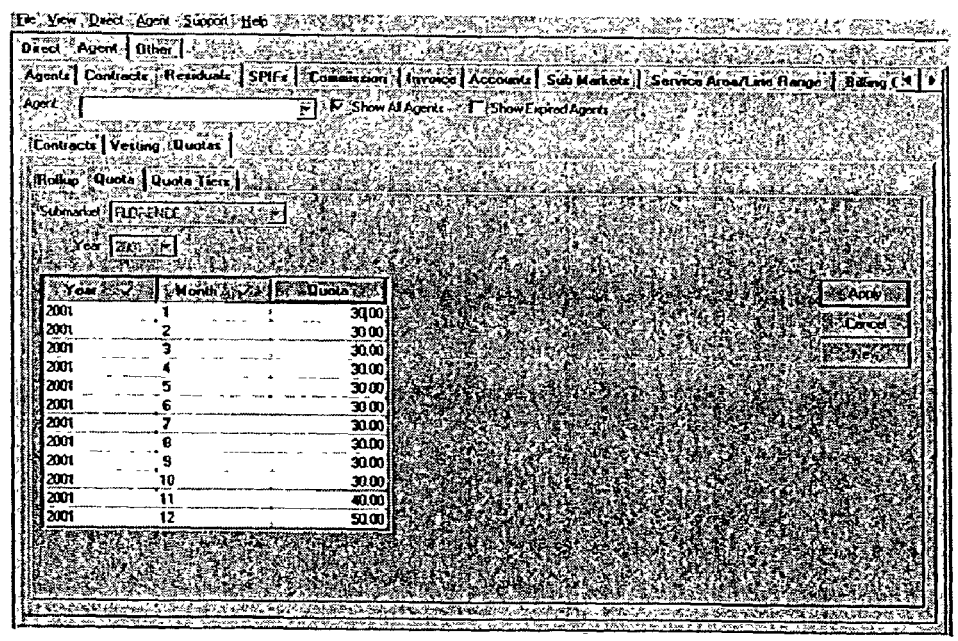

FIG. 73 illustrates one embodiment of one example of a "Quota" sub-tab screen 830 that defines the monthly quota amounts applicable to each residual rollup list. The user can use the Submarket drop-down list to select the master submarket and use the Year drop-down list to change the year. This defaults to the current processing year. The field definitions for the "Quota" sub-tab screen 830 are:

1. "Year, Month, Quota"—the commission management system displays a monthly quota grid for the selected year. (It displays blank for a new year until that year's grid is established.) Enter the quota amount per month.

2. "Function Buttons"

| | |
|---|---|
| Apply | Click to apply a change to an established quota amount. |
| Cancel | Click to exit without saving changes. |
| New | Click to establish a new quota grid. |

Figures 74, 75:
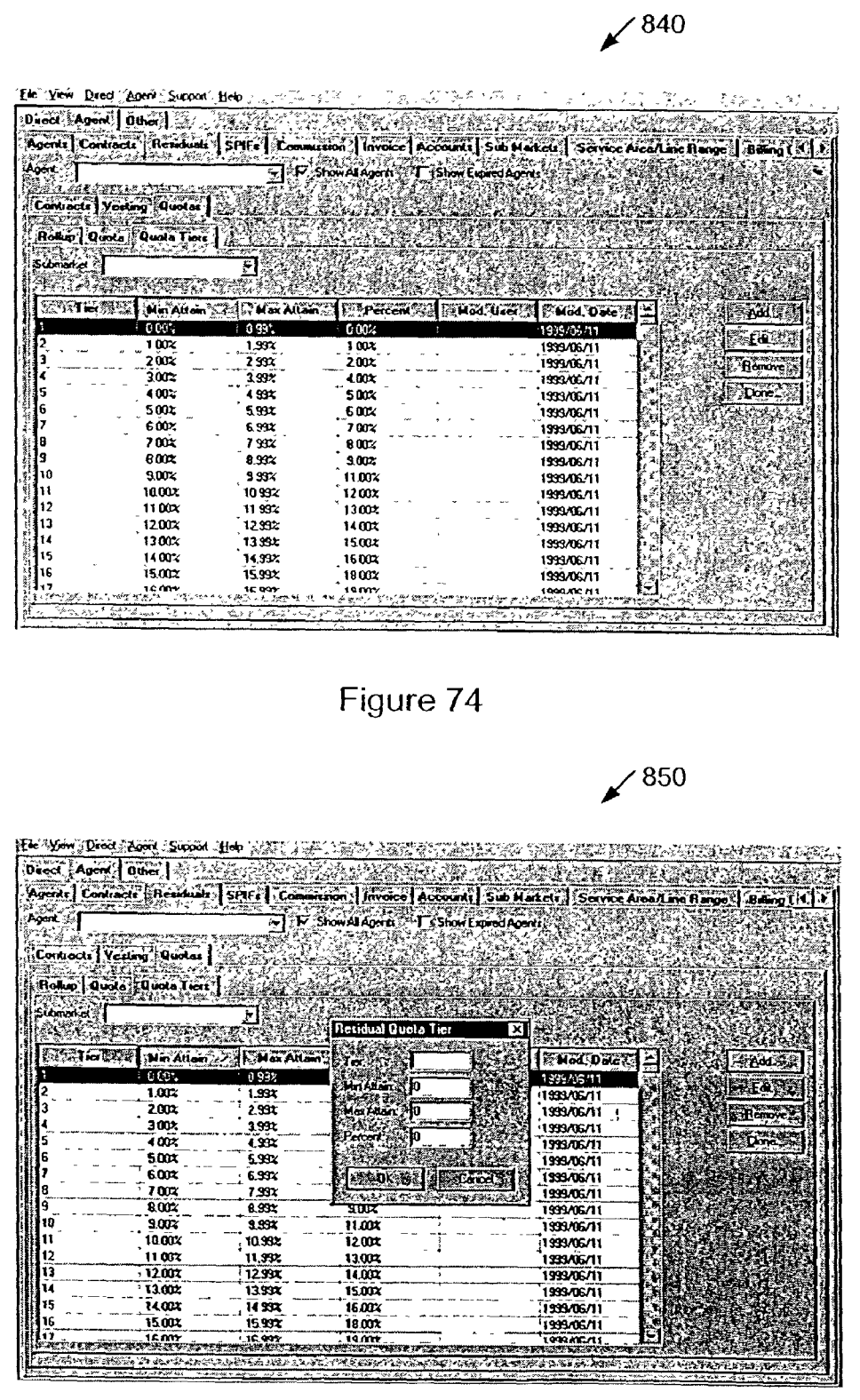

FIG. 74 illustrates one embodiment of one example of a "Quota Tiers" sub-tab screen 840 that defines the payment percentages applicable to each residual rollup list, based on quota attainment. The user can use the Submarket drop-down list to select the master submarket.

FIG. 75 illustrates one embodiment of one example of a "Residual Quota Tier" dialog screen 850 that defines each quota payment tier for the specified master submarket and its associated rollup list. The field definitions for the "Residual Quota Tier" dialog screen 850 are:

1. "Tier"—Enter the tier name.
2. "Min Attain"—Enter the minimum quota attainment for this tier, in decimal format (e.g., 1% should be entered as 0.01).
3. "Max Attain"—Enter the maximum quota attainment for this tier, in decimal format (e.g., 1.99% should be entered as 0.0199).
4. "Percent"—Enter the payment percent for this tier, in decimal format (e.g., 11% should be entered as 0.11).

Figure 76:
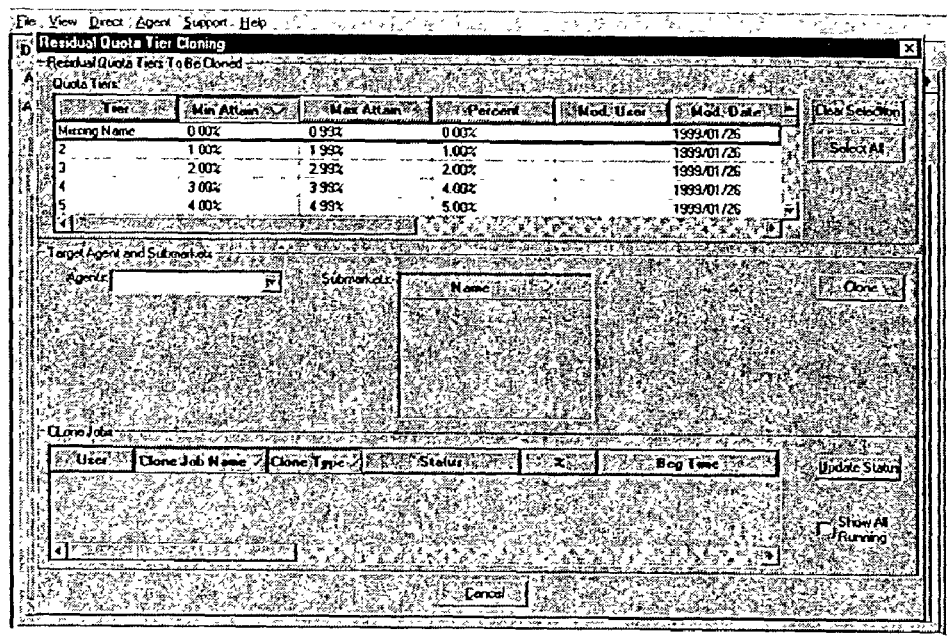

FIG. 76 illustrates one embodiment of one example of a "Residual Quota Tier Cloning" dialog screen 860 that is accessed by clicking the Clone function button on the Quota Tiers sub-tab. This function copies residual quota tiers data from the "source" to a "target." The field definitions for the "Residual Quota Tier Cloning" dialog screen 860 are:

1. "Residual Quota Tiers To Be Cloned"—The commission management system lists all quota tiers defined in the system for the selected master submarket. Highlight a line to select the tier(s) to be cloned from this list. Use the Ctrl key to select multiple tiers and use the Shift key to select a block of tiers, and then click on the Select All button to select all listed tiers. Click on the Clear Selection button to clear the selections and start over.

Quota Tiers:

| | |
|---|---|
| Tier | The tier name. |
| Min Attain | The minimum attainment. |
| Max Attain | The maximum attainment |
| Percent | The payment percent. |
| Mod. User | The username of the last user to modify the tier. |
| Mod. Date | The date of the last tier modification. |

2. "Target Agent and Submarkets"—Select the agent/submarket(s) to which the "source" quota tier(s) should be copied.

| | |
|---|---|
| Agents | Use the drop-down list to select the target agent. |
| Submarkets | Highlight the target submarket(s). Use the Ctrl key to select multiple submarkets; use the Shift key to select a block of submarkets. |

3. "Clone"—Click this function key to begin the cloning process. The user will be asked to assign a name to this clone job for tracking purposes.

4. "Clone Jobs"—Allows the user to track the progress of clone jobs. Click the Update Status function button to refresh the display.

| | |
|---|---|
| User | The username of the specialist initiating the clone job. |
| Clone Job Name | The name assigned to the clone job. |
| Clone Type | The type of clone job. |
| Status | The status of the clone job. |
| % | The percent complete. |
| Beg Time | The beginning time. |
| End Time | The ending time. |
| Show All Running | Click to show all clone jobs for all usernames. |

Figure 77:
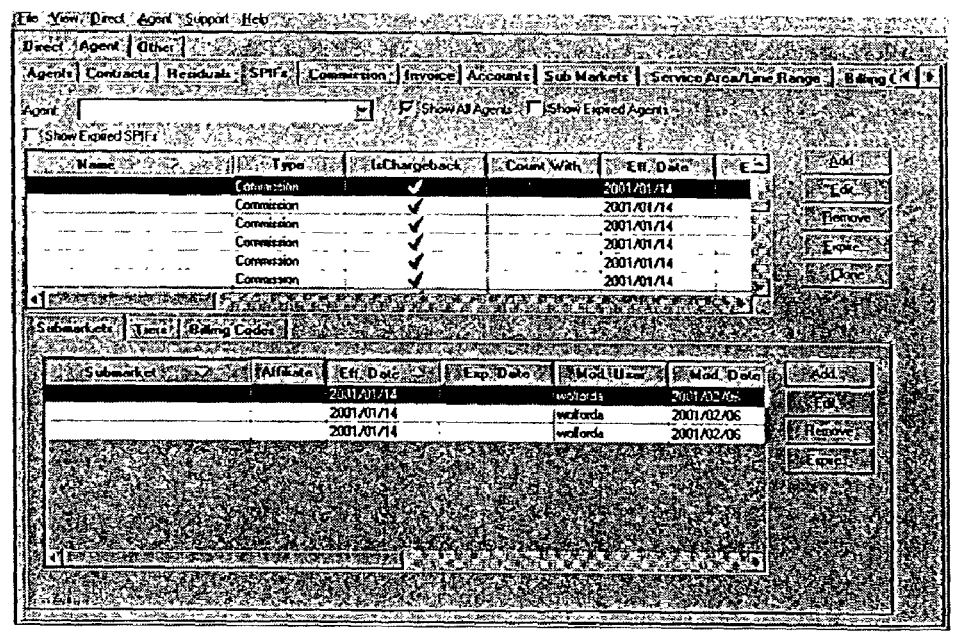
FIGS. 77 to 84 illustrate various example screens associated with a portion of a software module feature according to one embodiment of the present invention.

FIGS. 77 to 84 illustrate various example screens associated with the "SPIFs" tab portion of the commission management system's Agent Module feature. It is to be understood that such example screens are provided for illustration purposes only and, therefore the present invention should not be limited thereby. Turning now to FIG. 77, one embodiment of one example of a "SPIFs" tab screen 870 is illustrated. The SPIFs tab and its sub-tabs define the Special Promotional Incentive Features in effect for each agent, including the billing codes that are part of each and the payment tiers for each. Note that all information is date-sensitive. The user can use the Agent drop-down list to select the agent code. Initially, this tab lists active SPIF's for the specified agent. Click Show Expired SPIFs to list only expired SPIF's for this agent.

Figure 78:
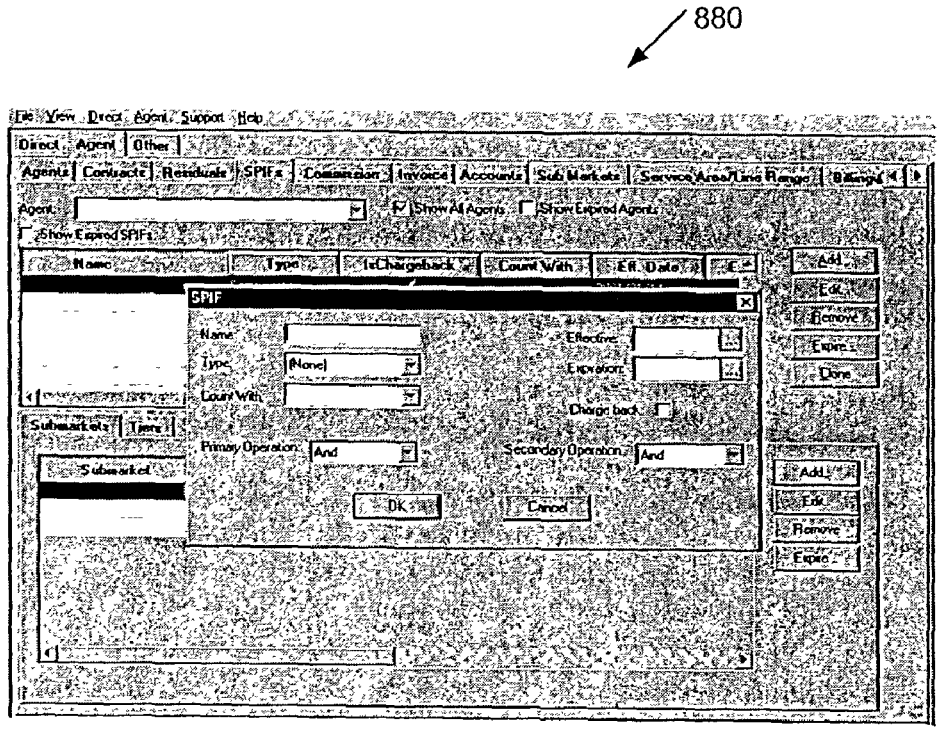

FIG. 78 illustrates one embodiment of one example of an "SPIF" dialog screen 880 that defines each Special Promotional Incentive Feature for the selected agent. The field definitions for the "SPIF" dialog screen 880 are:

1. "Name"—Enter the name of the SPIF.
2. "Type"—Use the drop-down list to select the SPIF type.
3. "Count With"—Use the drop-down list to select the SPIF that this one should "count with" in determining the agent's SPIF tier.
4. "Effective"—Use the calendar to select the date the SPIF is effective in the commission management system.
5. "Expiration"—Use the calendar to select the date the SPIF is expired from the commission management system.
6. "Charge back"—Click to indicate whether or not a disconnect should generate a chargeback for this SPIF.
7. "Primary Operation"—Use the drop-down list to select the operation to be performed on the "primary" billing codes defined for this SPIF.
   "And"—Indicates that all of the primary billing codes must be present for the SPIF to be paid.
   "Not"—Indicates that none of the primary billing codes can be present for the SPIF to be paid.
   "Or"—Indicates that if any of the primary billing codes are present, the SPIF should be paid.
8. "Secondary Operation"—Use the drop-down list to select the operation to be performed on the "secondary" billing codes defined for this SPIF.
   "And"—Indicates that all of the secondary billing codes must be present for the SPIF to be paid.
   "Not"—Indicates that none of the secondary billing codes can be present for the SPIF to be paid.
   "Or"—Indicates that if any of the secondary billing codes are present, the SPIF should be paid.

Figure 79:
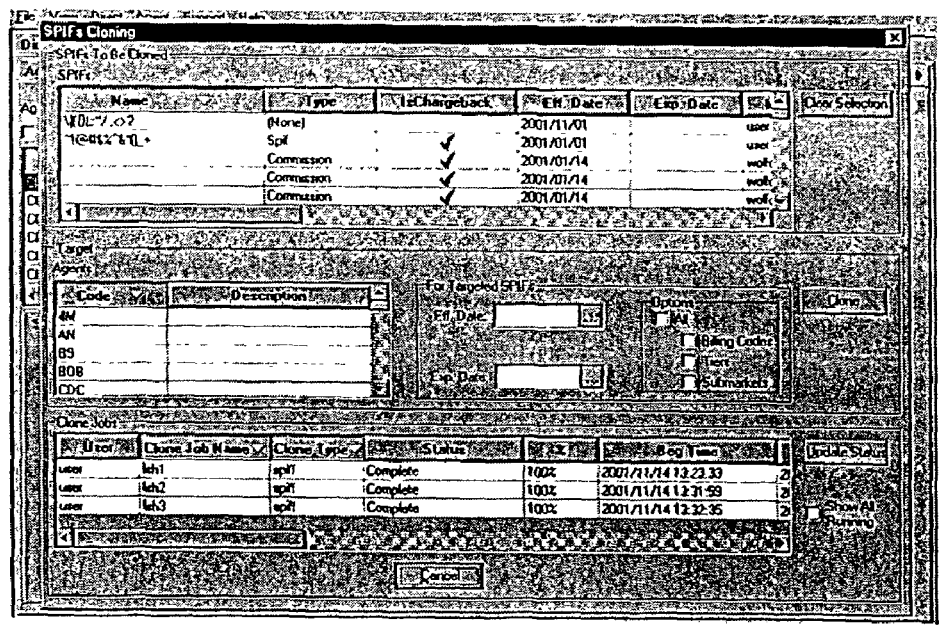

FIG. 79 illustrates one embodiment of one example of a "SPIFs Cloning" dialog screen 890 that is accessed by clicking the Clone function button on the SPIFs sub-tab. This function copies SPIF data from the "source" to a "target." The specified SPIF cannot already exist for the target agent. The field definitions of the "SPIFs Cloning" dialog screen 890 are:

1. "SPIFs To Be Cloned"—The commission management system lists all SPIFs defined in the system for the selected agent. Highlight a line to select the SPIF(s) to be cloned from this list. Use the Ctrl key to select multiple SPIFs; use the Shift key to select a block of SPIFs. Click on the Clear Selection button to clear the selections and start over.

| | |
|---|---|
| Name | The SPIF name. |
| Type | The type of SPIF. |
| IsChargeback | The flag indicating if chargebacks should be generated. |
| Eff. Date | The SPIF effective date. |
| Exp. Date | The SPIF expiration date. |
| Mod. User | The last user to modify the SPIF. |
| Mod. Date | The last date the SPIF was modified. |

2. "Target Agents"—Highlight the target agent(s) to which the "source" SPIF(s) should be copied. Use the Ctrl key to select multiple agents; use the Shift key to select a block of agents.

| | |
|---|---|
| Eff. Date | Use the calendar to select the date the SPIF is effective for the target agent. |
| Exp. Date | Use the calendar to select the date the SPIF expires for the target agent. |
| Options | Click the appropriate box to indicate what to copy: All copies all aspects of the "source" SPIF. Billing Codes copies only SPIF billing codes. Tiers copies only SPIF tiers. Submarkets copies only SPIF submarkets. |

3. "Clone"—Click this function key to begin the cloning process. The user will be asked to assign a name to this clone job for tracking purposes.

4. "Clone Jobs"—Allows the user to track the progress of clone jobs. Click the Update Status function button to refresh the display.

| User | The username of the specialist initiating the clone job. |
|---|---|
| Clone Job Name | The name assigned to the clone job. |
| Clone Type | The type of clone job. |
| Status | The status of the clone job. |
| % | The percent complete. |
| Beg Time | The beginning time. |
| End Time | The ending time. |
| Show All Running | Click to show all clone jobs for all usernames. |

Figure 80:
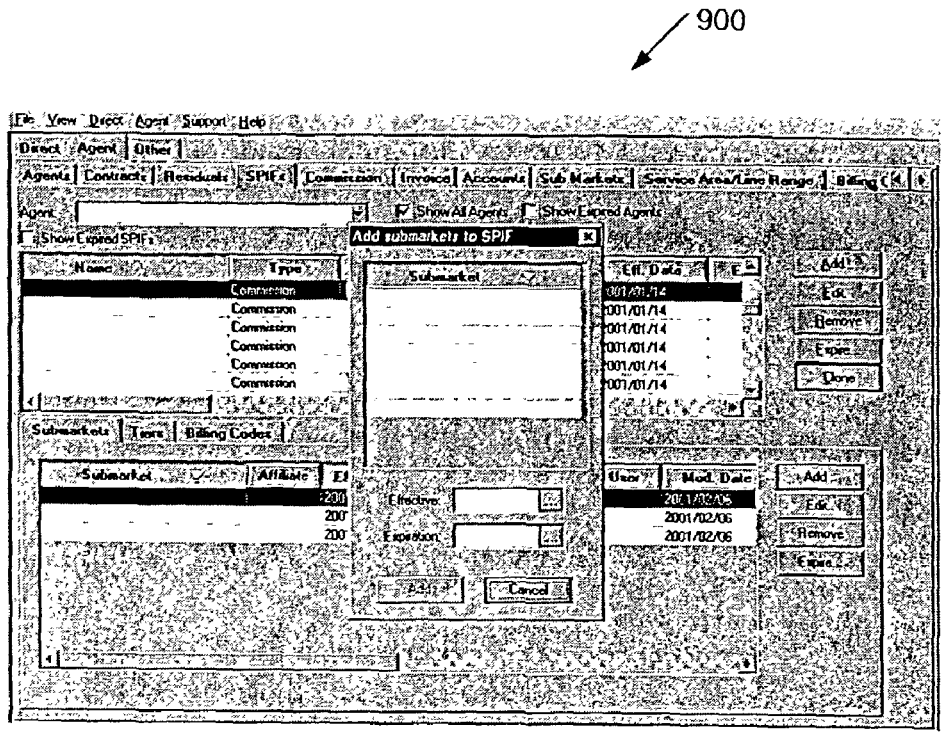

FIG. 80 illustrates one embodiment of one example of an "Add submarkets to SPIF" dialog screen 900 that defines the submarket(s) in which each SPIF applies. The field definitions of the "Add submarkets to SPIF" dialog screen 900 are:

1. "Submarket"—The commission management system lists all submarkets in the specified location. Highlight a line to select the submarket(s) to which this SPIF applies. Use the Ctrl key to select multiple submarkets and use the Shift key to select a block of submarkets.

2. "Effective"—Use the calendar to select the date the submarkets are effective for this SPIF.

3. "Expiration"—Use the calendar to select the date the submarkets expire from this SPIF.

Figure 81:
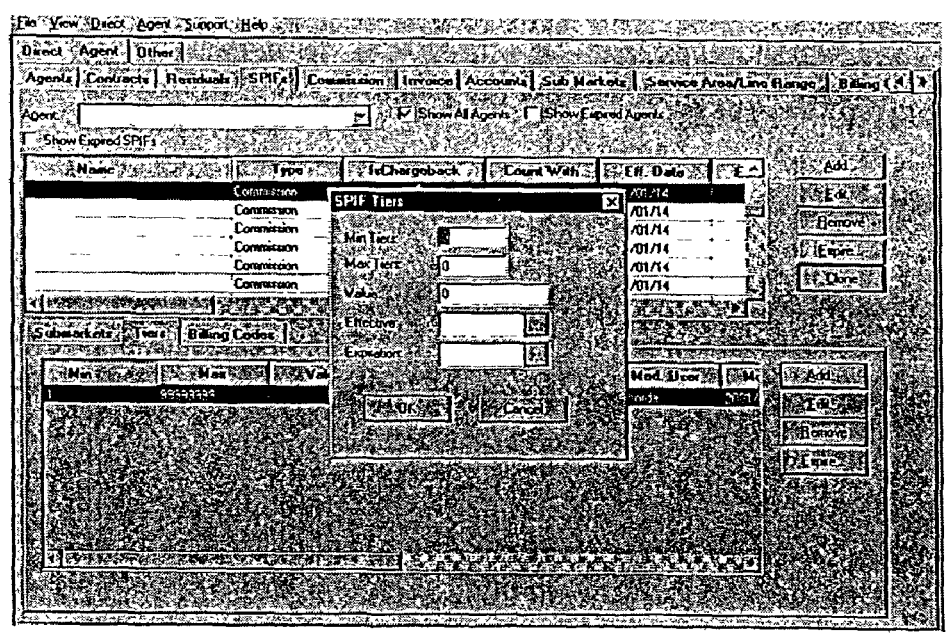

FIG. 81 illustrates one embodiment of one example of a "SPIF Tiers" dialog screen 910 that defines the commission payment tiers for each SPIF. The field description for the "SPIF Tiers" dialog screen 910 are:

1. "Min Tiers"—Enter the minimum customer count for this tier.

2. "Max Tiers"—Enter the maximum customer count for this tier.

3. "Value"—Enter the value to be paid on this tier.

4. "Effective"—Use the calendar to select the date this tier is effective.

5. "Expiration"—Use the calendar to select the date this tier expires.

Figure 82:
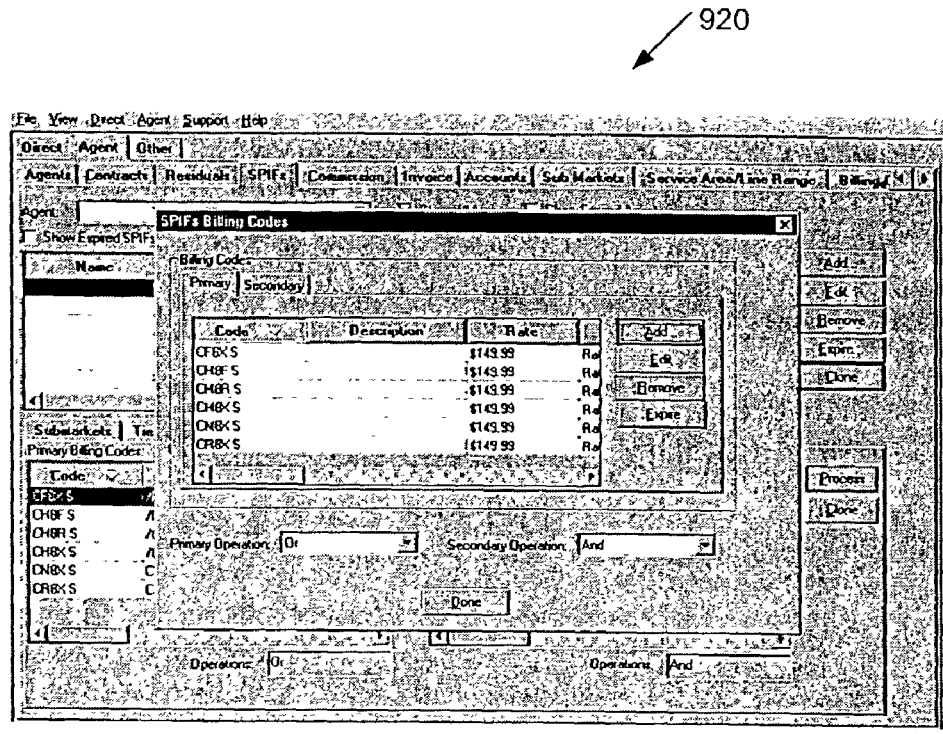

FIG. 82 illustrates one embodiment of one example of a "SPIFs Billing Codes" dialog screen 920 that is accessed by clicking the Process function button on the Billing Codes sub-tab. It displays all billing codes associated with the selected SPIF. Separate sub-tabs show Primary vs. Secondary billing codes, with identical data fields for each. Primary billing codes are the main codes that control payment of the SPIF; secondary billing codes identify a subsequent set of conditions on a SPIF. For example, assume that a SPIF is designed to be paid if any of a set of billing codes is present, provided any of a second set of billing codes is also present. The first set of billing codes is "primary"; the second set of billing codes is "secondary." The field definitions for the "SPIFs Billing Codes" dialog screen 920 are:

1. "Code"—The billing code.
2. "Description"—The billing code description.
3. "Rate"—The rate charged for the billing code.
4. "Type"—The billing code type.
5. "Eff. Date"—The billing code effective date.
6. "Exp. Date"—The billing code expiration date.
7. "Primary Operation"—Use the drop-down list to change the operation to be performed on the "primary" billing codes defined for this SPIF.

"And"—Indicates that all of the primary billing codes must be present for the SPIF to be paid.

"Not"—Indicates that none of the primary billing codes can be present for the SPIF to be paid.

"Or"—Indicates that if any of the primary billing codes are present, the SPIF should be paid.

8. "Secondary Operation"—Use the drop-down list to change the operation to be performed on the "secondary" billing codes defined for this SPIF.

"And"—Indicates that all of the secondary billing codes must be present for the SPIF to be paid.

"Not"—Indicates that none of the secondary billing codes can be present for the SPIF to be paid.

"Or"—Indicates that if any of the secondary billing codes are present, the SPIF should be paid.

Figure 83:
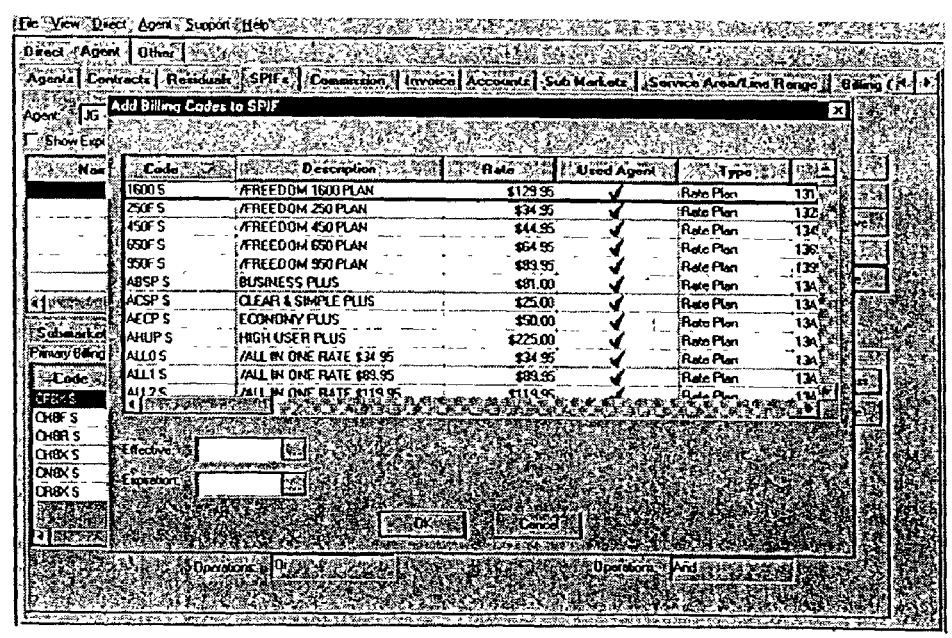

FIG. 83 illustrates one embodiment of one example of an "Add Billing Codes to SPIF" dialog screen 930 that is accessed by clicking the Add function button on the SPIFs Billing Codes dialog. It defines all billing codes that contribute to the selected SPIF. The field definitions for the "Add Billing Codes to SPIF" dialog screen 930 are:

1. "Billing Codes"—The commission management system lists all commissionable billing codes in the specified location. Highlight a line to select the appropriate billing code(s) from this list. Use the Ctrl key to select multiple billing codes and use the Shift key to select a block of billing codes.

| Code | The billing code. |
|---|---|
| Description | The billing code description. |
| Rate | The rate charged for the billing code. |
| Used | The "used" flag set for either Agent or National Retailer, depending on the type of agent. |
| Type | The billing code type. |
| Internal Code | The internal billing code. |
| Eff. Date | The billing code effective date. |
| Exp. Date | The billing code expiration date. |

2. "Effective"—Use the calendar to select the date the billing code becomes part of this SPIF.

3. "Expiration"—Use the calendar to select the date the billing code is no longer part of this SPIF.

Figure 84:
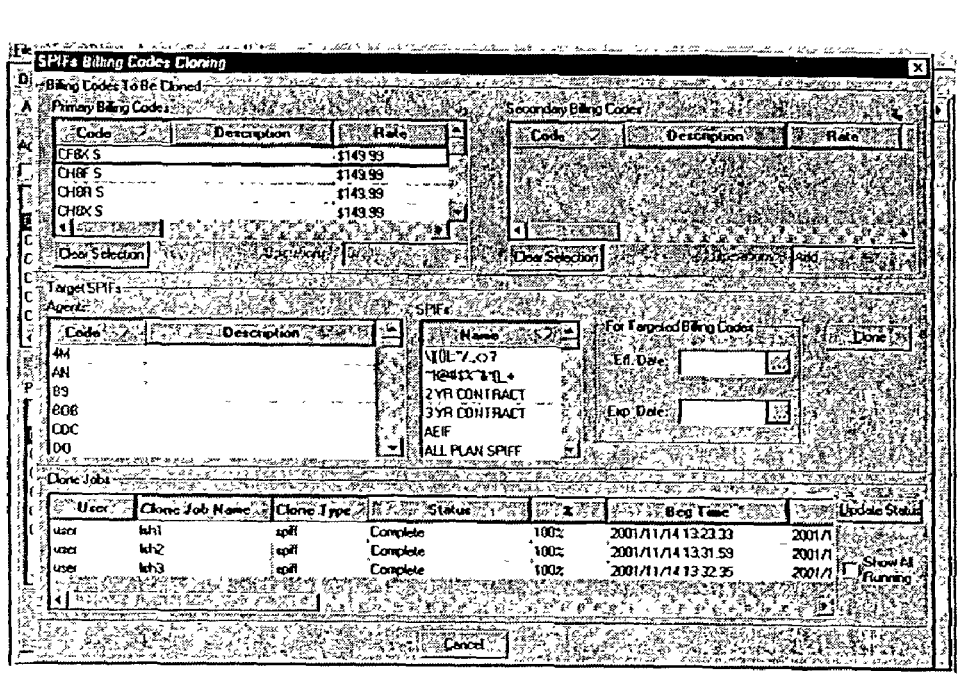

FIG. 84 illustrates one embodiment of one example of an "SPIFs Billing Codes Cloning" dialog screen 940 that is accessed by clicking the Clone function button on the Billing Codes sub-tab. This function copies SPIF billing code data from the "source" to a "target." The target agent/SPIF must already exist. The field definitions for the SPIFs Billing Codes Cloning" dialog screen 940 are:

1. "Billing Codes To Be Cloned"—The commission management system lists all billing codes defined in the system for the selected SPIF. Separate displays address Primary Billing Codes vs. Secondary Billing Codes. Highlight a line to select the billing code(s) to be cloned from these lists. Use the Ctrl key to select multiple codes and use the Shift key to select a block of codes. Click on the Clear Selection button to clear the selections and start over.

Primary Billing Codes:

| Code | The billing code. |
|---|---|
| Description | The billing code description. |
| Rate | The billing code rate. |
| Type | The billing code type. |
| Eff. Date | The billing code effective date. |
| Exp. Date | The billing code expiration date. |

Secondary Billing Codes:

| | |
|---|---|
| Code | The billing code. |
| Description | The billing code description. |
| Rate | The billing code rate. |
| Type | The billing code type. |
| Eff. Date | The billing code effective date. |
| Exp. Date | The billing code expiration date. |

2. "Target SPIFs"—Select the agent(s)/SPIF(s) to which the "source" billing code(s) should be copied.

| | |
|---|---|
| Agents | Highlight the target agent(s). Use the Ctrl key to select multiple agents; use the Shift key to select a block of agents. |
| SPIFs | Highlight the target SPIF(s). Use the Ctrl key to select multiple SPIFs; use the Shift key to select a block of SPIFs. |

3. "For Targeted Billing Codes"

| | |
|---|---|
| Eff. Date | Use the calendar to select the date the billing code is effective for the target agent/SPIF. |
| Exp. Date | Use the calendar to select the date the billing code expires for the target agent/SPIF. |

4. "Clone"—Click this function key to begin the cloning process. The user will be asked to assign a name to this clone job for tracking purposes.

5. "Clone Jobs"—Allows the user to track the progress of clone jobs. Click the Update Status function button to refresh the display.

| | |
|---|---|
| User | The username of the specialist initiating the clone job. |
| Clone Job Name | The name assigned to the clone job. |
| Clone Type | The type of clone job. |
| Status | The status of the clone job. |
| % | The percent complete. |
| Beg Time | The beginning time. |
| End Time | The ending time. |
| Show All Running | Click to show all clone jobs for all usernames. |

Figure 85:
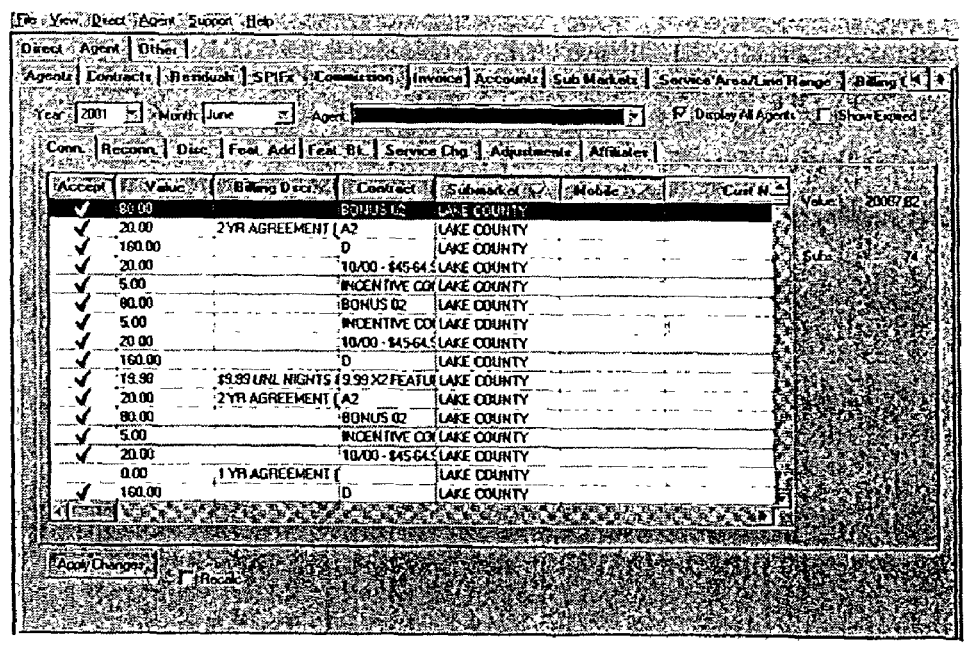
FIGS. 85 to 90 illustrate various example screens associated with a portion of a software module feature according to one embodiment of the present invention.

FIGS. 85 to 90 illustrate various example screens associated with the "Commission" tab portion of the commission management system's Agent Module feature. It is to be understood that such example screens are provided for illustrative purposes only and, therefore, the present invention should not be limited thereby. Turning now to FIG. 85 where one embodiment of one example of a "Commission" tab screen 950 is illustrated. The commission tab details an agent's commission compensation for a given month and year, allows the user to make manual adjustments, and to re-calculate on demand. Separate sub-tabs display the agent's detailed sales transactions by type (e.g., connects vs. reconnects vs. feature adds, etc.). The field definitions of the "Commission" tab screen 950 are:

1. "Year"—Use the drop-down list to select the year. This defaults to the current processing year.

2. "Month"—Use the drop-down list to select the month. This defaults to the current processing month.

3. "Agent"—Use the drop-down list to select the agent.

4. "Display All Agents"—Click to list all agents, regardless of Commission Specialist, in the drop-down Agent list.

5. "Show Expired"—Click to list only expired agents in the drop-down Agent list.

6. "Apply Changes"—Click to "save" any changes the user has made.

7. "Recalc"—Click to recalculate this agent when the user selects Apply Changes.

Figure 86:
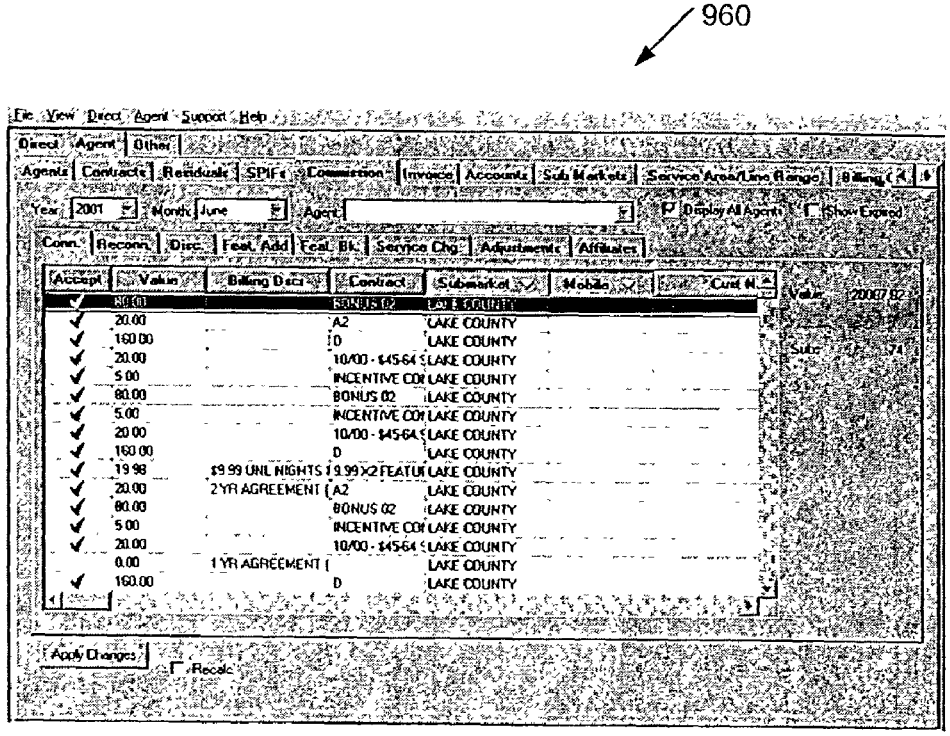

FIG. 86 illustrates one embodiment of one example of a screen 960 associated with various aspects of the "Commission" tab screen such as Conn. (Connect), Reconn. (Reconnect), Feat. Add (Feature Add) and Feat. Bk. (Feature Backout) sub-tabs. The field definitions for the screen 960 are:

1. "Accept"—Click to indicate whether or not a transaction should be "accepted" for inclusion in the agent's commission compensation calculation. This is initially set based on predefined business rules applied during the load process.

2. "Value"—The tier value loaded in the Contracts or SPIFs tab for the contract or SPIF this billing code is part of.

3. "Billing Dscr."—The billing code description.

4. "Contract"—The contract or SPIF this billing code is part of.

5. "Submarket"—The submarket on the transaction.

6. "Mobile"—The mobile number.

7. "Cust Name"—The customer name.

8. "Action"—The "action date". This is the date the commission management system uses to determine which processing month a transaction falls into.

9. "Init Srv"—The initial service date.

10. "DCD"—The disconnect date.

11. "RCD"—The reconnect date.

12. "EFD"—The effective final date.

13. "BC ISD"—The billing code initial service date.

14. "BC His CD"—The billing code history connect date.

15. "BC His DCD"—The billing code history disconnect date.

16. "Status"—The status.

17. "Agent"—The agent code.

18. "BC Agent"—The billing code agent code.

19. "SIM Serial"—The Subscriber Identity Module serial code.

20. "IMEI"—The International Mobile Equipment Identity code.

Figure 87:
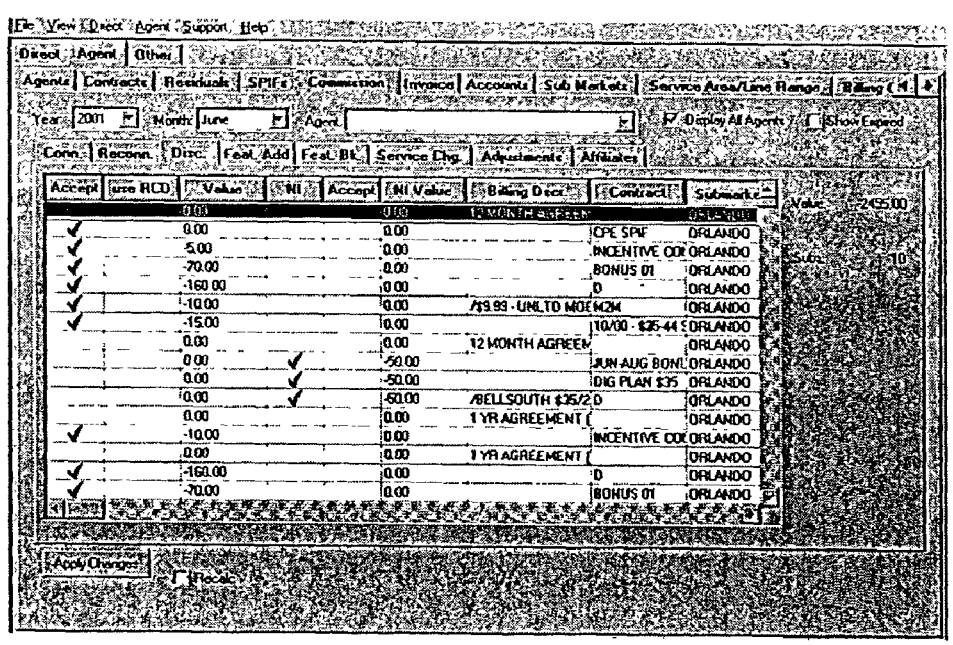

FIG. 87 illustrates one embodiment of one example of a "Disc." (Disconnect) sub-tab screen 970. The field definitions for the "Disc." Sub-tab screen 970 are:

1. "Accept"—Click to indicate whether or not a transaction should be "accepted" for inclusion in the agent's commission compensation calculation. This is initially set based on predefined business rules applied during the load process.

2. "use RCD"—Click to indicate whether or not the reconnect date, if any, should be used to determine vesting for the transaction.

3. "Value"—The tier value loaded in the Contracts or SPIFs tab for the contract or SPIF this billing code is part of. For contracts, this is the Backout Value loaded for the tier. For SPIFs, this is only generated if Charge back is checked.

4. "NI"—Flag to indicate whether or not the transaction is a no-install.

5. "Accept"—Click to indicate whether or not the no-install should be "accepted" for inclusion in the agent's commission compensation calculation.

6. "NI Value"—The Noinstall amount loaded in the Contracts tab for the contract this billing code is part of.

7. "Billing Dscr."—The billing code description.

8. "Contract"—The contract or SPIF this billing code is part of.

9. "Submarket"—The submarket on the transaction.

10. "Mobile"—The mobile number.

11. "Cust Name"—The customer name.

12. "Action"—The "action date". This is the date the commission management system uses to determine which processing month a transaction falls into.

13. "Init Srv"—The initial service date.

14. "DCD"—The disconnect date.

15. "RCD"—The reconnect date.

16. "EFD"—The effective final date.

17. "BC ISD"—The billing code initial service date.

18. "BC His CD"—The billing code history connect date.

19. "BC His DCD"—The billing code history disconnect date.

20. "Status"—The status.

21. "Agent"—The agent code.

22. "BC Agent"—The billing code agent code.

23. "SIM Serial"—The Subscriber Identity Module serial code.

24. "IMEI"—The International Mobile Equipment Identity code.

Figure 88:
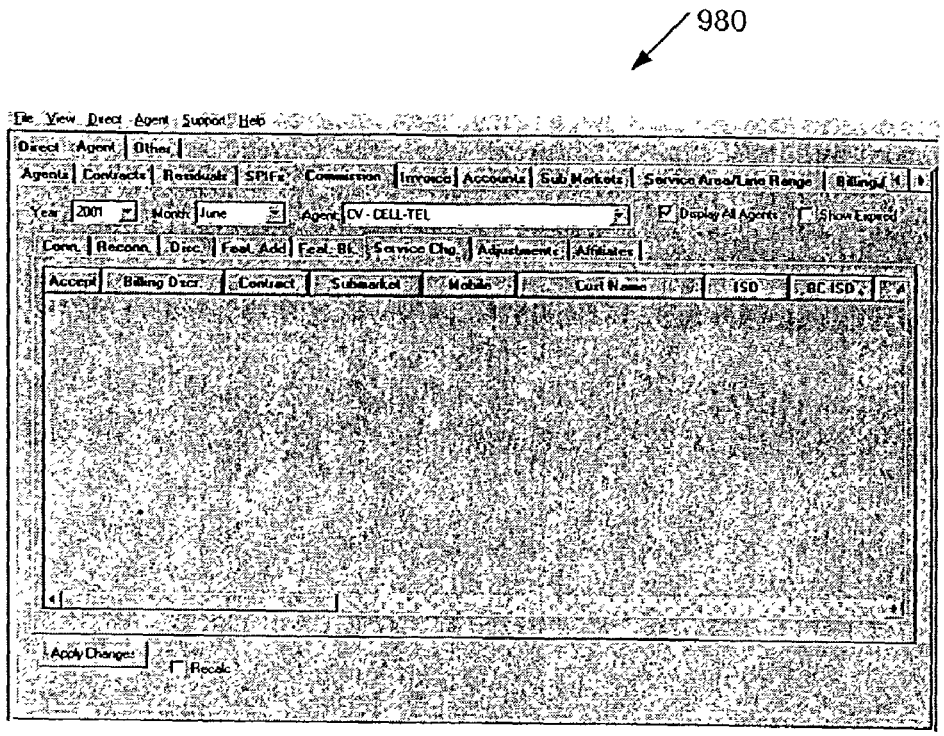

FIG. 88 illustrates one embodiment of one example of a "Service Chg." (Service Change) sub-tab screen 980. The field definitions for the "Service Chg." Sub-tab screen 980 are:

1. "Accept"—Click to indicate whether or not a transaction should be "accepted" for inclusion in the agent's commission compensation calculation. This is initially set based on predefined business rules applied during the load process.

2. "Billing Dscr."—The billing code description.

3. "Contract"—The contract this billing code is part of.

4. "Submarket"—The submarket on the transaction.

5. "Mobile"—The mobile number.

6. "Cust Name"—The customer name.

7. "ISD"—The initial service date.

8. "BC ISD"—The billing code initial service date.

9. "Agent"—The agent code.

10. "BC Agent"—The billing code agent code.

Figure 89:
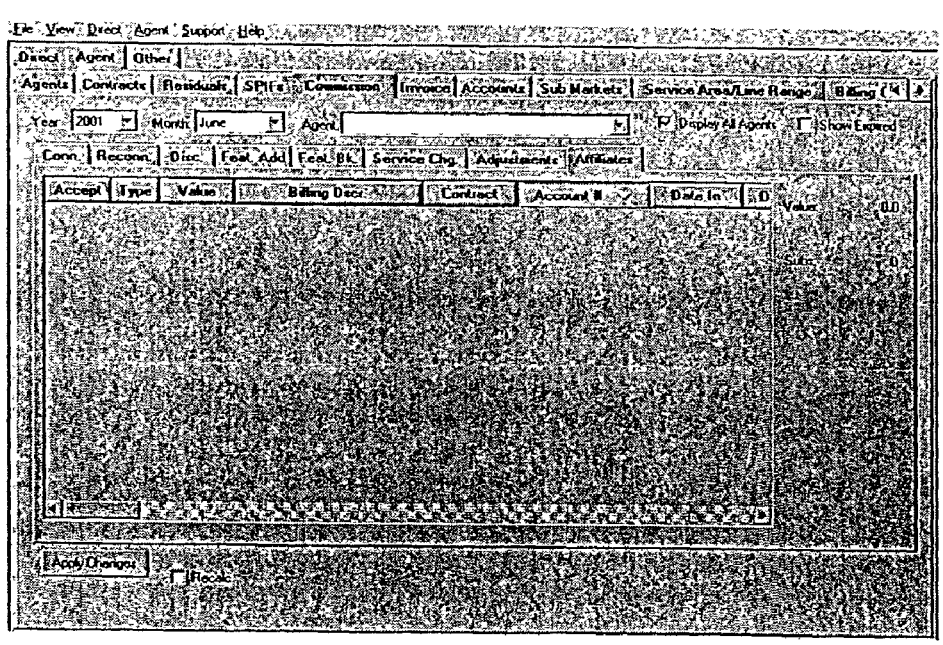

FIG. 89 illustrates one embodiment of one example of an "Affiliates" sub-tab screen 990. The field definitions associated with the "Affiliates" sub-tab screen 990 are:

1. "Accept"—Click to indicate whether or not a transaction should be "accepted" for inclusion in the agent's commission compensation calculation. This is initially set based on predefined business rules applied during the load process.

2. "Type"—The type of affiliate transaction (e.g., Connect vs. Disconnect).

3. "Value"—The tier value loaded in the Contracts tab for the contract this billing code is part of.

4. "Billing Dscr."—The billing code description.

5. "Contract"—The contract this billing code is part of.

6. "Account #"—The affiliate account number.

7. "Date In"—The incoming service order date.

8. "Date Out"—The outgoing service order date.

9. "Svc. Code"—The affiliate service code.

10. "Company"—The affiliate company name.

11. "Svc. ID"—The affiliate service ID.

12. "Qty."—The quantity on this transaction.

13. "Mod User"—The username of the last user to modify the transaction.

14. "Mod Date"—The date the transaction was last modified.

Figure 90:
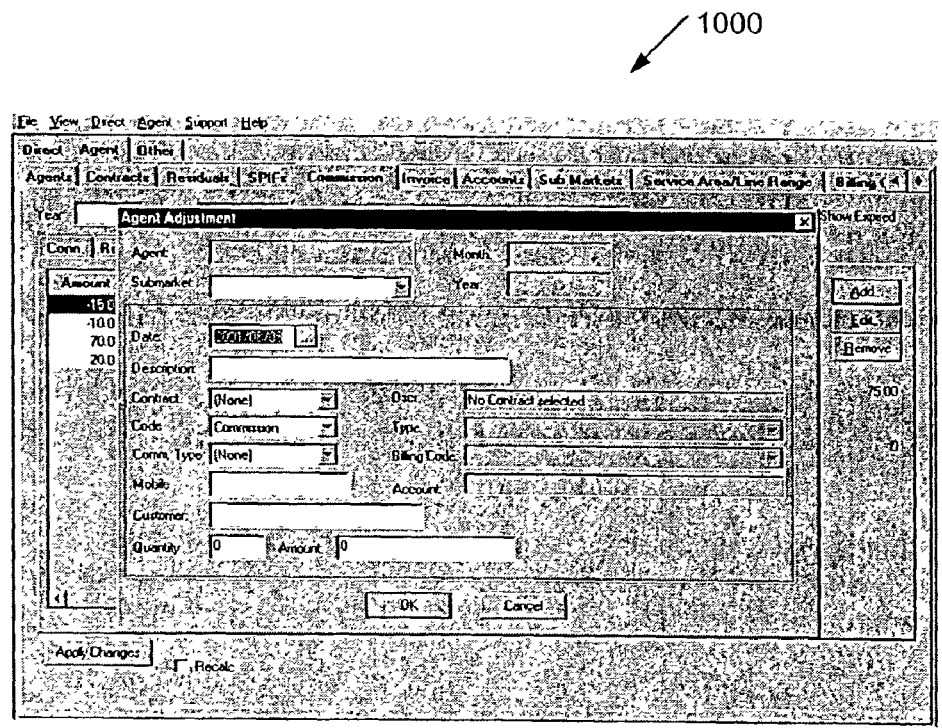

FIG. 90 illustrates one embodiment of one example of an "Agent Adjustments" sub-tab dialog screen 1000. The columns displayed reflect the data entered on the "Agent Adjustment" dialog screen 1000. The field descriptions associated with the "Agent Adjustment" dialog screen 1000 are:

1. "Agent"—The agent code.

2. "Submarket"—Use the drop-down list to select the submarket associated with this adjustment.

3. "Month"—The processing month.

4. "Year"—The processing year.

5. "Date"—Use the calendar to select the adjustment effective date.

6. "Description"—Enter a description of the adjustment.

7. "Contract"—Use the drop-down list to select the contract associated with the adjustment. The commission management system displays the contract expiration date in parentheses following the contract name.

8. "Dscr"—The description of the selected contract.

9. "Code"—Use the drop-down list to select the adjustment code.

10. "Type"—Use the drop-down list to select the type of adjustment for the selected adjustment Code. This field is invalid unless a Contract is specified.

11. "Comm. Type"—Use the drop-down list to select the commission type.

12. "Billing Code"—Use the drop-down list to select the billing code within the selected Contract. The commission management system displays the contract billing code expiration date in parentheses following the billing code description. This field is invalid unless a Contract is specified.

13. "Mobile"—Enter the mobile number.

14. "Account"—The account code associated with the selected Contract and Comm. Type.

15. "Customer"—Enter the customer name.

16. "Quantity"—Enter the adjustment quantity. This allows the user to enter "bulk" adjustments.

17. "Amount"—Enter the amount of the adjustment. This field is invalid unless (None) is selected as the Contract.

Figure 91:
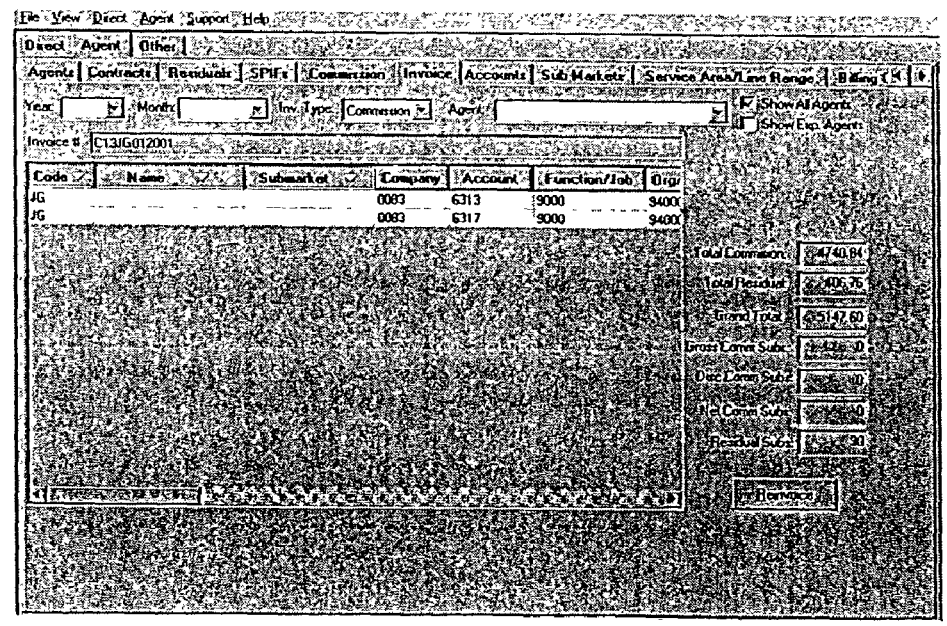
FIG. 91 illustrates one example of a screen associated with a portion of a software module feature according to one embodiment of the present invention.

FIG. 91 illustrates one embodiment of one example of a screen associated with the "Invoice" tab portion of the commission management system's Agent Module feature. The "Invoice" tab screen 1010 provides an online view of each agent's invoice. The field descriptions associated with the "Invoice" tab screen 1010 are:

1. "Year"—Use the drop-down list to select the year. This defaults to the current processing year.

2. "Month"—Use the drop-down list to select the month. This defaults to the current processing month.

3. "Inv. Type"—Use the drop-down list to select the type of invoice (e.g., Commission vs. Residual).

4. "Agent"—Use the drop-down list to select the agent.

5. "Show All Agents"—Click to list all agents, regardless of Commission Specialist, in the drop-down Agent list.

6. "Show Exp. Agents"—Click to list only expired agents in the drop-down Agent list.

7. "Invoice #"—The invoice number.

8. "Code"—The agent code.

9. "Name"—The agent name.

10. "Submarket"—Each submarket identified for the agent.

11. "Company"—The company code, defined on the Submarkets tab.

12. "Account"—The account code, defined on the Accounts tab.

13. "Function/Job"—The function/job code, defined on the Submarkets tab.

14. "Org/Dept"—The organization/department code, defined on the Submarkets tab.

15. "Line Of Business"—The line of business code, defined on the Accounts tab.

16. "Sub Proj"—The sub-project code, defined on the Accounts tab.

17. "Amount"—The invoice amount.

18. "Total Commission"—The total invoice amount for commission payment.

19. "Total Residual"—The total invoice amount for residual payment.

20. "Grand Total"—The grand total invoice amount.

21. "Gross Comm Subs"—The gross sub count for commission.

22. "Disc Comm Subs"—The disconnect sub count for commission.

23. "Net Comm Subs"—The net sub count for commission.

24. "Residual Subs"—The sub count for residuals.

25. "Reinvoice"—Click to reinvoice the specified month's data for the agent. Any changes made to accounts and/or accounting codes will be applied to the agent's invoice and accounting report. Click Refresh from the View menu in the toolbar or press F5 to see the updates online.

Figure 92:
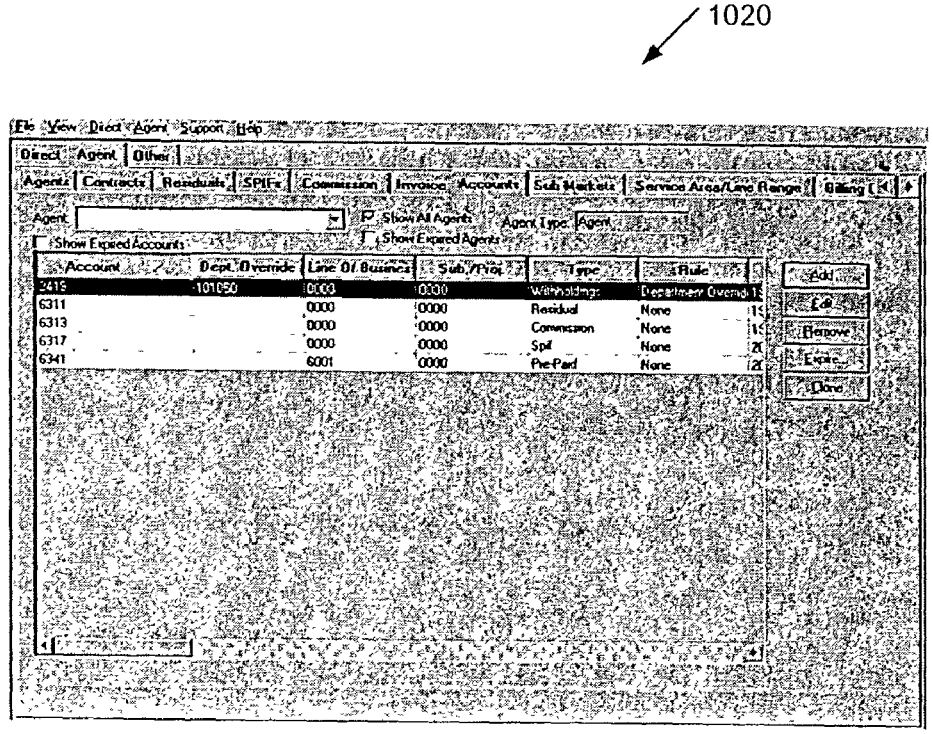
FIGS. 92 to 94 illustrate various example screens associated with a portion of a software module feature according to one embodiment of the present invention.
Figure 93:
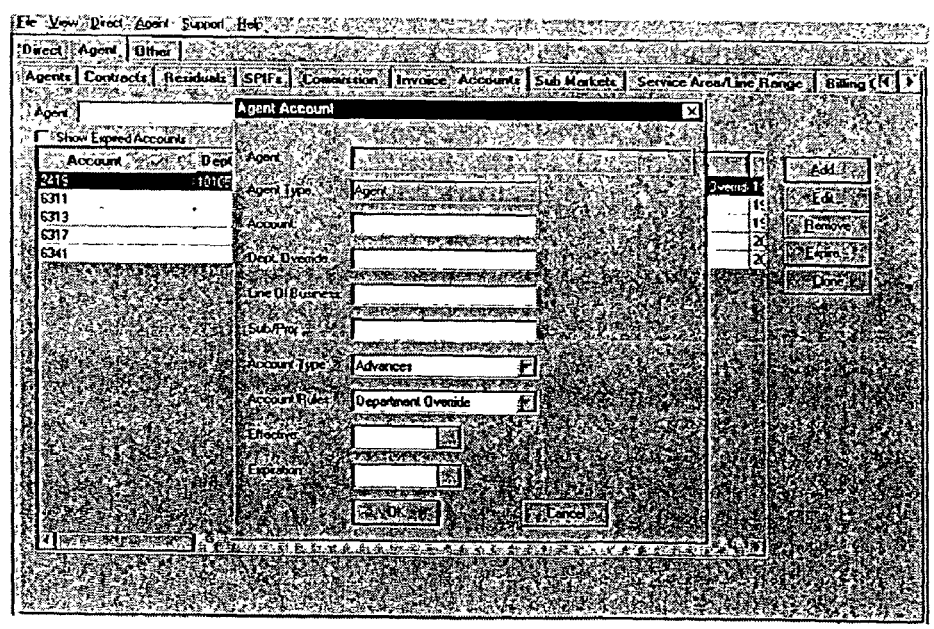
Figure 94:
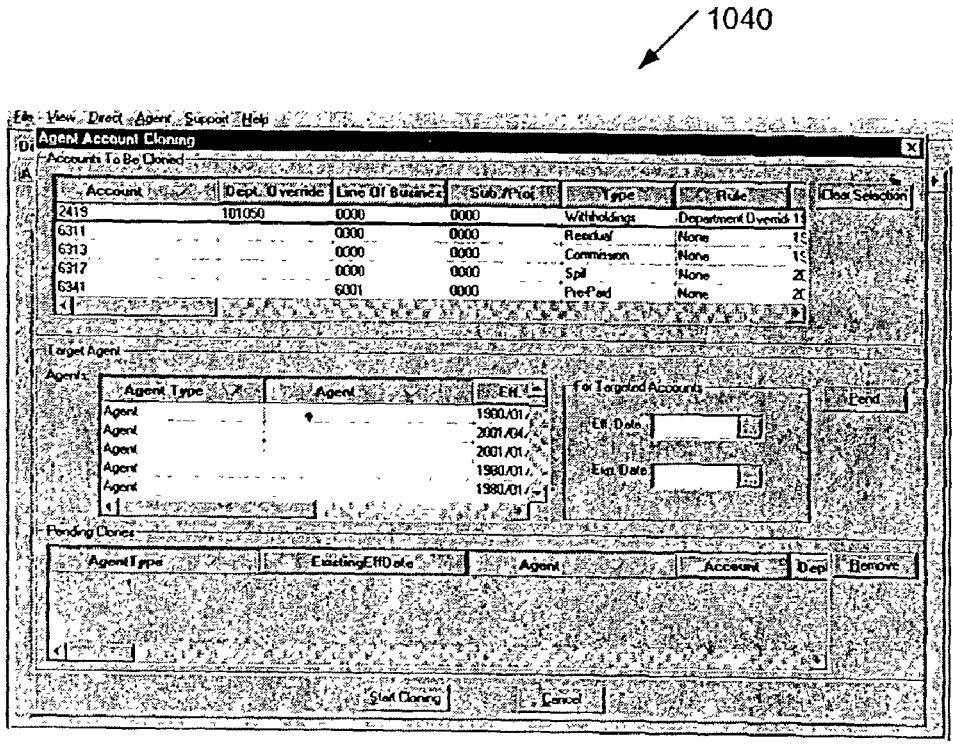

FIGS. 92 to 94 illustrate various example screens associated with the "Accounts" tab portion of the commission management system's Agent Module feature. It is to be understood that such example screens are provided for illustrative purposes only and, therefore, the present invention should not be limited thereby. Turning now to FIG. 92 where one embodiment of one example of an "Accounts" tab screen 1020 is illustrated. The Accounts tab defines the accounting codes required by Oracle for agent payment processing. The user can use the Agent drop-down list to select the agent code. The commission management system populates the Agent Type based on the selection. Initially, this tab lists active accounts for those active agents in the specified location for which the user is identified as the Commission Specialist. The user can Click Show All Agents to list all agents in the specified-location, regardless of Commission Specialist. The user can Click Show Expired Agents to list only expired agents in the specified location. The user can Click Show Expired Accounts to list only expired accounts for the specified agent.

FIG. 93 illustrates one embodiment of one example of an "Agent Account" dialog screen 1030 that defines each account for the selected agent. The field definitions associated with the "Agent Account" dialog screen 1030 are:

1. "Agent"—The agent code and name.
2. "Agent Type"—The agent type.
3. "Account"—Enter the account code.
4. "Dept. Override"—Enter the department override code. This code will override the Org. Dept. code loaded on the Sub Markets tab.
5. "Line Of Business"—Enter the line of business code.
6. "Sub/Proj"—Enter the sub-project code.
7. "Account Type"—Use the drop-down list to select the type of account.
8. "Account Rules"—Use the drop-down list to select a unique account rule. The only current choice indicates that Department Override applies to this account.
9. "Effective"—Use the calendar to select the date this account becomes effective in the commission management system.
10. "Expiration"—Use the calendar to select the date this account expires from the commission management system.

FIG. 94 illustrates one embodiment of one example of an "Agent Account Cloning" dialog screen 1040 that is accessed by clicking the Clone function button on the Accounts tab. This function copies account data from the "source" to a "target." The target agent, however, must already exist. The field definitions associated with the "Agent Account Cloning" dialog screen 1040 are:

1. "Accounts To Be Cloned"—the commission management system lists all accounts defined in the system for the selected agent. Highlight a line to select the account(s) to be cloned from this list. Use the Ctrl key to select multiple accounts; use the Shift key to select a block of accounts. Click on the Clear Selection button to clear the selections and start over.

| Account | The account name. |
|---|---|
| Dept. Override | The department override code. |
| Line Of Business | The line of business code. |
| Sub./Proj. | The sub-project code. |
| Type | The account type. |
| Rule | The account rule. |
| Eff. Date | The account effective date. |
| Exp. Date | The account expiration date. |
| Mod. User | The last user to modify the account. |
| Mod. Date | The last date the account was modified. |

2. "Target Agent"—Select the agent(s) to which the "source" account(s) should be copied.

| Agents | Highlight the target agent(s). Use the Ctrl key to select multiple agents; use the Shift key to select a block of agents. |
|---|---|

3. "For Targeted Accounts"

| Eff. Date | Use the calendar to select the date the account is effective for the target agent. |
|---|---|
| Exp. Date | Use the calendar to select the date the account expires for the target agent. |

4. "Pend"—Click this function key to create a "pended" clone job based on the defined parameters.

5. "Pending Clones"—Allows the user to review the accounts to be copied before initiating the cloning process. To delete an account from this list, highlight that line and click Remove.

| Agent Type | The target agent type. |
|---|---|
| ExistingEffDate | The existing account effective date. |
| Agent | The target agent code. |
| Account | The account code. |
| Dept. Override | The department override code. |
| Line Of Business | The line of business code. |
| Sub./Proj. | The sub-project code. |
| Account Type | The account type code. |
| Account Rule | The account rule. |
| Eff. Date | The target account effective date. |
| Exp. Date | The target account expiration date. |

6. "Start Cloning"—Click this function key to begin the cloning process.

Figure 95:
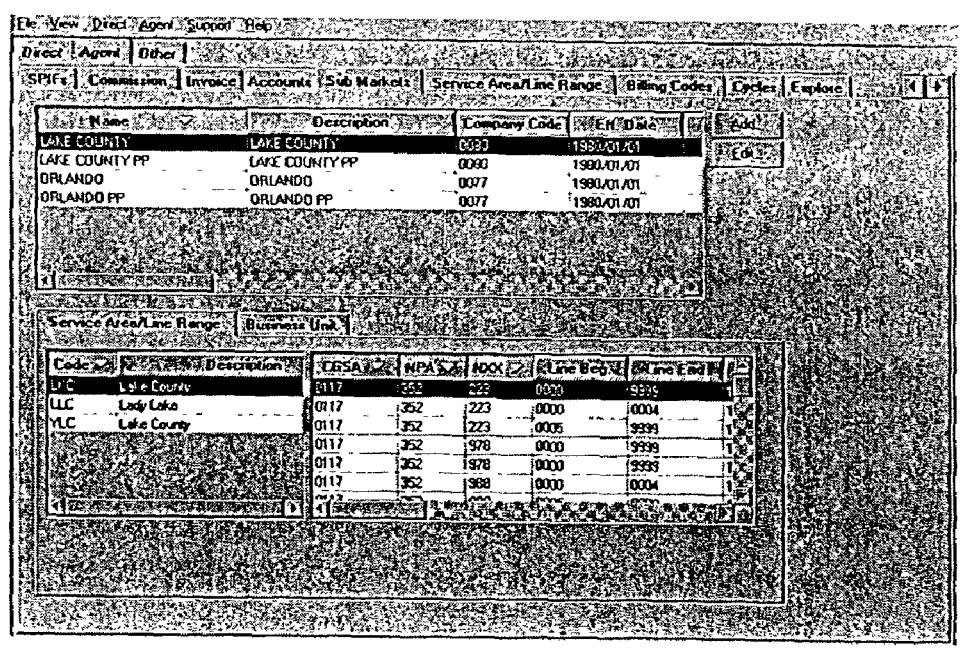

FIGS. 95 to 100 illustrate various example screens associated with the "Sub Markets" tab portion of the commission management system's Agent Module feature. It is to be understood that such example screens are provided for illustrative purposes only and, therefore, the present invention should not be limited thereby. Turning now to FIG. 95 where one embodiment of one example of a "Sub Markets" tab screen 1050 is illustrated. The Sub Markets tab defines all submarkets within the specified location, and identifies the service area/line range combinations and business units for each.

Figure 96:
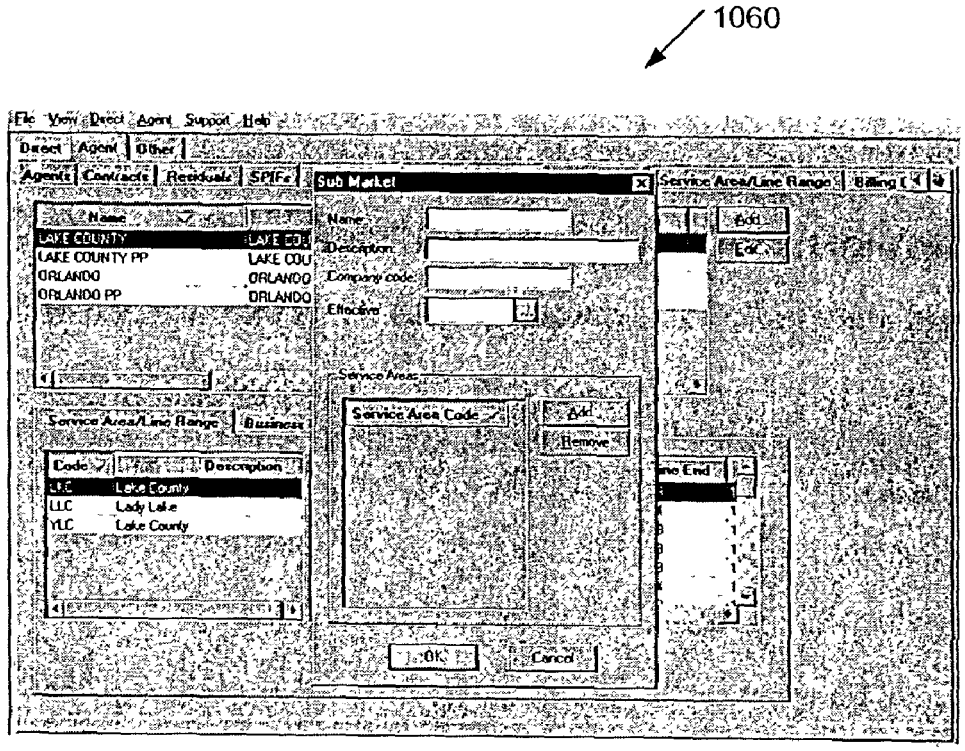

FIG. 96 illustrates one embodiment of one example of a "Sub Market" dialog screen 1060 that defines each unique company code to be expensed. The field definitions associated with the "Sub Market" dialog screen 1060 are:
1. "Name"—Enter the name of the submarket.
2. "Description"—Enter a description of the submarket.
3. "Company code"—Enter the company code for the submarket.
4. "Effective"—Use the calendar to select the date the submarket is effective in the commission management system.
5. "Service Areas"—The service area codes defined for the submarket.

Figure 97:
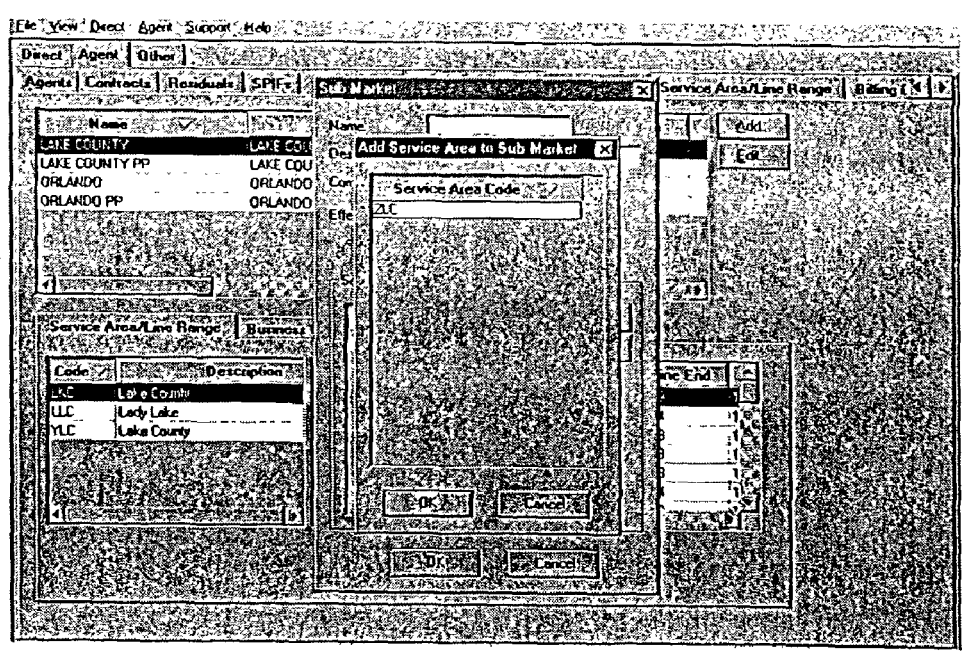

FIG. 97 illustrates one embodiment of one example of an "Add Service Area to Sub Market" dialog screen 1070 that is accessed by clicking the Add function button beside the Service Areas display on the Sub Market dialog. The field definition associated with the "Add Service Area to Sub Market" dialog screen 1070 is:
1. "Service Area Code"—The commission management system displays all service area codes for the specified location not already associated with a submarket. Highlight a line to select the service area code(s) to be added. Use the Ctrl key to select multiple codes and use the Shift key to select a block of codes.

Figures 98, 99:
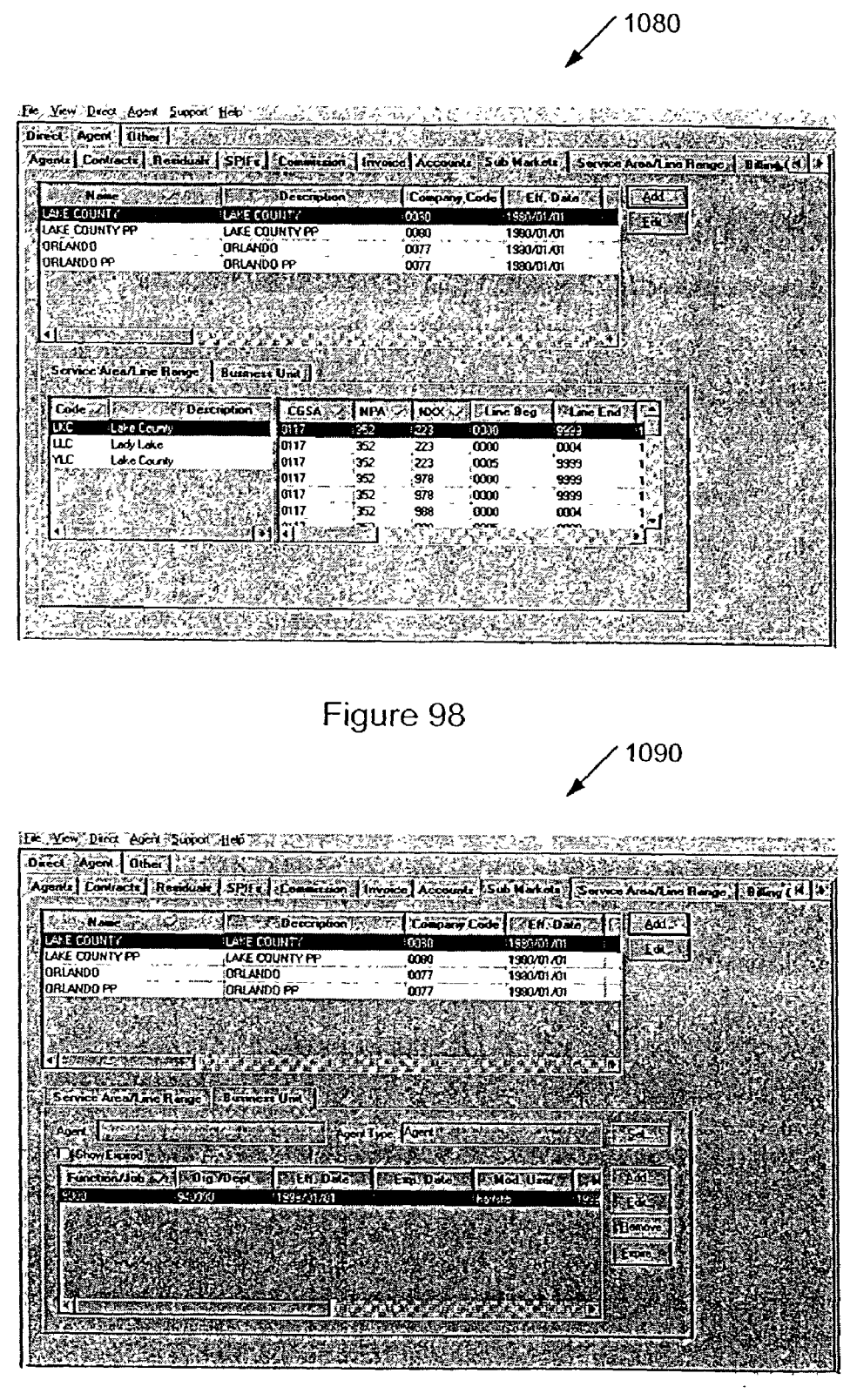

FIG. 98 illustrates one embodiment of one example of a "Service Area/Line Range" sub-tab screen 1080 that displays the service area codes associated with the selected submarket, and the line ranges for each. The field definitions for the "Service Area/Line Range" sub-tab screen 1080 are:
1. "Code"—The service area code.
2. "Description"—The service area description.
3. "CGSA"—The Cellular Geographical Service Area code.
4. "NPA"—The NPA.
5. "NXX"—The NXX.
6. "Line Beg."—The beginning line number in the range.
7. "Line End"—The ending line number in the range.
8. "Eff. Date"—The line range effective date.
9. "Exp. Date"—The line range expiration date.

FIG. 99 illustrates one embodiment of one example of a "Business Unit" sub-tab screen 1090 that defines function/job codes and organization/department codes, by agent, for each submarket. The user can use the Set button to select the agent. The commission management system displays the Agent Type based on the selection. Initially, this tab lists active business units for the specified agent. The user can click Show Expired to list only expired business units for this agent.

Figures 100, 101:
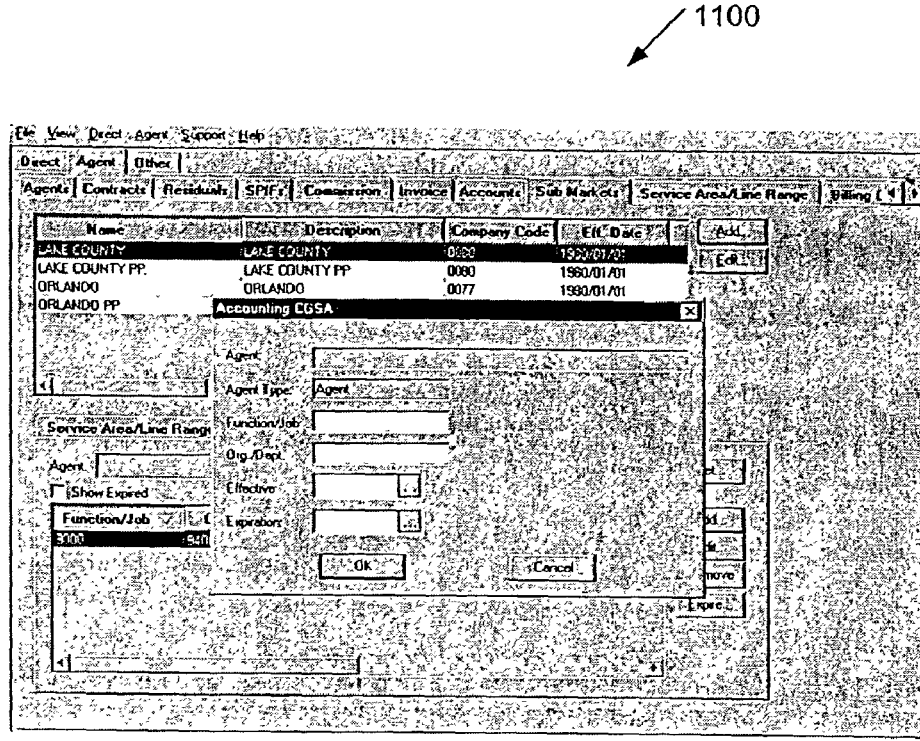

FIG. 100 illustrates one embodiment of one example of an "Accounting CGSA" dialog screen 1100 that is accessed by clicking the Add function button on the Business Unit sub-tab. The field definitions associated with the "Accounting CGSA" dialog screen 1100 are:
1. "Agent"—The agent code and name.
2. "Agent Type"—The agent type.
3. "Function/Job"—Enter the accounting function/job code.
4. "Org./Dept."—Enter the accounting organization/department code.
5. "Effective"—Enter the date these codes are effective for this agent.
6. "Expiration"—Enter the date these codes expire for this agent.

FIG. 101 illustrates one embodiment of one example of a "Service Area/Line Range" tab screen 1110 that displays the service area codes for the specified location and the line ranges associated with each. The filed descriptions of the "Service Area/Line Range" tab screen 1110 are:
1. "Code"—The service area code.
2. "Description"—The service area description.
3. "CGSA"—The Cellular Geographical Service Area code.
4. "NPA"—The NPA.
5. "NXX"—The NXX.
6. "Line Beg."—The beginning line number in the range.
7. "Line End"—The ending line number in the range.
8. "Eff. Date"—The line range effective date.
9. "Exp. Date"—The line range expiration date.

Figure 102:
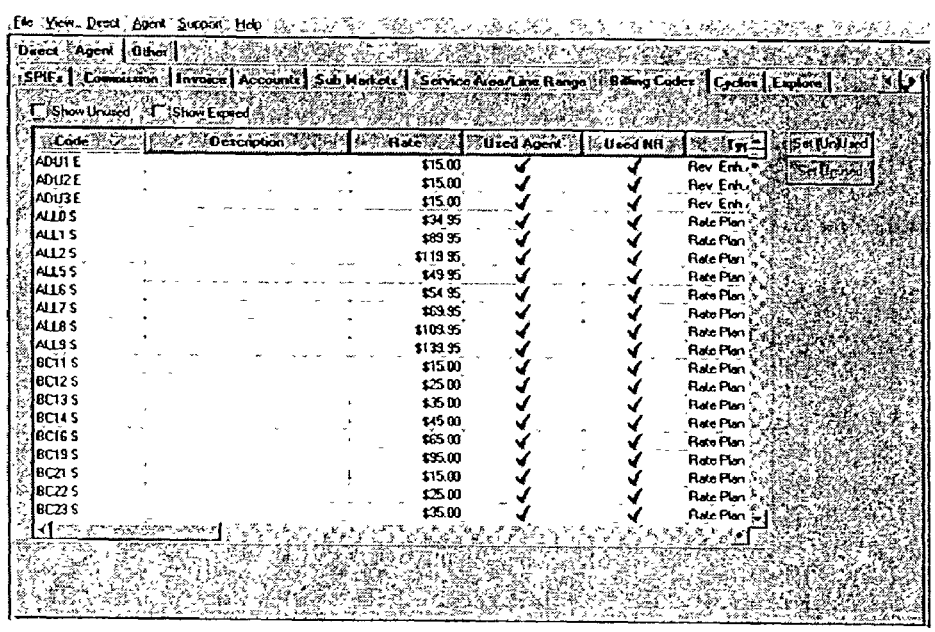
FIGS. 102 to 103 illustrate various example screens associated with a portion of a software module feature according to one embodiment of the present invention.
Figure 103:
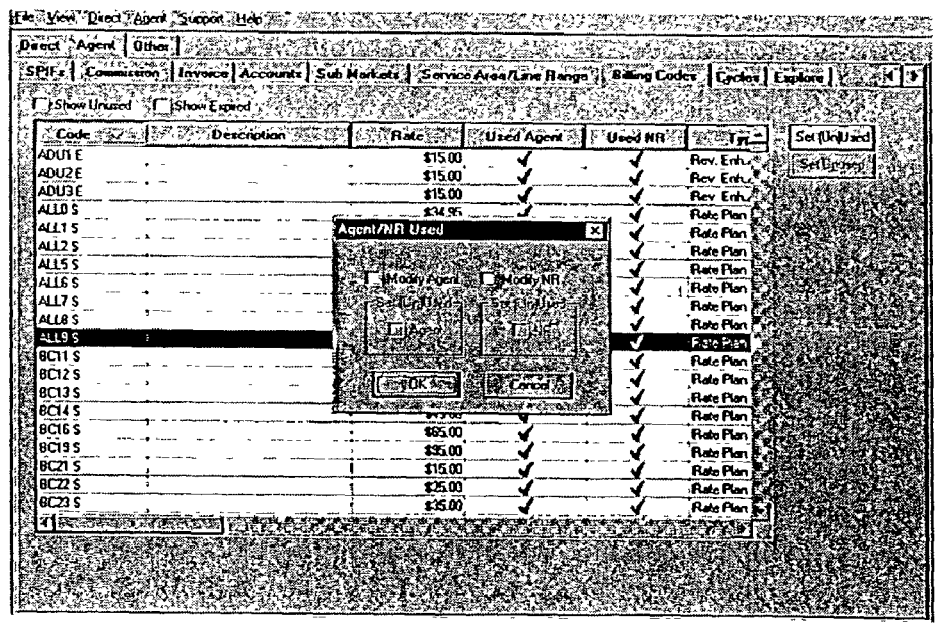

FIGS. 102 to 103 illustrate various example screens associated with the "Billing Codes" tab portion of the commission management system's Agent Module feature. It is to be understood that such example screens are provided for illustrative purposes only and, therefore, the present invention should not be limited thereby. Turning now to FIG. 102 where one embodiment of one example of a "Billing Codes" tab screen 1120 is illustrated. The Billing Codes tab lists all billing transaction codes and identifies those considered commissionable. Codes flagged as "used" are considered commissionable, and are included in the extract from the billing system(s). Initially, this tab lists those active billing codes in the specified location marked as "used" for agent or national retailer agent types. (Note that, depending on the permissions assigned to the user's specific security ID, the user may only have access to one or the other.) The user can click Show Unused to list all unused billing codes in this location and click Show Expired to list only expired billing codes in this location. The field descriptions associated with the "Billing Codes" tab screen 1120 are:
1. "Code"—The billing code defined in the billing system(s).
2. "Description"—The billing code description.
3. "Rate"—The rate charged for the billing code as defined in the billing system(s).
4. "Used Agent"—Flag to indicate that the billing code is commissionable for non-national retailer agents (e.g., it is "used" in the agent's compensation calculation).
5. "Used NR"—Flag to indicate that the billing code is commissionable for national retailer agents (e.g., it is "used" in the agent's compensation calculation).
6. "Type"—The component type into which the commission management system groups the billing code for compensation calculation.
7. "Internal Code"—The internal billing code defined M the billing system(s).
8. "Eff. Date"—The date the billing code was effective in the billing system(s).
9. "Exp. Date"—The date the billing code is no longer effective in the billing system(s).
10. "Function Buttons Set (Un) Used"—Click to set or clear the "used" flag on a billing code.

FIG. 103 illustrates one embodiment of one example of an "Agent/NR Used" dialog screen 1130 that is accessed by clicking the Set (Un)Used function button on the Billing Codes tab if the user's specific security ID gives the user access to both national retailer and non-national retailer agent codes. The field definitions associated with the "Agent/NR Used" dialog screen 1130 are:
1. "Modify Agent"—Click to change the Used Agent flag.
2. "Set (Un)Used Agent"—Click to turn the agent flag "on" (e.g., set it to "used"); leave blank to turn the agent flag "off" (e.g., set it to un-"used").
3. "Modify NR"—Click to change the Used NR flag.

4. "Set (Un)Used NR"—Click to turn the national retailer flag "on" (e.g., set it to "used"); leave blank to turn the national retailer flag "off" (e.g., set it to un-"used").

Figures 104, 105:
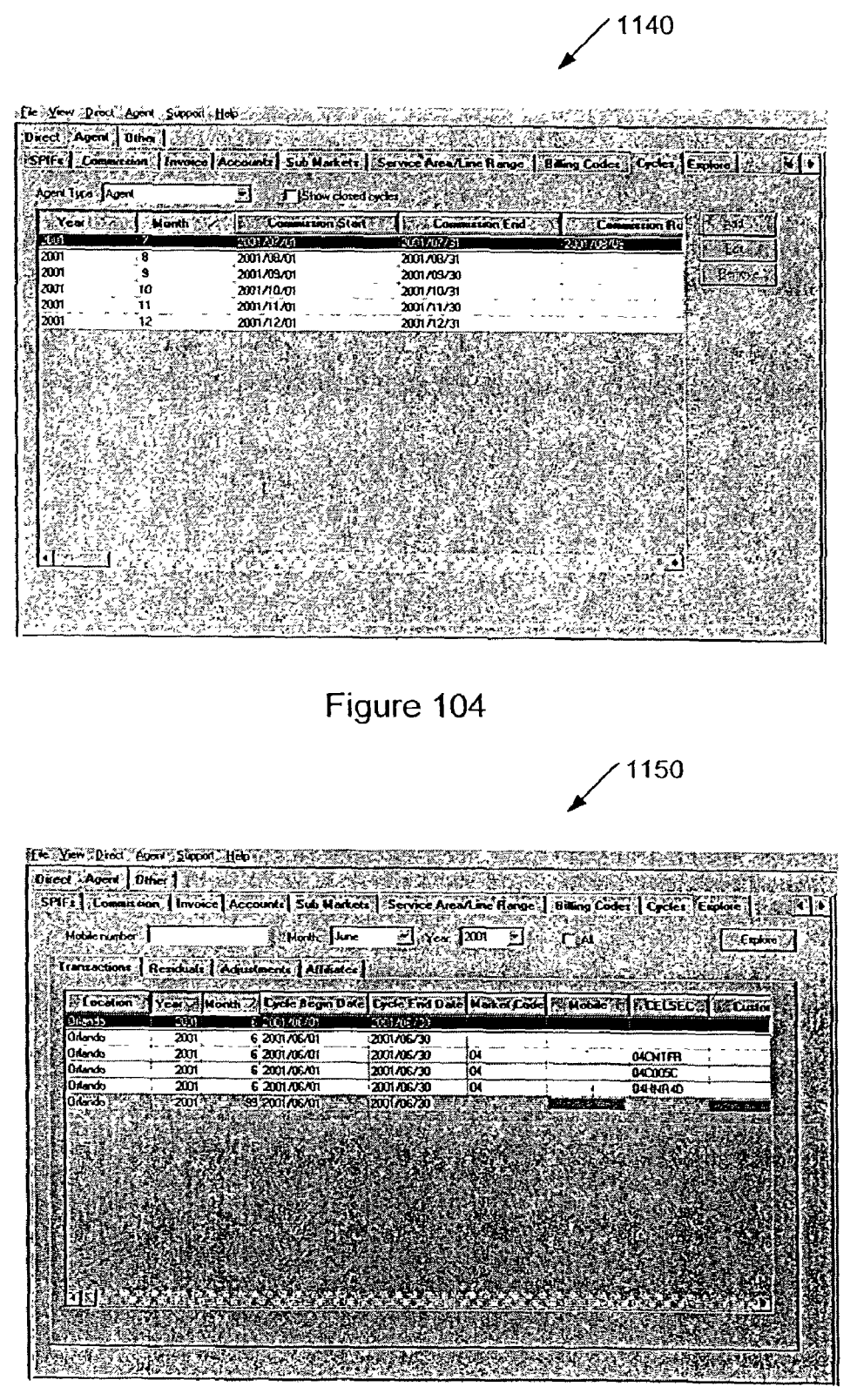

FIG. 104 illustrates one embodiment of one example of a "Cycles" tab screen 1140 that displays the commission, residual and average revenue cycles for the specified location. The user can use the Agent Type drop-down list to select Agent or National Retailer. Initially, this tab lists the open cycles remaining in the current year. The user can click Show closed cycles to list all cycles, both open and closed. The field definitions associated with the "Cycles" tab screen 1140 are:

1. "Year"—The cycle year.
2. "Month"—The cycle month.
3. "Commission Start"—The beginning date of the commission cycle.
4. "Commission End"—The ending date of the commission cycle.
5. "Commission Run"—The date this commission cycle was run.
6. "Residual Start"—The beginning date of the residual cycle.
7. "Residual End"—The ending date of the residual cycle.
8. "Residual Run"—The date this residual cycle was run.
9. "Avg. Rev. Start"—The beginning date of the average revenue cycle.
10. "Avg. Rev. End"—The ending date of the average revenue cycle.
11. "Avg. Rev. Run"—The date this average revenue cycle was run.
12. "Acct. Date"—The accounting date (e.g., the date by which agent data must be submitted to the Accounting department).
13. "Close Date"—The date this cycle was closed (e.g., the actual submission date to the Accounting department).
14. "Mod. User"—The username of the last user to modify the cycle.
15. "Mod. Date"—The date of the last cycle modification.

FIGS. 105 to 109 illustrate various example screens associated with the "Explore" tab portion of the commission management system's Agent Module feature. It is to be understood that such example screens are provided for illustrative purposes only and, therefore, the present invention should not be limited thereby. Turning now to FIG. 105 where one embodiment of one example of an "Explore" tab screen 1150 is illustrated. The Explore tab provides a search tool that displays detailed information about all transactions associated with a particular mobile number. Commission data displays on the Transactions sub-tab. Residual data displays on the Residuals sub-tab. Any transactions entered by the user display on the Adjustments sub-tab. Affiliate transactions display on the Affiliates sub-tab. The field definitions associated with the are:

1. "Mobile number"—The mobile number the user is searching for.
2. "Month"—Use the drop-down box to select the month the user wants to search in.
3. "Year"—Use the drop-down box to select the year the user wants to search in.
4. "All"—Click to search in all months and years for the mobile number.
5. "Function button: Explore"—Click to initiate the search.

Figures 106, 107:
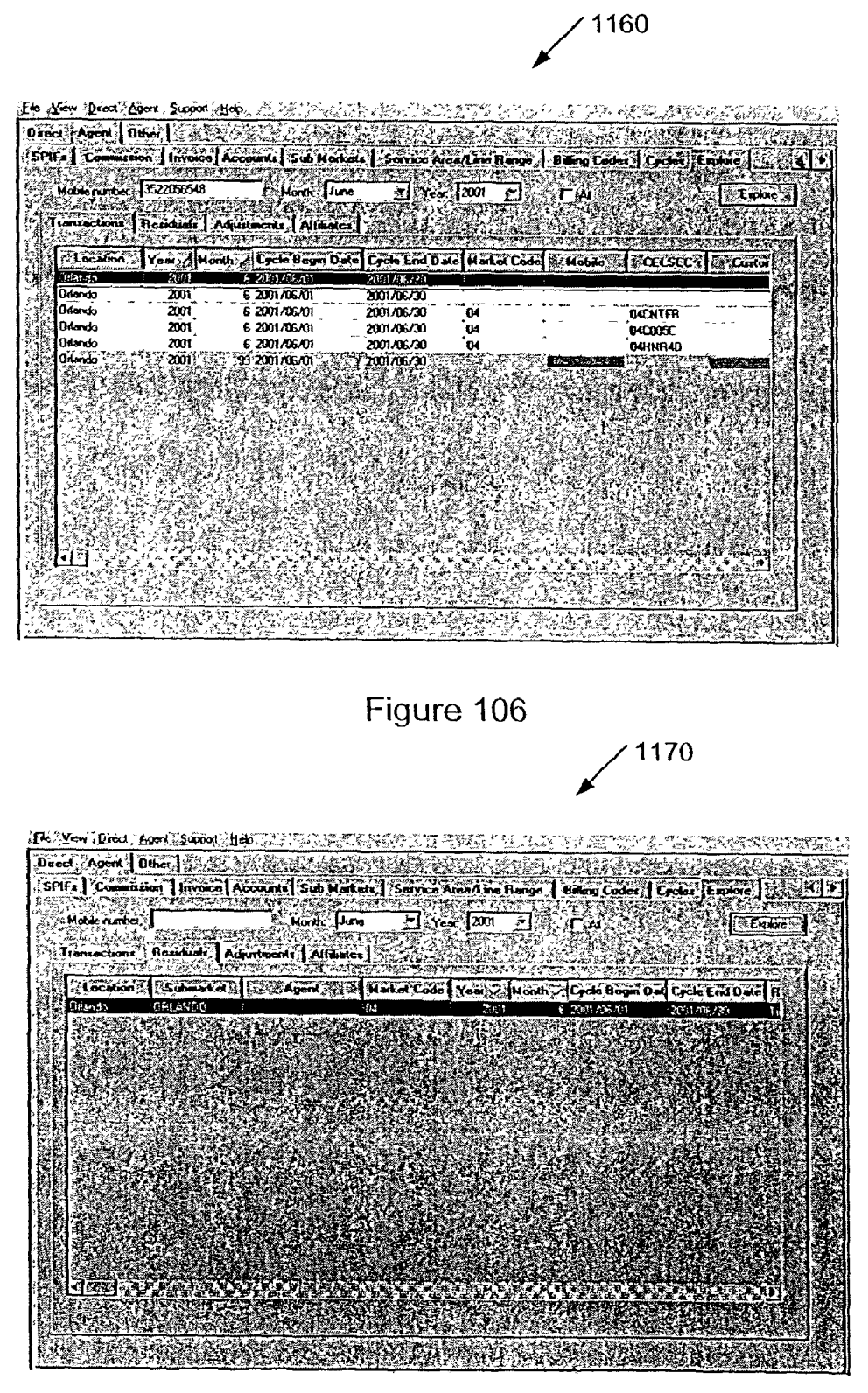

FIG. 106 illustrates one embodiment of one example of a "Transactions" sub-tab screen 1160. Commission data from the CARE and TELEGANCE systems displays on the Transactions sub-tab. The field definitions for the "Transactions" sub-tab screen 1160 are:

1. "Location"—The location name.
2. "Year"—The year.
3. "Month"—The month.
4. "Cycle Begin Date"—The beginning date of the cycle the transaction pulled in.
5. "Cycle End Date"—The ending date of the cycle the transaction pulled in.
6. "Market Code"—The commission market code.
7. "Mobile"—The mobile number.
8. "CELSEC"—The billing code, prefaced by the market code.
9. "Customer Name"—The customer name.
10. "Contract Name"—The name of the contract the transaction mapped to.
11. "Mnemonic"—The mnemonic code.
12. "ESN"—The ESN.
13. "Account Status"—The status of the account. If active, this will display blank.
14. "Air Charge"—The air charge.
15. "New Mobile"—The new mobile number.
16. "ISD"—The initial service date.
17. "RCD"—The reconnect date.
18. "DCD"—The disconnect date.
19. "EFD"—The effective final date.
20. "SCD"—The status change date. Not currently populated.
21. "SYS ISD"—The system initial service date.
22. "SYS RCD"—The system reconnect date.
23. "SYS DCD"—The system disconnect date.
24. "SYS EFD"—The system effective final date.
25. "Agnt"—The mobile-level agent code.
26. "Terminate Code"—The terminate code. This is used to determine no-installs.
27. "Radioshack Code"—This code is no longer used by the commission management system.
28. "Store"—The store code.
29. "ENO"—The mobile-level employee ID.
30. "BCAgt"—The billing code-level agent code.
31. "BCISD"—The billing code-level initial service date.
32. "BCSYS"—The billing code-level system date.
33. "BCSYSHDC"—The billing code-level system history connect date.
34. "BCSYSHDCD"—The billing code-level system history disconnect date.
35. "CS Flag"—The contract service flag.
36. "IsAcc"—"Is Accepted" indicator, Yes or No.
37. "Action Type"—The action type.
38. "ActionDate"—The action date.
39. "Agnt Key"—The internal agent key.
40. "Submarket"—The submarket name.
41. "Billing Code"—The billing code.
42. "Billing Code Dscr"—The billing code description.
43. "Agent Contract"—The agent contract key.
44. "IsNoInstall"—"No-install" indicator, Yes or No.
45. "IsNoInstallAcc"—"No-install Accepted" indicator, Yes or No.
46. "IsSub"—"Is Sub" indicator, Yes or No.
47. "Value"—The commission value.
48. "NoInstallValue"—The no-install value.
49. "Sim Serial"—The Subscriber Identity Module serial code.
50. "IMEI"—The International Mobile Equipment Identity code.
51. "Mod. User"—The username of the last person to modify the transaction.
52. "Mod. Date"—The date the transaction was last modified.

FIG. 107 illustrates one embodiment of one example a "Residuals" sub-tab screen 1170. Residual data displays on the Residuals sub-tab. The field definitions for the are:
1. "Location"—The location name.
2. "Submarket"—The submarket name.
3. "Agent"—The agent name.
4. "Market Code"—The residual market code.
5. "Year"—The year.
6. "Month"—The month.
7. "Cycle Begin Date"—The beginning date of the cycle the mobile pulled in.
8. "Cycle End Date"—The ending date of the cycle the mobile pulled in.
9. "Residual Name"—The residual contract name.
10. "Residual %"—The residual percent.
11. "Mobile"—The mobile number.
12. "ISD"—The initial service date.
13. "Bill Month"—The billing month.
14. "Access"—The access charge.
15. "Access Pro"—The access pro-rations charge.
16. "1 Time Charge"—One-time charges.
17. "Other Charge"—Other charges.
18. "Feature"—The feature charge.
19. "Feature OCC RTA"—Feature OCC's (other charges/credits) or RTA's (real time adjustments).
20. "BSLD Charge"—BellSouth long distance charges.
21. "BSLD OCCRTA"—BellSouth long distance OCC's (other charges/credits) or RTA's (real time adjustments)
22. "Air Charge"—The air charge.
23. "Air OCC RTA"—Air OCC's (other charges/credits) or RTA's (real time adjustments).
24. "Air With Plan"—The air with plan Charge.
25. "Total Charges"—The total of all charges for the mobile.
26. "Acquired AgtKey"—The internal agent key or acquired agent key.

Figure 108:
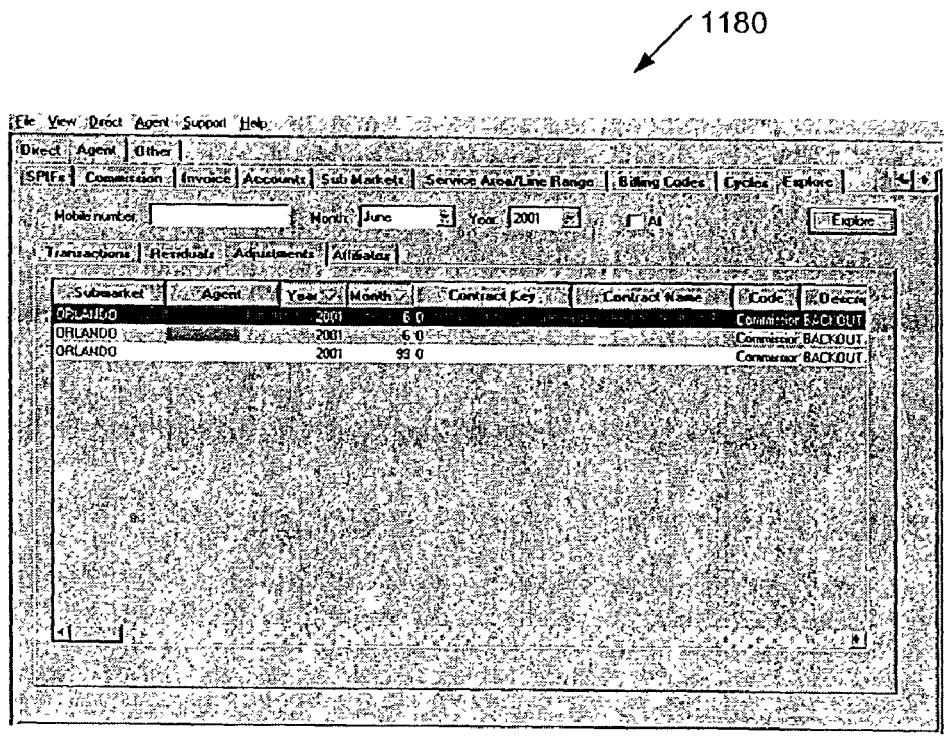

FIG. 108 illustrates one embodiment of one example of an "Adjustments" sub-tab screen 1180. Manual adjustments entered by the Commission Specialist display on the Adjustments sub-tab. Field definitions for the "Adjustments" sub-tab screen 1180 are:
1. "Submarket"—The submarket name.
2. "Agent"—The agent name.
3. "Year"—The year.
4. "Month"—The month.
5. "Contract Key"—The internal contract key.
6. "Contract Name"—The contract name.
7. "Code"—The adjustment code.
8. "Description"—The adjustment description.
9. "Type"—The adjustment type.
10. "Commission Type"—The transaction type.
11. "Account"—The account code.
12. "Mobile"—The mobile number.
13. "Customer Name"—The customer name.
14. "Adj. Date"—The adjustment effective date.
15. "Quantity"—The adjustment quantity.
16. "Amount"—The amount of the adjustment.
17. "Total"—The total value of the adjustment.
18. "Billing Code"—The billing code.
19. "Billing Code Dscr"—The billing code description.
20. "Mod. User"—The username of the last person to modify the transaction.
21. "Mod. Date"—The date the transaction was last modified.

Figure 109:
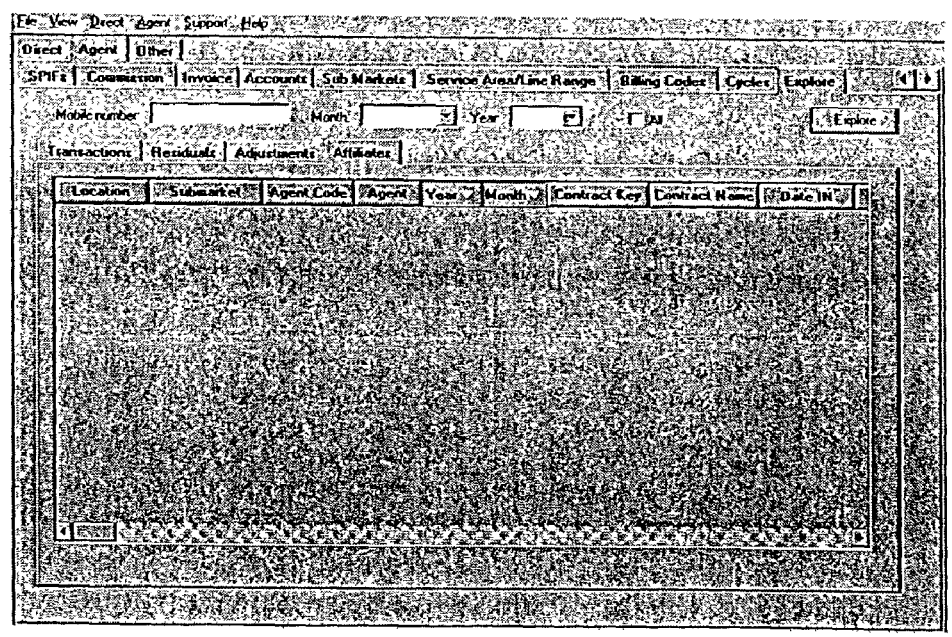

FIG. 109 illustrates one embodiment of one example of an "Affiliates" sub-tab screen 1190. Affiliate sales display on the Affiliates sub-tab. The field definitions for the "Affiliates" sub-tab screen 1190 are:
1. "Location"—The location name.
2. "Submarket"—The submarket name.
3. "Agent Code"—The agent code.
4. "Agent"—The agent name.
5. "Year"—The year.
6. "Month"—The month.
7. "Contract Key"—The internal contract key.
8. "Contract Name"—The contract name.
9. "Date IN"—The incoming service order date.
10. "Date OUT"—The outgoing service order date.
11. "Svc Code"—The affiliate service code.
12. "Svc ID"—The affiliate service ID.
13. "Company Code"—The affiliate company code.
14. "Account"—The affiliate account number.
15. "Billing Code"—The billing code.
16. "Billing Code Type"—The type of billing code.
17. "Billing Code Dscr"—The billing code description.
18. "BC Key"—The internal billing code key.
19. "Quantity"—The quantity on this transaction.
20. "Commission"—The commission amount.
21. "IsAcc"—"Is Accepted" indicator, Yes or No.
22. "Value"—The commission value.
23. "Action Type"—The action type.
24. "IsSub"—"Is Sub" indicator, Yes or No.
25. "Mod. User"—The username of the last person to modify the transaction.
26. "Mod. Date"—The date the transaction was last modified.

Having discussed one embodiment of the present invention with respect to the Agent Module screen descriptions, one embodiment of the present invention with respect to various procedures will now be described. There are five separate functional procedures in the Agent Module that are available to a user of the Agent Module portion of the commission management system in accordance with one embodiment of the present invention. The separate five functional procedures are the "Accounting," "Commission Processing," "Explore," "Residual Processing," and "Table Maintenance" procedures.

The separate procedures section is divided into several functional sub-sections. The "Accounting" procedure describes how to submit the user's agents' commission and residual information to Accounting. The "Commission Processing" procedure describes how to reconcile the user's agents' sales each month. The "Explore" procedure describes how to use this tool to investigate transactions. The "Residual Processing" procedure describes how to process the user's agents' residuals. The "Table Maintenance" procedure describes how to set up and maintain the tables that drive the commission management system.

A user can follow these Accounting procedures to submit the user's agents' commission and residual information to Payroll:
1. Click Accounting from the Agent menu on the toolbar.
2. Select Agent vs. National Retailer.
3. Click Preview to review the accounting report online and/or to generate a hard copy of the report for signatures.
4. If the user detects commission payment errors, correct and recalculate the agent(s) in question; if the user detects accounting code errors, correct the code(s) and re-invoice the agent(s) in question. Repeat these procedures.

5. Click Submit when all commission and residual information is accurate. The commission management system generates a file and transmits it to the Accounting department for processing.

A user can follow these Commission Processing procedures each month as the user reconciles the user's agents' sales:
1. Click on the Commission tab.
2. Use the drop-down boxes to select the Year and Month the user is processing. The system defaults to the current processing year and month.
3. Select the Agent the user is processing from the drop-down box.
NOTE: The user can "fast-track" to a specific agent from the Agents tab by right-clicking the mouse and highlighting Go To Commission Tab. Reverse this by right-clicking the mouse on the Commission tab and highlighting Go to Agent Tab.
4. To approve or reject transactions for payment, click in the Accept column to set or remove the check mark. Different transaction types are displayed on different sub-tabs (e.g., connects, disconnects, feature adds, etc.).
5. Make manual adjustments on the Adjustments sub-tab.
6. Click the Recalc box, then click Apply Changes to recalculate the agent's commission, incorporating changes the user has made.

A user can use this Explore troubleshooting tool to determine the data the commission management system received from its source systems, and how it mapped that data:
1. Click on the Explore tab. The user can also access Explore from the Agent menu on the toolbar by clicking Tools then Explore, or by simply pressing F8.
2. Enter the Mobile number the user is searching for.
NOTE: The user can "fast-track" to Explore a specific mobile from the Commission tab by highlighting that mobile, then right-clicking the mouse and clicking Explore.
3. Use the drop-down boxes to select the Month and Year the user is searching in, or click All to search all months and years. The system defaults to the current processing year and month.
4. Click Explore.

A user can use the monthly Residual Processing job submitted by corporate headquarters not only extracts and loads residual information, but also performs all residual calculations. The user can check the Cycles tab to determine when the job completes. Once that happens, each Commission Specialist should run the residual reports for their agents to verify the calculated residual payments.

The following Table Maintenance procedures can be followed to add, edit, remove and expire records from the tables that define and direct the commission management system processing for Accounts, Agents, Billing Codes, Contracts, Residuals, SPIFs, and Sub Markets.

To add a new account:
1. On the Accounts tab, click Add.
2. Enter the Account code, and the Dept. Override, Line Of Business, and Sub/Proj. Use the drop-down boxes to select the Account Type and Account Rules, and enter the Effective Date and Expiration Date (if applicable).
3. Click OK to add the account, or Cancel to abort the process.

To edit an account:
1. On the Accounts tab, highlight the account being changed.
2. Click Edit.
3. Enter the updated information for the account. The commission management system prevents the user from changing "key" data.
4. Click OK to process the update, or Cancel to abort the process.
NOTE: the commission management system does not allow the user to make changes to a record effective in a "frozen" month (e.g., a month for which accounting has been submitted).

To remove an account:
1. On the Accounts tab, highlight the account being removed.
2. Click Remove. In one embodiment, this function physically deletes the record.
3. The commission management system displays a confirmation window. Click Yes to remove the account, or No to abort the process.
NOTE: the commission management system does not allow the user to remove a record effective in a "frozen" month (e.g., a month for which accounting has been submitted).

To expire an account:
1. On the Accounts tab, highlight the account being expired.
2. Click Expire.
3. On the Expire dialog, enter the Expiration Date.
4. Click OK to expire the account, or Cancel to abort the process.

To clone an account:
1. On the Accounts tab, click Clone.
2. On the Agent Account Cloning dialog, highlight the Accounts To Be Cloned, select the Target Agent(s), and enter the Eff. Date and Exp. Date (if applicable).
3. Click Pend.
4. Click Start Cloning to clone the account(s), or Cancel to abort the process.

To add a new agent:
1. On the Agents tab, click Add.
2. Enter the agent Code, Type, Description and Vendor No. Use the drop-down boxes to select the Commission Vendor Site ID, Residual Vendor Site ID, and Payment Handling code, and enter the Effective Date and Expiration Date (if applicable). Set any applicable processing flags for the agent.
3. Click OK to add the agent, or Cancel to abort the process.

To edit an agent:
1. On the Agents tab, highlight the agent being changed.
2. Click Edit.
3. Enter the updated information for the agent. The commission management system prevents the user from changing "key" data.
4. Click OK to process the update, or Cancel to abort the process.
NOTE: the commission management system does not allow the user to make changes to a record effective in a "frozen" month (e.g., a month for which accounting has been submitted).

To expire an agent:
1. On the Agents tab, highlight the agent being expired.
2. Click Expire.
3. On the Expire dialog, enter the Expiration Date.
4. Click OK to expire the agent, or Cancel to abort the process.

Once an agent has been established in the commission management system, use the sub-tabs to add or change data.

To add an acquired agent to an agent:
1. On the Agents tab, highlight the agent being changed.
2. On the Acquired sub-tab, click Add.
3. Use the drop-down box to select the Acquired Agent, and enter the Effective date and Expiration date (if applicable). Set any processing flags, as appropriate.

4. Click OK to add the record, or Cancel to abort the process.

To edit an acquired agent:
1. On the Agents tab, highlight the agent being changed.
2. On the Acquired sub-tab, highlight the agent being changed and click Edit.
3. Enter the updated information for the acquired agent. The commission management system prevents the user from changing "key" data.
4. Click OK to process the update, or Cancel to abort the process.
NOTE: the commission management system does not allow the user to make changes to a record effective in a "frozen" month (e.g., a month for which accounting has been submitted).

To remove an acquired agent:
1. On the Agents tab, highlight the agent being changed.
2. On the Acquired sub-tab, highlight the agent being removed and click Remove. In one embodiment, this function physically deletes the record.
3. The commission management system displays a confirmation window. Click Yes to remove the acquired agent, or No to abort the process.
NOTE: the commission management system does not allow the user to remove a record effective in a "frozen" month (e.g., a month for which accounting has been submitted).

To add an alias code to an agent:
1. On the Agents tab, highlight the agent being changed.
2. On the Alias sub-tab, click Add.
3. Enter the Alias code, the Effective date, and the Expiration date (if applicable).
4. Click OK to add the record, or Cancel to abort the process.

To edit an alias code:
1. On the Agents tab, highlight the agent being changed.
2. On the Alias sub-tab, highlight the alias being changed and click Edit.
3. Enter the updated information for the alias code. The commission management system prevents the user from changing "key" data.
4. Click OK to process the update, or Cancel to abort the process.
NOTE: the commission management system does not allow the user to make changes to a record effective in a "frozen" month (e.g., a month for which accounting has been submitted).

To remove an alias code:
1. On the Agents tab, highlight the agent being changed.
2. On the Alias sub-tab, highlight the alias being removed and click Remove. In one embodiment, this function physically deletes the record.
3. The commission management system displays a confirmation window. Click Yes to remove the alias code, or No to abort the process.
NOTE: the commission management system does not allow the user to remove a record effective in a "frozen" month (e.g., a month for which accounting has been submitted).

To add a new billing code to the extract:
1. On the Billing Codes tab, click Show Unused.
2. Highlight the billing code being added.
3. Click Set (Un)Used.
4. On the Agent/NR Used dialog, click the appropriate box(es) to indicate whether the billing code is being added for national retailer or non-national retailer agents, then set the corresponding flag(s).
NOTE: This dialog only displays if the user has access to both types of agents.

5. Click OK to add the billing code, or Cancel to abort the process.

To remove a billing code from the extract:
1. On the Billing Codes tab, highlight the billing code being removed.
2. Click Set (Un)Used.
3. On the Agent/NR Used dialog, click the appropriate box(es) to indicate whether the billing code is being removed for national retailer or non-national retailer agents; leave the corresponding flag(s) blank.
NOTE: This dialog only displays if the user has access to both types of agents.
4. Click OK to remove the billing code, or Cancel to abort the process.

To add a new commission contract:
1. On the Contracts tab, use the drop-down box to select the agent being added the contract to.
2. Click Add beside the contract list.
3. Enter the contract Name, Description, and Noinstall amount. Use the drop-down boxes to select the Reconnect Period, Chargeback Period, and Count With contract code. Enter the Effective Date and Expiration Date (if applicable), and set the Reconnect and/or Reduced Commission flags as appropriate.
4. Click OK to add the contract, or Cancel to abort the process.

To edit a commission contract:
1. On the Contracts tab, highlight the contract being changed.
2. Click Edit.
3. Enter the updated information for the contract. The commission management system prevents the user from changing "key" data.
4. Click OK to process the update, or Cancel to abort the process.
NOTE: the commission management system does not allow the user to make changes to a record effective in a "frozen" month (e.g., a month for which accounting has been submitted).

To remove a commission contract:
1. On the Contracts tab, highlight the contract being removed.
2. Click Remove. In one embodiment, this function physically deletes the record.
3. The commission management system displays a confirmation window. Click Yes to remove the contract, or No to abort the process.
NOTE: the commission management system does not allow the user to remove a record effective in a "frozen" month (e.g., a month for which accounting has been submitted).

To expire a commission contract:
1. On the Contracts tab, highlight the contract being expired.
2. Click Expire.
3. On the Expire dialog, enter the Expiration Date.
4. Click OK to expire the contract, or Cancel to abort the process.

To clone a commission contract:
1. On the Contracts tab, click Clone.
2. On the Contracts Cloning dialog, highlight the Contracts To Be Cloned, select the Target Agents, and enter the Eff. Date and Exp. Date (if applicable). Pick the Options to be cloned.
3. Click Clone to clone the contract, or Cancel to abort the process. If the user chooses to initiate the cloning process, the user can assign a name to the clone job.

Once a commission contract has been established in the commission management system, use the sub-tabs to add or change data.

To add a submarket to a commission contract:
1. On the Contracts tab, highlight the contract being changed.
2. On the Submarkets sub-tab, click Add.
3. Highlight the submarket to be added, and enter the Effective date and Expiration date (if applicable).
4. Click OK to add the record, or Cancel to abort the process.

To edit a submarket on a commission contract:
1. On the Contracts tab, highlight the contract being changed.
2. On the Submarkets sub-tab, highlight the submarket being changed and click Edit.
3. Enter the updated information for the submarket. The commission management system prevents the user from changing "key" data.
4. Click OK to process the update, or Cancel to abort the process.
NOTE: the commission management system does not allow the user to make changes to a record effective in a "frozen" month (e.g., a month for which accounting has been submitted).

To remove a submarket from a commission contract:
1. On the Contracts tab, highlight the contract being changed.
2. On the Submarkets sub-tab, highlight the submarket being removed and click Remove. In one embodiment, this function physically deletes the record.
3. The commission management system displays a confirmation window. Click Yes to remove the submarket, or No to abort the process.
NOTE: the commission management system does not allow the user to remove a record effective in a "frozen" month (e.g., a month for which accounting has been submitted).

To expire a submarket from a commission contract:
1. On the Contracts tab, highlight the contract being changed.
2. On the Submarkets sub-tab, highlight the submarket being expired and click Expire.
3. On the Expire dialog, enter the Expiration Date.
4. Click OK to expire the submarket, or Cancel to abort the process.

To add a tier to a commission contract:
1. On the Contracts tab, highlight the contract being changed.
2. On the Tiers sub-tab, click Add.
3. Enter the Tier name, and define the Min and Max Tiers. Enter the Value to be paid, the Backout Value to be charged back, the Effective date and the Expiration date (if applicable).
4. Click OK to add the record, or Cancel to abort the process.

To edit a commission contract tier:
1. On the Contracts tab, highlight the contract being changed.
2. On the Tiers sub-tab, highlight the tier being changed and click Edit.
3. Enter the updated information for the tier. The commission management system prevents the user from changing "key" data.
4. Click OK to process the update, or Cancel to abort the process.
NOTE: the commission management system does not allow the user to make changes to a record effective in a "frozen" month (e.g., a month for which accounting has been submitted).

To remove a tier from a commission contract:
1. On the Contracts tab, highlight the contract being changed.
2. On the Tiers sub-tab, highlight the tier being removed and click Remove. In one embodiment, this function physically deletes the record.
3. The commission management system displays a confirmation window. Click Yes to remove the tier, or No to abort the process.
NOTE: the commission management system does not allow the user to remove a record effective in a "frozen" month (e.g., a month for which accounting has been submitted).

To expire a commission contract tier:
1. On the Contracts tab, highlight the contract being changed.
2. On the Tiers sub-tab, highlight the tier being expired and click Expire.
3. On the Expire dialog, enter the Expiration Date.
4. Click OK to expire the tier, or Cancel to abort the process.

To add a billing code to a commission contract:
1. On the Contracts tab, highlight the contract being changed.
2. On the Billing Codes sub-tab, click Add.
3. Highlight the billing code(s) to be added, and enter the Effective date and Expiration date (if applicable).
4. Click OK to add the record, or Cancel to abort the process.

To edit a commission contract billing code:
1. On the Contracts tab, highlight the contract being changed.
2. On the Billing Codes sub-tab, highlight the billing code being changed and click Edit.
3. Enter the updated information for the billing code. The commission management system prevents the user from changing "key" data.
4. Click OK to process the update, or Cancel to abort the process.
NOTE: the commission management system does not allow the user to make changes to a record effective in a "frozen" month (e.g., a month for which accounting has been submitted).

To remove a billing code from a commission contract:
1. On the Contracts tab, highlight the contract being changed.
2. On the Billing Codes sub-tab, highlight the billing code being removed and click Remove. In one embodiment, this function physically deletes the record.
3. The commission management system displays a confirmation window. Click Yes to remove the billing code, or No to abort the process.
NOTE: the commission management system does not allow the user to remove a record effective in a "frozen" month (e.g., a month for which accounting has been submitted).

To expire a commission contract billing code:
1. On the Contracts tab, highlight the contract being changed.
2. On the Billing Codes sub-tab, highlight the billing code being expired and click Expire.
3. On the Expire dialog, enter the Expiration Date.
4. Click OK to expire the billing code, or Cancel to abort the process.

To clone a commission contract billing code:
1. On the Contracts tab, highlight the contract being changed.
2. On the Billing Codes sub-tab, click Clone.)
3. On the Contract Billing Codes Cloning dialog, highlight the Billing Codes To Be Cloned, select the Target Contracts, and enter the Eff. Date and Exp. Date (if applicable).
4. Click Clone to clone the billing code, or Cancel to abort the process. If the user chooses to initiate the cloning process, the user can assign a name to the clone job.

To add a new residual contract:
1. On the Residuals tab, use the drop-down box to select the agent being added the contract to.
2. On the Contracts sub-tab, click Add.
3. Enter the contract Name, the Cust. Start Date, and the Cust. End Date. Use the drop-down boxes to select the True Up Cycle and Fall Off Period, and enter the Effective Date and Expiration Date (if applicable). Set the Quota flag, if appropriate, and check the revenue component(s).
4. Click OK to add the contract, or Cancel to abort the process.

To edit a residual contract:
1. On the Contracts sub-tab, highlight the contract being changed.
2. Click Edit.
3. Enter the updated information for the contract. The commission management system prevents the user from changing "key" data.
4. Click OK to process the update, or Cancel to abort the process.
NOTE: the commission management system does not allow the user to make changes to a record effective in a "frozen" month (e.g., a month for which accounting has been submitted).

To remove a residual contract:
1. On the Contracts sub-tab, highlight the contract being removed.
2. Click Remove. In one embodiment, this function physically deletes the record.
3. The commission management system displays a confirmation window. Click Yes to remove the contract, or No to abort the process.
NOTE: the commission management system does not allow the user to remove a record effective in a "frozen" month (e.g., a month for which accounting has been submitted).

To expire a residual contract:
1. On the Contracts sub-tab, highlight the contract being expired.
2. Click Expire.
3. On the Expire dialog, enter the Expiration Date.
4. Click OK to expire the contract, or Cancel to abort the process.

Once a residual contract has been established in the commission management system, use the sub-tabs to add or change data.

To add a submarket to a residual contract:
1. On the Contracts sub-tab, highlight the contract being changed.
2. On the Submarkets sub-tab, click Add.
NOTE: For contracts containing quotas, this function button is de-activated once a "master" submarket is assigned to that contract.
3. Highlight the submarket to be added, and enter the Effective date and Expiration date (if applicable).
4. Click OK to add the record, or Cancel to abort the process.

To edit a submarket on a residual contract:
1. On the Contracts sub-tab, highlight the contract being changed.
2. On the Submarkets sub-tab, highlight the submarket being changed and click Edit.
3. Enter the updated information for the submarket. The commission management system prevents the user from changing "key" data.
4. Click OK to process the update, or Cancel to abort the process.
NOTE: the commission management system does not allow the user to make changes to a record effective in a "frozen" month (e.g., a month for which accounting has been submitted).

To remove a submarket from a residual contract:
1. On the Contracts tab, highlight the contract being changed.
2. On the Submarkets sub-tab, highlight the submarket being removed and click Remove. In one embodiment, this function physically deletes the record.
3. The commission management system displays a confirmation window. Click Yes to remove the submarket, or No to abort the process.
NOTE: the commission management system does not allow the user to remove a record effective in a "frozen" month (e.g., a month for which accounting has been submitted).

To add a tier to a residual contract:
1. On the Contracts sub-tab, highlight the contract being changed.
2. On the Tiers sub-tab, click Add.
3. Enter the Tier name, and define the Min and Max Tiers. Enter the Percent to be paid, the Effective date and the Expiration date (if applicable).
4. Click OK to add the record, or Cancel to abort the process.

To edit a residual contract tier:
1. On the Contracts sub-tab, highlight the contract being changed.
2. On the Tiers sub-tab, highlight the tier being changed and click Edit.
3. Enter the updated information for the tier. The commission management system prevents the user from changing "key" data.
4. Click OK to process the update, or Cancel to abort the process.
NOTE: the commission management system does not allow the user to make changes to a record effective in a "frozen" month (e.g., a month for which accounting has been submitted).

To remove a tier from a residual contract:
1. On the Contracts tab, highlight the contract being changed.
2. On the Tiers sub-tab, highlight the tier being removed and click Remove. In one embodiment, this function physically deletes the record.
3. The commission management system displays a confirmation window. Click Yes to remove the tier, or No to abort the process.
NOTE: the commission management system does not allow the user to remove a record effective in a "frozen" month (e.g., a month for which accounting has been submitted).

To add a residual vesting period:
1. On the Residuals tab, use the drop-down box to select the agent being added the vesting period to.
2. On the Vesting sub-tab, click Add.
3. Use the drop-down box to select the Period, and enter the Effective date and Expiration date (if applicable).

4. Click OK to add the period, or Cancel to abort the process.

To edit a residual vesting period:
1. On the Vesting sub-tab, highlight the period being changed.
2. Click Edit.
3. Enter the updated information for the period. The commission management system prevents the user from changing "key" data.
4. Click OK to process the update, or Cancel to abort the process.

NOTE: the commission management system does not allow the user to make changes to a record effective in a "frozen" month (e.g., a month for which accounting has been submitted).

To remove a residual vesting period:
1. On the Vesting sub-tab, highlight the period being removed.
2. Click Remove. In one embodiment, this function physically deletes the record.
3. The commission management system displays a confirmation window. Click Yes to remove the period, or No to abort the process.

NOTE: the commission management system does not allow the user to remove a record effective in a "frozen" month (e.g., a month for which accounting has been submitted).

To expire a residual vesting period:
1. On the Vesting sub-tab, highlight the period being expired.
2. Click Expire.
3. On the Expire dialog, enter the Expiration Date.
4. Click OK to expire the period, or Cancel to abort the process.

To add a residual "master" submarket:
1. On the Residuals tab, use the drop-down box to select the agent being added the master submarket to.
2. Click on the Quotas sub-tab.
3. On the Rollup sub-tab, click New list.
4. Highlight the master Submarket(s) to be added.
5. Click Add to add the master submarket, or Cancel to abort the process.

To remove a residual "master" submarket:
1. Click on the Quotas sub-tab.
2. On the Rollup sub-tab, highlight the master submarket being removed. Note that all Associated Submarkets will also be removed.
3. Click Remove. In one embodiment, this function physically deletes the record.
4. The commission management system displays a warning window. Click OK to remove the submarket and its associated rollup list, or Cancel to abort the process.

NOTE: the commission management system does not allow the user to remove a record effective in a "frozen" month (e.g., a month for which accounting has been submitted).

To add a submarket to a rollup list:
1. Click on the Quotas sub-tab.
2. On the Rollup sub-tab, highlight the master submarket being added associated submarkets to.
3. Click Add beside the associated submarket list.
4. Highlight the Submarket(s) to be added.
5. Click Add to proceed, or Cancel to abort the process.
6. The commission management system displays a confirmation window. Click OK to add the submarket, or Cancel to abort the process.

To remove a submarket from a rollup list:
1. Click on the Quotas sub-tab.
2. On the Rollup sub-tab, highlight the master submarket being removed associated submarkets from.
3. Click Remove beside the Associated Submarkets list. In one embodiment, this function physically deletes the record.
4. The commission management system displays a warning window. Click OK to remove the submarket, or Cancel to abort the process.

To add a residual quota grid:
1. On the Residuals tab, use the drop-down box to select the agent being added the quota grid to.
2. On the Quotas Quota sub-tab, use the drop-down boxes to select the "master" submarket and the year.
3. Click New.
4. Enter the Quota applicable to each Year and Month combination.
5. Click Apply to add the quota grid, or Cancel to abort the process.

To add or change quota amounts on a residual quota grid:
1. On the Quotas Quota sub-tab, use the drop-down boxes to select the "master" submarket and the year.
2. Highlight the displayed Quota for the applicable Year and Month combination, and enter the new quota amount.
3. Click Apply to process the update, or Cancel to abort the process.

To add a residual quota tier:
1. On the Residuals tab, use the drop-down box to select the agent being added the quota tiers to.
2. Click on the Quotas sub-tab.
3. On the Quota Tiers sub-tab, click Add.
4. Enter the Tier name, the Min Attain and the Max Attain, and the payment Percent.
5. Click OK to add the tier, or Cancel to abort the process.

To edit a residual quota tier:
1. Click on the Quotas sub-tab.
2. On the Quota Tiers sub-tab, highlight the tier being changed.
3. Click Edit.
4. Enter the updated information for the tier. The commission management system prevents the user from changing "key" data.
5. Click OK to process the update, or Cancel to abort the process.

NOTE: the commission management system does not allow the user to make changes to a record effective in a "frozen" month (e.g., a month for which accounting has been submitted).

To remove a residual quota tier:
1. Click on the Quotas sub-tab.
2. On the Quota Tiers sub-tab, highlight the tier being removed.
3. Click Remove. In one embodiment, this function physically deletes the record.
4. The commission management system displays a confirmation window. Click Yes to remove the tier, or No to abort the process.

NOTE: the commission management system does not allow the user to remove a record effective in a "frozen" month (e.g., a month for which accounting has been submitted).

To clone a residual quota tier:
1. Click on the Quotas sub-tab.
2. On the Quota Tiers sub-tab, click Clone.
3. On the Residual Quota Tiers Cloning dialog, highlight the Residual Quota Tiers To Be Cloned and select the Target Agent and Submarkets.

4. Click Clone to clone the billing code, or Cancel to abort the process. If the user chooses to initiate the cloning process, the user can assign a name to the clone job.

SPIFs

To add a new commission SPIF:

1. On the SPIFs tab, use the drop-down box to select the agent being added the SPIF to.
2. Click Add beside the SPIF list.
3. Enter the SPIF Name, and use the drop-down boxes to select the Type, Count With SPIF code, Primary Operation and Secondary Operation. Enter the Effective date and Expiration date (if applicable), and set the Charge back flag as appropriate.
4. Click OK to add the SPIF, or Cancel to abort the process.

To edit a commission SPIF:

1. On the SPIFs tab, highlight the SPIF being changed.
2. Click Edit.
3. Enter the updated information for the SPIF. The commission management system prevents the user from changing "key" data.
4. Click OK to process the update, or Cancel to abort the process.

NOTE: the commission management system does not allow the user to make changes to a record effective in a "frozen" month (e.g., a month for which accounting has been submitted).

To remove a commission SPIF:

1. On the SPIFs tab, highlight the SPIF being removed.
2. Click Remove. In one embodiment, this function physically deletes the record.
3. The commission management system displays a confirmation window. Click Yes to remove the SPIF, or No to abort the process.

NOTE: the commission management system does not allow the user to remove a record effective in a "frozen" month (e.g., a month for which accounting has been submitted).

To expire a commission SPIF:

1. On the SPIFs tab, highlight the SPIF being expired.
2. Click Expire.
3. On the Expire dialog, enter the Expiration Date.
4. Click OK to expire the SPIF, or Cancel to abort the process.

To clone a commission SPIF:

1. On the SPIFs tab, click Clone.
2. On the SPIFs Cloning dialog, highlight the SPIFs To Be Cloned, select the Target Agents, and enter the Eff. Date and Exp. Date (if applicable). Pick the Options to be cloned.
3. Click Clone to clone the SPIF, or Cancel to abort the process. If the user chooses to initiate the cloning process, the user can assign a name to the clone job.

Once a commission SPIF has been established in the commission management system use the sub-tabs to add or change data.

To add a submarket to a commission SPIF:

1. On the SPIFs tab, highlight the SPIF being changed.
2. On the Submarkets sub-tab, click Add.
3. Highlight the submarket to be added, and enter the Effective date and Expiration date (if applicable).
4. Click OK to add the record, or Cancel to abort the process.

To edit a submarket on a commission SPIF:

1. On the SPIFs tab, highlight the SPIF being changed.
2. On the Submarkets sub-tab, highlight the submarket being changed and click Edit.
3. Enter the updated information for the submarket. The commission management system prevents the user from changing "key" data.

4. Click OK to process the update, or Cancel to abort the process.

NOTE: the commission management system does not allow the user to make changes to a record effective in a "frozen" month (e.g., a month for which accounting has been submitted).

To remove a submarket from a commission SPIF:

1. On the SPIFs tab, highlight the SPIF being changed.
2. On the Submarkets sub-tab, highlight the submarket being removed and click Remove. In one embodiment, this function physically deletes the record.
3. The commission management system displays a confirmation window. Click Yes to remove the submarket, or No to abort the process.

NOTE: the commission management system does not allow the user to remove a record effective in a "frozen" month (e.g., a month for which accounting has been submitted).

To expire a submarket from a commission SPIF:

1. On the SPIFs tab, highlight the SPIF being changed.
2. On the Submarkets sub-tab, highlight the submarket being expired and click Expire.
3. On the Expire dialog, enter the Expiration Date.
4. Click OK to expire the submarket, or Cancel to abort the process.

To add a tier to a commission SPIF:

1. On the SPIFs tab, highlight the SPIF being changed.
2. On the Tiers sub-tab, click Add.
3. Enter the Min and Max Tiers, the Value to be paid, the Effective date and the Expiration date (if applicable).
4. Click OK to add the record, or Cancel to abort the process.

To edit a commission SPIF tier:

1. On the SPIFs tab, highlight the SPIF being changed.
2. On the Tiers sub-tab, highlight the tier being changed and click Edit.
3. Enter the updated information for the tier. The commission management system prevents the user from changing "key" data.
4. Click OK to process the update, or Cancel to abort the process.

NOTE: the commission management system does not allow the user to make changes to a record effective in a "frozen" month (e.g., a month for which accounting has been submitted).

To remove a tier from a commission SPIF:

1. On the SPIFs tab, highlight the SPIF being changed.
2. On the Tiers sub-tab, highlight the tier being removed and click Remove. In one embodiment, this function physically deletes the record.
3. The commission management system displays a confirmation window. Click Yes to remove the tier, or No to abort the process.

NOTE: the commission management system does not allow the user to remove a record effective in a "frozen" month (e.g., a month for which accounting has been submitted).

To expire a commission SPIF tier:

1. On the SPIFs tab, highlight the SPIF being changed.
2. On the Tiers sub-tab, highlight the tier being expired and click Expire.
3. On the Expire dialog, enter the Expiration Date.
4. Click OK to expire the tier, or Cancel to abort the process.

To add a billing code to a commission SPIF:

1. On the SPIFs tab, highlight the SPIF being changed.
2. On the Billing Codes sub-tab, click Process.

3. Click on either the Primary sub-tab or the Secondary sub-tab. Use the drop-down boxes to select the primary and/or secondary operation, and click Add.

4. Highlight the billing code(s) to be added, and enter the Effective date and Expiration date (if applicable).

5. Click OK to add the record, or Cancel to abort the process.

To edit a billing code on a commission SPIF:
1. On the SPIFs tab, highlight the SPIF being changed
2. On the Billing Codes sub-tab, click Process.
3. Click on either the Primary sub-tab or the Secondary sub-tab.
4. Highlight the billing code being changed, and click Edit.
5. Enter the updated information for the billing code. The commission management system prevents the user from changing "key" data.
6. Click OK to process the update, or Cancel to abort the process.

NOTE: the commission management system does not allow the user to make changes to a record effective in a "frozen" month (e.g., a month for which accounting has been submitted).

To remove a billing code from a commission SPIF:
1. On the SPIFs tab, highlight the SPIF being changed.
2. On the Billing Codes sub-tab, click Process.
3. Click on either the Primary sub-tab or the Secondary sub-tab.
4. Highlight the billing code being removed and click Remove. In one embodiment, this function physically deletes the record.
5. The commission management system displays a confirmation window. Click Yes to remove the billing code, or No to abort the process.

NOTE: the commission management system does not allow the user to remove a record effective in a "frozen" month (e.g., a month for which accounting has been submitted).

To expire a commission SPIF billing code:
1. On the SPIFs tab, highlight the SPIF being changed.
2. On the Billing Codes sub-tab, click Process.
3. Click on either the Primary sub-tab or the Secondary sub-tab.
4. Highlight the billing code being expired and click Expire.
5. On the Expire dialog, enter the Expiration Date.
6. Click OK to expire the billing code, or Cancel to abort the process.

To clone a commission SPIF billing code:
1. On the SPIFs tab, highlight the SPIF being changed.
2. On the Billing Codes sub-tab, click Clone.
3. On the SPIFs Billing Codes Cloning dialog, highlight the Billing Codes To Be Cloned, select the Target SPIFs, and enter the Eff. Date and Exp. Date (if applicable).
4. Click Clone to clone the billing code, or Cancel to abort the process. If the user chooses to initiate the cloning process, the user can assign a name to the clone job.

To add a new submarket to the location:
1. On the Sub Markets tab, click Add.
2. On the Sub Market dialog, enter the submarket Name, Description, Company Code and Effective date.
3. Click Add beside the service area list.
4. On the Add Service Area to Sub Market dialog, highlight the service area code(s) to be added. Click OK to add the service area code, or Cancel to return to the Sub Market dialog.
5. When all service areas have been defined, click OK to add the submarket, or Cancel to abort the process.

To edit a submarket:
1. On the Sub Markets tab, click Edit.
2. Enter the updated information for the submarket. The commission management system prevents the user from changing "key" data.
3. To add new service areas to the submarket, click Add beside the service area list and select the service area code(s) to be added.
4. To remove a service area from a submarket, highlight the Service Area Code to be removed and click Remove beside the service area list.
5. Click OK to process the update, or Cancel to abort the process.

NOTE: the commission management system does not allow the user to make changes to a record effective in a "frozen" month (e.g., a month for which accounting has been submitted).

Once a submarket has been established in the commission management system, use the Business Unit sub-tab to add or change the associated accounting information for each agent who sells in that submarket.

To add a business unit to a submarket:
1. On the Sub Markets tab, highlight the submarket being changed.
2. On the Business Unit sub-tab, click Set to select the agent being added the business unit to, and click OK.
3. Click Add beside the business unit list.
4. Enter the Function/Job code, Org./Dept. code, Effective date and Expiration date (if applicable).
5. Click OK to add the record, or Cancel to abort the process.

To edit a business unit:
1. On the Sub Markets tab, highlight the submarket being changed.
2. On the Business Unit sub-tab, click Set to select the agent being changed, and click OK.
3. Highlight the record being changed, and click Edit.
4. Enter the updated information for the business unit. The commission management system prevents the user from changing "key" data.
5. Click OK to process the update, or Cancel to abort the process.

NOTE: the commission management system does not allow the user to make changes to a record effective in a "frozen" month (e.g., a month for which accounting has been submitted).

To remove a business unit:
1. On the Business Unit sub-tab, click Set to select the agent being changed, and click OK.
2. Highlight the record being removed, and click Remove. In one embodiment, this function physically deletes the record.
3. The commission management system displays a confirmation window. Click Yes to remove the business unit, or No to abort the process.

NOTE: the commission management system does not allow the user to remove a record effective in a "frozen" month (e.g., a month for which accounting has been submitted).

To expire a business unit:
1. On the Business Unit sub-tab, click Set to select the agent being changed, and click OK.
2. Highlight the record being expired, and click Expire.
3. On the Expire dialog, enter the Expiration Date.
4. Click OK to expire the business unit, or Cancel to abort the process.

Other Module

One embodiment of the present invention will now be discussed with respect to the Other Module screen descriptions and procedures. There are four different tab options provided within the commission management system's Other Module, separate tabs are provided to process different types of data. The commission management system Other Module handles administrative functions not specific to either Direct or Agent processing: Comments, Codes, Printers, and Info Notes. The "Comments" function allows the user to send messages to and receive messages from the user's representative's Web session(s). The "Codes" function defines market-specific entries that populate certain drop-down boxes in the Direct and Agent modules. The "Printers" function identifies the printer(s) available for use with the commission management system in the user's location. The "Info Notes" function provides an audit trail of user-initiated changes to the commission management system data.

Figure 110:
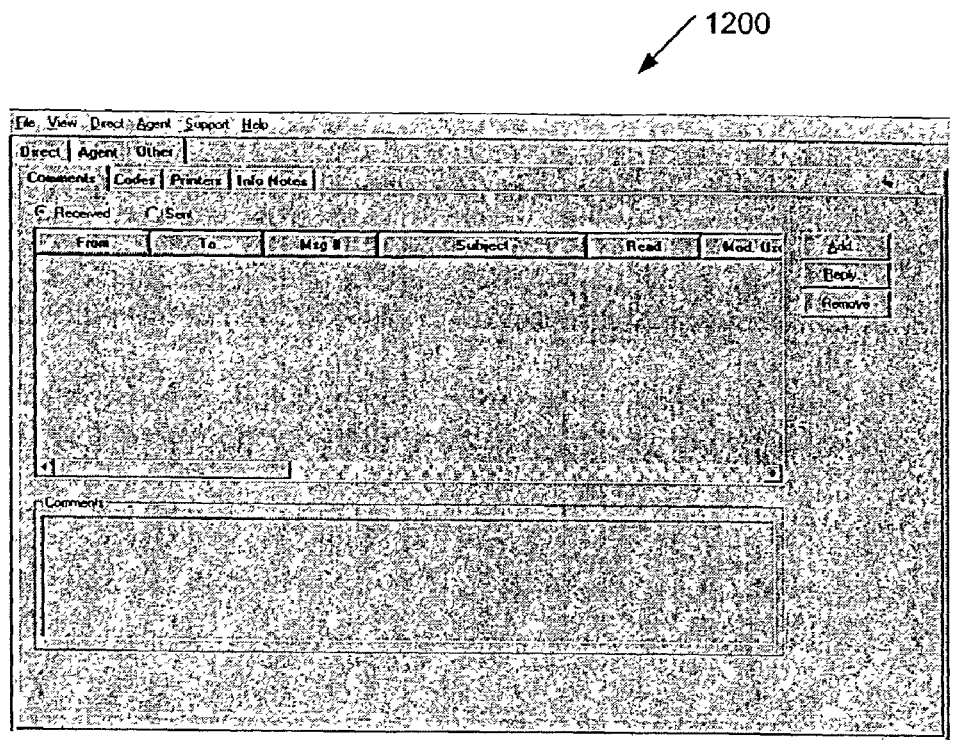
FIG. 110 illustrates one example of a screen associated with a portion of a software module feature according to one embodiment of the present invention.

FIG. 110 illustrates one embodiment of one example of a "Comments" tab screen 1200. The Comments tab provides a means of communicating back-and-forth with the user's representatives via their Web session(s). Initially, this tab displays any messages Received from the representatives. The user can Click Sent to display messages the user has sent to any of the user's representatives. The username of the originator displays in the From column. A unique Msg # is assigned to each message created. The commission management system marks each message as Read once the recipient reviews it.

Figure 111:
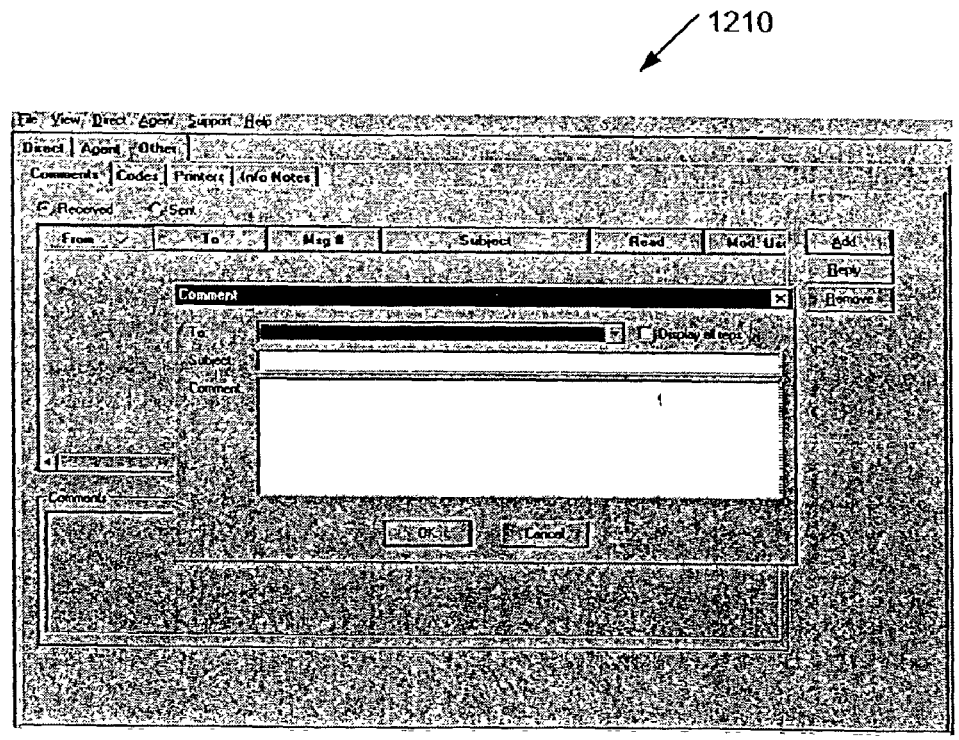
FIG. 111 illustrates one example of a screen associated with a portion of a software module feature according to one embodiment of the present invention.

FIG. 111 illustrates one embodiment of one example of a "Comment" dialog screen 1210 that captures the text of the comment message. The field definitions associated with the "Comment" dialog screen 1210 are:

1. "To"—The recipient(s) of the message. To specify an individual rep, click Display all representatives and choose the recipient from the drop-down box.
2. "Subject"—The subject of the message.
3. "Comment"—The detailed text of the message.

Figure 112:
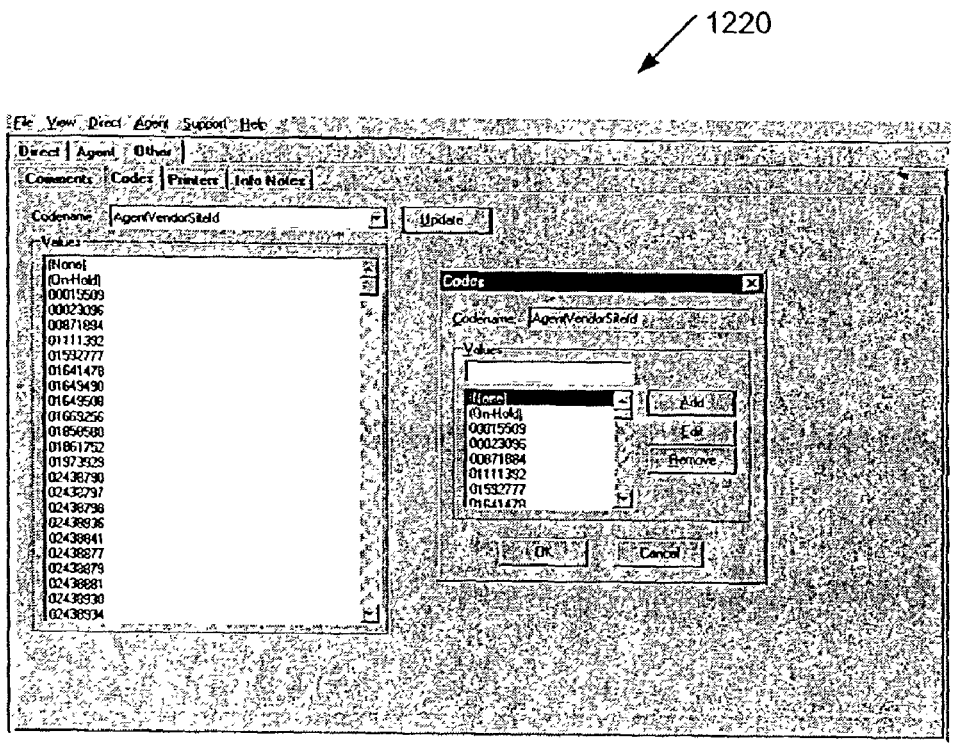
FIG. 112 illustrates one example of a screen associated with a portion of a software module feature according to one embodiment of the present invention.

FIG. 112 illustrates one embodiment of one example of a "Codes" tab screen 1220. The Codes tab defines the valid entries, as determined by each market, to populate certain drop-down boxes in the Direct and Agent modules. The field definitions associated with the "Codes" tab screen 1220 are:

1. "Codename"—Use the drop-down box to select the type of code.
2. "Values"—The valid values associated with each codename.

Figure 113:
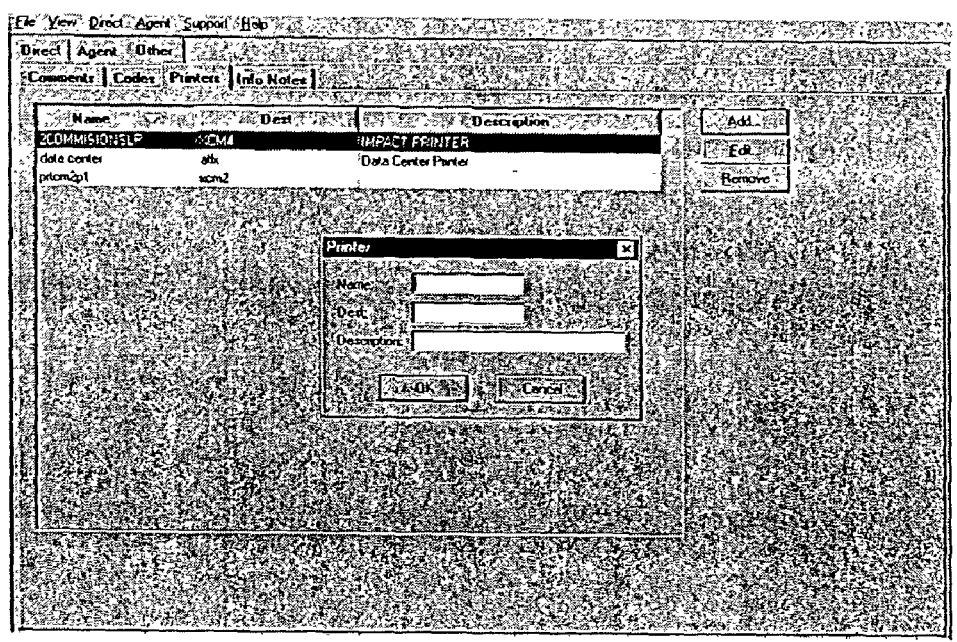
FIG. 113 illustrates one example of a screen associated with a portion of a software module feature according to one embodiment of the present invention.

FIG. 113 illustrates one embodiment of one example of a "Printers" tab screen 1230. The Printers tab defines any impact printer(s) accessed through a mainframe server that are available for use with the commission management system in the user's location. The field definitions associated with the "Printers" tab screen 1230 are:

1. "Name"—The printer name.
2. "Dent"—The printer destination.
3. "Description"—A description of the printer.

Figure 114:
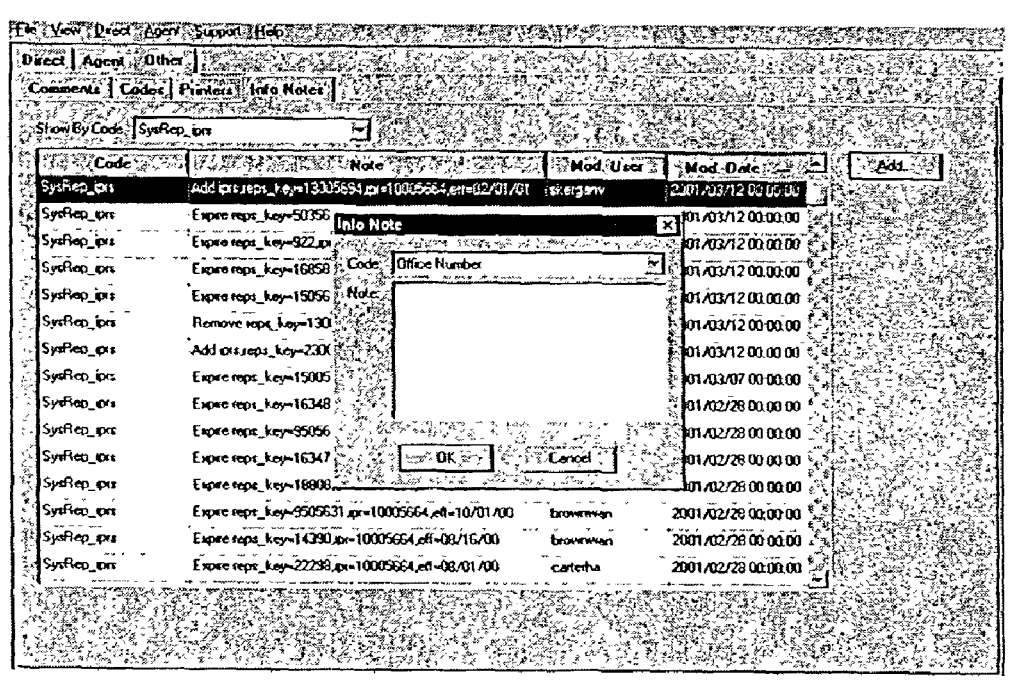
FIG. 114 illustrates one example of a screen associated with a portion of a software module feature according to one embodiment of the present invention.

FIG. 114 illustrates one embodiment of one example of an "Info Notes" tab screen 1240. The Info Notes tab tracks all user-initiated changes to the commission management system data. The field definitions associated with the "Info Notes" tab screen 1240 are:

1. "Code"—Use the drop-down box to select the type of data.
2. "Note"—The "note" describing the data change.

Having discussed one embodiment of the present invention with respect to the Other Module screen descriptions, one embodiment of the present invention with respect to various Other Module procedures will now be described. There are four separate functional procedures in the Other Module that are available to a user of the commission management system Other Module in accordance with one embodiment of the present invention. The separate four functional procedures are the "Comments" procedure, the "Codes" procedure, the "Printers" procedure, and "Info Notes" procedure.

The user can Click on the Comments tab and follow these procedures to send messages to the user's representative's Web session(s).

To add a new message:
1. Click Add.
2. Select who the message should be sent To, enter the Subject of the message, the user's Comment.
3. Click OK to send the message, or Cancel to abort the process.

To reply to a representative's message:
1. Click the Received box to display messages the user has received.
2. Highlight the message the user wants to respond to, and click Reply.
3. Update the Subject, if desired, and enter the user's Comment.
4. Click OK to send the reply, or Cancel to abort the process.

To remove a message:
1. Click the Received box to display messages the user has received, or the Sent box to display messages the user sent.
2. Highlight the message the user wants to remove, and click Remove. In one embodiment, this functions physically deletes the record.
3. The commission management system displays a confirmation window. Click Yes to remove the message, or No to abort the process.

The user can Click on the Codes tab and follow these procedures to maintain the valid values defined by the particular market for certain drop-down boxes.

To add a new code value:
1. Use the drop-down box to select the Codename being added values to.
2. Click Update.
3. Enter the Values, and click Add.
4. Click OK to add the value, or Cancel to abort the process.

To edit a code value:
1. Use the drop-down box to select the Codename being changed.
2. Click Update.
3. Click on the value being changed to "pull" that entry into the Values box.
4. Make any updates in the Values box, and click Edit.
5. Click OK to process the update, or Cancel to abort the process.

To remove a code value:
1. Use the drop-down box to select the Codename being changed.
2. Click Update.
3. Highlight the value being removed, and click Remove. In one embodiment, this function physically deletes the record.
4. Click OK to remove the value, or Cancel to abort the process.

The user can Click on the Printers tab and follow these procedures to identify the server printers available for use with the commission management system.

To add a new printer:
1. Click Add.
2. Enter the printer Name, Destination and Description.

3. Click OK to add the printer, or Cancel to abort the process.

To edit a printer:
1. Highlight the printer being changed.
2. Click Edit.
3. Enter the updated information for the printer.
4. Click OK to process the update, or Cancel to abort the process.

To remove a printer:
1. Highlight the printer being removed.
2. Click Remove. In one embodiment, this function physically deletes the record.
3. The commission management system displays a confirmation window. Click Yes to remove the printer, or No to abort the process.

The user can Click on the Info Notes tab and follow these procedures to review the user-initiated changes to the commission management system data.

To review notes:
1. Use the drop-down box to Show notes By Code.
2. Scroll through the notes.

To add a new note:
1. Click Add.
2. Use the drop-down box to select the Code being added a note to.
3. Enter the Note.
4. Click OK to add the info note, or Cancel to abort the process.

One embodiment of the present invention will now be described with respect to the toolbar functions available in the commission management system. Accordingly, the following functions are available through the toolbar at the top of each screen in the commission management system. Note that certain items in these menus may be disabled based on the particular security set-up.

File
1. Click Print Setup to set the particular print options within the commission management system.
2. Click Exit to log out of the commission management system.

View
1. Click Location, or press F3, to select the location in which the user is working.
2. Click Refresh, or press F5, to update the particular screen.
3. Click Messages, or press F10, to display any "instant" messages sent from corporate headquarters to the commission management system users.
4. Click Status Bar to turn the status bar across the bottom of each the commission management system screen "on" and "off".

Direct
1. Click Reports to generate reports from the Direct module of the commission management system. Select the type of report the user wants to run, then define the report parameters. To export the report data into a text file, click the Export box at the top of the screen, select the report(s) to export, and click Preview. Click Export in the toolbar across the top of the preview window, specify the Save As information, click Save, then click Close. The user can now access the text file the user created just as the user would do for any other document.
2. Click Tools to access a sub-menu of useful "short-cuts" in the commission management system.
  a. Explore, or F7, accesses the Direct Explore function.
  b. Calculate allows the user to calculate an entire store or location.
  c. Load allows the user to reload an individual representative's transactions, or to load new values for a specific billing code.
  d. Relocate Rep streamlines the process of expiring a rep from one location and adding him/her to another.
  e. Store MBO allows the user to enter an MBO score to apply to all representatives in a specific store.
  f. Assign IPR To Representatives allows the user to assign an IPR to multiple representatives at once.
  g. Click Payroll to either preview or submit the current processing month's payroll file. Once the user submits, the month is "frozen" in the commission management system; only corporate headquarters can reset or "un-freeze" the month.

Agent
1. Click Reports to generate reports from the Agent module of the commission management system. Select the type of report the user wants to run, then define the report parameters. To export the report data into a text file, click the Export box at the top of the screen, select the report(s) to export, and click Preview. Click Export in the toolbar across the top of the preview window, specify the Save As information, click Save, then click Close. The user can now access the text file the user created just as the user would access any other document.
2. Click Tools to access a sub-menu of useful "short-cuts" in the commission management system.
  a. Explore, or F8, accesses the Agent Explore function.
  b. Calculate allows the user to calculate an individual agent.
  c. Load allows the user to reload an individual agent's transactions.
  d. Extract is no longer available; all extracts are now initiated from corporate headquarters.
3. Click Accounting to either preview or submit the current processing month's accounting file. Once the user submits, the month is "frozen" in the commission management system; only corporate headquarters can reset or "un-freeze" the month.

Support
1. Processes and Log are designed for use by corporate headquarters personnel.

Help
1. Click Help Topics to access the commission management system's online "help" facility.
2. Click About the commission management system to verify the commission management system version number the user is running.

According to exemplary embodiments of the present invention, there is a computer system for managing commissions, including: a storage device containing a database having commission data and a periodic extract of sales transactions stored therein; a user interface for inputting the commission data into the database and viewing the commission data stored in the database; and a processor for calculating commissions for sales representatives and agents associated with a business enterprise based on the commission data, and forwarding the calculated commissions to a payroll department within the business enterprise; wherein the processor executes: a first software module for retrieving billing, inventory, corporate, and affiliated sales information for the sales representatives, and for calculating the commissions based on a predetermined rules set; and a second software module for retrieving billing and affiliated sales information for the agents, and for calculating the commissions based on the terms of a contract between the agent and the business enterprise. The user interface can comprise an Internet software application. The commission data can be stored in the database via a billing backend computer system that interacts with a plurality of point of sale terminals. The processor calculates bonuses for the sales representatives and the agents, and forwards the calculated bonuses to the payroll department within the business enterprise. The processor calculates residuals for the sales representatives and the agents, and forwards the calculated residuals to the payroll department within the business enterprise. The processor calculates commissions for the sales representatives and the agents, and forwards the calculated commissions to an accounting department within the business enterprise. The processor calculates bonuses for the sales representatives and the agents, and forwards the calculated bonuses to an accounting department within the business enterprise. The processor calculates residuals for the sales representatives and the agents, and forwards the calculated residuals to an accounting department within the business enterprise. The commission data is date-sensitive and has both an effective date and an expiration date associated with the commission data stored in the database. The processor provides a snapshot of historical data for an effective period measured according to the effective date. The first software module is a Direct Module. The second software module is an Agent Module. The processor executes a third software module for providing administrative functions for interacting with the first software module and the second software module. The third software module is an Other Module.

According to other exemplary embodiments of the present invention, a method of managing commissions, includes: communicating with a plurality of commissions object servers located in a central location via a client component implemented as a plurality of GUI applications; determining commission compensation amounts via a plurality of interface processes components; and reporting the commission compensation amounts. Allowing a commissions specialist to approve or reject specific sales transactions via a user interface. Allowing a commissions specialist to calculate commissions via a user interface. Allowing a commissions specialist to calculate bonus amounts via a user interface. Allowing a commissions specialist to maintain sales force information via a user interface. Providing data to the client component from any one of a billing/pricing system, inventory system, payroll system, accounting system, affiliated system, and ad-hoc reporting system. Validating sales and commissions information via a commission web system component.

According to other exemplary embodiments of the present invention, a commission management system, including: a first computer including one or more clients and browsers in communication with a plurality of remotely located computers; wherein the first computer collects commission data from the plurality of remotely located computers and executes: a first software module for retrieving billing, inventory, corporate, and affiliated sales information for sales representatives associated with a business enterprise via the remotely located computers, and for calculating commissions based on a predetermined rules set; and a second software module for retrieving billing and affiliated sales information for agents associated with the business enterprise, via the remotely located computers and for calculating the commissions based on the terms of a contract between the agent and the business enterprise. The first software module is a Direct Module. The second software module is an Agent Module. The first computer executes a third software module for providing administrative functions for interacting with the first software module and the second software module. The third software module is an Other Module. The first and second software modules reside in the first computer in the form of a CORBA application executing on one or more servers. The plurality of remotely located computers comprise a plurality of external systems forming a distributed computing environment residing in various geographic locations. The plurality of external systems include any of a billing/pricing system, an inventory system, a payroll and accounting system, an affiliate system, and an ad-hoc reporting system. The commission management system further includes a web server in communication with the first computer.

While the present invention has been described in conjunction with its presently contemplated best mode, it is clear that it is susceptible to various modifications, modes of operation, and embodiments, all within the ability of those skilled in the art and without exercise of further inventive activity. Further, while the present invention has been described in connection with what is presently considered the most practical and preferred embodiments, it is to be understood that the invention is not limited to the disclosed embodiments, but on the contrary, it is intended to cover various modifications and equivalent arrangements included within the scope of the appended claims. The foregoing description and the following claims are intended to cover all such modifications and variations.

What is claimed is:

1. A computer system for managing commissions, comprising:
   a storage device containing a database having sales data representing sales made to purchasers by members of a distributed sales team of a business enterprise, commission calculation data for computing sales commissions for the members of the distributed sales team and a periodic extract of sales transactions for the business enterprise stored therein;
   a user interface for inputting the sales data and commission calculation data into the database and viewing reports derived from the sales data and the commission calculation data stored in the database; and
   a processor for processing data associated with the members of the distributed sales team;
   wherein the processor retrieves only a sub-group of the billing, inventory, corporate, and affiliated sales information associated with a selected sub-set of the members of the distributed sales team to calculate commissions for the sub-set of the members of the distributed sales team based on rules set by the commission calculation data and forwards the calculated commissions for the selected sub-set of the members of the distributed sales team to a payroll department within the business enterprise; and
   provides an interface for enabling the members of the distributed sales team to review commissions prior to payment of the commissions.

2. The computer system of claim 1, wherein the user interface comprises an Internet software application.

3. The computer system of claim 1, wherein the commission data is stored in the database via a billing backend computer system that interacts with a plurality point of sale terminals.

4. The computer system of claim 1, wherein the processor calculates residuals for the members of the distributed sales team, and forwards the calculated residuals to an accounting department within the business enterprise.

5. The computer system of claim 1, wherein the commission data is date-sensitive and has both an effective date and an expiration date associated with the sales data stored in the database.

6. The computer system of claim 5, wherein the processor provides a snapshot of historical data for an effective period measured according to the effective date.

7. The computer system of claim 1, wherein the processor provides administrative functions.

8. A method of managing commissions, comprising:
communicating with a plurality of commissions object servers located in a central location via a client component implemented as a plurality of GUI applications;
providing data to the client component from a billing/pricing system, inventory system, payroll system, accounting system, affiliated system, and ad-hoc reporting system;
storing in a database sales data representing sales made to purchasers by members of a sales team of a business enterprise, commission calculation data for computing sales commissions for the members of the distributed sales team and a periodic extract of sales transactions for the business enterprise stored therein;
presenting a user interface for inputting the sales data and commission calculation data into the database and for viewing reports derived from the sales data and the commission calculation data stored in the database; and
processing data associated with the members of the distributed sales team, wherein the processing data includes:
retrieving only a sub-group of the billing, inventory, corporate, and affiliated sales information associated with a selected sub-set of the members of the distributed sales team to calculate commissions for the sub-set of the members of the distributed sales team based on rules set by the commission calculation data;
forwarding the calculated commissions for the selected sub-set of the members of the distributed sales team to a payroll department within the business enterprise; and
providing an interface for enabling the members of the distributed sales team to review commissions prior to payment of the commissions.

9. The method of claim 8, further comprising allowing a commissions specialist to approve or reject specific sales transactions via a user interface.

10. The method of claim 8, further comprising allowing a commissions specialist to calculate commissions via a user interface.

11. The method of claim 8, further comprising allowing a commissions specialist to calculate bonus amounts via a user interface.

12. The method of claim 8, further comprising allowing a commissions specialist to maintain sales force information via a user interface.

13. The method of claim 8, further comprising validating sales and commissions information via a commission web system component.

* * * * *